United States Patent [19]
Doshi et al.

[11] Patent Number: 5,642,501
[45] Date of Patent: Jun. 24, 1997

[54] COMPUTER METHOD AND APPARATUS FOR ASYNCHRONOUS ORDERED OPERATIONS

[75] Inventors: Kshitij Arun Doshi, Springfield; Jonathan Haim Saks, Summit, both of N.J.

[73] Assignee: Novell, Inc., Orem, Utah

[21] Appl. No.: 280,307

[22] Filed: Jul. 26, 1994

[51] Int. Cl.⁶ ................................................. G06F 13/00
[52] U.S. Cl. .................. 395/608; 395/859; 395/876; 364/251.7; 364/254.5; 364/270.9; 364/281.3; 364/961.3; 364/DIG. 1
[58] Field of Search ............................ 395/275, 425, 395/575, 600, 650, 700, 859, 876; 364/251.7, 254.5, 270.9, 281.3, 961.3

[56] References Cited

U.S. PATENT DOCUMENTS

| | | | |
|---|---|---|---|
| 5,086,502 | 2/1992 | Malcolm | 395/575 |
| 5,218,695 | 6/1993 | Noveck et al. | 395/600 |
| 5,247,618 | 9/1993 | Davis et al. | 395/275 |
| 5,297,258 | 3/1994 | Hale et al. | 395/275 |
| 5,317,734 | 5/1994 | Gupta | 395/650 |
| 5,353,410 | 10/1994 | Macon et al. | 395/275 |
| 5,386,559 | 1/1995 | Eisenberg et al. | 395/600 |

OTHER PUBLICATIONS

"Over to Alpha: (DEC's Alpha RISC processor–based architecture)", Henry Young, Dec User, p13(2), Dec., 1992.
"Alpha AxP migration:synchronization on Open VMS AxP System" Morse et al.; Digital Systems Journal, v15, n3, p28(7), May–Jun. 1993.

*Primary Examiner*—Thomas G. Black
*Assistant Examiner*—Hosain T. Alam
*Attorney, Agent, or Firm*—Madson & Metcalf

[57] ABSTRACT

A computer system having data organized in files, having a secondary storage for storing files, having a primary storage, and having one or more types of file subsystems (file system implementations) for controlling transfer of files between primary storage and secondary storage. A subset of writes to secondary storage are performed using a Delayed Ordered Write (DOW) subsystem, which makes it possible for any file system to control the order in which modifications are propagated to disk. The DOW subsystem consists of two parts. The first part is a specification interface, which a file system implementation or any other kernel subsystem can use to indicate sequential ordering between a modification and some other modification of file system structural data. The second part of DOW subsystem is a mechanism that ensures that the disk write operations are indeed performed in accordance with the order store. DOW improves computer system performance by reducing disk traffic as well as the number of context switches that would be generated if synchronous writes were used for ordering.

59 Claims, 14 Drawing Sheets

*FIG. 15*
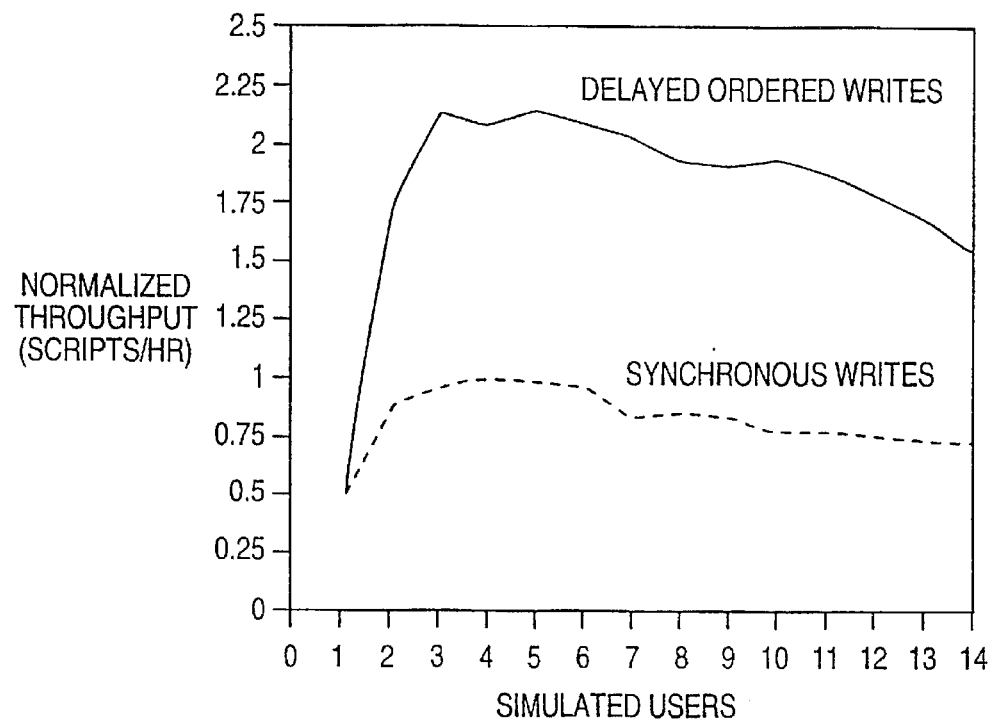
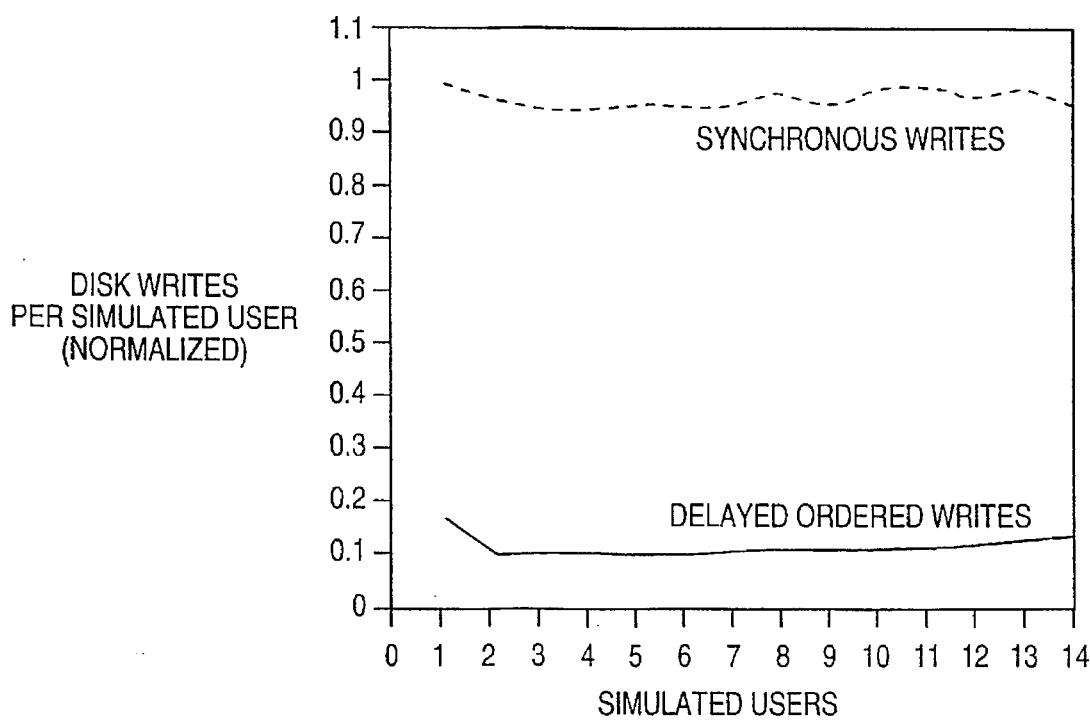
*FIG. 16*

COMPUTER METHOD AND APPARATUS FOR ASYNCHRONOUS ORDERED OPERATIONS

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present invention relates to computer systems and to file system implementations for computer operating systems and methods and apparatus used by file systems for controlling the order of operations, such as the order in which information is updated on secondary storage, to realize gains in performance.

Computer systems are composed of hardware and software. The hardware includes one or more processors, typically a central processing unit (CPU), main storage or memory, secondary storage, and other input/output (I/O) devices. The software includes an operating system and user (application) programs. The computer system executes user programs in the hardware under the control of the operating system. The operating system controls the operation of secondary storage devices and other I/O devices such as terminals through a set of software modules called device drivers.

In modern computer systems, secondary storage systems such as disks have become performance bottlenecks because processors have higher speeds than disks. Various methods have been used to minimize the impact of disk subsystems on overall system performance. For example, some disk controllers employ large random access memories as disk caches in order to reduce the number of slower disk accesses. Operating system device drivers use a variety of algorithms to schedule disk requests so that they can be serviced with minimum mechanical movement or delays within the disk hardware. Some file system implementations log their operations so that it is not critical to have all intermediate information updates applied immediately to secondary storage. See, for example, Mendel Rosenblum and John K. Ousterhout, "The Design and Implementation of a Log Structured File System," *Proceedings of the 13th ACM Symposium on Operating System Principles* (October 1991), and Robert Hagmann, "Reimplementing the Cedar File System using Logging and Group Commit," *Proceedings of the 11th ACM Symposium on Operating Systems Principles* (November 1987).

By way of background, three types of writes exist for writing information to disk storage, namely, Synchronous, Asynchronous, and Delayed writes. With a synchronous write, the computer system suspends execution of the program that caused the write to occur. When the write completes, the program is allowed to continue. With an asynchronous write, the computer system permits the program to continue, after enqueuing the request for writing with the device drivers that manage the operation of disks. In this case, the program can make further progress, even though the actual information to be written is not yet stored to disk. Delayed writing is a special type of asynchronous write, in which the execution of the program is allowed to continue without enqueuing the write request with the device drivers. In this case, the buffer in memory that is modified during the write is marked as needing to be written to disk, and the request is propagated to the device drivers by the operating system at a later time. Generally, the operating system ensures that the request propagates within a finite time interval. Asynchronous writes achieve a performance advantage over synchronous writes by decoupling the execution of processors from disk subsystems and allowing more overlap between them. Delayed writes improve the decoupling and serve to reduce the aggregate number of disk writes by allowing multiple modifications of the same buffer to be propagated to the disk with a single disk write.

Despite the performance advantage of using asynchronous and delayed writes over synchronous writes as described above, many file system implementations employ synchronous write operations for recording changes to file system structural (administrative) data. Synchronous writing is used so that the file system implementation can regulate the order in which structural changes appear on the disk. By controlling the order in which modifications of structural data are written to disk, a file system implementation achieves the capability to perform file system repairs in the event that a system crash occurs before a sequence of structural changes can complete and reach a self-consistent organization of file system structural information. The specific requirements for ordering updates of structural data vary according to file system implementation as described, for example, in M. Bach, "The Design of the UNIX Operating System," Prentice-Hall, Englewood Cliffs, 1986. An example of a utility for repairing file systems following a crash, the fsck program, is described in M. McKusick, W. Joy, S. Leffler, and S. Fabry, "Fsck—The UNIX File System Check Program," UNIX System Manager's Manual—4.3 BSD Virtual Vax-11 Version, USENIX, April 1986.

As described above, many file system implementations need to perform ordered disk writing for maintaining structural order and repairability and therefore they employ synchronous writes that maintain the order of disk writes. The use of synchronous writes, however, limits system performance since disks and other secondary storage devices are slower relative to processors and main memory. File system formats can be designed to minimize the number of distinct disk updates needed for accomplishing a consistent reorganization of structure. Alternative techniques for repairability, such as intent logging, provide the ability to recover from an incomplete sequence of disk modifications. Such alternatives, while being beneficial to performance, have proved overly burdensome due to loss of media or software compatibility. Accordingly, there is a need for an improved operating system that provides control of write ordering without the performance penalty of synchronous writing and without mandating special hardware, new media formats or other changes.

SUMMARY OF THE INVENTION

The present invention applies to a computer system having data organized in files, having a secondary storage for storing files, having a primary storage, and having one or more types of file subsystems (file system implementations) for controlling transfer of files between primary storage and secondary storage. A subset of writes to secondary storage are performed using a Delayed Ordered Write (DOW) subsystem, which makes it possible for any file system to control the order in which modifications are propagated to disk. The DOW subsystem consists of two parts. The first part is a specification interface, which a file system implementation or any other kernel subsystem can use to indicate sequential ordering between a modification and some other modification of file system structural data. The use of the specification interface by any file system implementation results implicitly in the construction of an order store in primary storage, that records the ordering interdependence among different buffers affected by the modifications. The second part of DOW subsystem is a mechanism that ensures that the disk write operations are indeed performed in accordance with the order store. The DOW subsystem accomplishes this task by both intercepting and initiating disk write operations, as needed, to control the actual sequence of writes presented to device drivers.

DOW improves computer system performance by reducing disk traffic as well as the number of context switches that would be generated if synchronous writes were used for ordering. The use of DOW for controlling the order of structural updates does not require a structural redesign of a file system format, or changes to the system hardware or device drivers. Replacing synchronous writing by DOW-maintained ordered writing provides large gains in system performance.

DOW is modular and is loosely coupled with other kernel subsystems, including the file system implementations that use it. It does not require any modifications to other kernel subsystems or to the standard file system interfaces. Any file system type (implementation) in the operating system can use DOW easily, without structural redesign and without loss of media compatibility. The file system implementation that uses DOW only needs to specify the necessary ordering, if any, among a sequence of structural changes in lieu of forcing synchronous writes. While DOW thus provides an alternate mechanism for regulating the disk writing, the file system implementation retains control of the policy—that is, control of which modifications should be ordered relative to each other.

Thus, DOW allows a computer system to obtain the performance advantage associated with delayed writes while retaining the file system repairability characteristics that come with ordered writing.

The foregoing and other objects, features and advantages of the invention will be apparent from the following detailed description in conjunction with the drawings.

BRIEF DESCRIPTION OF THE DRAWINGS

FIG. 15 depicts normalized system throughput for users with and without delayed ordered writes.

FIG. 16 depicts disk writes per user with and without delayed ordered writes.

DETAILED DESCRIPTION

Figure 1:
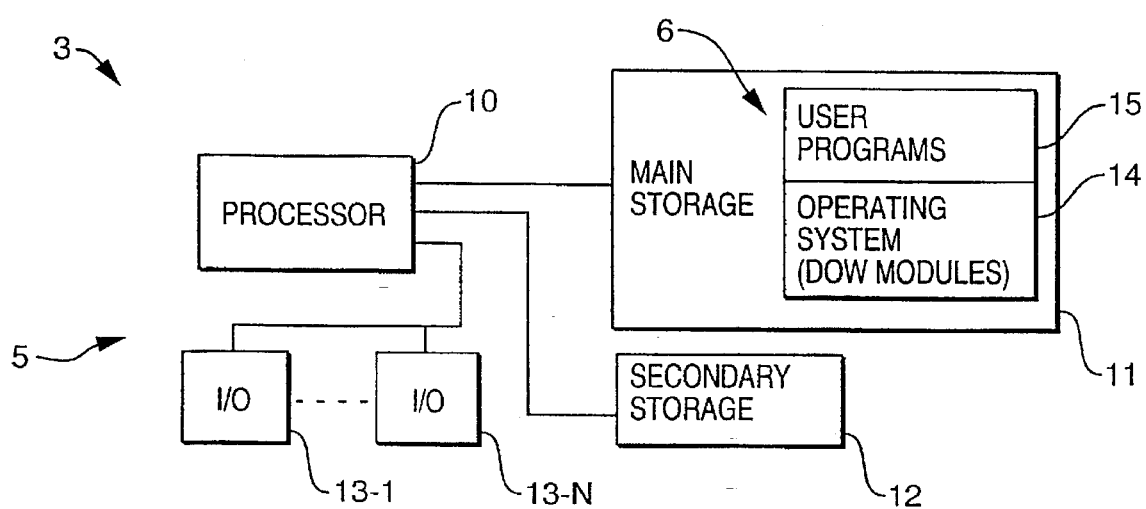
FIG. 1 depicts a block diagram of a computer system employing ordered operations including, for example, delayed ordered writes to secondary storage.

Computer System General—FIG. 1

The computer system 3 of FIG. 1 is composed of hardware 5 and software 6. The hardware 5 includes one or more processors 10, typically a central processing unit (CPU), main storage 11, input/output (I/O) in the form of secondary storage 12 and other input/output devices 13-1, . . . , 13-N. The software 6 includes an operating system 14 and user (application) programs 15. The computer system 3 executes user programs 15 in the hardware 5 under control of the operating system 14. A common instance of the operating system 14 is the UNIX® operating system.

Figure 2:
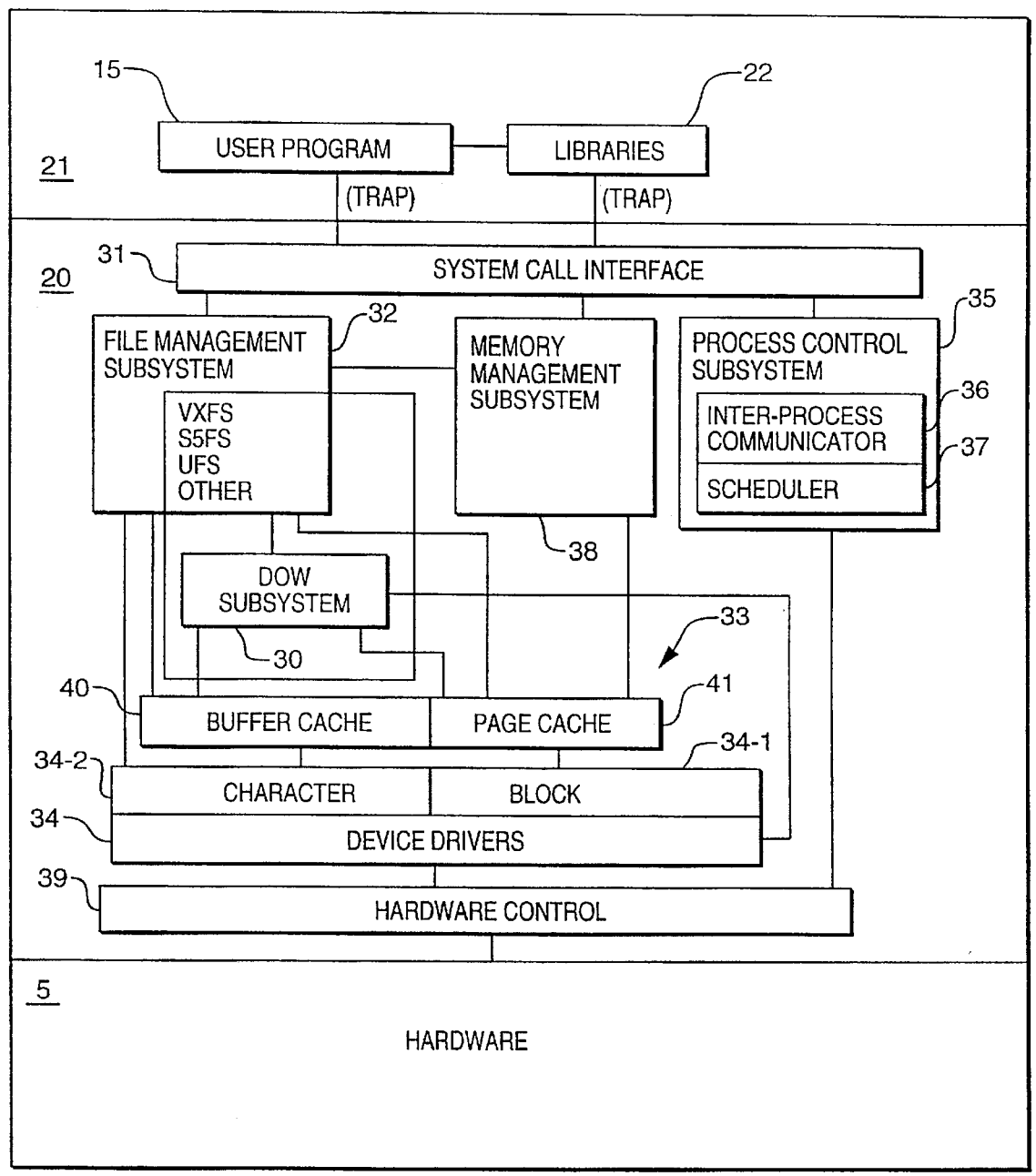
FIG. 2 depicts a block diagram of the operating system software of the computer system of FIG. 1.

UNIX Operating System—FIG. 2

Referring to FIG. 2, the UNIX operating system has files and processes that execute under the control of a kernel 20. A process is a computer program in a state of execution. The computer system of FIG. 1, when running the UNIX operating system, has three levels of operation: user 21, kernel 20, and hardware 5. Typically, application programs run at user level, and request the services of the operating system by means of system calls. A system call interface 31 and libraries 22 exist for this purpose; the libraries 22 are linked in with the user programs 15 and map system calls to primitives that the kernel 20 recognizes.

The kernel 20 acts as a resource manager for all of the resources of hardware 5 of the computer system 3 of FIG. 1. Primarily the kernel has two functions. The first is to provide a large degree of device independence to the application programs by masking details of the various hardware resources needed during computation. The second is to perform various supervisory and control functions so that the needed resources are scheduled as necessary. The kernel is partitioned into a process control subsystem 35, a file management subsystem 32, a memory management subsystem 38, and other supporting subsystems.

The process control subsystem 35 creates or terminates processes in response to explicit or implicit user requests, controls process behavior, obtains the resources that are necessary from the other subsystems for process execution, and provides means for inter-process communication. Chief among the resources that a process needs during execution are usage of the processors 10, usage of primary storage (main storage 11), access to data stored on secondary storage 12, and other facilities such as printers.

The memory management subsystem 38 regulates the use of primary storage for efficient, protected, and convenient access to programs and data, and coordinates with file management subsystem 32 so that file data is transferred between primary and secondary storage as needed by processes. In most UNIX operating system versions, the memory management subsystem provides the convenient illusion of a linear space in which processes can expect to reference the data or code that they need during execution, although the main storage 11 employed for meeting this need is neither linearly nor continuously present for a specific process. This illusion is supported by managing the main storage in small units of allocation, called pages, and by dynamically adjusting the mapping between process generated references (also called addresses) and the pages into which the data accessed by these references reside. The pool of pages that are so used, as the variably allocatable storage resource, is termed a page cache that appears in FIG. 2 as page cache 41.

Over the duration that the operating system executes a specific process on a processor, the processor is said to be functioning in the context of the process. The context of a process refers to the overall hardware and software state of a processor that makes it possible for the memory references generated during the process execution to map correctly to the physical addresses that contain the instructions or data needed for computation. Accordingly, the context of a process is defined by all the machine register contents that need to be saved at the time that the process control subsystem 35 disembarks the process from execution on a processor. This "saved context" information must be subsequently restored on a processor, in order to continue the execution of that process on the processor. The operation of a processor of stopping the execution of one process, saving its context, and restoring the context of a second process, so that the second process uses the processor instead of the first process, is called a context-switch.

The file management subsystem 32 commonly comprises one or more file systems, each of which spans a single logical partition or subdivision of a secondary storage medium such as a disk, and which organize the data within that partition. Generally, multiple implementations of file systems are available, each providing a common set of services to the remainder of the operating system and differentiated from other implementations by virtue of specialized functions and structure that are appropriate for the specific uses intended by the implementation. The common set of services offered by various file system implementations to the other kernel subsystems is generally called the Virtual File System interface.

A file system implementation is also commonly referred to as a file system type. Some of the commercial file system types that are in wide use are the UFS, S5FS, and VxFS file system implementations. These names are acronyms for (1) the [Berkeley] Unix File System, see M. McKusick et. al., "A Fast File System for UNIX," *ACM Transactions on Computer Systems* pp. 181–197, 1984, (2) the (AT&T) System V File System, see Maurice J. Bach, *"The Design of the UNIX Operating System"*, Prentice-Hall, Englewood Cliffs, 1986, and (3) the Veritas eXtent File System, (see the *Veritas™ File System Administrator's Guide*, VERITAS Software Corporation, 4800 Great America Parkway, Suite 420, Santa Clara, Calif. 95054). Also, a file system type that is used commonly for providing file system services between machines connected by a network is the NFS, or the Network File System, see R. Sandberg, et. al., "Design and Implementation of the Sun Network File System," *Proceedings of the USENIX* 1985 *Summer Conference*, pp. 119–130, June 1985. Since file system types can be different, the specific file system type to which any particular discussion in this specification applies will be identified where such identification is important.

The transfer of data between primary storage and peripheral (I/O) devices such as disks, terminals, or printers, and the control of such devices, is accomplished by the services of kernel modules called Device Drivers 34. The device drivers support two models of access to the peripheral devices. One of the two models is the block device model 34-1, and is used for devices that can be addressed as sequences of blocks, in which the length of a block is typically 512 bytes. The other is called the character device model 34-2 and it is used for devices for which the block device model does not apply.

The block device model is usually applied to disks and tapes. The purpose of the block model is to allow the use of buffering in order to reduce I/O traffic. The sizes of buffers used in performing transfers from or to block devices are some convenient multiples of 512, which is the size of a typical disk block. The buffering for block I/O data transfers is performed either by using some or all pages from the page cache 41, or by a dedicated pool of memory called buffer cache 40, and frequently by employing both the page cache and a buffer cache. In cases where both caches are used, pages that contain file data are used directly as the I/O buffers, while file system structural data (to be described) are held in the buffer cache. Both the file management subsystem 32 and the memory management subsystem 38 cooperatively manage the page cache 41, while only the file management subsystem manages the use of buffers from the buffer cache 40. Collectively, the buffer cache 40 and the page cache 41 are the cache 33.

The functions implemented by block or character device drivers that kernel subsystems can call in order to perform data transfer or control operations are called device driver strategy routines. Of these, the functions called in order to write data from primary storage to secondary storage are called write strategy routines, while those that are called in order to read data from secondary storage into primary storage are called read strategy routines.

Hardware control 39 is responsible for handling interrupts and for communicating with the machine hardware 5. I/O devices 12 and 13, such as disks or terminals, may interrupt the processors (CPU) 10 while a process in executing. If interrupted, the kernel 20 may resume execution of the interrupted process after servicing the interrupt. Interrupts are generally serviced by special functions in the kernel that are called in the context of a currently running process.

While many of the processes that run under the control of the operating system kernel arise from computational work generated by users, some special processes are created and run on behalf of the operating system itself. These special processes are called daemons. Daemons perform many general system-wide services, such as administration and control of networks, line printer spooling, handling of many exceptional situations, and so on.

UNIX File System Data Structures and Organization

A File System is a span or subdivision of a secondary storage medium that is managed by a file system implementation. There exist multiple possible file system types or implementations that manage file systems. Within a file system are files, most of which contain ordinary data. Diskless work-stations are also used, frequently, where files are located on a remote system and are accessed via a network. For simplicity, all devices can be considered as "disks", since the principles apply to any storage device. The files are identified by names, each name is a string of characters. Certain files are distinguished as directories, and they contain names of other files along with pointers to their location in the file system. These names are called directory entries, and may refer either to plain files or to directories. Each file name is also called a "link". The system permits a single physical file within a file system to have more than one name or link.

While conceptually a directory may be considered as containing the files for the file names the directory contains, the files named by a directory actually exist separately and are only referenced by the directory. By allowing directories to contain entries to other directories as well as plain files, the UNIX operating system provides to its users a perspective in which an entire file system is a tree structured hierarchical organization with a single starting directory called the root directory of the file system. The root directory refers to a number of files and directories; the directories in the root directory themselves refer to additional files and directories, and so on, thus covering all available files and directories in the file system.

UNIX file system implementations do not impose any structural requirements on contents of plain files; these files are treated by the file system implementations as streams of bytes, to be arbitrarily accessed by application programs. Application programs may impose specific semantics on file contents in accordance with application needs. For example, some applications may interpret line feed or tab characters as distinguishing ends of data fields within a file; however, this information is of no significance to the file system implementations. The content of directories is however a different matter. Directories contain information about file system organization; so they have a specific structure that is defined by and meaningful to the file system implementation. In addition to directories, a file system implementation reads other structural data from secondary storage, manipulates and writes the structural data back to secondary storage as necessary in order to manage the physical layouts of files and directories and to reflect changes in characteristics of files and directories. Examples of structural data include owners, sizes, and access times for files and directories. The management of structural data occurs without the explicit knowledge or request of application programs and the rules for such management vary from one file system implementation to another.

The kernel deals on a logical level with file systems, viewing them as sequences of logical blocks instead of viewing them as disks or other storage units. In this perspective, each disk or other storage device is viewed as one or more logical devices, identifiable by one or more logical device numbers. A logical device is equivalently a disk partition or a subdivision in which a file system resides. A file system is viewed by the file system implementation as a sequence of logical blocks of storage. The conversion between a logical device address (that is, a file system address) and a physical device address (e.g., a disk block address) is done by one of the block device drivers.

Data Structures and Policies of File System Implementations

It is not generally possible to describe file system data structures and organization commonly across all file system implementations. The general requirements of all file system implementations are common, however; and these are that it should be possible to allocate and free space for file data and to allocate and free space for any auxiliary data describing the layout and characteristics of files and directories in the file system. Therefore, for simplicity, an overview of data structures and file system space management procedures is given here for the UFS file system implementation, but the principles and the invention to be detailed apply equally to UFS and to other file system implementations. However, to prevent ambiguity, the term UFS will be used to qualify the description that applies particularly to the UFS file system implementation.

In the UFS file system the internal representation of a file is given by an inode which contains a description of the device layout of the file data and other information such as file owner, access permissions, and access times. Every file (or directory) has one inode, but may have several names (also called links), all of which map into the same inode. When a process creates or opens a file by name, UFS parses each component of the file name, checking that the process has the necessary privileges for searching the intermediate directories and then retrieves the inode for the file. In the case of opening or creating a new file, UFS assigns to the file an unused inode. Inodes are stored in the file system and UFS reads the needed inodes into an inode table that is maintained in primary storage for ease and efficiency of access.

A file system in UFS is a sequence of logical blocks. The size of a logical block is a convenient multiple of the smallest size in which data transfer can be performed to secondary storage.

Each UFS file system includes a number of special blocks, which contain file system administrative data, and whose contents are manipulated without explicit request from or knowledge of application programs. One of them is a superblock, which describes the state of the file system and information identifying available inodes and free space (unallocated blocks) in the file system. For achieving compact layouts, UFS divides a file system into smaller divisions called cylinder groups, and uses algorithms that promote allocations of inodes and data blocks from the same or neighboring cylinder groups among correlated uses. To protect against catastrophic loss of information, the superblock is replicated among the cylinder groups. Other blocks containing administrative information include blocks that contain bitmaps describing the available blocks within each of the cylinder groups, and blocks from which space can be used for allocating inodes.

The blocks that contain file data are reachable from the inode for the file by one of three means. The inode itself contains the logical addresses for several initial data blocks. In addition, the inode contains a few block addresses for "indirect" and "double indirect" blocks for large files. The indirect blocks contain addresses of additional data blocks for a file and double indirect blocks contain addresses of additional indirect blocks that could not be accommodated in the inode.

The kernel allows processes to store new information in files or to recall previously stored information. When a process is to access data from a file, the data is brought into main storage 11 where the process can examine it, alter it, and request that the data be saved in the file system again. A process may also create new files and directories, remove existing files and directories, or replicate or rename existing files and directories. In all cases, as file sizes and file and directory populations in a file system change, the auxiliary data that describes the file system organization is brought into memory, examined and altered, and written to secondary storage. For example, the superblock of a file system must be examined when there is a need to allocate a new file or inode or to allocate new data blocks, and the superblock must be modified when data blocks or inodes are allocated or freed. Similarly, an inode describes the layout or data block organization within a file; the operating system reads an inode into memory to access its data, and writes the inode back to secondary storage when updating the file layout. The manipulation of this auxiliary data is done without the explicit knowledge or request of a running process.

If the kernel were to read and write directly to and from disk for all file system accesses, then system response time and productivity would be poor because of the slow rate of data transfers between disk and memory. The file system implementation therefore attempts to minimize the frequency of disk accesses by keeping file data and file system structural information in the page cache 41, or the buffer cache 40, or both the caches. Page cache 41 is generally used for keeping data or code that should be directly addressable from a process running in user mode. Buffer cache 40, on the other hand, is a pool of memory that is allocated to and managed by the file subsystem for storing information that is needed by a file system implementation. Commonly, file data are cached in the page cache 41, while structural data such as inodes, superblocks, and indirect blocks are kept in the buffer cache 40; however, a file system implementation may choose to maintain file data in buffer cache, or to maintain structural data in the page cache for reasons of policy or algorithmic convenience.

Read/Write Procedures

When reading data from disk of secondary storage 12, the kernel first attempts to find the data in buffer/page cache 33 and does not have to read from disk if found in cache 33. If the requested data block is not in the cache 33, then the kernel 20 calls the disk device driver 34 to "schedule" a read request, and suspends the current process ("puts it to sleep") awaiting the completion of the requested I/O. The disk driver notifies the disk controller hardware to read the data, which the disk controller later transfers to the indicated location in the buffer/page cache 33. Finally, the disk controller interrupts the processor when the I/O is complete, and the disk interrupt handler awakens the suspended process; the requested data is then in the cache 33.

Similarly, data being written to disk is cached in cache 33 in case there is a subsequent read attempt for the data. When writing, the kernel also attempts to reduce frequency of disk writes by determining whether the data being written needs to be immediately sent to disk or whether it is transient data that will soon be overwritten and therefore is retained only in cache 33.

The three styles of disk write operations described earlier: synchronous, asynchronous, and delayed writes have differing performance consequences. If the write is synchronous, the kernel informs the disk device driver 34, which schedules a write I/O. The calling process is suspended until the write is done, as in the case of a read request. If the write is asynchronous, a write I/O is scheduled, but the process is allowed to continue without waiting for the write to be done. If the write is delayed, then the page or the buffer of cache 33 to be written is merely marked as needing to be written at a later time and no attempt is made to schedule a write I/O operation. Some time later, the kernel writes the delayed write pages or buffers in cache 33 asynchronously to disk (secondary storage 12). In the interim, if the same buffer or page receives more delayed writes, then all of these writes are accumulated and result in only one physical disk write.

Ordering for Structural Modifications

Many file system implementations need to control the order in which modifications that are made to structural data are recorded to disk. This control is to allow file system repair by programs such as fsck following a system crash. The specific requirements for ordering vary accordingly from one file system implementation to another, but the following example for the UFS file system shows why ordering of modifications is necessary. Consider what happens when a file name is removed from a directory, and the name being removed is the last remaining link to the file. The operation of name removal in this case will also remove the file itself, and free up the storage associated with the file. This operation updates three kinds of structural information: (1) the directory entry, which is space in the directory data block, in which the file name and the file inode are identified, (2) the file inode, which is the structure describing the file layout and file properties such as owner and protections, and (3) the free block list for the file system, to which the file data blocks need to be returned upon the removal of the file. Copies of these structural data are updated in memory: the directory entry is maintained in the page cache while the file inode and the file system superblock which contains the free block list are maintained in the buffer cache. As a simplification, the term "buffer" will be used to refer to any in-memory copy of data, whether that copy is stored in the buffer cache 40 or the page cache 41.

To remove a file, the UFS file system performs the steps in the following TABLE 1:

TABLE 1

1. Clear the directory entry referencing the file name.
2. Write the buffer containing the directory entry to disk.
3. Decrement the link count for the file inode. Since the link count reduces to 0, the file will need to be removed. Zero out all the data block pointers that are described by the file inode, in effect breaking the connection between the file inode and the file data blocks.
4. Write the buffer that contains the file inode, to disk.
5. Return the data blocks that belonged to the file, to the free block list.
6. Mark the inode as "free".
7. Since the file inode was changed again in step (6), mark the buffer that contains it as modified (to be written to disk at a later time).
8. Return the file inode itself to a list of free inodes in the file system.

In the sequence of steps listed in TABLE 1, the cleared directory entry must be written (step 2) to disk, before the freed inode (steps 6, 7) can be written to disk or reassigned to other use. Otherwise, if the system crashes before the modified directory entry is recorded on disk but after the inode has been reassigned to other use (for example, after step 7), then when the system is rebooted, the directory entry would still exist and identify the old file as valid, although the inode is reassigned. To the user, it would appear that the old file's name now refers to a different, newly created file.

Similarly, the inode, with its data block pointers zeroed out (step 4) must be written to disk before the freed data blocks can be allowed to appear on the free list (step 5). Once a data block is returned to the free list, it can get reassigned to another use, and if the ordering between step 4 and step 5 is not enforced and a system crash happens before the inode is written, a single data block can become part of more than one file.

File system modules which require ordered disk writes for file system repairability have implemented this ordering using synchronous writes. In the example of TABLE 1, the writes at steps 2 and 4 are done synchronously; thus ensuring that step 4 has completed before step 5, and step 2 has completed before steps 6 or 7.

In a synchronous write, the process issuing a disk write waits for the write to complete before continuing execution. Because typical delays in writing to disks are of a magnitude comparable to the time it would take for the processor to execute thousands of instructions, when a process needs to wait for a disk write to complete, the process control subsystem reassigns the processor to some other process that is ready to continue. Thus, synchronous disk writes give rise to context switches.

Some consequences of using synchronous writes are described in connection with an example which consists of the execution of the UNIX system command:

rm file1 file2 file3 where the command (rm) removes three files (file1, file2, file3) in a single directory. For purposes of this example, the directory entries for all three files are in the same buffer of the directory, as would be typical for moderate sized directories. Also, in the example, the inode data for file2 and file3 are stored in the same buffer while the inode data for file1 is in a separate buffer.

Figure 3:
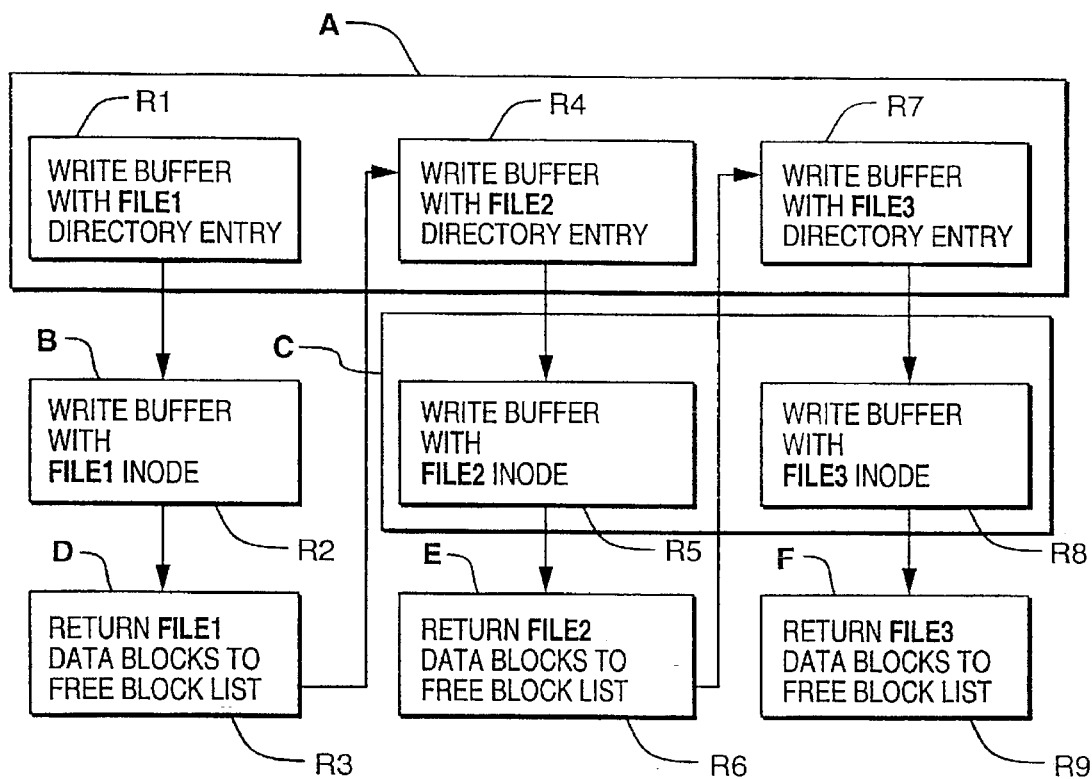
FIG. 3 depicts a block diagram of an example of the processing of a remove (rm) command that causes writes in the system of FIGS. 1 and 2 using synchronous writes.

Operation of rm Command—FIG. 3

FIG. 3 illustrates the operation of the above rm command in a UFS file system implementing ordering by using synchronous writes. It shows the ordering requirements for each file, based on the implementation of file removal procedure described in TABLE 1. FIG. 3 corresponds to a sequence of requests R1, R2, ..., R9. Note that for each file, the order dependencies are that the buffer containing the directory entry must be written before the buffer containing the inode and the buffer containing the inode must be written before the data blocks are returned to the free list. In addition, FIG. 3 shows the additional order dependencies that each file is handled in sequence; all the actions for one file are performed before the actions for the next file and so on. In general, the order dependencies D1, D2, ..., D8 for requests R1, R2, ..., R9 of FIG. 3 are as follows:

D1: R1→R2
D2: R2→R3
D3: R3→R4
D4: R4→R5
D5: R5→R6
D6: R6→R7
D7: R7→R8
D8: R8→R9

The order dependency D1, for example, means in the expression R1→R2 that R1 is to be performed before R2. The eight order dependencies D1, D2, ..., D8 result from a simple time-order presentation of the requests R1, R2, ..., R9 so that a single time-order subset of order dependencies is formed D1→D2→D3→D4→D5→D6→D7→D8 meaning that the requests are specifically ordered as R1→R2→R3→R4→R5→R6→R7→R8→R9.

As shown in FIG. 3, there are two synchronous writes per file (requests R1, R2; R4, R5; R7, R8), resulting in a total of six writes to disk and six context switches. Note that one buffer contains all three directory entries (requests R1, R4, R7), and is thus written to disk three times, and, similarly, another buffer contains the inodes (requests R5, R8) for both file2 and file3 and is written to disk twice.

Comparison of Synchronous, Asynchronous, and Delayed Disk Writes

Asynchronous writes, and Delayed writes are two alternatives to Synchronous writes, and they are used commonly by various file system implementations for writes to disk because of their less adverse impact upon performance. TABLE 2 provides a comparison of the three write operations used in the kernel.

TABLE 2

|   | Synchronous | Asynchronous | Delayed |
| --- | --- | --- | --- |
| 1. Writes to Disk When? | Immediately | Immediately | Later |
| 2. Data Integrity | High | High | Medium |
| 3. Ratio to Actual Disk Writes | 1:1 | Marginally > 1:1 | Many: 1 |
| 4. Waits for Disk Write to Complete? | Yes | No | No |
| 5. Can be used for Ordering? | Yes | No | No |
| 6. Causes Context Switches? | Yes | No | No |
| 7. Disk Throughput Limits Program? | Yes | Somewhat | Minimal |

As shown in TABLE 2, each write operation provides a different tradeoff among various characteristics. Synchronous and asynchronous writes provide greater integrity on secondary storage in the event of machine failure (see line 2 of TABLE 2), while the use of delayed writes gains the benefit of improved performance but is more vulnerable to a system crash. Since delayed writes minimize the coupling between disk subsystem and the CPU (line 7), as well as reduce the actual number of disk writing by promoting write caching (line 3), they tend to be best suited for achieving high system throughput; and since they do not cause extra context switches (line 6), they improve individual response times as well.

Delayed Ordered Writes (DOW)

The Delayed Ordered Write (DOW) subsystem 30 of FIG. 2 of the present invention provides a more efficient solution to the disk write ordering problem. DOW, implemented in one embodiment in a UNIX Operating System, doubles system performance by reducing the amount of disk traffic as well as the number of context switches generated by synchronous writes. DOW provides a mechanism for controlling the order in which modifications of file system structural data are recorded on disk, without using the one-disk-write-at-a-time style of synchronous disk writing. Large gains in system performance have resulted from using DOW in place of synchronous writes within the UFS file system implementation. These advantages are obtained without requiring a structural redesign or a change in the media format for UFS.

DOW includes two parts. The first part is an interface by which file system implementations, or any kernel subsystem, specify the sequences in which modifications of file system data blocks can be recorded on disks. These sequences translate into ordering dependencies among disk blocks themselves, which are collectively represented by an ordering graph (entries in an ordering store), prepared by DOW in response to the specification. The second part of DOW consists of mechanisms responsible for ensuring that the operations of the ordering graph (indicated by the entries in the ordering store) are performed in the order specified.

DOW is a modular service, loosely coupled with other kernel subsystems, including the file system implementations which use it. In the preferred embodiment, no modifications are made to other kernel subsystems (including device drivers) or to the standard file system interfaces. The changes to the file system implementations that choose to employ the DOW mechanism are simple in place code substitutions in which synchronous writing is replaced by calls into the DOW subsystem for recording the needed ordering entries.

Any file system implementation in the operating system can therefore use DOW easily, without structural redesign and the loss of media compatibility that might otherwise result. Furthermore, while DOW provides the mechanism for ordering disk write operations, the file system retains control of the policy for ordering, that is, which disk write operations should be ordered and how.

Terminology and Conventions

For an exposition of how the DOW subsystem 30 works, it is useful to represent the actions that need to be performed in a time order as nodes (operation entries) of a graph and to represent the time ordering constraints as directed links (order entries) between the nodes. The nodes and links in the graph are stored as entries located in an ordering store for example in system memory such as main store 11 of FIG. 1.

The graph in the ordering store is called a DOW ordering graph or simply an ordering graph. The actions that are represented by the nodes of the ordering graph for write operations are of two types: (1) writing of data to disk, and (2) execution of some function that needs to be time ordered relative to writing of some data to disk. For example, in FIG. 3, the functions which return the disk blocks of the removed files to the file system free list (requests R3, R6, R9), are represented in a DOW ordering store by nodes of the second type. A node of type (2) is called a function node, and the ordered function call that is represented by a function node is called a deferred procedure call.

For convenience of description, the nodes in an ordering graph are identified symbolically as N1, N2, . . . , Nn. An ordering constraint between two nodes N1 and N2 of the ordering graph, such that the action corresponding to N1 must happen before the action corresponding to N2 can happen, is represented by a link directed from N1 to N2—or, in text as N1→N2.

The execution of a node in the ordering graph refers to the action of performing the task that is represented by that node. Thus, executions of DOW graph nodes result either in the writing of a particular data item to secondary storage, or, in the case of function nodes, the execution of the procedure call that the function node represents.

For two nodes N1 and N2 in the ordering graph, if a link N1→N2 exists, then N1 is called a predecessor of N2 since N1 must be executed before N2 can be executed. Alternatively, since the execution of N2 depends upon the execution of N1, N2 is called a dependent of N1.

As defined above, the ordering graph is directed, that is, any link between two nodes in the ordering graph is directed from one node to the other, to represent the ordering requirement between the actions that correspond to the two nodes. In addition, an important characteristic of the ordering graph is that at all times, it is free of cycles. If a cycle existed, for example, among 3 nodes N1, N2, and N3 of the ordering graph due to links N1→N2, N2→N3, and N3→N1, then the ordering constraints suggested by the three links would be self-contradictory, since at least one of the three constraints that the links represent would be violated in any order in which N1, N2, and N3 are executed. Therefore the ordering graph does not contain cycles, and is said to be a directed acyclic graph.

Reducing Disk Writes with Delayed Ordered Writes

Delayed Ordered Writes (DOW) combines delayed writes with an ordering store mechanism for controlling the order in which data is written to disk. Thus, the use of DOW allows the system to obtain the performance improvement associated with delayed writes while retaining the file system recovery capability that is provided by synchronous writes.

FIG. 3 is analyzed to understand the transformation from synchronous writes to delayed ordered writes. The "**" boxes (A and C) in FIG. 3 represent disk blocks having contents updated in more than one sequence of ordered modifications. The one-at-a-time handling of file removals which occurs as a result of synchronous writes, as described above in connection with FIG. 3 and TABLE 1 is not necessary for repairability, so the sequencing shown in FIG. 3 between boxes R3 and A(R4), and between boxes R6 and A(R7) can be removed. With these changes, the control flow of FIG. 3 is transformed into a directed acyclic graph.

Figure 4:
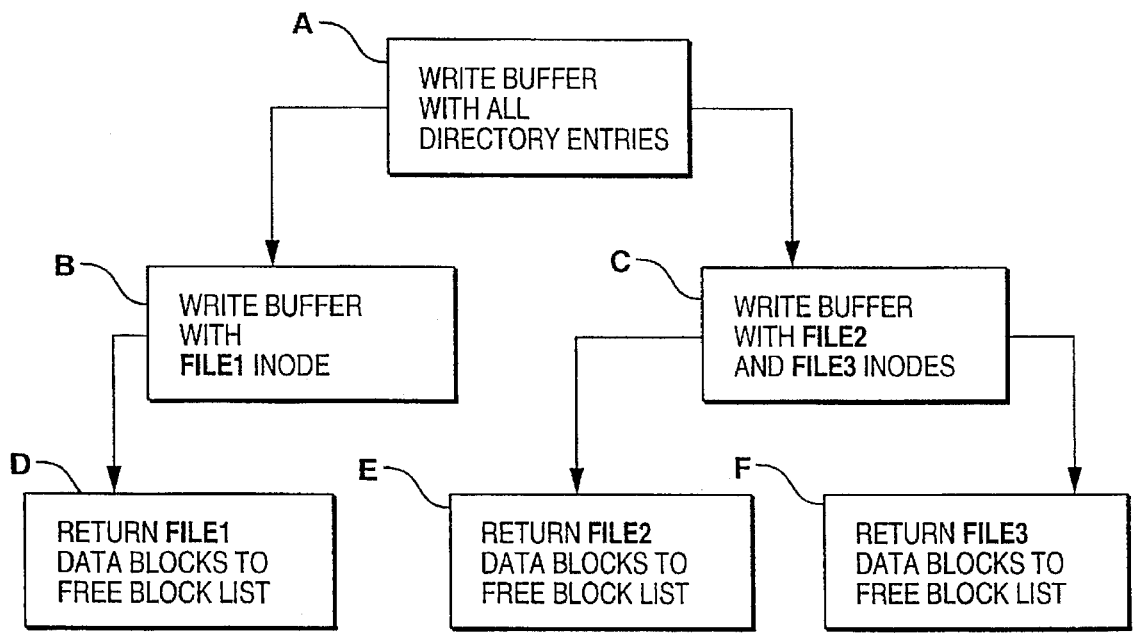
FIG. 4 depicts a block diagram of a directed acyclic graph for the FIG. 3 example of the processing of a remove (rm) command that causes writes in the system of FIGS. 1 and 2 using delayed ordered writes (DOW).

Directed Acyclic Graph—FIG. 4

The directed acyclic graph of FIG. 4 includes the nodes A, B, . . . , F by merging disk write requests (R1, R4, R7 and R5, R8 of FIG. 3) of the same buffer that are common to multiple sequences into a single disk write of the buffer. Merging common data into a single write in this example reduces the total number of disk writes from six (R1, R2, R4, R5, R7, R8) to three (A, B, and C), while continuing the proper ordering among the disk writes.

FIG. 4 also illustrates the use of deferred procedure calls (nodes D, E, and F), which represent other actions to be completed in the prescribed order relative to the delayed, ordered disk write operations. The nodes D, E, and F in FIG. 4 each represent a procedure to be executed for returning the data blocks of a removed file to the free list, but the procedure can be permitted to execute only after the inode for the removed file is written to disk with its data block pointers zeroed. This ordering is specified by creating a graph node which corresponds to the inode buffer, creating another graph node corresponding to a procedure that would free the data blocks for the inode, and then specifying that the procedure can be invoked only after the inode buffer is written to disk.

Finally, note that unlike the synchronous write operations of FIG. 3, the ordering graph of FIG. 4 is only partially sequential and represents a partial ordering among multiple subsets of file system data structure modifications—some of which may, therefore, execute concurrently. Specifically, in FIG. 4, the common order dependencies CD1 and CD2 for a first subset are:

CD1: A→B
CD2: B→D

The common order dependencies CD3, CD4, and CD5 for a second subset are as follows:

CD3: A→C
CD4: C→E
CD5: C→F

Note that the first and second subsets of common order dependencies for FIG. 4 are independent of each other.

Figure 5:
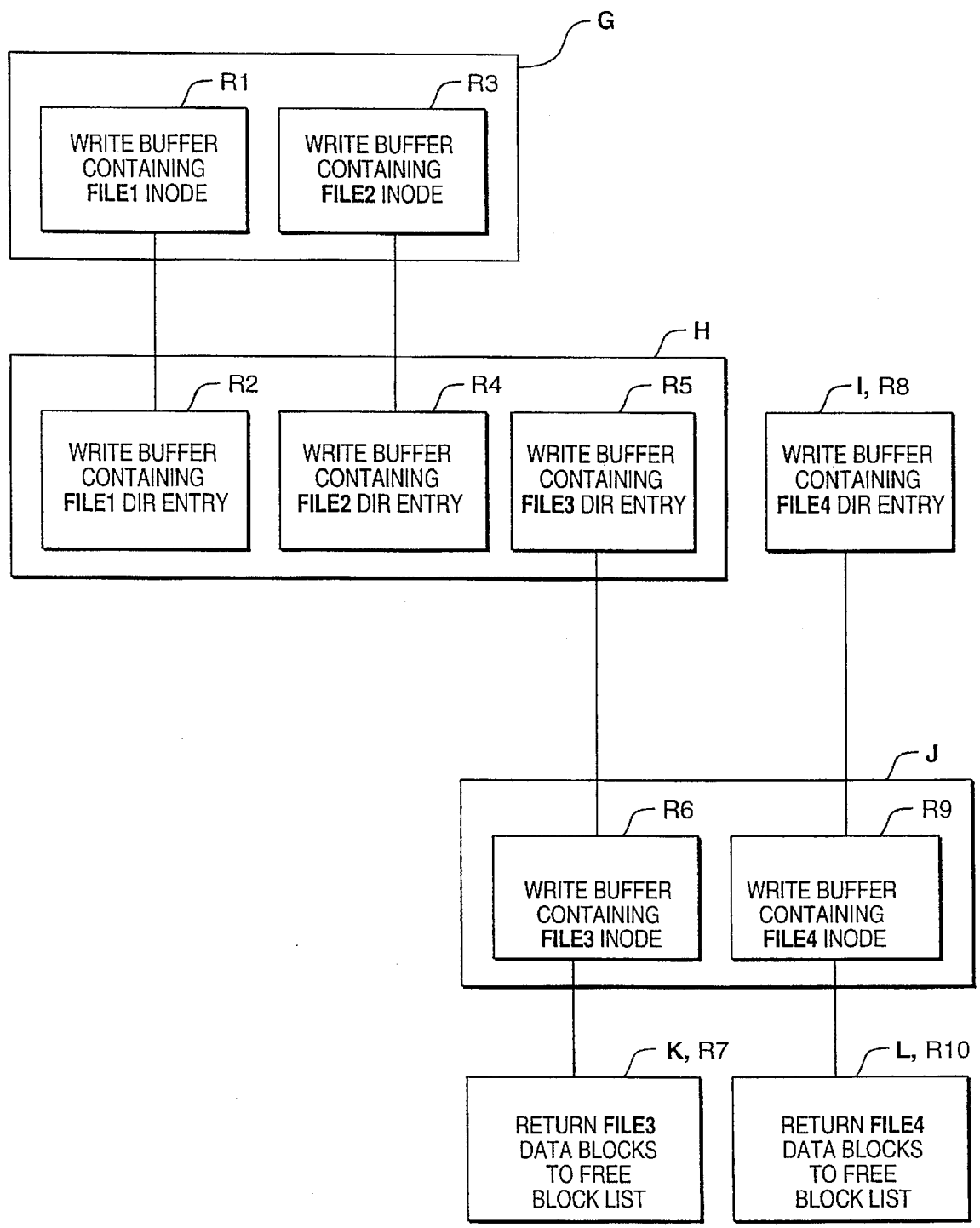
FIG. 5 depicts a block diagram of an example of the processing of two touch commands and two remove commands that cause writes in the system of FIGS. 1 and 2 using synchronous writes.

Four Process Example—FIG. 5

The operation of delayed ordered writes is further illustrated by a second example in FIG. 5. In this example, it is assumed that four processes operate separately on files in a directory. Two of the processes each create a file by using the unix touch command:

| touch | filename |
|---|---| which creates a zero-length file called filename if it does not already exist in a directory. The other two processes each remove a file from the directory using the unix rm command. The four processes execute these commands, in the same directory:

| Process 1 | Process 2 | Process 3 | Process 4 |
|---|---|---|---|
| touch file1 | touch file2 | rm file3 | rm file4 |

When creating a file name in a directory, a process increments the link count in the inode for the file and adds the file name to the directory. It is only after the increased link count is safely written to disk that the file name itself can be added to the directory buffer. Otherwise, an intervening system crash would cause the file inode to have a smaller link count than the number of actual directory entries referencing the file so that a file system repair utility could not correctly determine a proper recovery action, and so would be forced to leave the file in the directory from which it was being unlinked prior to the system crash.

FIG. 5 illustrates the steps followed by each of the processes in accordance with the ordering dependencies that apply to creating and removing files. For purposes of this example, assume that the inodes for file1 and file2 are in one buffer and that the inodes for file3 and file4 are in another buffer. Also, assume that the directory entries for file1, file2, and file3 are in the same page buffer; and the directory entry for file4 is in another buffer.

The four processes run independently. The time order of each update request per process is important and the overall time order of all the requests will be some interleaving of all the per-process requests. The overall time order is unimportant, so long as the order dependencies of update requests within each process are preserved. The order dependencies of FIG. 5 are as follows:

D1: R1→R2
D2: R3→R4
D3: R5→R6
D4: R6→R7
D5: R8→R9
D6: R9→R10

Figure 6:
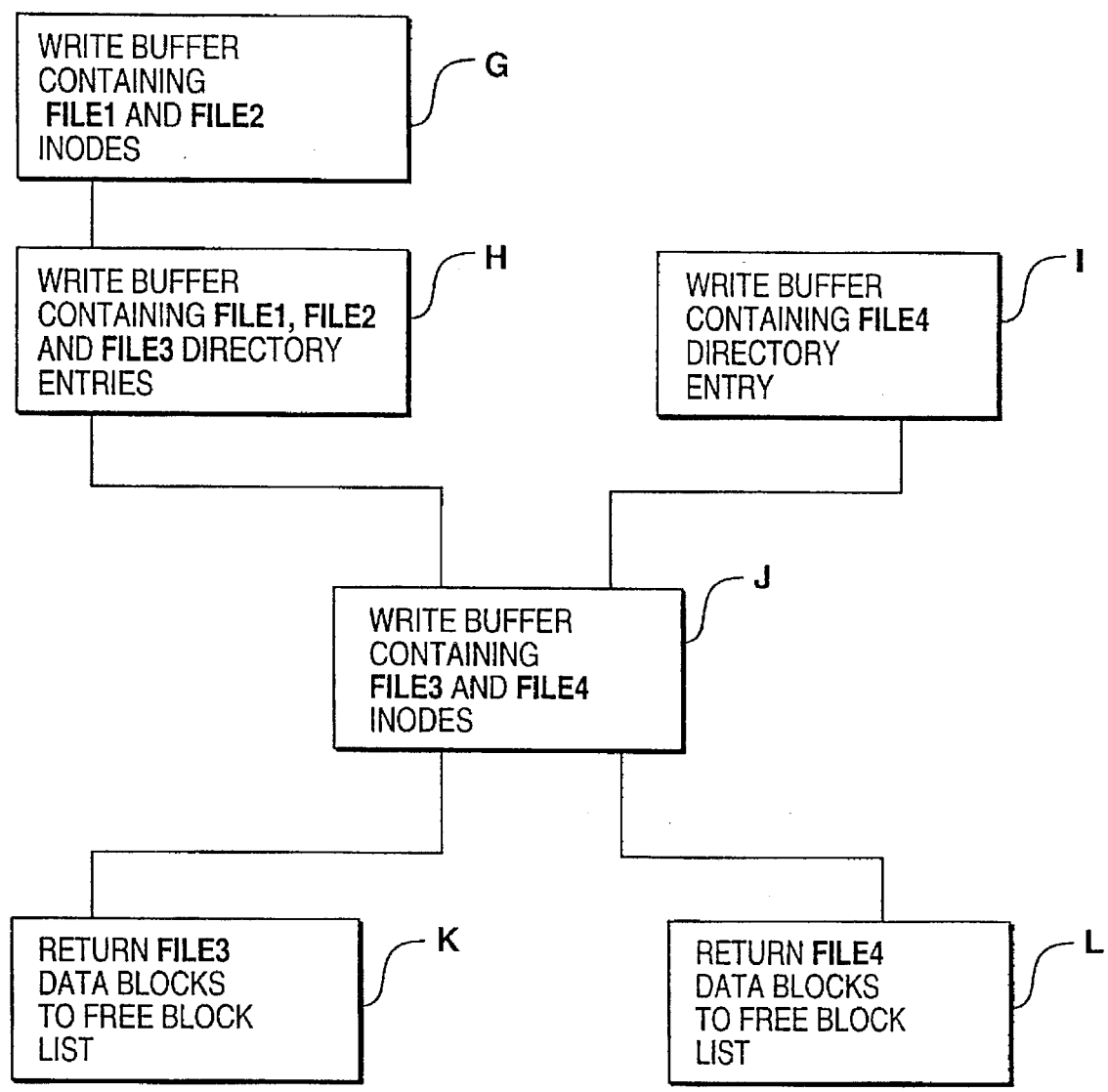
FIG. 6 depicts a block diagram of a directed acyclic graph for the FIG. 5 example of the processing of commands that cause writes in the system of FIGS. 1 and 2 using delayed ordered writes (DOW).

Directed Acyclic Graph—FIG. 6

FIG. 6 shows how the ordering requirements of FIG. 5 can be met by using DOW so that it is possible to combine the common elements among the steps taken by the four processes. While the resulting overall order among all the steps is different, the sequencing of steps within each process is preserved. Specifically, the common order dependencies of FIG. 6 preserve the order dependencies of FIG. 5 while reducing the number of separate operations required. Specifically, in FIG. 6, the common order dependencies are:

CD1: G→H
CD2: H→J
CD3: I→J
CD4: J→K
CD5: J→L

The common order dependencies CD1, CD2, ..., CD5 OF FIG. 6 preserve the order dependencies D1, D2, ..., D6 of FIG. 5.

Constructing an Acyclic Ordering Graph

The potential I/O reduction from delayed ordered writes relies on combining delayed writes with a control mechanism based on an order store storing entries, which constitute a directed acyclic graph, in which the graph represents ordering dependencies among data modifications. TABLE 3 presents a summary of the DOW procedures that are available to file system implementations for use in constructing the ordering graph in the ordering store.

TABLE 3

| Routines for Constructing an Ordering Graph | |
|---|---|
| dow_create | Create, if it does not exist, a node in the ordering graph which corresponds to either a delayed write buffer or a deferred function execution, and return an integer identifier which may be used to reference that node. |
| dow_order | Specify an ordering between two nodes in the ordering graph. |
| dow_startmod | Indicate that data in a buffer is about to be modified. |
| dow_setmod | Indicate either that modification of data in a buffer, or the setup for a deferred function execution, has completed. |
| dow_rele | Release a hold on a node identifier. |
| dow_abort_range | Destroy all nodes in the graph corresponding to a range of buffers in a particular file. |

In TABLE 4 below, a code sketch in C language illustrates the transformation from the example of FIG. 3 to the ordering graph of FIG. 4 using the routines of TABLE 3.

TABLE 4

| | File Removal using Delayed Ordered Writes |
|---|---|
| Iteration 1, 2, 3 | Operation |
| | 1 dowid_t pgdow, ibdow, fdow;<br>2 /*<br>3 * make a node in the ordering graph corresponding<br>4 * to directory buffer which contains the directory<br>5 * entry of the file being removed, and then clear<br>6 * the file's directory entry.<br>7 */ |
| A, (A), (A) | 8 pgdow = dow_create(directory buffer containing entry);<br>9 dow_startmod(pgdow);<br>10<br>11 . clear the portion of the directory buffer containing<br>12 . the directory entry of the file being removed. |

TABLE 4-continued

File Removal using Delayed Ordered Writes

| Iteration 1, 2, 3 | Operation |
|---|---|
| | 13 . |
| | 14 dow_setmod(pgdow); |
| | 15 |
| | 16 /* |
| | 17 * make a graph node corresponding to the |
| | 18 * inode buffer, and set up ordering to write |
| | 19 * the inode buffer to disk after the directory |
| | 20 * buffer is written to disk. |
| | 21 */ |
| B, C, (C) | 22 ibdow = dow_create(inode buffer); |
| A→B, A→C, (A→C) | 23 dow_order(ibdow, pgdow, 0); |
| | 24 dow_startmod(ibdow); |
| | 25 . |
| | 26 . Decrement the inode link count and zero out |
| | 27 . the inode data block pointers |
| | 28 . |
| | 29 dow_setmod(ibdow); |
| | 30 /* |
| | 31 * set up ordering: call function to free |
| | 32 * the blocks after writing the inode. |
| | 33 */ |
| D, E, F | 34 fdow = dow_create(function to free data blocks, |
| | 35 block list specification); |
| B→D, C→E, C→F | 36 dow_order(fdow, ibdow, 0); |
| | 37 dow_setmod(fdow); |
| | 38 . |
| | 39 . mark the inode as free and return the inode |
| | 40 . to the free inode list |
| | 41 |
| | 42 /* |
| | 43 * release the node identifiers |
| | 44 */ |
| | 45 dow_rele(pgdow); |
| | 46 dow_rele(ibdow); |
| | 47 dow_rele(fdow); |

For the example of FIG. 3, the code in TABLE 4 is executed three times, once for each file that is removed, by the file system implementation that is a client of the DOW facility. The code segment appears in the right column, marked "Operation". The left column describes how, during each of the three iterations, the execution of the code in the right column results in the construction of the ordering graph of FIG. 4. In the left column, at lines 8, 22, 23, 34, and 36, are three comma separated entries; these entries identify the nodes or links in the ordering graph that result from the execution of the corresponding lines of code in the right column during the respective iterations.

In the code sketch, line 1 is a declaration of three DOW identifiers, called pgdow, ibdow, and fdow; respectively, these variables are used to store identities of graph nodes corresponding to disk write of a page, disk write of a buffer, and a deferred procedure call. Lines 2–7, 16–21, 30–33, and 42–44 are comments.

During the first iteration: At line 8, the file system implementation requests the DOW subsystem via dow_create to map a directory page in which the entry for file1 exists, to a DOW node. The result of this mapping, is to have in the variable pgdow, the value of the DOW node identifier for the directory page which will need to be modified in order to remove the files name entry. This is shown in the left hand column as the creation of node A of FIG. 4.

Before proceeding to modify the directory page, the file system implementation signals its intent to the DOW subsystem by issuing the dow_startmod call (line 9) for pgdow. After that, in lines 10–13, the actual modification occurs, the code for which is not different in absence of DOW, and is not shown for brevity. Then at line 14, the file system implementation calls dow_setmod for pgdow, to signal to the DOW subsystem that the modification is complete.

At line 22, dow_create is called again for creating a second DOW node, corresponding to the buffer in which the inode for file1 resides. The result is to have the variable ibdow contain the DOW node identifier for the buffer which contains the inode, and which will need to be modified and written to disk. This is shown in the left hand column as the creation of node B of FIG. 4.

At line 23, the ordering constraint between pgdow and ibdow is specified via dow_order. The effect of this is to insert a link directed from pgdow to ibdow, that is, from A to B in terms of FIG. 4.

As in the case of pgdow, the intent to modify the inode (and hence the buffer which contains the inode) is signaled at line 24 by the call to dow_startmod for ibdow. Again, the actual modification is not shown for brevity because it is independent of DOW usage, and happens in lines 25–28. Then, at line 29, the indication that the buffer is modified as desired, is given to the DOW subsystem via the call to dow_setmod.

At line 34, the file system implementation calls dow_create to request the creation of a function node. The deferred procedure call to which the function node is mapped, is one that would need to be executed in order to return the freed data blocks from file1 to the disk block free list in the file system. This creates node D for the ordering graph shown in FIG. 4; the identifier for the node is kept in the variable fdow.

At line 36, the ordering constraint between ibdow and fdow is specified via dow_order. The effect is to insert a link directed from ibdow to fdow, that is, from B to D in terms of FIG. 4.

Enlisting the ordering constraint at line 36 effectively completes the setup of the function node; hence the dow_setmod call is used at line 37 to signal the readiness of the function node for execution at any following time. All necessary ordering actions have been represented at this point, so the three DOW nodes can be released at any time. Actually, the node pgdow could be released at any time after line 24. The DOW nodes, pgdow, ibdow, and fdow, are released in lines 45–47.

During the second iteration: As in the case of the first iteration, at line 8, the file system implementation requests the DOW subsystem (via dow_create) to map a directory page in which the entry for file2 exists, to a DOW node. Since the entry for file2 is in the same directory page as for file1 the result of this mapping is to have in the variable pgdow, the same DOW identifier as in the first iteration; that is, the node A in FIG. 4. At line 22, when a DOW node for mapping the buffer containing the inode for file2 is requested, the result is that a new identifier is created and written into the variable ibdow. This new node is shown as the node C in FIG. 4, and in the left hand column in TABLE 4.

At line 23, the ordering constraint specified between pgdow and ibdow via dow_order results in the directed link from A to C in terms of FIG. 4. At line 34, a new function node is requested for mapping to the deferred procedure call that would release the disk blocks from file2 to the file system free list. This creates the node E for the ordering graph shown in FIG. 4; the identifier for the node is kept in the variable fdow. At line 36, the ordering constraint between ibdow and fdow is specified. The effect is to insert a link directed from ibdow to fdow, that is, from C to E in terms of FIG. 4.

During the third iteration: The third iteration, for the removal of file3, proceeds analogously to the first two iterations. In this iteration, the directory entries for file3 and file2 share the same page and the inodes for the two files reside in the same disk block. Hence, at lines 8 and 22, the same DOW identifiers are returned for the two iterations. At line 23, the ordering constraint that is specified between pgdow and ibdow, results in no new work since the ordering link from A to C was already created in iteration 2.

At line 34, a new function node is requested for mapping to the deferred procedure call that would release the disk blocks from file3 to the file system free list. This creates the node F for the ordering graph shown in FIG. 4; the identifier for the node is kept in the variable fdow. At line 36, the ordering constraint between ibdow and fdow is specified, whose effect is to insert a link directed from ibdow to fdow, that is, from C to F in terms of FIG. 4.

Thus when all three iterations are completed, the DOW subsystem has the necessary ordering requirements between the various disk writes and the deferred procedure calls in place, to resemble the ordering relationships of FIG. 4.

File system implementations typically use these DOW functions in conjunction with modifying structural data. For the example in TABLE 4, the modifications of structural data occur in lines 10–13, 25–28, and 38–41, identically with the usual synchronous write based implementation. With the synchronous write based ordering, the modifications are followed by disk writes; with DOW, the modifications are followed by the primitives that construct the ordering graph.

The general outline followed by a DOW client when modifying a datum which must be written to disk in an ordered fashion is described in TABLE 5 as follows:

TABLE 5

1. Create a graph node corresponding to the datum and acquire a node identifier referencing the node by calling dow_create.
2. If there is a datum which must be written prior to this datum, use dow_order to specify an ordering between the two nodes representing these two data items.
3. Call dow_startmod to indicate that this datum is about to be modified.
4. Modify the datum.
5. Signal that the modification is complete, by using dow_setmod to mark the graph node as "modified".
6. Finally, at any point after the last dow_order or dow_setmod call involving this graph node, release the graph node through a call to dow_rele.

The functions dow_startmod and dow_setmod provide coordination points between a client of DOW and the DOW subsystem. They are used to notify the DOW subsystem that the client is modifying a page or a buffer that corresponds to a node in the ordering graph.

One key aspect is the rule:

When establishing an ordering between first and second operations (between first and second common writes or a first common write and a function), dow_order is called only after dow_setmod for the first common operation has completed, but before dow_startmod for the second common operation is called.

The reason for the rule can be understood as follows:

1. After dow_order is called, the associated writes of data can occur at any time. If the call to dow_order takes place before modifying the first data, then the first data may be written to disk before its modification is effective. The ordering requirement is violated if the second data is then written to disk.
2. Until dow_order is called, the writes of each data are unordered relative to each other. If the second data is modified before the call to dow_order, the second modification can become effective on disk before the modification of the first data has propagated to disk.

DOW Subsystem Data Structures

The data structures used for representing the DOW nodes (operation entries) and their ordering linkage (order entries) exist in an ordering store. The DOW ordering store is constructed from two types of data structures, dow-nodes (identifying operations) and dow-link-elements (identifying ordering among operations). Dow-nodes represent operation entries in the ordering graph and dow-link-elements represent linkages (ordering) between graph nodes.

Figure 7:
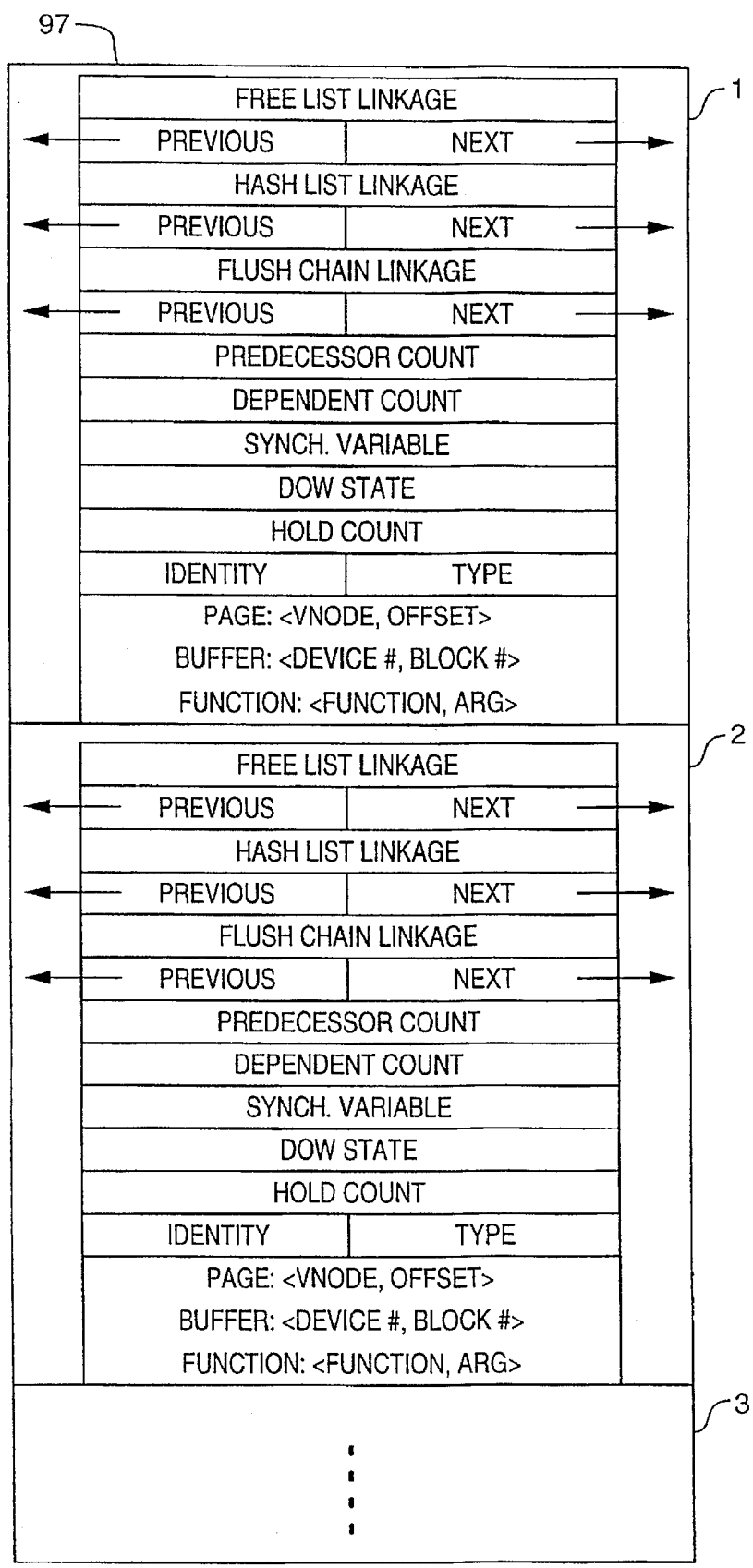
FIG. 7 depicts an array of data structures that constitute the operation (node) entries in an ordering store.

Fields For Operation Entries of Ordering Store (DOW-Node)—FIG. 7

Each DOW-node contains information identifying the operation specified by a graph node as well as other information about the dow-node itself. Storage for dow-nodes is obtained from a statically configured array, as shown in FIG. 7. Each node is identified by its dow-id, which is its index in this array. For convenience and memory economy, linked lists of dow-nodes are constructed using dow-ids rather than memory addresses.

In FIG. 7, the fields of dow-node ordering store entries for node N1 and N2 from an array N1, N2, . . . , Nn of nodes are shown. Each node includes the following fields:

Free List Linkage.

Linkage for a doubly linked list of unused dow-nodes.

Hash List Linkage.

Linkage for a doubly linked list of in-use dow-nodes, hashed by identity. Used to speed searches for a dow-node for a particular operation.

Flush Chain Linkage.

The Flush Chain Linkage (FCL) is a linkage for the doubly linked list of dow-nodes whose operations are to be executed.

Predecessor Count.

The number of predecessor nodes.

Dependent Count.

The number of dependent nodes.

Synch. Variable.

A variable for synchronization.

DOW State.

Tracks state information such as whether the dow-node's operation is ready to be initiated, whether the operation has been initiated, whether the operation has completed, or whether the nodes' predecessors have been searched.

Hold Count.

A field used for counting.

Type.

The type of operation represented by the node, for example a write of a page, a write of a buffer, or a deferred procedure call.

Identity.

Parameters of the delayed operation that the dow-node represents:

For a page write, the identify field specifies a inode and offset which identifies the page.

For a buffer write, the identity field specifies a device number and block number which identifies the buffer.

For a deferred procedure call, the identify field specifies the address of the procedure and an argument to be passed to the procedure.

For each dow-node, there are two linked lists of dow-link-elements, termed the predecessor list and the dependent list. The predecessor list for a dow-node is a doubly linked list of dow-link-elements which point from that dow-node to the dow-nodes of its predecessors in the graph. Similarly, the dependent list for a dow-node is a doubly linked list of dow-link-elements which point from that dow-node to the dow-nodes of its dependents in the graph.

As with dow-nodes, storage for dow-link-elements is obtained from statically configured arrays; each dow-link-element is identified by its dow-link-id, which is its index in this array; and linked lists of dow-link-elements are constructed using their dow-link-ids rather than their memory addresses.

Figure 8:
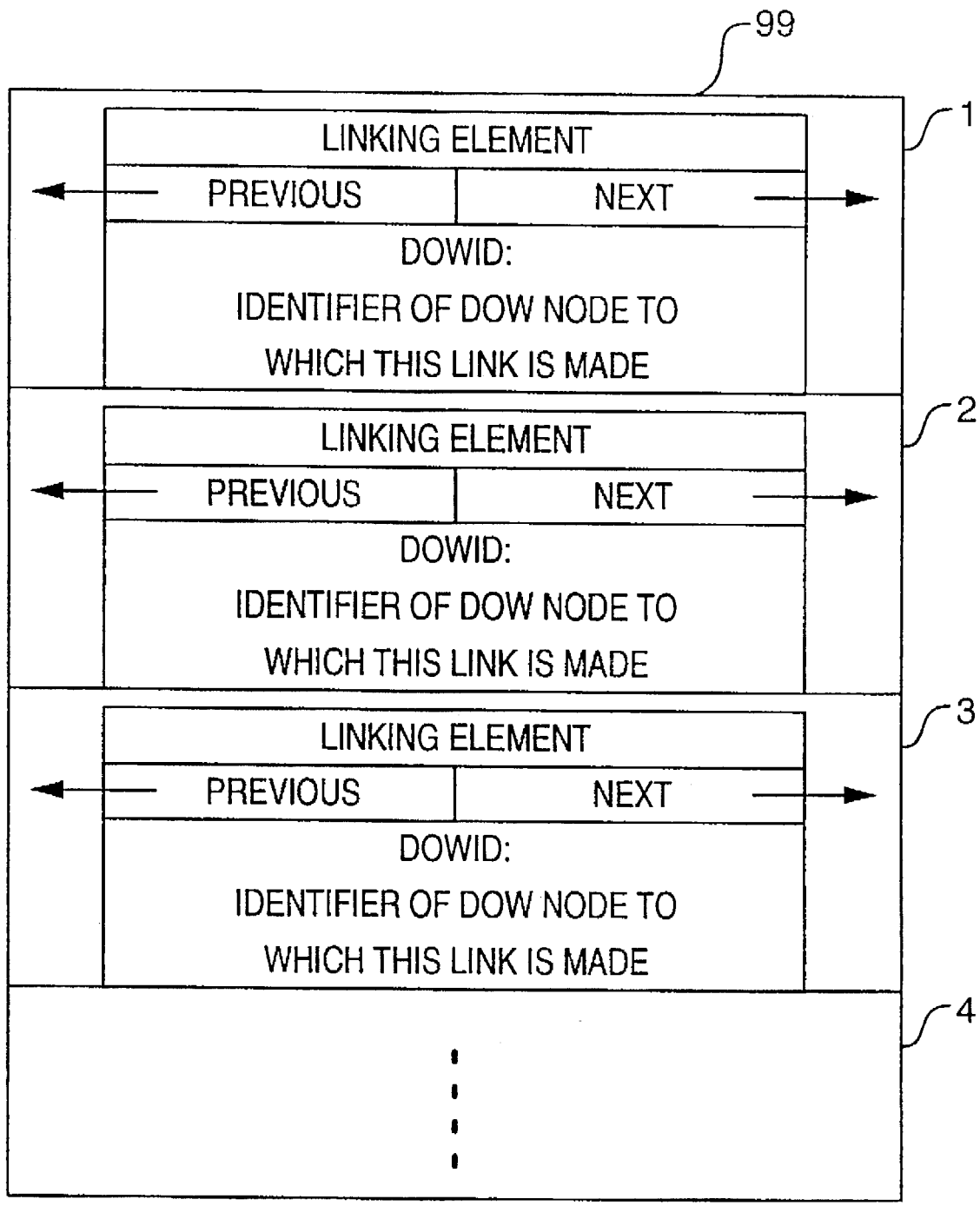
FIG. 8 depicts an array of data structures that constitute the order (link) entries in an ordering store.

Fields For Order Entries of Ordering Store (DOW-Link Element)—FIG. 8

In FIG. 7, the fields of DOW-Link-Element (DLE) ordering store entries for node D1, D2 and D3 from an array D1, D2, . . . , Dm are shown. Each entry includes the following fields:

Linking Element.

Linkage field for forward and backward chaining of DLEs for forming lists.

DOWID.

The dow-id of the predecessor or dependent dow-node to which the dow-link-element points.

For example, consider a link A→B in an ordering graph. The dow-nodes for A and B would each have two lists of DLFs, one for dependents and one for predecessors. One of the DLEs on A's dependent list would contain in its dow-id field the dow-id of B. Similarly, one of the DLEs on B's predecessor list would contain in its dow-if field the dow-id of A.

The two DLEs—one on the dependent list for A and the other on the predecessor list for B are called inverse-links of each other. A DLE contains an additional field identifying its inverse-link, but this is omitted in FIG. 8 for simplification.

Figure 9:
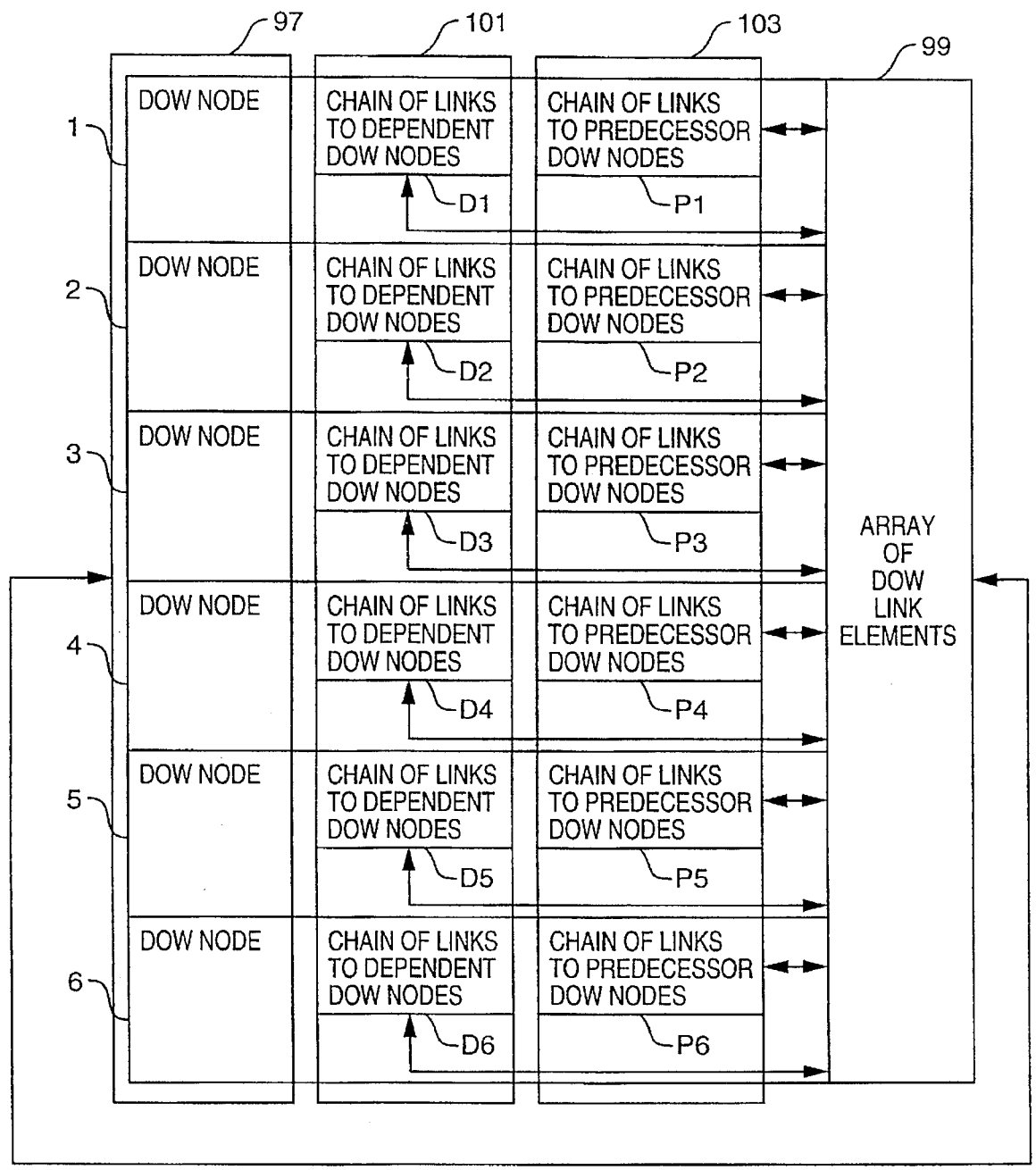
FIG. 9 depicts the manner in which predecessor and dependant entries are organized using pointers in the ordering store.

DLE Arrays—FIG. 9

While there are two DLE lists (one for predecessor dow-nodes and the other for dependent dow-nodes) for each dow-node, the lists are not anchored at any field of the dow-node structure. Instead, the anchors for these lists are provided by two special array of DLEs. This structure is shown in FIG. 9. Placing the storage for the heads of these lists in special DLE arrays as shown in FIG. 9 simplifies the linked list management. Except for this detail, the anchors can be viewed simply as parts of the dow-node structure that are given separate storage.

Figure 10:
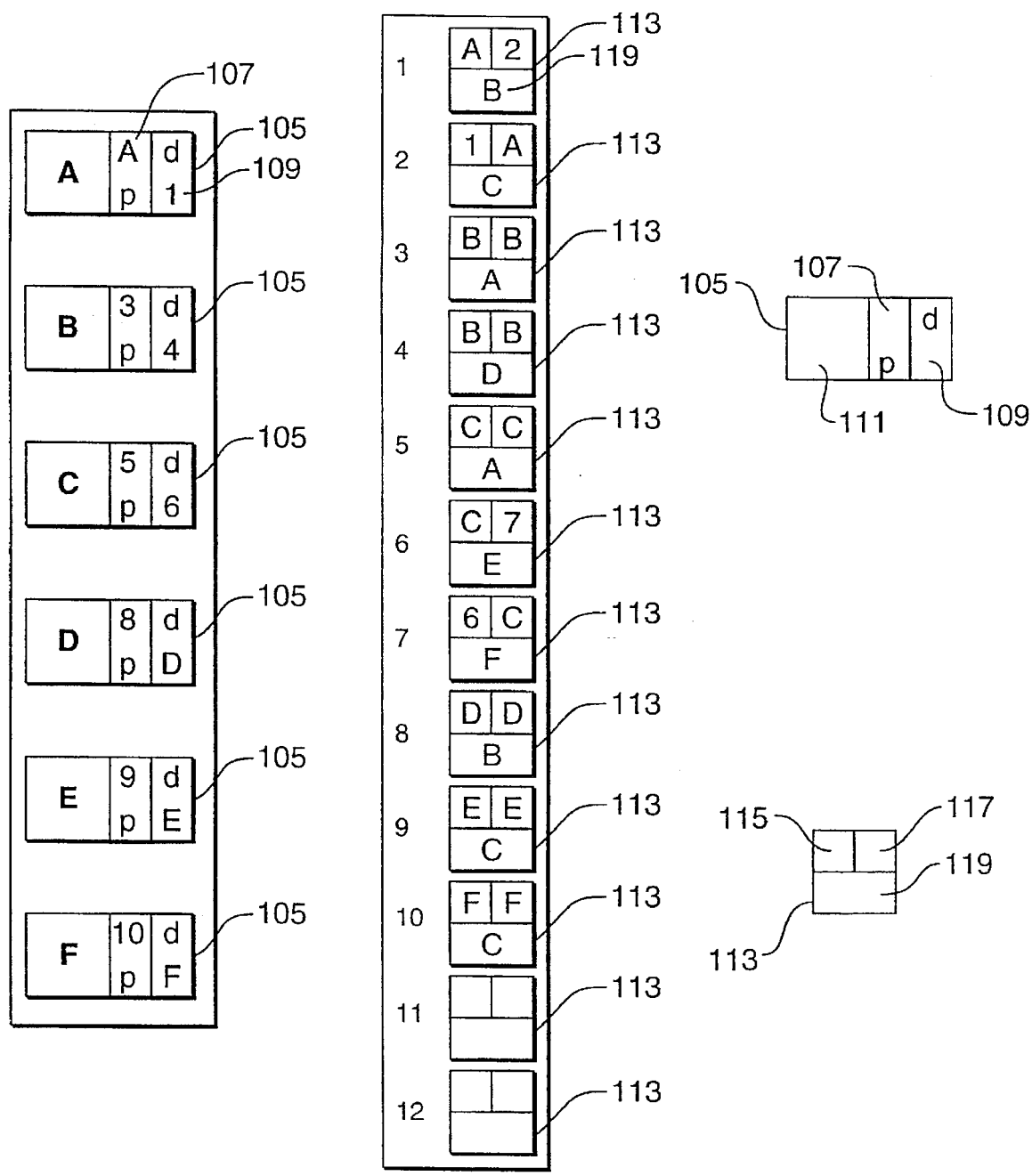
FIG. 10 depicts the ordering of entries in the ordering store for the FIG. 4 example.

Example of Dow-Node And DLE Structures—FIG. 10

FIG. 10 contains an example of the organization of the dow-node and DLE structures for representing the ordering graph of FIG. 4. In this example, the anchors for the predecessor and the dependent dow-nodes lists are treated as extensions of the dow-node as a simplification for purposes of explanation.

Consider dow-node for A. Its predecessor list is empty; its dependent list contains DLEs 1 and 2. The dow-id for DLE1 is the dow-node for B while the dow-id for DLE 2 is the dow-node for C. In this way, B and C are identified as dependents of A. Next consider the dow-node for B. Its predecessor list consists only of DLE 3. The dow-id field of DLE 3 contains the identifier for A thus recording that A is B's sole predecessor. The dependent list for B also consists of only one element, namely, DLE 4. The dow-id field of DLE 4 identifies D as the sole dependent of B. In a similar manner, the other dow-nodes in the organization of lists in FIG. 10 represent the ordering links of FIG. 4.

Executing the Ordering Graph

In addition to primitives for constructing the ordering graph, the delayed ordered writes facility implements the mechanisms to carry out the operations represented in the ordering graph in the order specified by the graph. Execution of a node in the ordering graph is defined as the operation of performing the action that is represented by the node; it may be, for example, either the writing of a buffer to secondary storage or the invocation of a deferred procedure call. Execution of the ordering graph consists of the procedures that are followed by the DOW subsystem to ensure that executions of nodes in the ordering graph are performed in the prescribed order.

Execution of nodes in the ordering graph generally starts when a kernel subsystem, such as a file system module, requests an operation on a buffer corresponding to a node in the ordering graph. When this happens, the DOW subsystem must mediate and ensure that all operations that must precede the requested operation are performed before the requested operation and in the proper order. In this way, a request from a kernel subsystem for carrying out a specific action, translates for the DOW subsystem into an execution of the node that represents the action in the ordering graph. The execution of that node, in turn, may require executions of other nodes in the ordering graph that are predecessors of the node.

In addition to an externally requested operation causing the need for such execution, the DOW subsystem itself needs to undertake node executions in response to a dow order, if, the addition of a specified ordering would cause a cycle in the ordering graph. This happens, for example, in a situation such as the following. Suppose that in the ordering graph, a chain of links,

{A→B, B→C, C→D} exists among nodes A, B, C, and D. Next, suppose a client of the DOW facility requests, via dow_order, the ordering D→A. Evidently, the desired ordering cannot be added to the graph without first removing one of the links that already exists between these nodes. The policy followed in the DOW subsystem is to issue a node execution either for A or D (the choice between executing A or D is made by the DOW subsystem, and is based on some optimality criteria). When the operation that is represented by a node in the ordering graph is completed, the DOW subsystem removes the links between the node and its dependent nodes, since the completion of that operation removes the ordering constraint that existed between that operation and others needing to follow it. So when node A, in the above example, is executed, the link A→B can be removed; this then permits the link D→A to be added without creating a cycle. Thus, the DOW subsystem may initiate the execution of one or more DOW nodes to occur, in order to accommodate a new ordering need specified by a client of the DOW subsystem.

The starting node in the ordering graph that is requested to be executed, is called the requested node. The DOW implementation performs node execution by searching the ordering graph (or sub-graph), starting from the requested node and identifying all the nodes that are predecessors of the requested node; it then searches each of these predecessor nodes to find their predecessors, and so on. Each identified node is marked with a special flag, so that it is recorded that the node must be executed as soon as its predecessors are executed. The nodes identified and flagged for execution in this manner are called pruned nodes. Searching upward in this manner, the DOW implementation identifies one or more nodes whose execution must be done first; these are nodes that have no predecessors.

After identifying the nodes whose operations must be performed first, the DOW subsystem initiates these operations; they can be performed concurrently if there are multiple such nodes. Then, when these nodes have been executed, the DOW implementation traces back towards the requested node: it follows a method of initiating the operations on each of the pruned nodes whose predecessors have completed, and as outstanding operations complete, finds more pruned nodes that can be executed next—until the requested node is reached. Thus the DOW implementation meets the requirement that all the operations that need to be performed before the requested operation can be undertaken are indeed performed.

In the trivial case, if there are no nodes which must be executed before the requested node, the DOW subsystem can initiate the operation that corresponds to the requested node.

The actual implementation of the search for nodes to be pruned, and the carrying out of the actions that the nodes represent, is the result of two independent agents: a dow_strategy function, and a dow_flush daemon, communicating through a shared data structure called the dow_flush_chain. The dow_strategy function searches the ordering graph and identifies the nodes that need to be executed, and places these nodes on the dow_flush_chain, which is a queue of nodes. The dow_flush_daemon is a kernel process; it removes nodes from the dow_flush_chain and initiates their associated operations.

For the DOW subsystem to be able to mediate in this manner, the file system implementations that use the DOW facility must replace their calls to the device driver write strategy routines, with calls to the dow_strategy routine.

When dow_strategy receives a disk write request for a buffer, it searches for a graph node corresponding to the buffer. If no such node exists, or if the node exists but has no predecessor nodes, then dow_strategy simply forwards the buffer to the device driver by calling the device driver's write strategy routine.

On the other hand, if the node corresponding to the operation has one or more nodes preceding it in the graph, the dow_strategy function does not call the device driver directly. Instead, it searches for predecessor nodes and marks them pruned, and then proceeds to do the same with these predecessor nodes. When continuing this way, dow_strategy reaches nodes that have no predecessors, it places them on the dow_flush chain for execution by the dow flush daemon.

The dow_flush_daemon checks the dow_flush_chain periodically, and for each node on the flush chain, the dow_flush daemon initiates the needed deferred operation.

When a deferred operation on a buffer completes, the DOW subsystem receives control via a callback mechanism. Since the deferred operation is now completed, all dependence links between its corresponding node and other nodes in the graph are dismantled. If the node whose execution just completed was the last predecessor of some other graph node, and the latter node had been marked "pruned", then the latter graph node is now considered ready for execution. It is therefore placed on the dow_flush_chain, where it would be picked up by the dow_flush_daemon. Again, when the operations represented by these nodes are completed, their dependence links are dismantled, which may move additional nodes to the dow_flush_chain.

The process continues in this way, until the operations for all nodes preceding the originally requested node have been performed. At that point, the requested node is itself moved to the dow_flush chain for handling by the dow_flush_daemon, which proceeds to call the needed device driver write strategy function. This completes the process of executing the requested node.

Execution of nodes in the ordering graph may be initiated for reasons other than a direct call to the dow_strategy function by the file system implementation, or because of the need to keep the ordering graph acyclic. Each deferred write operation is given a delay limit; when the limit is reached, and the operation is still pending, the operation is initiated by the DOW subsystem itself. This in turn may result in a graph search similar to that initiated by the dow_strategy routine. A deferred procedure call is not given a delay limit; it is carried out immediately after its last predecessor is executed.

Example

FIGS. 11 through 14 illustrate this process using the ordering graph of FIG. 4. Note that the ordering graph of FIG. 4 was derived from the example of FIG. 3 (rm file1 file2 file3), by the use of DOW ordering graph construction method described in TABLE 5.

Figure 11:
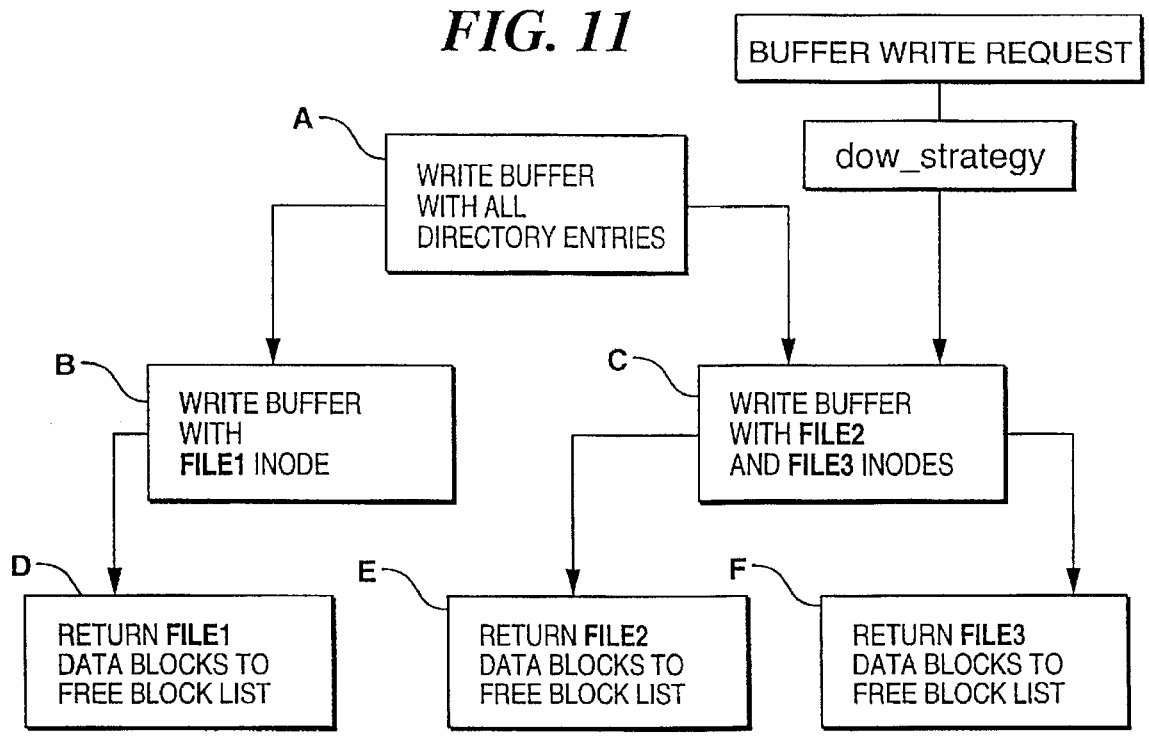
FIG. 11 depicts a block diagram of the processing in which a write request is reserved for an inode buffer represented by a DOW node.

Daemon Write Request—FIG. 11

In this case, suppose that a system daemon requests a write for one of the buffers; specifically, for the buffer that contains the inodes for files file2 and file3. This write call will be intercepted by the dow_strategy function, which first looks for a node corresponding to the requested operation; in this case, it is node C. This situation is depicted in FIG. 11.

Figure 12:
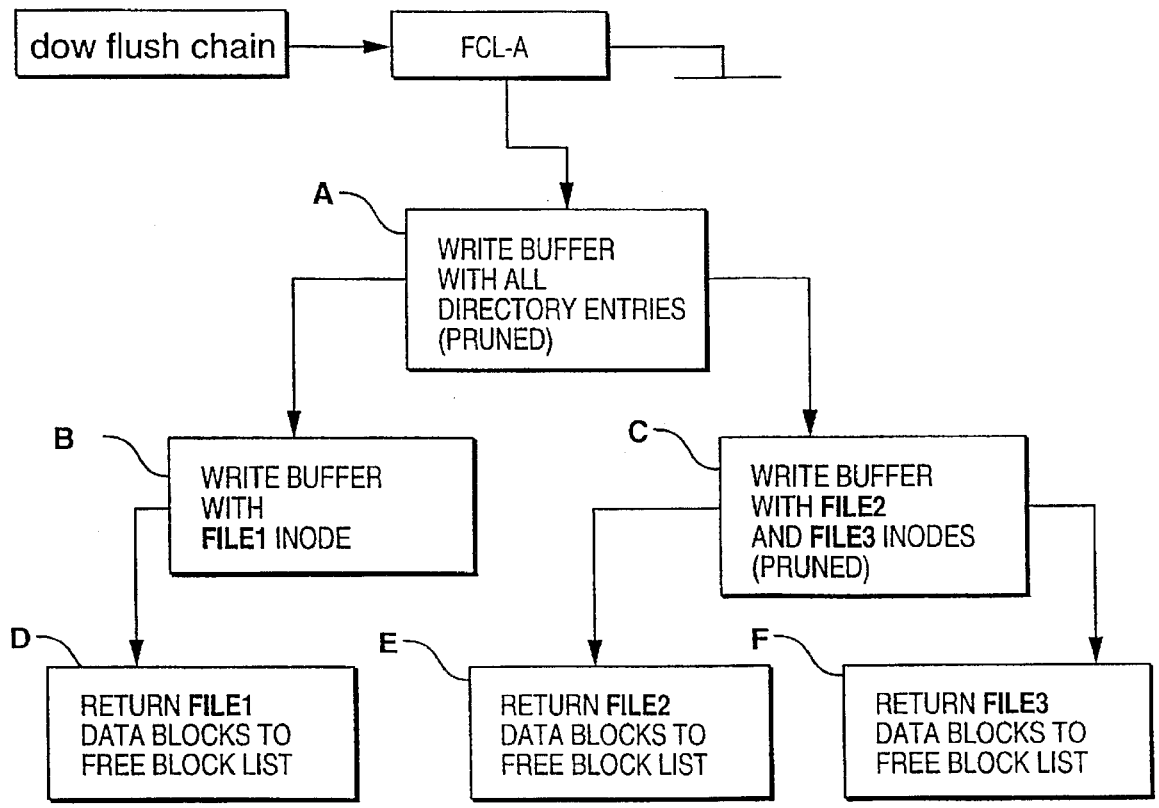
FIG. 12 depicts a block diagram of the processing in which nodes C and E are marked pruned and the A node is moved to the dow flush chain.

Insertion Into Dow_Flush_Chain—FIG. 12

On finding node C, and seeing that there is at least one node preceding it in the graph, the dow_strategy routine searches upward through the graph and marks C and its predecessor A as "pruned". Since A is at the top of the graph, and has no dependence upon any other graph nodes, it is inserted into the dow_flush_chain (see FIG. 12), from which it will be selected by the dow_flush_daemon.

Figure 13:
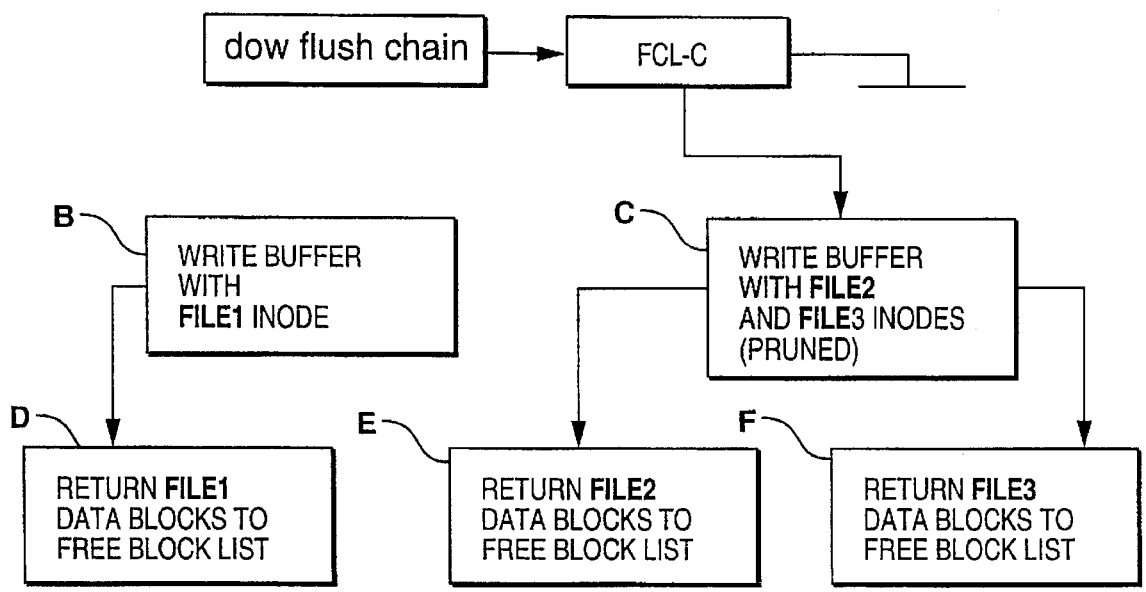
FIG. 13 depicts a block diagram of the processing in which the C node is moved to the dow flush chain after buffer write node completes.

Move To Dow_Flush_Chain—FIG. 13

The dow_flush_daemon executes node A by writing the directory buffer to disk. Upon completion of this write, the link from A to C is dismantled. Since C is marked pruned and has no other predecessors in the graph, it is moved to the row_flush_chain (FIG. 13).

Figure 14:
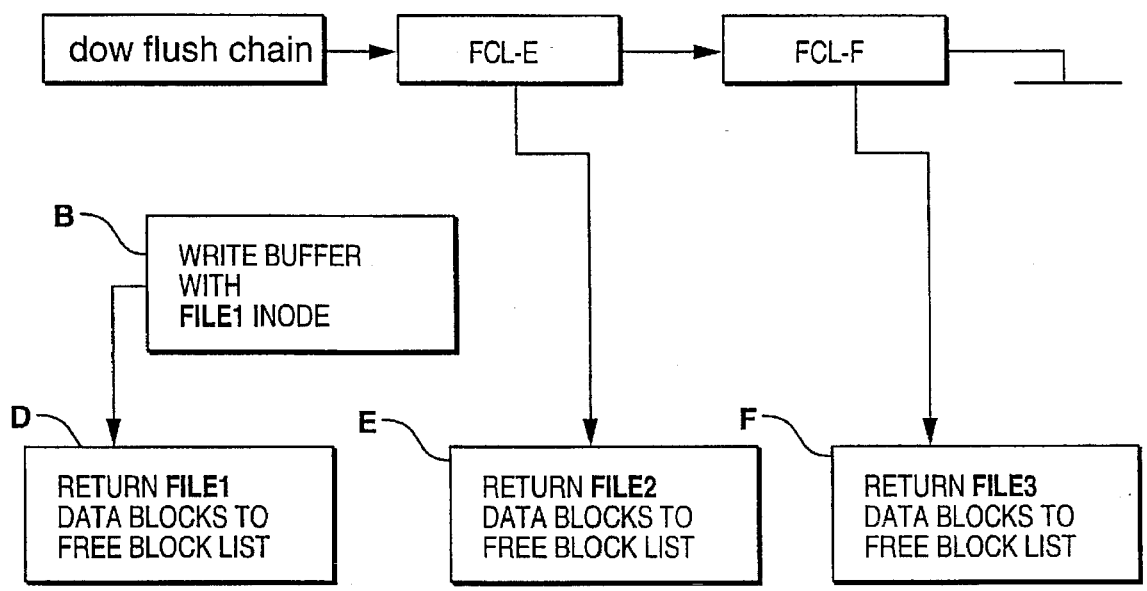
FIG. 14 depicts a block diagram of the processing in which the E and F nodes are moved to the dow flush chain after buffer write completes for the C node.

Move To Dow_Flush_Chain—FIG. 14

Subsequently, the dow_flush_daemon removes node C from the dow_flush_chain, and executes it by writing the buffer to disk. Upon completion of this write, the links between node C and nodes E and F are removed. Since E and F are function nodes, and all nodes preceding them in the ordering graph have been executed, they are moved to the dow_flush_chain (FIG. 14). Thus, after the buffer containing the inodes for files 1 and 2 is written to disk, the functions that return their disk blocks to the free list can be safely invoked; this is done by the dow_flush_daemon as it visits the dow_flush_chain and processes the nodes E and F.

Following this sequence of events, of the original graph nodes, only nodes B and D, remain. At some future time, these nodes will migrate to the dow_flush_chain either because of explicit requests to perform their operations, or perhaps due to expiry of the delay interval permitted on these operations.

Additional Design Considerations

The additional design issues in creating the DOW mechanism divide into

MODULARITY: Implementing the mechanism as a modular subsystem within the kernel.

ERROR RECOVERY: Allowing a file system implementation to recover from an error during a delayed ordered disk write.

DEADLOCK AVOIDANCE: Preventing deadlocks resulting from the addition of ordering dependencies to existing resource dependencies in the kernel.

These design considerations are briefly described in the next three subsections. In these subsections, reference is frequently made to races between agents performing computational operations. This term, "race", is used broadly in the Operating Systems literature to describe the uncontrolled access or modification of an operational variable because of overlapped actions of multiple processes or interrupt handlers, which causes system state to become inconsistent.

Modularity

The DOW mechanism was created as a modular service within the operating system kernel, separate from the other kernel subsystems with which it must coordinate to ensure deadlock free execution. As a modular service, DOW cannot have access to private data within the memory management subsystem or the disk device drivers; DOW cannot, therefore, reliably infer such data as whether a page has been modified or is instantaneously being written to disk. To circumvent this problem, the DOW subsystem independently tracks information about the status of directory pages. This DOW version of information can become stale in rare circumstances. This poses a problem which is described below, along with a solution that has been implemented.

A requirement on the dow_flush_daemon is that it must issue all of its own write requests to the file system implementation, as asynchronous writes. This requirement arises from the consideration that if the dow_flush_daemon were to wait for a write to complete, and the node corresponding to the write operation has predecessors that need to be handled by the dow_flush_daemon during the graph execution procedure described previously, then an impasse develops. The impasse can be removed by directing all page writes to a separate daemon that can write pages synchronously, but at the cost of some loss of performance. With this as the background, staleness of page-modification information tracked independently by the DOW subsystem creates the following problem.

There are two conditions in which a call for asynchronous writing of a page can return without causing a disk operation to occur. These are, (1) the page is already being written to disk by a disk driver (since the asynchronous write cannot wait), or, (2) the file system implementation finds that the page has not been modified since the last time it was written to disk (usually this happens when there is a race with some other instance of write of the same page). From DOW's standpoint, there is uncertainty, in case (1), about whether the disk write that is in progress (or has just completed) recorded a specific modification, or whether the modification raced with the disk write, and in case (2), about whether the modification state in the DOW data structure is clear at the same time that the modification state in the page is clear. These uncertainties would not arise at all, if DOW subsystem could access the page structures (used by the memory management subsystem) under the cover of the appropriate memory subsystem locks; but such access would compromise the modularity of the DOW and the memory subsystems.

However, the likelihood of races leading to either of the above uncertainties is low. The DOW subsystem takes advantage of the low likelihood of the races, by using this fail-safe algorithm. The dow_flush_daemon attaches a tag to the DOW node identifying itself as the owner of the corresponding page write, and if the write reaches dow_strategy function, then dow_strategy changes the tag so that dow_flush_daemon can discover later that this has happened. In the infrequent cases when the dow_flush_daemon discovers that an attempt to write a page asynchronously failed, it hands the page over to another daemon that is specially created for writing pages synchronously.

Error Recovery

For file system implementations which use delayed ordered writes, many of the write operations are handled asynchronously by the dow_flush_daemon. However, in the event of an I/O error, the file system implementation may wish to regain control of the operation, in order to take some recovery action for the error. DOW makes provision for this, by allowing a file system implementation to register routines to be called in the event of an error. If an error occurs, the DOW subsystem can call the registered routine, passing it information regarding what operation failed and why.

Deadlock Avoidance

One of the effects of deferred execution of disk writes is that new possibilities for process and system deadlocks arise. Listed below are three broad deadlock situations that can arise with the DOW scheme. While these deadlocks can be addressed by certain standard techniques for deadlock avoidance (see, for example, A. C. Shaw, "The Logical Design of Operating Systems," pp. 224–227, Prentice-Hall, 1974), the resulting computational overhead may degrade performance significantly. Hence, for each of the deadlocks situations listed below, more details follow, describing the specialized solutions that are simple and efficient and have been used with the DOW implementation.

I/O Inter-dependencies:

I/O inter-dependencies created by DOW could give rise to cycles. Furthermore, file system implementations frequently combine multiple disk reads or disk writes for reducing overhead, in an operation called "clustering". Such I/O clustering could create new, hidden inter-dependencies.

Resource Inter-dependencies:

Performing I/O requires resources. A potential for deadlock exists when DOW subsystem attempts to acquire resources, and these attempts conflict with other resource allocation strategies used by the kernel.

Memory Exhaustion with Blocked Pageout Daemon:

The Pageout daemon is a system process that is used to free up memory. A special memory exhaustion deadlock arises when the pageout daemon is forced to wait for a sequence of delayed ordered writes to complete.

I/O Inter-dependencies

An obvious deadlock condition arises if the ordering graph does not remain acyclic. This condition is prevented by cycle checking in dow_order. To perform exact cycle detection, that is, to identify exactly the situations in which a cycle arises, requires that the DOW subsystem either perform an exhaustive search with every addition of a link to the ordering graph, or, maintain a transitive closure (that is, node-to-node reachability information) over the full ordering graph. Both methods of determining exact connectivity are computationally expensive.

The DOW implementation uses the following simple, but fail-safe heuristic in lieu of performing exact cycle detection. Adding a link A→B to the ordering graph is permitted if either (1) A does not have a predecessor node, or (2) B does not have a dependent node. Otherwise, the DOW subsystem executes one of A or B before permitting the link A→B. While the above heuristic successfully detects true cycles and prevents their occurrence, it has the potential for inferring cycles that do not exist and thereby cause some loss of efficiency from node execution.

However, the heuristic is very successful in avoiding false cycles because of a characteristic of DOW usage. The construction of an ordering graph by a file system implementation usually proceeds linearly, as in the example of TABLE 5, with predecessors nodes created first and dependent nodes added in sequence. The likelihood that two pre-formed chains of dependence links ever fuse is very low; so that as new nodes are added to an existing ordering chain, they go to the end of the chain. In other applications of the DOW mechanism, a more sophisticated heuristic or accurate cycle detection may be more beneficial.

In addition to cycles, I/O interdependence could result from I/O clustering that is frequently performed by file system implementations. Clustering is a performance optimization in which read or write operations on two or more contiguous disk regions are combined before being presented to the disk drivers. With DOW, clustering presents a deadlock potential, since it may create undetectable I/O dependency cycles. A simple example of such a cycle is when two writes are combined as a single I/O but in which one operation has a direct or indirect DOW dependency linkage with respect to the other operation.

Inter-dependence arising from clustering can be avoided by a range of solutions. A general, exhaustive solution would be to cover an entire cluster unit with a special DOW graph node, so that the individual dependence links for each member of a cluster are brought together as dependence links applying to the special DOW graph node for the cluster unit. Another solution is to modify clustering so that the I/O operations are not combined, but issued in quick succession, so that the disk driver can exploit the spatial proximity and sell perform streamlined accesses to disk.

For DOW usage, a simple solution has been implemented. This consists of selectively disabling clustering for those disk blocks that are represented in the ordering graph as subjects of delayed writes. For UFS, this solution applies entirely to directory pages. It is seldom the case that the file system implementation has the opportunity for combining multiple neighboring pages of the same directory in a single disk write, so the loss of clustering for directory page writes has a minimal performance impact.

Resource Inter-dependencies

With DOW, a write operation undertaken by some process may end up having to write out other delayed buffers purely as a side effect. This gives rise to a interdependence, between the original process and other processes, for resources they each hold and which are needed to complete these additional delayed writes. The following example illustrates this problem:

Process Pa holds buffer Y locked, and issues a synchronous write for it.

A buffer (or page) Z must precede Y to disk, so an attempt is initiated (which may or may not be in the context of Pa) to acquire the appropriate lock on Z.

Process P2 holds Z and is waiting to acquire Y before it can release Z.

Resource dependence cycles are commonly prevented by using resource hierarchies by which all subsystems perform resource acquisitions. In hierarchy based allocation, each resource category is assigned a hierarchy level, and resource acquisition is permitted only in an increasing (or decreasing) order of hierarchy levels. This ensures that two agents attempting to acquire two resources do not each acquire one of the two resources and then wait indefinitely for the other resource. Thus, a hierarchy allocation rule may have prohibited the allocation of Z to a process that holds Y as a simple means of preventing a resource interdependence from arising.

It is difficult or impossible to apply hierarchy rules to the operation of the dow_flush_daemon. Activities of the dow_flush_daemon cause the dismantling of pre-existing links in the ordering graph, so that new links can be added, and so that dependent nodes are readied for execution. If a hierarchy rule forces the dow_flush_daemon to wait for a resource such as a specific buffer, and the process holding that buffer waits until the dow_flush_daemon can succeed in removing an ordering link in the graph, then an impasse develops between the two processes. One solution is to have the operating system maintain an explicit knowledge of resource ownerships, and force a process to release a specific resource (to break the deadlock), and fall back to a point from which it can re-initiate its operation. Generally this solution degrades performance noticeably.

With DOW usage, a less general but simple and effective solution exists. In this solution a file system implementation that is a DOW client is required to observe this rule:

A process is not allowed to hold a resource (e.g., a page or buffer) which is represented in the ordering graph as the subject of a write operation, while blocking for another resource that is also similarly represented.

This solution is not restrictive because a directory page, or a buffer containing structural information, needs to be held locked by a process in two cases:

An ongoing device driver operation requires the page (or buffer) to be locked. Device driver operations do not take indefinitely long time to complete, and do not need additional pages or buffers locked. Thus only one resource is held at a time.

The process needs to lock out a page (or buffer) for preventing it from being modified by other processes. This happens when a process needs to either read the data contained in the page (or buffer), or modify the data. The file system implementation can ensure that in such cases, only one page (or buffer) is locked at a time, for a read or write access.

There are a small number of instances in the UFS file system implementation that are modified for enforcing the above rule of holding one resource at a time. In all these instances, the file system implementation was previously holding multiple buffers or pages in the course of applying updates. The previous policy of simultaneously holding more than one page or buffer in this way was arbitrary and hence was easily corrected.

Memory Exhaustion with Blocked Pageout Daemon

The pageout daemon handles lists of free but modified pages; it has to write them to disk before they can be available for fresh use. In order to submit a page to a disk driver, the pageout daemon uses a memory unit called "buffer header" to record some auxiliary information about the page, and then passes the address of the buffer header to the disk driver. Normally, the memory needed for this purpose is obtained from a dynamic kernel memory allocator (KMA), to which it is returned as writes complete.

To permit graceful system recovery under extremely severe memory conditions, the kernel maintains a small, "contingency" memory pool for critical uses. If KMA cannot furnish the needed memory to the pageout daemon, then the kernel provides the needed memory from this contingency pool, and as the page writes complete, returns the memory to the contingency pool. When the DOW mechanism is used, the dow_flush_daemon is provided memory from the contingency pool as well, for the asynchronous page writes that it needs to perform, if KMA cannot furnish the needed memory.

As the number of deferred page writes increases, the deferred writes pose a threat to the ability of this contingency pool to cover them in the event of a severe memory exhaustion. If pageout daemon cannot continue to operate in this situation, then a system deadlock can result.

This deadlock is prevented by detecting that the count of deferred page writes due to DOW use has crossed some threshold. When this happens, new dependence creation by the DOW mechanism is disabled temporarily, until the count has been reduced. In the meantime, the system is forced to revert to using synchronous writes instead of creating new ordering dependencies. This operation is done transparently by having dow_order perform the synchronous writes directly on behalf of the file system implementation.

Performance Gain From Delayed Ordered Writes

Comparison of system performance with and without the use of delayed ordered writes in UFS shows that dramatic gains have been achieved by replacing synchronous disk writes with DOW. The measurements were made on a UNIX System V Release 4.2 MP Operating System, running on a single Intel 486/33 Mhz processor with the IDE disk subsystem. The benchmark used for measuring system performance was the System Performance Evaluation Cooperative's Software Development Environment Throughput (SPEC SDET) benchmark (see System Performance Evaluation Cooperative, 057.SDET *Benchmark: A User's Guide*). The comparison is drawn by normalizing the measurement data to the results obtained without the use of delayed ordered writes.

The SPEC SDET benchmark simulates a multi-user workload in a program development environment and measures throughput as a function of the number of simulated users. In this benchmark, each user is simulated by the execution of a UNIX shell script that is composed of a randomized sequence of commands. A representative script consists of commands to edit files, compile and link programs, create, remove, and copy directories and files, and text formatting and spell-checking documents. While each script executes a different sequence of these commands, all scripts are composed of the same aggregate command mix, so that the total work done by each of the simulated users is identical. In the absence of DOW usage, the performance of the benchmarked system is found to be limited by the speed with which read/write I/O is performed to disk.

Normalized System Throughput—FIG. 15

FIG. 15 compares the normalized system throughput with and without DOW usage. DOW usage improves the SPEC SDET measure of system's peak performance by more than a factor of two. This happens as the benchmarked system moves from being disk bound in the base case to becoming bound by the processor execution speed with DOW usage.

Figure 17:
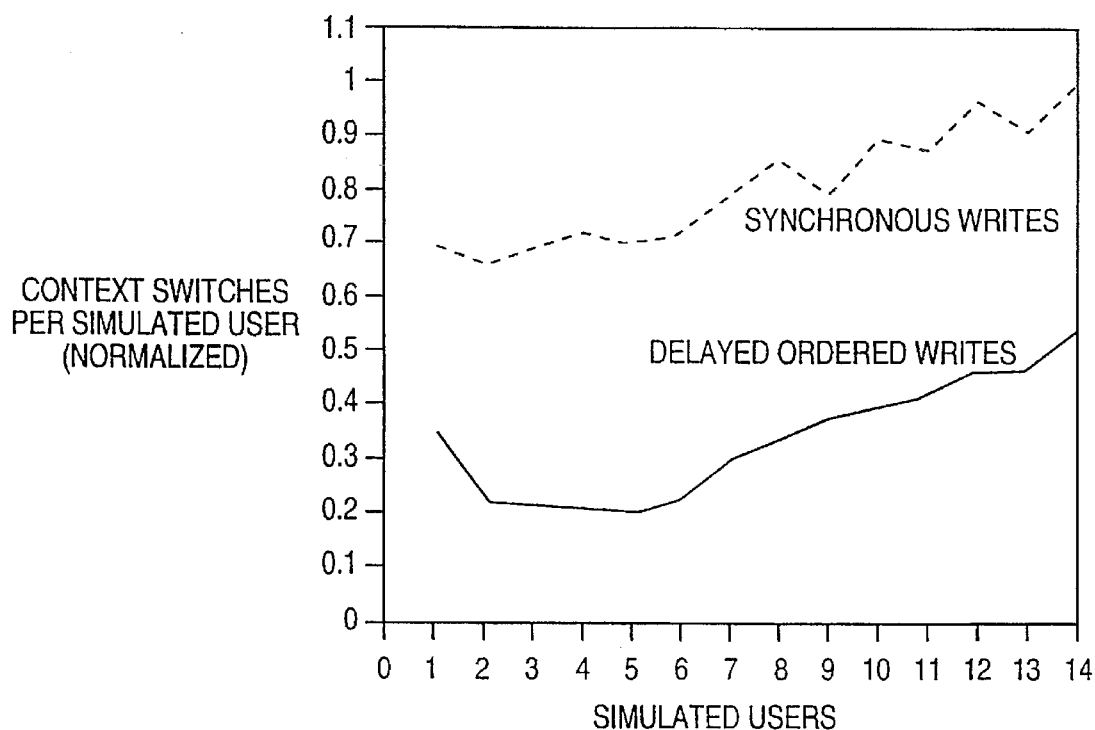
FIG. 17 depicts context switches per user for synchronous writes and delayed ordered writes.

Disk Write Operations Reduction—FIGS. 16 and 17

The reduction in disk write operations is confirmed by FIG. 16 which shows that the number of disk write operations reduces by 85% the number without the use of DOW. An added benefit from the reduction of synchronous writes is a 50% drop in the aggregate number of process context switches, as shown in FIG. 17.

Figure 18:
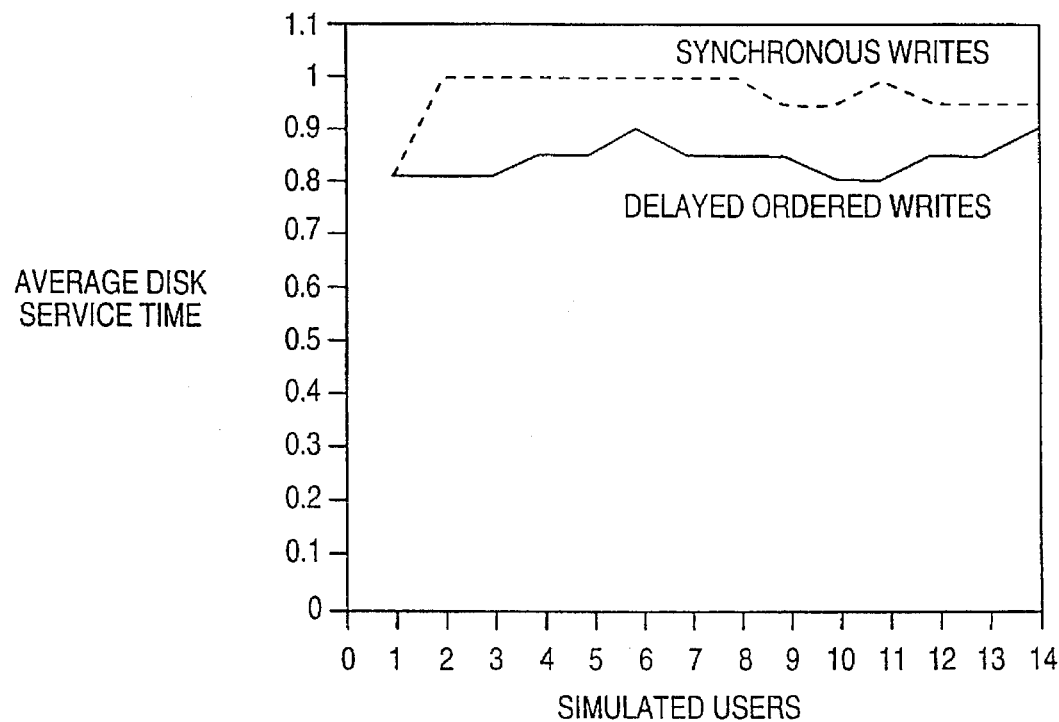
FIG. 18 depicts average disk service time for synchronous writes and delayed ordered writes.

Decrease in Disk Service Time—FIG. 18

An additional indirect benefit of using delayed ordered writes is a decrease in the average disk service time, as shown in FIG. 18. The decrease in disk service time occurs because the dow_flush_daemon can issue multiple concurrent disk requests (since its disk operations are not synchronous), and thus enable the disk driver to better schedule these disk writes for best disk access performance.

Figure 19:
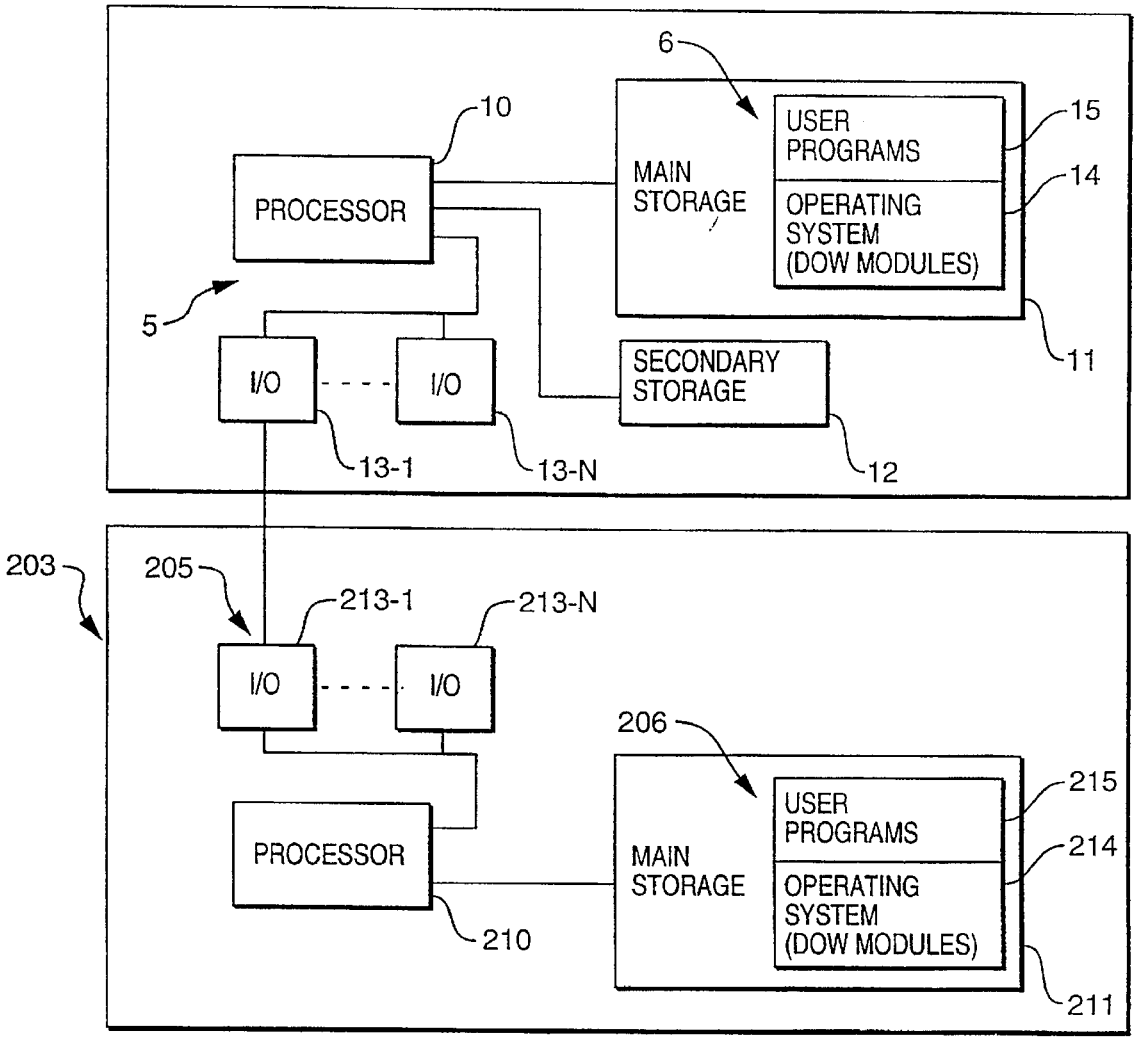
FIG. 19 depicts a block diagram of a computer system employing ordered operations in a network environment.

Network File System Environment—FIG. 19

The computer system 3 of FIG. 19 is a server system that connects to a client system in the form of computer system 3'. The computer system 3 of FIG. 19 like in FIG. 1 is composed of hardware 5 and software 6. The hardware 5 includes one or more processors 10, typically a central processing unit (CPU), main storage 11, input/output (I/O) in the form of secondary storage 12 and other input/output devices 13-1, . . . 13-N. The software 6 includes an operating system 14 and user (application) programs 15. The computer system 3 executes user programs 15 in the hardware 5 under control of the operating system 14. A common instance of the operating system 14 is the UNIX® operating system.

The client computer system 3' of FIG. 19 is composed of hardware 5' and software 6'. The hardware 5' includes one or more processors 10', typically a central processing unit (CPU), main storage 11', input/output (I/O) in the form of input/output devices 13'-1, . . . 13'-N. The software 6' includes an operating system 14' and user (application) programs 15'. The computer system 3' executes user programs 15' in the hardware 5' under control of the operating system 14'. A common instance of the operating system 14' is the UNIX® operating system.

The I/O devices 13-1 and 13'-1 in the server system 3 and the client system 3', respectively, connect the systems 3 and 3' together through a network 50 to form a Network File System (NFS). The network 50 is any conventional local-area network.

An example of the use of delayed ordered writes in place of synchronous writes to improve response time and throughput in the Network File System is described.

The Network File System (NFS) permits sharing of files between different computer systems connected via a network. NFS allows processes located on one computer system, such as NFS client system 3', to access files on a (usually) different computer system, such as server system 3.

On an NFS server system 3, several processes called server processes execute in order to provide the necessary file access services to client system 3'.

When a process running on the client system 3' wishes to access a file on the server system 3, it sends a request through the network to the server system 3. The request is handled by one of the server processes, which performs the operation specified by the request, and then sends a response back across the network to the client. The response may include data or status information.

Before it sends a response back to the client, the server process must ensure that all data modifications associated with the request have been written to disk. For example, on a file write request, the server process must write the file data to disk along with any structural modifications such as the inode and indirect blocks, wait for those writes to complete, and then send the response back to the client.

Server processes typically use synchronous writes to meet this requirement. For example, to service a write request, a server process uses synchronous writes to write data, inode, and, if necessary, indirect block modifications to disk. Since the server process waits for each synchronous write to complete before proceeding, this use of synchronous writes guarantees that the data will be on disk before the response message is sent.

Typically, a server process takes these steps, in time order, to service a client request for writing a file:

1. Acquire lock protecting file data structures.
2. A. Modify in-memory copy of indirect block, if necessary.
   B. Synchronously write buffer containing indirect block to disk, if modified.
3. A. Modify in-memory copy of file data.
   B. Synchronously write buffer containing file data to disk.
4. A. Modify in-memory copy of inode.
   B. Synchronously write buffer containing inode to disk.
5. Release lock protecting file data structures.
6. Send response message back to user.

One major drawback of this scheme is that if multiple requests arrive for the same file, the server processes handling these requests will each need to acquire the same lock (in step 1, above). One process at a time would acquire the lock, perform steps 2, 3, and 4, and then release the lock for another process to acquire. The time for which the lock is held includes the duration of time that each of the synchronous disk writes in steps 2B, 3B, and 4B take. Thus, each server process will hold the lock for a long duration before allowing another server process to perform work for the same file, and thereby reduce the ability of the NFS server to provide fast response and high throughput to its clients.

A second drawback in the above scheme is that the disk is likely to be under utilized. Because the synchronous writes are serialized, each is sent to the disk driver one at a time. The disk driver is thus forced to schedule the writes in the order in which they are requested, even if an alternate order would be more efficient. Also, little or no overlap of work happens between the disk driver and the server processes, since the disk driver stays idle during the interval between the completion of one write and the initiation of the next, and since the server process needs to wait for each of the disk writes to complete.

An alternative scheme would be to use delayed ordered writes in place of synchronous writes. In this scheme, the server process could instead issue delayed ordered writes, and specify an ordering relationship between each write and a deferred function call which would signal the server process when all the writes have completed. Instead of holding the lock across all of its operations, a server process would need to hold the lock only during the modifications of in-memory copies of the information that is modified; and the time spent waiting by a server process for disk write completions would not inflate the lock hold time. Specifically, in the DOW-based scheme, server process would take the following steps to service a write request:

1. Acquire lock protecting file data structures.
2. Create DOW node for function call to signal the server process.
3. A. Modify in-memory copy of indirect block, if necessary.
   B. If the in-memory copy of the indirect block has been modified, establish an ordering specifying that the function which signals the server process is to be called after writing the buffer containing the indirect block.
   C. If the indirect block has been modified, issue delayed or asynchronous write to disk of buffer containing indirect block.
4. A. Modify in-memory copy of file data.
   B. Establish an ordering specifying that the function which signals the server process is to be called after writing the buffer containing the in-memory copy of the file data.
   C. Issue a delayed or asynchronous write to disk of the buffer containing the file data.
5. A. Modify in-memory copy of inode.
   B. Establish an ordering specifying that the function which signals the server process is to be called after writing the buffer containing the in-memory copy of the inode.
   C. Issue a delayed or asynchronous write to disk of the buffer containing the inode.
6. Release lock protecting file data structures.
7. Wait for signal (coming from function) that the disk writes have completed.
8. Send response message back to user.

This scheme addresses the two drawbacks of the previous scheme. First, the file lock is only held during the time that the in-memory file state is modified, and the DOW graph is being constructed; it is released before the disk writes complete. This means the lock is held for much less time on each write, and lock contention is reduced. The reduced lock contention in turn means that each server process acquires the lock sooner, and is able to begin servicing its request more quickly.

Secondly, in this scheme, each write request is handed to the disk driver before the previous one completes. This allows the disk driver to schedule the disk jobs more efficiently, and tends to keep the disk queue full, which also makes more efficient use of the disk.

Figure 20:
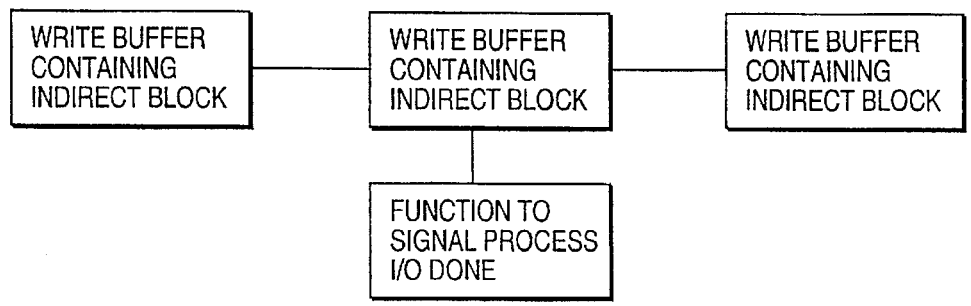
FIG. 20 depicts a block diagram of the processing for the computer system of FIG. 20.

Network File System Directed Acyclic Graph—FIG. 20

FIG. 20 depicts the directed acyclic graph for the network file system of FIG. 19.

Conclusion

The present invention provides a facility called Delayed Ordered Writes (DOW), which is used by a file system implementation to schedule the writing of a set of data items from primary to secondary storage so that the writing of these items occurs in a specific, desired order. Use of this facility makes it unnecessary to employ synchronous disk writing for guaranteed ordering among disk writes.

The performance benefits of using this facility are significant. Disk writes are reduced by nearly an order of magnitude for typical UNIX operating system workloads because of the much improved disk write caching that is possible with delayed writing. In addition, context switching is reduced as well, which improves the productive utilization of the processor.

The DOW usage and performance gains were measured in the context of the UFS file system implementation in a recent version of the UNIX Operating System (System V, Release 4.2 Multi-processor UNIX Operating System).

DOW can be used equally beneficially with other file system implementations, such as the AT&T UNIX System V (S5) file system. It may also be used, for example, to extend the benefits already achieved in some file system implementations from the use of techniques such as disk logging.

The DOW facility is available as a modular service, which will facilitate its integration into other UNIX Operating system implementations. While it is available as a mechanism for enforcing ordering among the writing operations, the policy for determining the necessary ordering is maintained with the clients of the DOW facility. Furthermore, a DOW client retains the ability of enabling or disabling the DOW optimization at run time, and to apply the optimization selectively among the write operations that it needs to perform. With DOW use, a file system implementation obtains dramatic improvement of performance without losing file system media compatibility and with minimal modification of code structure.

Use of delayed ordered writes in some applications can increase parallelism, thereby improving performance without necessarily reducing the number of disk writes.

A program listing that is an actual embodiment, in combination with a UFS file system, of the present invention appears in the attached LISTING APPENDIX which includes the following modules:

| LISTING APPENDIX MODULES | |
|---|---|
| Master | Configuration file (in dow.cf directory) |
| System | Configuration file (in dow.cf directory) |
| dow.h | Header file describing all data structures and convenient macros. |
| dow_cancel.c | File containing function for removing operation entries. |
| dow_check.c | File containing functions for correctness checking. |
| dow_create.c | File containing functions for creating dow nodes for buffers, pages, functions. |
| dow_flush.c | File containing functions for dow_flush_daemon. |
| dow_handle.c | File containing some of the functions for executing dow nodes and to wait for pending executions to complete. |
| dow_io.c | File containing driver layer functions. |
| dow_leaf.c | File containing functions explicitly for executing dow nodes that have no predecessors. |
| dow_order.c | File containing dow_order function. |
| dow_prune.c | File containing code for pruning a dow graph. |
| dow_util.c | File containing functions for allocating and releasing dow nodes. |
| dowlink_util.c | File containing functions for allocating and freeing ordering entries. |

While the invention has been particularly shown and described with reference to preferred embodiments thereof it will be understood by those skilled in the art that various changes in form and details may be made therein without departing from the spirit and scope of the invention.

© COPYRIGHT 1994 NOVELL, INC.

fs_dow/dow.cf/Master                                                                                    Page 1

```
1 #ident  "@(#)kern:fs/dow.cf/Master   1.1"
2 #ident  "$Header: $"
3 $version 1
4 $entry init postroot         0      0
5 dow     dow         -        0      0
``` fs_dow/dow.cf/Master

File modified: Wed Apr  6 11:25:56 1994

Page 1

Printed: Wed Apr  6 11:28:29 1994

```
fs_dow/dow.cf/System                                              Page 2

1 #ident  "@(#)kern:fs/dow.cf/System   1.2"
2 #ident  "$Header: $"
3 $version 1
4 $loadable dow
5 dow     Y    0    0    0    0    0    0    0    0    -1
```

```
fs_dow/dow.cf/System                                              Page 2
                                         File modified: Wed Apr  6 11:25:56 1994
```

```c
1  #ident  "@(#)kern:fs/dow.h  1.6"
2  #ident  "$Header: $"
3
4  #if defined(__cplusplus)
5  extern "C" {
6  #endif
7
8  #ifndef _FS_DOW_H
9  #define _FS_DOW_H
10
11 #ifdef _KERNEL
12
13 #include <fs/buf.h>           /* REQUIRED */
14 #include <fs/vnode.h>         /* REQUIRED */
15 #include <util/ksynch.h>      /* REQUIRED */
16 #include <util/types.h>       /* REQUIRED */
17
18 typedef short dowid_t;
19 typedef short dowlinkid_t;
20
21 /*
22  * A note on DOW structures and structure linkages.
23  *
24  * Each dow structure is used to represent one unit of deferred action:
25  * a write or a deferred function. When not in use, unless a hold is
26  * active on a dow structure, the structure is placed on a free list
27  * for allocation to a new use.
28  *
29  * When in use, a dow structure is placed on some hash chain and one of
30  * three flush chains -- with one exception. The exception is when a dow
31  * structure is "aborted", but cannot be freed due to an existing hold
32  * by some context. In this case, the dow structure is marked as having
33  * been abolished ("DOW_GONE"), and is not placed on any hash chains.
34  * This fact is exploited to union the freelist linkage with the hash
35  * chain linkage in the dow structure.
36  *
37  * There are three flush chains: (a) leaf flush chain, (b) non-leaf,
38  * "pruned" flushed chain, and (c) an aged flush chain. The flush
39  * chain membership determines how a dow structure is handled through
40  * various operations, and is described in some detail in dow_prune.c
41  * In brief, flush chains are used to divide work among different
42  * dow functions by isolating those actions that need to be performed
43  * quickly from those that do not have an associated urgency.
44  */
45
46
47 typedef struct dow {
48    union {
49        struct {
50              dowid_t dowfreenext;
```

```
51                       dowid_t  dowfreeprev;
52              } dowfreelinks;
53              struct {
54                       dowid_t  dowhashnext;
55                       dowid_t  dowhashprev;
56              } dowhashlinks;
57      } dow_links;
58      dowid_t dow_flushnext;
59      dowid_t dow_flushprev;
60      uchar_t dow_spare;              /* free space */
61      uchar_t dow_level;              /* level depth; currently unused */
62      uchar_t dow_dep_cnt;            /* number of immediate dependents */
63      uchar_t dow_ant_cnt;            /* number of immediate antecedents */
64      /*
65       * sync variable to signal waiters on
66       * the DOW_INTRANS state.
67       */
68      /*
69       * The hash bucket SVs are used, on the other hand,
70       * to implement a pseudo sleep lock for signalling
71       * the modify-busy exchange between dow_setmod and
72       * dow_strategy.
73       */
74      sv_t    dow_sv;
75
76      uchar_t dow_state;
77      /*
78       * dow_type specifies whether it is a page, a buffer,
79       * a general function, or a non-blocking function
80       */
81      uchar_t dow_type;
82      short   dow_hold;
83      clock_t dow_timestamp;
84      union {
85              dev_t    dowdev;                        /* "dev" for a buffer dow */
86              vnode_t *dowvp;                         /* "vp" for a page dow */
87              void   (*dowfunc)();                    /* "func ptr" for a function dow */
88              long    dowident1;
89      } dow_u1;
90      union {
91              int      dowblkno;                      /* "blkno" for a buffer dow */
92              off_t    dowoffset;                     /* "offset" for a page dow */
93              void    *dowargp;                       /* "argp" for a function dow */
94              long     dowident2;
95      } dow_u2;
96
97      buf_t   *dow_bp;                /* pageio/buffer header pointer */
98      /*
99       * we should not really need to remember
100      * size for a delayed write buffer, since we
      * expect that a waiting variant of blookup
```

```
fs_dow/dow.h                                                               Page 5

101          * must find the buffer if the DOW is marked
102          * modified. however, we remember it anyway,
103          * for now -- for convenience.
104          */
105         union {
106             long       dowbsize;        /* block size for a buffer dow */
107             long       dowlen;          /* length of unit of a "page" dow */
108         } dow_u3;
109         /*
110          * dow_mod_lock count: for pages only. We could union it
111          * with the dow_bsize field, above.
112          */
113         short      dow_mod_lock;
114         /*
115          * b_iodone/b_iochain linkage
116          */
117         void       (*dow_b_iodone)();
118         void       *dow_b_iochain;
119 #ifdef DEBUG
120         dowid_t    dow_debug_hashid;
121         dowid_t    dow_debug_flushid;
122         short      dow_debug_cnt;
123 #endif
124 } dow_t;
125 /*
126  * dow_state values
127  */
128 #define DOW_MODIFIED      0x01
129 #define DOW_INTRANS       0x02
130 #define DOW_FLUSH         0x04
131 #define DOW_IOSETUP       0x08
132 #define DOW_PRUNE         0x10
133 #define DOW_GONE          0x20
134
135 /*
136  * common compound tests of dow structure state: following are useful.
137  */
138 #define DOW_MODINTRANS       (DOW_MODIFIED | DOW_INTRANS)
139 #define DOW_FLUSHINTRANS     (DOW_FLUSH | DOW_INTRANS)
140 #define DOW_MODPRUNE         (DOW_MODIFIED | DOW_PRUNE)
141
142
143
144 /*
145  * dow_type values
146  */
147 #define DOW_ISBUFFER      0x01
148 #define DOW_ISPAGE        0x02
149 #define DOW_ISFUNC        0x04
150
```

```
151  #define DOW_ISFUNC_NBLK 0x0C      /* includes DOW_ISFUNC */
152
153  /*
154   * dow_order: flag values and return codes from dow_order_nowait
155   */
156
157  /* wait flags */
158  #define DOW_NO_RESWAIT  0x01
159  #define DOW_NO_WAIT     0x02
160  #define DOW_ANY_WAIT    0x04
161
162  /* return codes */
163  #define DOW_ANY_BUSY    1
164  #define DOW_DEP_BUSY    2
165  #define DOW_POS_CYCLE   3
166  #define DOW_DEF_CYCLE   4
167  #define DOW_CREATE_OK   5
168  #define DOWLINK_NORES   6
169  #define DOW_DEP_GONE    7
170  #define DOW_DEP_PRUNE   8
171  #define DOW_MAX_ANTCNT  9
172  #define DOW_MAX_DEPCNT  10
173
174  /*
175   * We maintain the dow and dowlink free lists as doubly linked
176   * lists -- anchored at the last elements of each array.
177   * However, the freelist management can (and should) be made
178   * simpler by making these lists singly linked and having all
179   * allocation and freeing proceed directly at the heads of the
180   * the freelists. The "prev" pointers can be used at that point
181   * only in the DEBUG cases.
182   */
183
184  #define dow_freenext    dow_links.dowfreelinks.dowfreenext
185  #define dow_freeprev    dow_links.dowfreelinks.dowfreeprev
186  #define dow_hashnext    dow_links.dowhashlinks.dowhashnext
187  #define dow_hashprev    dow_links.dowhashlinks.dowhashprev
188
189  #define dow_dev         dow_u1.dowdev
190  #define dow_vp          dow_u1.dowvp
191  #define dow_func        dow_u1.dowfunc
192  #define dow_ident1      dow_u1.dowident1
193  #define dow_blkno       dow_u2.dowblkno
194  #define dow_offset      dow_u2.dowoffset
195  #define dow_argp        dow_u2.dowargp
196  #define dow_ident2      dow_u2.dowident2
197  #define dow_bsize       dow_u3.dowbsize
198  #define dow_len         dow_u3.dowlen
199
200  #define DOW_ID_TO_P(x)  ((void *)(&(dow_tab[(x)])))
```

```
201 #define DOW_P_TO_ID(idaddr)      (((dow_t *)(idaddr)) - (&(dow_tab[0])))
202 #define DOW_HOLD(x)              ((dow_tab[(x)]).dow_hold)
203 #define DOW_LEVEL(x)             ((dow_tab[(x)]).dow_level)
204 #define DOW_DEP_CNT(x)           ((dow_tab[(x)]).dow_dep_cnt)
205 #define DOW_ANT_CNT(x)           ((dow_tab[(x)]).dow_ant_cnt)
206 #define DOW_TIMESTAMP(x)         ((dow_tab[(x)]).dow_timestamp)
207 #define DOW_FREENEXT(x)          ((dow_tab[(x)]).dow_freenext)
208 #define DOW_FREEPREV(x)          ((dow_tab[(x)]).dow_freeprev)
209 #define DOW_HASHNEXT(x)          ((dow_tab[(x)]).dow_hashnext)
210 #define DOW_HASHPREV(x)          ((dow_tab[(x)]).dow_hashprev)
211 #define DOW_FLUSHNEXT(x)         ((dow_tab[(x)]).dow_flushnext)
212 #define DOW_FLUSHPREV(x)         ((dow_tab[(x)]).dow_flushprev)
213 #define DOW_SVP(x)               (&(dow_tab[(x)]).dow_sv)
214 #define DOW_STATE(x)             ((dow_tab[(x)]).dow_state)
215 #define DOW_TYPE(x)              ((dow_tab[(x)]).dow_type)
216 #define DOW_DEV(x)               ((dow_tab[(x)]).dow_dev)
217 #define DOW_VP(x)                ((dow_tab[(x)]).dow_vp)
218 #define DOW_FUNC(x)              ((dow_tab[(x)]).dow_func)
219 #define DOW_IDENT1(x)            ((dow_tab[(x)]).dow_ident1)
220 #define DOW_BLKNO(x)             ((dow_tab[(x)]).dow_blkno)
221 #define DOW_OFFSET(x)            ((dow_tab[(x)]).dow_offset)
222 #define DOW_ARGP(x)              ((dow_tab[(x)]).dow_argp)
223 #define DOW_IDENT2(x)            ((dow_tab[(x)]).dow_ident2)
224 #define DOW_BP(x)                ((dow_tab[(x)]).dow_bp)
225 #define DOW_BSIZE(x)             ((dow_tab[(x)]).dow_bsize)
226 #define DOW_LEN(x)               ((dow_tab[(x)]).dow_len)
227 #define DOW_MOD_LOCK(x)          ((dow_tab[(x)]).dow_mod_lock)
228 #define DOW_B_IOCHAIN(x)         ((dow_tab[(x)]).dow_b_iochain)
229 #define DOW_B_IODONE(x)          ((dow_tab[(x)]).dow_b_iodone)
230 #define DOW_SPARE(x)             ((dow_tab[(x)]).dow_spare)
231
232 #ifndef DOW_KLUDGE
233 #define DOW_TRACKED              0x01
234 #define DOW_PUTPAGED             0x02
235 #define DOW_STRATTED             0x04
236 #define DOW_WRITTEN              0x08
237 extern  void mark_vp_offset_dows(vnode_t *, off_t , nchar_t);
238 extern  void check_vp_offset_dows(vnode_l *, off_t );
239 #define MARK_VP_OFFSET_DOWS(x, y, z) mark_vp_offset_dows((x), (y), (z))
240 #define CHECK_VP_OFFSET_DOWS(x, y) check_vp_offset_dows((x), (y))
241 #else
242 #define DOW_TRACKED
243 #define DOW_PUTPAGED
244 #define DOW_STRATTED
245 #define DOW_WRITTEN
246 #define MARK_VP_OFFSET_DOWS(x, y, z)
247 #define CHECK_VP_OFFSET_DOWS(x, y)
248 #endif
```

```
251 #ifdef   DEBUG
252 #define  DOW_DEBUG_HASHID(x)      ((dow_tab[(x)]).dow_debug_hashid)
253 #define  DOW_DEBUG_FLUSHID(x)     ((dow_tab[(x)]).dow_debug_flushid)
254 #define  DOW_DEBUG_CNT(x)         ((dow_tab[(x)]).dow_debug_cnt)
255 #else
256 #define  DOW_DEBUG_HASHID(x)
257 #define  DOW_DEBUG_FLUSHID(x)
258 #define  DOW_DEBUG_CNT(x)
259 #endif
260 /*
261  * DOW_CHEAP_RELE and DOW_CHEAP_HOLD are used to adjust the hold
262  * count without doing much else.
263  */
264
265 #define  DOW_CHEAP_HOLD(x)    (++(DOW_HOLD((x))))
266 #define  DOW_CHEAP_RELE(x)    (--(DOW_HOLD((x))))
267
268 #define  DOW_DEP_MAX         32
269 #define  DOW_AMT_MAX         32
270 #define  DOW_AGE_TIX         (HZ * 5)        /* 5 seconds */
271 #define  FLUSHDELTAMAX       (HZ * 180)      /* 180 seconds == "infinite dow delay" */
272 #define  MAX_RECUR           7
273
274 /*
275  *     DOWLINK structures:
276  *
277  * The dowlink structures are used in linking up dows into chains of
278  * antecedent or dependent structures. Since these relationships can
279  * be one->many in each direction, we cannot use fields within dow
280  * structures for encoding them. So we use the dowlink structures;
281  * each dowlink structure encodes a single dependence.
282  */
283 typedef struct dow_link {
284   /*
285    * the dowlink_next/dowlink_prev linkages double as free list
286    * linkages for non-active link structures; furthermore, the
287    * dowlink_prev linkage is used for doubly linking the free
288    * list ONLY in DEBUG mode.
289    */
290     dowlinkid_t   dowlink_next;
291     dowlinkid_t   dowlink_prev;
292   /*
293    * Suppose this link is on a chain that specifies the antecedents of
294    * a dow, say X. If this link specifies the dependence: (X --> Y),
295    * then the following two fields identify:
296    *     (a) the inverse link: (Y <-- X) -- on Y's list of antecedents
297    *     (b) the dowid, Y.
298    *
299    * Similarly, if the link specified an antecedence relationship,
300    * say, (X <-- Z), then the inverse link would be the one on Z's
```

```
301         * list of antecedents that specifies (Z --> X).
302         */
303        dowlinkid_t    dowlink_inverse;/* the inverse link */
304        dowid_t        dowlink_dowid;  /* the antecedent/dependent dowid */
305 #ifdef DEBUG
306        /*
307         * the dowlink_debug_lhead field identifies the link chain head.
308         */
309        dowlinkid_t    dowlink_debug_lhead;
310        /*
311         * dowlink_debug_cnt is used only by linkheaders, but since this
312         * is a DEBUG mode field, we don't try to union it away with something
313         * else in order to save space.
314         */
315        short          dowlink_debug_cnt;
316 #endif
317 } dowlink_t;
318
319 #define DOWLINK_NEXT(i)         ((dow_link_tab[(i)]).dowlink_next)
320 #define DOWLINK_PREV(i)         ((dow_link_tab[(i)]).dowlink_prev)
321 #define DOWLINK_INVERSE(i)      ((dow_link_tab[(i)]).dowlink_inverse)
322 #define DOWLINK_DOWID(i)        ((dow_link_tab[(i)]).dowlink_dowid)
323
324 #ifdef DEBUG
325 #define DOWLINK_DEBUG_MYDOW(i)  \
326        ((dow_link_tab[(i)]).dowlink_debug_lhead % DOW_TABLE_SIZE)
327 #define DOWLINK_DEBUG_LHEAD(i)  ((dow_link_tab[(i)]).dowlink_debug_lhead)
328 #define DOWLINK_DEBUG_CNT(i)    ((dow_link_tab[(i)]).dowlink_debug_cnt)
329 #else
330 #define DOWLINK_DEBUG_MYDOW(i)
331 #define DOWLINK_DEBUG_LHEAD(i)
332 #define DOWLINK_DEBUG_CNT(i)
333 #endif
334
335 /*
336  * structure for iochaining the untracked pageio function, to prevent
337  * potential resource deadlocks when tracking pageios for which dow
338  * structures could not be allocated.
339  */
340 typedef struct dow_io_utp { /* utp: UntrackedPages */
341        struct buf *diu_bp;
342        void (*diu_func)();
343        void *diu_chain;
344 } dow_io_utp_t;
345
346 #define MAX_UNTRACKED_PAGES    64
347
348 /*
349  * dow_io_utp_tab is an array of dow_io_utp structures, each used to track
```

```
351  * pages in transit that do not have DOWs associated with them, due to
352  * failure to allocate the dow structures.
353  */
354  extern  dow_io_utp_t   dow_io_utp_tab[];
355  extern  dow_t          dow_tab[];                /* dow structures array */
356  extern  dowlink_t      dow_link_tab[];           /* dowlink structures array */
357  extern  int            dow_freecount;            /* # free dows */
358  extern  int            dowlink_freecount;        /* # free dowlink structures */
359  extern  int            untracked_pgelo;          /* # untracked in-transit pgs */
360  extern  lock_t         dow_mutex;                /* global spin lock */
361  extern  lkinfo_t       dow_mutex_lkinfo;
362  extern  sv_t           dow_free_sv;              /* SV for dow resource wait */
363  extern  sv_t           dowlink_free_sv;          /* SV for dowlink res. wait */
364  extern  event_t        dow_flush_event;
365  extern  sv_t           dow_io_utp_sv;  /* to control dow_io_utp_t alloc */
366
367  #define DOW_IO_UTP_SV_INIT()       SV_INIT(&dow_io_utp_sv)
368  #define DOW_IO_UTP_SV_WAIT()       SV_WAIT(&dow_io_utp_sv, PRIBUF, &dow_mutex)
369  #define DOW_IO_UTP_SV_BLKD()       SV_BLKD(&dow_io_utp_sv)
370  #define DOW_IO_UTP_SV_BROADCAST()  SV_BROADCAST(&dow_io_utp_sv, 0)
371
372  #define DOW_MUTEX_HIER   FS_HIER_BASE | 4
373  #define DOW_MUTEX_IPL    PLFS
374  #define DOW_MUTEX_INIT() \
375      LOCK_INIT(&dow_mutex, DOW_MUTEX_HIER, DOW_MUTEX_IPL, \
376               &dow_mutex_lkinfo, KM_NOSLEEP)
377
378  /*
379   * we will need to modify codepaths that do not want to acquire/release
380   * dow_mutex at DOW_MUTEX_IPL and PLBASE respectively.
381   */
382  #define DOW_MUTEX_LOCK()              LOCK(&dow_mutex, DOW_MUTEX_IPL)
383  #define DOW_MUTEX_UNLOCK()            UNLOCK(&dow_mutex, PLBASE)
384  #define DOW_MUTEX_UNLOCK_SAVEDPL(x)   UNLOCK(&dow_mutex, (x))
385  #define DOW_MUTEX_OWNED()             LOCK_OWNED(&dow_mutex)
386
387  #define DOW_SV_INIT(x)          SV_INIT(DOW_SVP(x))
388  #define DOW_SV_WAIT(x)          SV_WAIT(DOW_SVP(x), PRIBUF, &dow_mutex)
389  #define DOW_SV_BROADCAST(x)     SV_BROADCAST(DOW_SVP(x), 0)
390  #define DOW_SV_SIGNAL(x)        SV_SIGNAL(DOW_SVP(x), 0)
391  #define DOW_SV_BLKD(x)          SV_BLKD(DOW_SVP(x))
392
393  #define DOW_FREE_SV_INIT()       SV_INIT(&dow_free_sv)
394  #define DOW_FREE_SV_WAIT()       SV_WAIT(&dow_free_sv, PRIBUF, &dow_mutex)
395  #define DOW_FREE_SV_BROADCAST()  SV_BROADCAST(&dow_free_sv, 0)
396  #define DOW_FREE_SV_SIGNAL()     SV_SIGNAL(&dow_free_sv, 0)
397  #define DOW_FREE_SV_BLKD()       SV_BLKD(&dow_free_sv)
398
399  #define DOWLINK_FREE_SV_INIT()   SV_INIT(&dowlink_free_sv)
400  #define DOWLINK_FREE_SV_WAIT()   SV_WAIT(&dowlink_free_sv, PRIBUF, &dow_mutex)
```

```
401   #define DOWLINK_FREE_SV_BLKD()   SV_BLKD(&dowlink_free_sv)
402   #define DOWLINK_FREE_SV_BROADCAST()   SV_BROADCAST(&dowlink_free_sv, 0)
403   #define DOWLINK_FREE_SV_SIGNAL()   SV_SIGNAL(&dowlink_free_sv, 0)
404
405   #define DOW_FLUSH_EVENT_CLEAR()   EVENT_CLEAR(&dow_flush_event)
406   #define DOW_FLUSH_EVENT_WAIT()    EVENT_WAIT(&dow_flush_event, (PRIBIO ( 1))
407   #define DOW_FLUSH_EVENT_BROADCAST()  EVENT_BROADCAST(&dow_flush_event, 0)
408   #define DOW_FLUSH_EVENT_INIT()    EVENT_INIT(&dow_flush_event)
409
410
411   #define DOW_AVAIL(x)       (dow_freecount >= (x))
412   #define DOWLINK_AVAIL(x)   (dowlink_freecount >= (x))
413
414   /*
415    * The dow structures are organized as a statically allocated array.
416    * The array also includes space for a set of special dow structures:
417    * these are the dow structures that are used as anchors for the control
418    * lists, namely the hash chains, the flush chains, and the freelist.
419    *
420    *                                                flush
421    *                                                chain
422    *                                                heads
423    *                                               |<--->|
424    *       +-+-+-+-+-+-+-+-+-+-+  +-+-+-+  +-+-+-+-+
425    *       | | | | | | | | | | |  | | | |  | | | | |
426    *       | | | | | | | | | | |  | | | |  | | | | |
427    *       +-+-+-+-+-+-+-+-+-+-+  +-+-+-+  +-+-+-+-+
428    *       |<- usable dow structs-->|<-- hash ->|   \
429    *                                  chain heads    free chain head
430    *
431    *              DOW array
432    *
433    * The first DOW_TABLE_SIZE elements are the DOW structures
434    * to be used in setting up ordering information.
435    *
436    * The next DOW_HASHWIDTH elements are used as heads for
437    * doubly linked DOW hash chains.
438    *
439    * The next 3 elements are used as heads for three doubly linked
440    * flush chains:
441    *     leaf chain: dows that have no antecedents and are ready
442    *                 for completing deferred action,
443    *     pruned chain: dows that
444    *                 - either have antecedents but have been pruned
445    *                   (i.e., all their antecedents have been either
446    *                    pruned or moved to the leaf chain).
447    *                 - or have been processed and/or aborted, and are
448    *                   waiting for their holds to go to 0, so that they
449    *                   can be freed. If abort processing has been
450    *                   completed, then the dows are not on hash chains.
451    *     aged chain: active dows that are not on the other two chains.
```

```
fs_dow/dow.h                                                                                              Page 12

451     *     Please refer to the notes section for prune() family of functions
452     *     for more details on how the flush chains are populated.
453     *
454     *     The last 1 element is used as head of a free list (singly
455     *     linked normally; doubly linked in debug mode).
456     *
457     */
458
459
460
461     /*
462     * The dowlink structures are organized as a statically allocated array,
463     * just as the dow structures are. However, the control lists are different.
464     * For convenience, a set of dowlink structures serve as anchors for
465     * linked lists of dependents: one anchor for each usable dow structure.
466     * Similarly, a second set of dowlink structures are used as anchors of
467     * linked lists of antecedents, one per usable dow structure.
468     * These contolling structures are placed at the beginning of the dowlink
469     * structure array.
470     *
471     * Next come all the usable dowlink structures.
472     *
473     * These are followed by a single dowlink structure that serves as the
474     * anchor for the free chain of dowlink structures.
475     *
476     *                                                              free chain
477     *    dependents    antecedents                                    head
478     *    chain         chain                                            \
479     *    +---------+---------+------------------------------------------+--+
480     *    | anchors | anchors |          usable dowlink structures       |  |
481     *    +---------+---------+------------------------------------------+--+
482     *                             DOWLINK array
483     *
484     * The first (2 * DOW_TABLE_SIZE) entries are used as heads of
485     * link chains: for dependent and antecedent chains for each of the
486     * DOW structure. Entries k and (DOW_TABLE_SIZE + k) respectively
487     * serve as dependent and antecedent link chain heads for the DOW
488     * structure whose index is k.
489     *
490     * The next (DOW_LINKS_RATIO * DOW_TABLE_SIZE) entries are the
491     * real link entries that can be allocated and used for setting
492     * up linkages.
493     *
494     * Finally, the last entry in the DOWLINK array serves as the
495     * head of a free chain. The chain is singly linked except in
496     * debug mode, when it is doubly linked.
497     *
498     */
499     #define DOW_TABLE_SIZE    500
500     #define DOW_HASHWIDTH      31
```

```
501  #define DOW_LEAF_FLUSHHEAD       (DOW_ARRAYSIZE - 4)
502  #define DOW_PRUN_FLUSHHEAD       (DOW_ARRAYSIZE - 3)
503  #define DOW_AGED_FLUSHHEAD       (DOW_ARRAYSIZE - 2)
504  #define DOW_FREEHEAD             (DOW_ARRAYSIZE - 1)
505  #define DOW_ARRAYSIZE            (DOW_TABLE_SIZE + DOW_HASHWIDTH + 3 + 1)
506  #define DOW_FIRST_HASHBUCKET     DOW_TABLE_SIZE
507  #define DOW_LAST_HASHBUCKET      (DOW_FIRST_HASHBUCKET + DOW_HASHWIDTH - 1)
508  #define DOW_HASHBUCKET(is_what, is_which) \
509          (((ulong_t)(is_what)) + (ulong_t)(is_which)) % DOW_HASHWIDTH) + \
510          DOW_TABLE_SIZE)
511
512  #define DEPENDENT_LINKS    0         /* from each dow to its dependents */
513  #define ANTECEDENT_LINKS   1         /* from each dow to its antecedents */
514  #define DOW_LINKSRATIO     8
515  #define DOWLINK_TABLE_BASE           (2 * DOW_TABLE_SIZE)
516  #define DOWLINK_MAXFREE              (DOW_LINKSRATIO * DOW_TABLE_SIZE)
517  #define DOWLINK_ARRAYSIZE            (DOWLINK_TABLE_BASE + DOWLINK_MAXFREE + 1)
518  #define DOWLINK_FREEHEAD             (DOWLINK_ARRAYSIZE - 1)
519  #define DOWLINK_DEP_LINKHEAD(dow_id) \
520          ((dowlinkid_t)((dow_id) + (DEPENDENT_LINKS * DOW_TABLE_SIZE)))
521  #define DOWLINK_ANT_LINKHEAD(dow_id) \
522          ((dowlinkid_t)((dow_id) + (ANTECEDENT_LINKS * DOW_TABLE_SIZE)))
523
524  /*
525   * We use an arbitrary negative dowid_t as an invalid dowid return value,
526   * and another arbitrary negative dowlinkid_t as an invalid dowlinkid
527   * return value.
528   */
529
530
531  #define DOW_BADID       (-3319)
532  #define DOW_NONE        DOW_BADID       /* useful synonym */
533  #define DOWLINK_BADID   (-29448)
534  #define DOW_BAD_IODONE  ((void (*)())(0xffffffff))
535  #define DOW_BAD_IOCHAIN ((void *)(0x0c0c0c0c))
536
537
538  /*
539   * Following macros permit easy range checks.
540   */
541
542  #define VALID_DOWID(i) \
543          (((i) >= (dowid_t)0) && ((i) < (dowid_t)DOW_TABLE_SIZE))
544
545  #define VALID_HASH_BUCKET(i) \
546          (((i) >= (dowid_t)DOW_TABLE_SIZE) && \
547           ((i) < (dowid_t)(DOW_TABLE_SIZE + DOW_HASHWIDTH)))
548
549  #define VALID_FLUSHHEAD(i) \
550          ((i) > (dowid_t)(DOW_TABLE_SIZE + DOW_HASHWIDTH)) && \
```

```
551             ((i) < (dowid_t)(DOW_TABLE_SIZE + DOW_HASHWIDTH + 3)))
552
553 #define VALID_DOWLINK_ID(j) \
554             (((j) >= (dowlinkid_t)DOWLINK_TABLE_BASE) && \
555             ((j) < (dowlinkid_t)(DOWLINK_TABLE_BASE + DOWLINK_MAXFREE)))
556
557 #define VALID_DOWLINK_HEAD(j) \
558             (((j) >= (dowlinkid_t)0) && ((j) < (dowlinkid_t)(2 * DOW_TABLE_SIZE)))
559 /*
560  * Following macros permit consistecy checks for various doubly linked lists.
561  */
562 #define DOW_HASHLINKS_SANE(i) \
563             ((DOW_HASHPREV(DOW_HASHNEXT(i)) == (i)) && \
564             (DOW_HASHNEXT(DOW_HASHPREV(i)) == (i)))
565
566 #define DOW_FLUSHLINKS_SANE(i) \
567             ((DOW_FLUSHPREV(DOW_FLUSHNEXT(i)) == (i)) && \
568             (DOW_FLUSHNEXT(DOW_FLUSHPREV(i)) == (i)))
569
570 #define DOWLINK_LINKS_SANE(i) \
571             ((DOWLINK_NEXT(DOWLINK_PREV(i)) == (i)) && \
572             (DOWLINK_PREV(DOWLINK_NEXT(i)) == (i)))
573
574 #define DOWLINK_ILINK_SANE(i) (DOWLINK_INVERSE(DOWLINK_INVERSE(i)) == (i))
575
576 #define EMPTY_DOWLINK_LIST(listhead) ((listhead) == DOWLINK_NEXT((listhead)))
577 #define EMPTY_DOW_FREELIST(listhead) ((listhead) == DOW_FREENEXT((listhead)))
578 #define EMPTY_DOW_HASHLIST(listhead) ((listhead) == DOW_HASHNEXT((listhead)))
579 #define EMPTY_DOW_FLUSHLIST(listhead) ((listhead) == DOW_FLUSHNEXT((listhead)))
580
581 #ifdef DEBUG
582 /*
583  * Macros for DEBUG field updates.
584  */
585 #define DOW_DEBUG_HASHENTER(id, hbucket) { \
586             ASSERT(VALID_DOWID(id)); \
587             ASSERT(VALID_HASH_BUCKET(hbucket)); \
588             ASSERT(DOW_DEBUG_HASHID(id) == DOW_BADID); \
589             DOW_DEBUG_HASHID((id)) = (hbucket); \
590             ++DOW_DEBUG_CNT((hbucket)); \
591             CHECK_HASH_CHAIN(hbucket); \
592 }
593
594 #define DOW_DEBUG_FLUSHENTER(id, flhead) { \
595             ASSERT(VALID_DOWID(id)); \
596             ASSERT(VALID_FLUSHHEAD(flhead)); \
597             ASSERT(DOW_DEBUG_FLUSHID(id) == DOW_BADID); \
598             DOW_DEBUG_FLUSHID((id)) = (flhead); \
599             ++DOW_DEBUG_CNT((flhead)); \
600
```

```
501         CHECK_FLUSH_CHAIN((flhead)); \
502 }
503
504 #define DOW_DEBUG_HASHLEAVE(id) { dowid_t _hbucket; \
505     ASSERT(VALID_DOWID(id)); \
506     _hbucket = DOW_DEBUG_HASHID(id); \
507     ASSERT(VALID_HASH_BUCKET(_hbucket)); \
508     DOW_DEBUG_HASHID((id)) = DOW_BADID; \
509     --DOW_DEBUG_CNT(_hbucket); \
510     ASSERT(DOW_DEBUG_CNT(_hbucket) >= 0); \
511     CHECK_HASH_CHAIN(_hbucket); \
512     DOW_HASHINVAL((id)); \
513 }
514
515 #define DOW_DEBUG_FLUSHLEAVE(id) { dowid_t _flhead; \
516     ASSERT(VALID_DOWID(id)); \
517     _flhead = DOW_DEBUG_FLUSHID((id)); \
518     ASSERT(VALID_FLUSHHEAD(_flhead)); \
519     DOW_DEBUG_FLUSHID((id)) = DOW_BADID; \
520     --DOW_DEBUG_CNT(_flhead); \
521     ASSERT(DOW_DEBUG_CNT(_flhead) >= 0); \
522     CHECK_FLUSH_CHAIN(_flhead); \
523     DOW_FLUSHINVAL((id)); \
524 }
525
526 #define DOW_DEBUG_FREEENTER(id) { \
527     ASSERT(VALID_DOWID(id)); \
528     ASSERT(DOW_DEBUG_HASHID(id) == DOW_BADID); \
529     ASSERT(DOW_DEBUG_FLUSHID(id) == DOW_FREEHEAD); \
530     DOW_DEBUG_HASHID((id)) = DOW_FREEHEAD; \
531     DOW_DEBUG_FLUSHID((id)) = DOW_FREEHEAD; \
532     ++DOW_DEBUG_CNT((DOW_FREEHEAD)); \
533     ASSERT(DOW_DEBUG_CNT(DOW_FREEHEAD) == dow_freecount); \
534 }
535
536 #define DOW_DEBUG_FREELEAVE(id) { \
537     ASSERT(VALID_DOWID(id)); \
538     ASSERT(DOW_DEBUG_HASHID((id)) == DOW_FREEHEAD); \
539     ASSERT(DOW_DEBUG_FLUSHID((id)) == DOW_FREEHEAD); \
540     DOW_DEBUG_HASHID((id)) = DOW_BADID; \
541     DOW_DEBUG_FLUSHID((id)) = DOW_BADID; \
542     --DOW_DEBUG_CNT((DOW_FREEHEAD)); \
543     ASSERT(DOW_DEBUG_CNT(DOW_FREEHEAD) == dow_freecount); \
544 }
545
546 #define DOW_DEBUG_IODONE_INIT(id) { \
547     DOW_B_IODONE(id) = DOW_BAD_IODONE; \
548     DOW_B_IOCHAIN(id) = DOW_BAD_IOCHAIN; \
549 }
650
```

```
651 #define EMPTY_IODONE_LINKAGE(id) ((DOW_B_IODONE(id) == DOW_BAD_IODONE) && \
652                                  (DOW_B_IOCHAIN(id) == DOW_BAD_IOCHAIN))
653
654 #else
655 #define DOW_DEBUG_HASHENTER(id, hbucket)
656 #define DOW_DEBUG_HASHLEAVE(id)
657 #define DOW_DEBUG_FLUSHENTER(id, flhead)
658 #define DOW_DEBUG_FLUSHLEAVE(id)
659 #define DOW_DEBUG_FREEENTER(id)
660 #define DOW_DEBUG_FREELEAVE(id)
661 #define DOW_DEBUG_IODONE_INIT(id)
662 #define EMPTY_IODONE_LINKAGE(id)                      B_TRUE
663 #endif
664
665 #ifdef DEBUG
666
667 #define DOWLINK_DEBUG_ENTER(link, head) { \
668     ASSERT(VALID_DOWLINK_ID(link)); \
669     ASSERT(VALID_DOWLINK_HEAD(head)); \
670     ASSERT(DOWLINK_DEBUG_LHEAD(link) == DOWLINK_BADID); \
671     DOWLINK_DEBUG_LHEAD(link) = head; \
672     ++(DOWLINK_DEBUG_CNT(head)); \
673     CHECK_DOWLINK_CHAIN(head); \
674 }
675 #define DOWLINK_DEBUG_LEAVE(link) { dowlinkId_t _linkhead; \
676     ASSERT(VALID_DOWLINK_ID(link)); \
677     _linkhead = DOWLINK_DEBUG_LHEAD(link); \
678     ASSERT(VALID_DOWLINK_HEAD(_linkhead)); \
679     DOWLINK_DEBUG_LHEAD(link) = DOWLINK_BADID; \
680     --(DOWLINK_DEBUG_CNT(_linkhead)); \
681     ASSERT(DOWLINK_DEBUG_CNT(_linkhead) >= 0); \
682     CHECK_DOWLINK_CHAIN(_linkhead); \
683 }
684
685 #define DOWLINK_DEBUG_FREEENTER(link) { \
686     ASSERT(VALID_DOWLINK_ID(link)); \
687     ASSERT(DOWLINK_DEBUG_LHEAD(link) == DOWLINK_FREEHEAD); \
688     DOWLINK_DEBUG_LHEAD(link) = DOWLINK_FREEHEAD; \
689     ++(DOWLINK_DEBUG_CNT(DOWLINK_FREEHEAD)); \
690     ASSERT(DOWLINK_DEBUG_CNT(DOWLINK_FREEHEAD) == dowlink_freecount); \
691 }
692
693 #define DOWLINK_DEBUG_FREELEAVE(link) { \
694     ASSERT(VALID_DOWLINK_ID(link)); \
695     ASSERT(DOWLINK_DEBUG_LHEAD(link) == DOWLINK_FREEHEAD); \
696     DOWLINK_DEBUG_LHEAD(link) = DOWLINK_BADID; \
697     --(DOWLINK_DEBUG_CNT(DOWLINK_FREEHEAD)); \
698     ASSERT(DOWLINK_DEBUG_CNT(DOWLINK_FREEHEAD) == dowlink_freecount); \
699 }
700
```

```
701  #else
702  #define DOWLINK_DEBUG_ENTER(link, head)
703  #define DOWLINK_DEBUG_LEAVE(link)
704  #define DOWLINK_DEBUG_FREEENTER(link)
705  #define DOWLINK_DEBUG_FREELEAVE(link)
706  #endif
707
708
709  #ifdef DEBUG
710  #define DOW_FREE_BADINIT(x)          dow_free_badinit(x)
711  #define DOW_DEBUG_INIT(x)            dow_debug_init(x)
712  #define DOWLINK_FREE_BADINIT(x)      dowlink_free_badinit(x)
713  #define DOWLINK_DEBUG_INIT(a, b)     dowlink_debug_init(a, b)
714  #else
715  #define DOW_FREE_BADINIT(x)
716  #define DOW_DEBUG_INIT(x)
717  #define DOWLINK_FREE_BADINIT(x)
718  #define DOWLINK_DEBUG_INIT(a, b)
719  #endif
720
721
722  #ifdef DEBUG
723  #define CHECK_HASHDUP(a, b, c, d)    check_hashdup((a), (b), (c), (d))
724  #define CHECK_HASH_CHAIN(x)          check_hash_chain(x)
725  #define CHECK_DOWLINK_CHAIN(x)       check_dowlink_chain(x)
726  #define CHECK_DOW_LINKAGE(x)         check_dow_linkage((x))
727  #define CHECK_ANTECDENTS_PRUNED(x)   check_antecdents_pruned(x)
728  #define CHECK_FLUSH_CHAIN(x)         check_flush_chain(x)
729  #define CHECK_HASH(x)                check_hash(x)
730  #define CHECK_ON_FLUSHCHAIN(x, flhead)  check_on_flushchain((x), (flhead))
731  #define CHECK_NOTON_FLUSHCHAIN(x, flhead)  check_noton_flushchain((x), (flhead))
732  #define CHECK_NOTON_ANY_FLUSHCHAIN(x)  check_noton_any_flushchain((x))
733  #define CHECK_HASH_REMOVED(x)        check_hash_removed(x)
734  #define CHECK_DOW_FREELIST()         check_dow_freelist()
735  #define CHECK_NOTFREE(x)             check_notfree(x)
736  #define CHECK_DOWLINK_FREELIST       check_dowlink_freelist
737  #define DOW_EXISTS(x, y)             dow_exists((x), (y))
738  #define DOW_VP_ANY(vp)               dow_vp_any((vp))
739  #else
740  #define CHECK_HASHDUP(a, b, c, d)
741  #define CHECK_HASH_CHAIN(x)
742  #define CHECK_DOWLINK_CHAIN(x)
743  #define CHECK_DOW_LINKAGE(x)
744  #define CHECK_ANTECDENTS_PRUNED(x)
745  #define CHECK_FLUSH_CHAIN(x)
746  #define CHECK_HASH(x)
747  #define CHECK_ON_FLUSHCHAIN(x, flhead)
748  #define CHECK_NOTON_FLUSHCHAIN(x, flhead)
749  #define CHECK_NOTON_ANY_FLUSHCHAIN(x)
750  #define CHECK_NOTON_ANY_FLUSHCHAIN(x)
```

```
751  #define CHECK_HASH_REMOVED(x)
752  #define CHECK_DOW_FREELIST()
753  #define CHECK_NOTFREE(x)
754  #define CHECK_DOWLINK_FREELIST()
755  #define DOW_EXISTS(x, y)
756  #define DOW_VP_ANY(vp)
757  #endif
758
759  #ifdef DEBUG
760  #define DOW_HASHINVAL(x) { \
761       DOW_HASHNEXT((x)) = DOW_BADID; \
762       DOW_HASHPREV((x)) = DOW_BADID; \
763  }
764  #define DOW_FLUSHINVAL(x) { \
765       DOW_FLUSHNEXT((x)) = DOW_BADID; \
766       DOW_FLUSHPREV((x)) = DOW_BADID; \
767  }
768  #else
769  #define DOW_HASHINVAL(x)
770  #define DOW_FLUSHINVAL(x)
771  #endif
772
773
774  #ifdef DEBUG
775
776  extern void dow_free_hashinit(dowid_t);
777  extern void dow_debug_init(dowid_t);
778  extern void dowlink_free_badinit(dowlinkid_t);
779  extern void dowlink_debug_init(dowlinkid_t, dowlinkid_t);
780
781  extern void check_flush_chain(dowid_t);
782  extern void check_on_flushchain(dowid_t, dowid_t);
783  extern void check_noton_flushchain(dowid_t, dowid_t);
784  extern void check_noton_any_flushchain(dowid_t);
785  extern boolean_t on_some_flushchain(dowid_t);
786  extern boolean_t dow_exists(long, long);
787  extern dowid_t dow_vp_any(vnode_t *);
788  extern void check_antecdents_pruned(dowid_t);
789  extern void check_dow_freelist();
790  extern void check_notfree(dowid_t);
791  extern void check_hashdup(dowid_t, dowid_t, long, long);
792  extern void check_hashid(dowid_t);
793  extern void check_hash_chain(dowid_t);
794  extern void check_dowlink_chain(dowlinkid_t);
795  extern void check_dow_linkage(dowlinkid_t);
796  extern void check_dowlink_freelist();
797  extern void check_hash_removed(dowid_t);
798
799  #endif
800
```

```
fs_dow/dow.h                                                                           Page 19

801  extern buf_t * dow_buffer(dowid_t);
802  extern void dow_bdwrite(buf_t *);
803  extern int linkage_detect(dowid_t , dowid_t );
804
805  #ifdef _IF_NEEDED
806  extern void dow_start_abort(dowid_t );
807  extern void dow_finish_abort(dowid_t );
808  #endif
809
810  extern void dow_abort(dowid_t );
811  extern void dow_abort_range(vnode_t *, off_t , int );
812  extern void dow_abort_rele_l(dowid_t );
813  extern dowid_t dow_alloc_l(void);
814  extern dowid_t dow_alloc(void);
815  extern dowid_t dow_alloc_l(void);
816  extern void dow_arrayinit(void);
817  extern void dow_clearmod(dowid_t );
818  extern dowid_t dow_create_pgc(vnode_t *, off_t , int , uint_t );
819  extern void dow_create_page_l(vnode_t *, off_t , int , uint_t );
820  extern dowid_t dow_create_buf(dev_t , daddr_t , long , uint_t );
821  extern dowid_t dow_create_func(void (*)(), void *, uint_t , boolean_t );
822  extern void dow_flush(dowid_t );
823  extern void dow_start_flush_timeout(void);
824  extern void dow_flush_timeout(void);
825  extern void dow_flush_daemon();
826  extern void dow_flush_headins(dowid_t , dowid_t );
827  extern void dow_flush_remove(dowid_t );
828  extern void dow_flush_tailins(dowid_t , dowid_t );
829  extern void dow_free(dowid_t );
830  extern void dow_handle_async(dowid_t );
831  extern void dow_handle_async_l(dowid_t );
832  extern void dow_handle_sync(dowid_t );
833  extern void dow_handle_sync_l(dowid_t );
834  extern void dow_init(dowid_t , long , long , uchar_t );
835  extern void dow_inshash(dowid_t , dowid_t );
836  extern void dow_io_utp_setup(buf_t *);
837  extern void dow_io_utp_rele(buf_t *);
838  extern void dow_buf_iodone(buf_t *);
839  extern void dow_page_iodone(buf_t *);
840  extern void dow_untracked_pageio_done(buf_t *);
841  extern void dow_iodone(dowid_t );
842  extern void dow_iodone_insert(dowid_t , buf_t *, void (*)());
843  extern void dow_iodone_restore(dowid_t , buf_t *);
844  extern void dow_ioflush(dowid_t );
845  extern void dow_intrans_wait(dowid_t );
846  extern void dow_iowait(dowid_t );
847  extern void dow_iowait_l(dowid_t );
848  extern dowid_t dow_lookup(long , long );
849  extern dowid_t dow_lookup_page(vnode_t *, off_t );
850  extern int dow_order_no_wait(dowid_t , dowid_t );
```

Page 19                                                            fs_dow/dow.h

Printed: Wed Apr  6 11:28:29 1994                        File modified: Wed Apr  6 11:25:57 1994

```
851 extern int dow_order(dowid_t, dowid_t, uint_t);
852 extern void dow_process_leaf_func(dowid_t, void (**)(dowid_t));
853 extern void dow_process_leaf_iodone(dowid_t);
854 extern boolean_t dow_process_leaf_flush(dowid_t);
855 extern int prune_search(dowid_t, int, boolean_t);
856 extern void prune(dowid_t);
857 extern void prune_antecedents(dowid_t);
858 extern void dow_rele(dowid_t);
859 extern void dow_rele_l(dowid_t);
860 extern void dow_remhash(dowid_t);
861 extern void dow_startmod(dowid_t);
862 extern void dow_startmod_rdlock(dowid_t);
863 extern void dow_startmod_wrlock_l(dowid_t);
864 extern void dow_drop_modlock_l(dowid_t);
865 extern void dow_clear_modlock_l(dowid_t);
866 extern void dow_setmod(dowid_t, clock_t);
867 extern void dow_strategy_buf(buf_t *);
868 extern void dow_strategy_page(buf_t **, vnode_t *, off_t, int);
869 extern void dowlink_addlink(dowlinkid_t, dowlinkid_t);
870 extern dowlinkid_t dowlink_alloc(void);
871 extern void dowlink_arrayinit(void);
872 extern void dowlink_breaklink(dowlinkid_t, dowlinkid_t, dowid_t);
873 extern void dowlink_free(dowlinkid_t);
874 extern void dowlink_init(dowlinkid_t, dowlinkid_t, dowid_t);
875 extern int dowlink_makelink(dowid_t, dowid_t);
876 extern void dowlink_sublink(dowlinkid_t);
877
878 #endif /* _KERNEL */
879 #if defined(__cplusplus)
880 }
881 #endif
882
883 #endif /* _FS_DOW_H */
```

```
1   #ident   "@(#)kern:fs/dow_cancel.c   1.5"
2   #ident   "$Header: $"
3
4   #include    <fs/dow.h>
5   #include    <fs/fs_hier.h>
6   #include    <io/conf.h>
7   #include    <mem/kmem.h>
8   #include    <mem/page.h>
9   #include    <svc/clock.h>
10  #include    <util/cmn_err.h>
11  #include    <util/debug.h>
12  #include    <util/ghier.h>
13  #include    <util/sysmacros_f.h>
14  #include    <util/var.h>
15
16  /*
17   * void
18   * dow_abort_range(vp, offset, len)
19   *   Abort any dow structures that are within the specified range and
20   *   decrement the softholds on the vp appropriately.
21   *
22   * Calling/Exit State:
23   *   The caller is expected to ensure that no races may occur whereby
24   *   another agent may attempt to abort the same range. Caller does not
25   *   hold the dow_mutex. The function may block, in general.
26   */
27  void
28  dow_abort_range(vnode_t *vp, off_t offset, int len)
29  {
30      dowid_t hb;   /* hashbuckets */
31      dowid_t i;
32      vaddr_t eoff = offset + len;
33
34      DOW_MUTEX_LOCK();
35  again:
36      for(hb = DOW_FIRST_HASHBUCKET; hb <= DOW_LAST_HASHBUCKET; hb++) {
37          for(i = DOW_HASHNEXT(hb); i != (long)vp ; i = DOW_HASHNEXT(i)) {
38              if ( (DOW_IDENT1(i) == (long)vp) &&
39                  (DOW_IDENT2(i) >= offset) &&
40                  (DOW_IDENT2(i) < eoff) &&
41                  (DOW_TYPE(i) == DOW_ISPACE) ) {
42                  ASSERT((DOW_STATE(i) & DOW_GONE) == 0);
43                  DOW_CHEAP_HOLD(i);
44                  dow_abort_role_1(i); /* returns w. dow_mutex */
45                  VN_SOFTRELE(vp);
46                  goto again;
47              }
48          }
49      }
50      DOW_MUTEX_UNLOCK();
```

```
 51  }
 52
 53  /*
 54   * void
 55   * dow_abort_rele_l(dowid_t id)
 56   *     Abort the specified dow structure. Wait for any outstanding
 57   *     IO to complete, and then mark the structure as unmodified and
 58   *     "gone". If there are no antecedents, then simulate the
 59   *     completion of IO on this dow; otherwise, wait until the io-done
 60   *     processing is performed on this dow after all its antecedents
 61   *     have been handled.
 62   *
 63   *     Also, the caller has acquired a hold on the dow; release it
 64   *     simultaneously with the abort -- and free the dow structure if
 65   *     appropriate.
 66   *
 67   * Calling/Exit State:
 68   *     dow_mutex held by caller, and returned held. The function will
 69   *     block in general.
 70   */
 71
 72  void
 73  dow_abort_rele_l(dowid_t id)
 74  {
 75
 76  start_over:
 77
 78      ASSERT(DOW_HOLD(id) > 0);
 79      ASSERT((DOW_STATE(id) & DOW_GONE) == 0);
 80      /*
 81       * dow_abort must be called only for those ids that are
 82       * currently possessing identity. Before returning, this
 83       * identity will be destroyed (the hold only preserves
 84       * the dow structure, not its hash identity. It is assumed
 85       * that the caller has followed some algorithm to ensure
 86       * that concurrent calls to dow_abort would not be made for
 87       * the same dowid.
 88       */
 89      CHECK_HASH(id);
 90
 91      /*
 92       * we must wait for any IO that has been started on the
 93       * dow, to complete; this includes DOW_INTRANS and DOW_IOSETUP
 94       * cases.
 95       *
 96       * otherwise, if IO is not ongoing or imminent, we have to
 97       * wait until all antecedents complete before returning from
 98       * this function. To ensure that this happens promptly, we
 99       * prune the id, if it is not already pruned.
100       */
```

```
fs_dow/dow_cancel.c                      (dow_abort_rele_l)                      Page 23

101
102
103      if (DOW_STATE(id) & (DOW_FLUSHINTRANS | DOW_IOSETUP)) {
104          if (DOW_STATE(id) & DOW_FLUSH) {
105              DOW_MUTEX_UNLOCK();
106              LBOLT_WAIT(PRTBUF);
107          } else {
108              dow_iowait_l(id);
109          }
110          DOW_MUTEX_LOCK();
111          goto start_over;
112      }
113
114      ASSERT((DOW_STATE(id) & (DOW_GONE|DOW_FLUSHINTRANS|DOW_IOSETUP)) == 0);
115
116      /*
117       * flush demon inherits the responsibility of calling dow_iodone
118       * if this dow has antecedents. function abort should imply the absolute
119       * dismantling of the function setup itself (and should therefore be
120       * synchronous).
121       */
122
123      if ((DOW_TYPE(id) & DOW_ISFUNC) && (DOW_STATE(id) & DOW_MODIFIED)) {
124          if (DOW_ANT_CNT(id) > 0) {
125              prune(id);
126              dow_iowait_l(id);
127              DOW_MUTEX_LOCK();
128          }
129          /*
130           * Can we be certain as to which flush chain this id could
131           * be on, based on its DOW_STATE? if so, may be nice to
132           * verify under DEBUG that DOW_DEBUG_FLUSHID matches it.
133           */
134          dow_flush_remove(id);
135          dow_remhash(id);
136          DOW_STATE(id) |= (DOW_GONE|DOW_PRUNE|DOW_INTRANS);
137          DOW_TIMESTAMP(id) = INT_MAX;
138          dow_iodone(id);
139          dow_rele_l(id);
140          return;
141      }
142
143      if (DOW_ANT_CNT(id) > 0) {
144          prune(id);
145      }
146      /*
147       * before we unhash, we need to ensure that no-one stays
148       * blocked on the modlock!
149       */
150      if (DOW_TYPE(id) == DOW_ISPAGE) {
                 dow_clear_modlock_l(id);
```

```
                }
                dow_remhash(id);
                DOW_STATE(id) = (DOW_GONE|DOW_PRUNE);
                /*
                 * Since we just cleared the MOD state, it is
                 * safe as well to reset the timestamp.
                 */
                DOW_TIMESTAMP(id) = INT_MAX;

/*
                 * we are leaving upto dow_iodone the job of removing this id
                 * from its hash chain so that dow_lookups cannot find it after
                 * that point.
                 *
                 * on second though, it seems advantageous to do it right
                 * now, since it is unclear why we need to guarantee that
                 * lookups can find this id after this point.
                 *
                 * but, FOR NOW, let us stick with the policy of letting
                 * dow_iodone perform the hash removal for aborted dowids.
                 * This has two advantages:
                 * (1) it will be possible to catch error(s) if a DOW_GONE id
                 *     comes through dow_iodone more than once,
                 * (2) much of the other code is written to the assumption that
                 *     dow_iodone will be responsible for unhashing (though
                 *     that can change, when we want to follow the new policy).
                 */

/*
                 * This is a special case: we cannot employ either
                 * of dow_intrans_wait OR dow_iowait_1 in order to
                 * wait for a signal from this id, since in this case
                 * we just want to wait until the upward filtering of
                 * IO completions finally reaches this dow. iowait is
                 * designed only to wait so long as the "current" modification
                 * has not been flushed out -- and here there is no such
                 * modification to flush.
                 */
                DOW_SV_WAIT(id);
                DOW_MUTEX_LOCK();
                CHECK_HASH_REMOVED(id);
                ASSERT(DOW_DEP_CNT(id) == 0);
                ASSERT(DOW_ANT_CNT(id) == 0);
        } else {

/*
                 * Can we be certain as to which flush chain this id could
                 * be on, based on its DOW STATE? If so, may be nice to
                 * verify under DEBUG that DOW_DEBUG_FLUSHID matches it.
                 */
```

```
201         dow_flush_remove(id);
202         /*
203          * before we unhash, we need to ensure that no-one stays
204          * blocked on the modlock!
205          */
206         if (DOW_TYPE(id) == DOW_ISPAGE) {
207             dow_clear_modlock_l(id);
208         }
209         dow_remhash(id);
210         DOW_STATE(id) = (DOW_GONE|DOW_PRUNE|DOW_INTRANS);
211         DOW_TIMESTAMP(id) = INT_MAX;
212         dow_iodone(id);
213         CHECK_HASH_REMOVED(id);
214         ASSERT(DOW_DEP_CNT(id) == 0);
215     }
216     dow_rele_l(id);
217     return;
218 }
219
220 /*
221  * void
222  * dow_abort(dowid_t id)
223  *      Abort the specified dow structure. Wait for any outstanding
224  *      IO to complete, and then mark the structure as unmodified and
225  *      "gone". If there are no antecedents, then simulate the
226  *      completion of IO on this dow; otherwise, wait until the io-done
227  *      processing is performed on this dow after all its antecedents
228  *      have been handled.
229  *
230  * Calling/Exit State:
231  *      dow_mutex not held by caller; acquired within, and released
232  *      before return. The function can block, so the caller must
233  *      not hold any locks.
234  */
235 void
236 dow_abort(dowid_t id)
237 {
238     ASSERT(KS_NOLOCKS());
239     ASSERT(getpl() == PLBASE);
240     if (!VALID_DOWID(id))
241         return;
242
243 start_over:
244     DOW_MUTEX_LOCK();
245     ASSERT(DOW_HOLD(id) > 0);
246     ASSERT((DOW_STATE(id) & DOW_GONE) == 0);
247     /*
248      * dow_abort must be called only for those ids that are
``` fs_dow/dow_cancel.c (dow_abort)

```
251      * currently possessing identity. Before returning, this
252      * identity will be destroyed (the hold only preserves
253      * the dow structure, not its hash identity. It is assumed
254      * that the caller has followed some algorithm to ensure
255      * that concurrent calls to dow_abort would not be made for
256      * the same dowid.
257      */
258     CHECK_HASH(id);
259
260     /*
261      * we must wait for any IO that has been started on the
262      * dow, to complete; this includes DOW_INTRANS and DOW_IOSETUP
263      * cases.
264      */
265     if (DOW_STATE(id) & (DOW_FLUSHINTRANS | DOW_IOSETUP)) {
266
267         if (DOW_STATE(id) & DOW_FLUSH) {
268             DOW_MUTEX_UNLOCK();
269             LBOLT_WAIT(PRIBUF);
270         } else {
271             dow_iowait_1(id);
272         }
273
274         goto start_over;
275     }
276
277     ASSERT((DOW_STATE(id) & (DOW_GONE[DOW_FLUSHINTRANS|DOW_IOSETUP])) == 0);
278
279     /*
280      * flush demon inherits the responsibility of calling dow_iodone
281      * if this dow has antecedents. function abort should imply the absolute
282      * dismantling of the function setup itself (and should therefore be
283      * synchronous).
284      */
285
286
287     if ((DOW_TYPE(id) & DOW_ISFUNC) && (DOW_STATE(id) & DOW_MODIFIED)) {
288         if (DOW_ANT_CNT(id) > 0) {
289             prune(id);
290             dow_iowait_1(id);
291             DOW_MUTEX_LOCK();
292         }
293         /*
294          * Can we be certain as to which flush chain this id could
295          * be on, based on its DOW STATE? If so, may be nice to
296          * verify under DEBUG that DOW_DEBUG_FLUSHID matches it.
297          */
298         dow_flush_remove(id);
299         dow_remhash(id);
300         DOW_STATE(id) -= (DOW_GONE[DOW_PRUNE|DOW_INTRANS]);
```

```
301         DOW_TIMESTAMP(id) = INT_MAX;
302         dow_iodone(id);
303         CHECK_HASH_REMOVED(id);
304         DOW_MUTEX_UNLOCK();
305         return;
306     }
307
308     if (DOW_ANT_CNT(id) > 0) {
309         prune(id);
310         /*
311          * before we unhash, we need to ensure that no-one stays
312          * blocked on the modlock!
313          */
314         if (DOW_TYPE(id) == DOW_ISPAGE) {
315             dow_clear_modlock_1(id);
316         }
317         dow_remhash(id);
318         DOW_STATE(id) = (DOW_GONE|DOW_PRUNE);
319         /*
320          * This is a special case: we cannot employ either
321          * of dow_intrans_wait OR dow_iowait 1 in order to
322          * wait for a signal from this id, since in this case
323          * we just want to wait until the upward filtering of
324          * IO completions finally reaches this dow. iowait is
325          * designed only to wait so long as the "current" modification
326          * has not been flushed out -- and here there is no such
327          * modification to flush.
328          */
329         DOW_SV_WAIT(id);
330 #ifdef DEBUG
331         DOW_MUTEX_LOCK();
332         ASSERT(DOW_HOLD(id) > 0);
333         ASSERT(DOW_DEP_CNT(id) == 0);
334         ASSERT(DOW_ANT_CNT(id) == 0);
335         DOW_MUTEX_UNLOCK();
336 #endif
337         return;
338
339     } else {
340         /*
341          * Can we be certain as to which flush chain this id could
342          * be on, based on its DOW_STATE? If so, may be nice to
343          * verify under DEBUG that DOW_DEBUG_FLUSHID matches it.
344          */
345         dow_flush_remove(id);
346         /*
347          * before we unhash, we need to ensure that no-one stays
348          * blocked on the modlock!
349          */
350
```

```
351        if (DOW_TYPE(id) == DOW_ISPAGE) {
352            dow_clear_modlock_l(id);
353        }
354        dow_remhash(id);
355        DOW_STATE(id) = (DOW_GONE|DOW_PRUNE|DOW_INTRANS);
356        DOW_TIMESTAMP(id) = INT_MAX;
357        dow_iodone(id);
358        ASSERT(DOW_DEP_CNT(id) == 0);
359        DOW_MUTEX_UNLOCK();
360        return;
361    }
362 }
363
364 /*
365  * void
366  * dow_clearmod(dowid_t id)
367  *   cancel a previously issued modification. wait for the intrans
368  *   state to be cleared, if a prune/flush/write operation is
369  *   currently underway.
370  *
371  * Calling/Exit State:
372  *   dow_mutex not held by the caller. The mutex is acquired and
373  *   released within. The function can block.
374  *
375  */
376 void
377 dow_clearmod(dowid_t id)
378 {
379     ASSERT(KS_HOLDNLOCKS());
380     ASSERT(getpl() == PLBASE);
381     if (!VALID_DOWID(id))
382         return;
383
384 start_over:
385
386     DOW_MUTEX_LOCK();
387
388     ASSERT(VALID_DOWID(id));
389     ASSERT(DOW_HOLD(id) > 0);
390
391     if (DOW_STATE(id) & DOW_GONE) {
392         DOW_MUTEX_UNLOCK();
393         return;
394     }
395
396     if (DOW_STATE(id) & (DOW_FLUSHINTRANS | DOW_IOSETUP)) {
397         if (DOW_STATE(id) & DOW_FLUSH) {
398             DOW_MUTEX_UNLOCK();
399             LHOLT_WAIT(PRIBUF);
400         } else {
```

```
                dow_iowait_1(id);
            }
            goto start_over;
        }

ASSERT((DOW_STATE(id) & DOW_GONE) == 0);
        /*
         * handling function dows:
         *
         * what to do with function dows? nothing special needed,
         * because:
         *
         *    If antecedent count > 0:
         *
         *       dow_process_leaf_func will handle a function dow
         *       that does not have its MODIFIED state set, in one of two
         *       ways depending in whether hold is 0 or not; if hold count
         *       is 0, then the dow will be freed. Otherwise it will be
         *       queued onto the aged list so that whenever the last rele
         *       occurs, dow_rele will know to free the dow. (dow_rele
         *       handles function dows differently in this way).
         *
         *    ELSE, we will call dow_iodone here itself?
         */
        DOW_STATE(id) &= ~DOW_MODIFIED;
        if (DOW_ANT_CNT(id) == 0) {
            if ((DOW_DEP_CNT(id) > 0) ||
                ((DOW_TYPE(id) & DOW_ISFUNC) == 0)) {
                /*
                 * Can we be certain as to which flush chain
                 * this id could be on, based on its DOW_STATE? If
                 * so, may be nice to verify under DEBUG that
                 * DOW_DEBUG_FLUSHID matches it.
                 *    DOW_AGED_FLUSHHEAD, perhaps?
                 */
                dow_flush_remove(id);
                DOW_STATE(id) |= DOW_INTRANS;
                DOW_TIMESTAMP(id) = INT_MAX;
                ASSERT((DOW_STATE(id) & (DOW_FLUSH|DOW_MODIFIED|
                                          DOW_IOSETUP)) == 0);
                dow_iodone(id);
            }
        }
        DOW_MUTEX_UNLOCK();
        return;
    }
```

```
 1  #ident    "@(#)kern:fs/dow_check.c    1.2"
 2  #ident    "$Header: $"
 3
 4  #include   <fs/dow.h>
 5  #include   <fs/fs_hier.h>
 6  #include   <io/conf.h>
 7  #include   <mem/kmem.h>
 8  #include   <mcm/page.h>
 9  #include   <svc/clock.h>
10  #include   <util/cmn_err.h>
11  #include   <util/debug.h>
12  #include   <util/ghier.h>
13  #include   <util/sysmacros_f.h>
14  #include   <util/var.h>
15
16  #ifdef DEBUG
17
18  /*
19   * check_antecdents_pruned(dowid_t id)
20   *     Verify that all antecdents of id are pruned.
21   *
22   * Calling/Exit State:
23   *     Dow mutex held by caller.
24   */
25  void
26  check_antecdents_pruned(dowid_t id)
27  {
28      dowlinkid_t ant_lhead, link;
29      dowid_t ant_id;
30
31      link = ant_lhead = DOWLINK_ANT_LINKHEAD(id);
32
33      ASSERT(VALID_DOWLINK_HEAD(link));
34      ASSERT(DOWLINK_LINKS_SAME(link));
35
36      while ((link = DOWLINK_NEXT(link)) != ant_lhead) {
37          ASSERT(VALID_DOWLINK_ID(link));
38          ant_id = DOWLINK_DOWID(link);
39          ASSERT(VALID_DOWID(ant_id));
40          ASSERT(DOW_STATE(ant_id) & (DOW_PRUNE|DOW_INTRANS));
41      }
42      return;
43  }
44
45  /*
46   * void
47   * check_flush_chain(dowid_t flush_header)
```

```
fs_dow/dow_check.c                                    (check_antecedents_pruned)                              Page 31

51    *  Debugging support to verify that indicated flush chain
52    *  (headed by "flush_header") is sane and has the right
53    *  number of items on it.
54    *
55    *  Calling/Exit State:
56    *     dow_mutex is held by caller.
57    *
58    */
59   void
60   check_flushchain(dowid_t flush_header)
61   {
62        int count = 0;
63        uchar_t prune_state = 0;
64        dowid_t id;
65
66        ASSERT(DOW_MUTEX_OWNED());
67
68        ASSERT( (flush_header == DOW_LEAF_FLUSHHEAD) ||
69                (flush_header == DOW_PRUN_FLUSHHEAD) ||
70                (flush_header == DOW_AGED_FLUSHHEAD) );
71
72        count = DOW_DEBUG_CNT(flush_header);
73
74        if (flush_header != DOW_AGED_FLUSHHEAD) {
75             prune_state = DOW_PRUNE;
76        }
77
78        for (id = DOW_FLUSHNEXT(flush_header); id != flush_header;
79             id = DOW_FLUSHNEXT(id)) {
80             ASSERT((--count) >= 0);
81             ASSERT(DOW_FLUSHLINKS_SANE(id));
82             ASSERT((DOW_STATE(id) & DOW_PRUNE) == prune_state);
83             ASSERT(DOW_DEBUG_FLUSHID(id) == flush_header);
84        }
85        ASSERT(count == 0);
86   }
87
88   /*
89    *  void
90    *  check_on_flushchain(dowid_t x, dowid_t flush_header)
91    *
92    *  Debugging support to verify that indicated dow, x, is on
93    *  the specified flush chain (headed by "flush_header").
94    *
95    *  Calling/Exit State:
96    *     dow_mutex is held by caller.
97    *
98    */
99   void
100  check_on_flushchain(dowid_t x, dowid_t flush_header)
```

```
                                                              (check_on_flushchain)
     101        dowid_t id;
     102
     103        ASSERT( (flush_header == DOW_LEAF_FLUSHHEAD) ||
     104                (flush_header == DOW_PRUN_FLUSHHEAD) ||
     105                (flush_header == DOW_AGED_FLUSHHEAD) );
     106
     107        if (flush_header == DOW_AGED_FLUSHHEAD) {
     108            ASSERT((DOW_STATE(x) & DOW_PRUNE) == 0);
     109        } else {
     110            ASSERT((DOW_STATE(x) & DOW_PRUNE) != 0);
     111        }
     112        ASSERT(DOW_DEBUG_FLUSHID(x) == flush_header);
     113        for (id = DOW_FLUSHNEXT(flush_header); id != flush_header;
     114             id = DOW_FLUSHNEXT(id)) {
     115            ASSERT(VALID_DOWID(id));
     116            if (id == x) {
     117                return;
     118            }
     119        }
     120        /*
     121        ** a dow structure was not found on the proper flush chain.
     122        ** kernel software error.
     123        */
     124        if (flush_header == DOW_LEAF_FLUSHHEAD) {
     125            cmn_err(CE_PANIC,
     126                "dowid %d not found on leaf flush chain\n", x);
     127        } else if (flush_header == DOW_PRUN_FLUSHHEAD) {
     128            cmn_err(CE_PANIC,
     129                "dowid %d not found on pruned flush chain\n", x);
     130        } else {
     131            cmn_err(CE_PANIC,
     132                "dowid %d not found on aged flush chain\n", x);
     133        }
     134    }
     135
     136    /*
     137     * void
     138     * check_noton_flushchain(dowid_t flush_header, dowid_t x)
     139     * Debugging support to verify that indicated dow, x, is not on
     140     * the specified flush chain (headed by "flush_header").
     141     *
     142     * Calling/Exit State:
     143     *     dow_mutex is held by caller.
     144     */
     145    void
     146    check_noton_flushchain(dowid_t x, dowid_t flush_header)
     147    {
     148        dowid_t id;
``` fs_dow/dow_check.c (check_noton_flushchain) Page 33

```
151           ASSERT( (flush_header == DOW_LEAF_FLUSHHEAD) ||
152                   (flush_header == DOW_PRUN_FLUSHHEAD) ||
153                   (flush_header == DOW_AGED_FLUSHHEAD) );
154
155           ASSERT(DOW_DEBUG_FLUSHID(x) != flush_header);
156
157           for (id = DOW_FLUSHNEXT(flush_header); id != flush_header;
158                id = DOW_FLUSHNEXT(id)) {
159                   ASSERT(id != x);
160           }
161   }
162
163   /*
164    * void
165    * check_noton_any_flushchain(dowid_t x)
166    *       Debugging support to verify that indicated dow, x, is not on
167    *       any flush chain.
168    *
169    * Calling/Exit State:
170    *       dow_mutex is held by caller.
171    */
172   void
173   check_noton_any_flushchain(dowid_t x)
174   {
175           ASSERT(DOW_DEBUG_FLUSHID(x) == DOW_BADID);
176   }
177
178   /*
179    * boolean_t
180    * on_some_flushchain(dowid_t id)
181    *       return true if id is on one of the flush chains, false otherwise.
182    *
183    * Calling/Exit State:
184    *       dow_mutex is held by caller.
185    */
186   boolean_t
187   on_some_flushchain(dowid_t id)
188   {
189           dowid_t fh;
190
191           fh = DOW_DEBUG_FLUSHID(id);
192
193           if ((fh == DOW_AGED_FLUSHHEAD) ||
194               (fh == DOW_PRUN_FLUSHHEAD) ||
195               (fh == DOW_LEAF_FLUSHHEAD)) {
196                   CHECK_ON_FLUSHCHAIN(id, fh);
197                   return(B_TRUE);
198           }
199   }
200
``` fs_dow/dow_check.c (on_some_flushchain)

fs_dow/dow_check.c    (on_some_flushchain)    page 34

```
201         ASSERT(!VALID_DOWID(fh));
202         return(B_FALSE);
203
204    }
205    /*
206     * boolean_t
207     * dow_exists(long ident1, long ident2)
208     *     Return B_TRUE if the dow of the specified identity exists,
209     *     B_FALSE otherwise.
210     *
211     * Calling/Exit State:
212     *     None.
213     *
214     * Remarks:
215     *     Answer stale unless higher level serialization ensures
216     *     otherwise.
217     */
218    boolean_t
219    dow_exists(long ident1, long ident2)
220    {
221         dowid_t hashid;
222         dowid_t i;
223         boolean_t retval = B_FALSE;
224
225         DOW_MUTEX_LOCK();
226         i = hashid = DOW_HASHBUCKET(ident1, ident2);
227         ASSERT(DOW_HASHLINKS_SANE(hashid));
228         ASSERT(VALID_HASH_BUCKET(hashid));
229         while ((i = DOW_HASHNEXT(i)) != hashid) {
230              if ((DOW_IDENT1(i) == ident1) && (DOW_IDENT2(i) == ident2)) {
231                   ASSERT((DOW_STATE(i) & DOW_GONE) == 0);
232                   retval = B_TRUE;
233                   break;
234              }
235         }
236         DOW_MUTEX_UNLOCK();
237         return (retval);
238    }
239
240    /*
241     * dowid_t
242     * dow_vp_any(vnode_t *vp)
243     *     Return a dowid if the dow has a page identity in the specified vp.
244     *     Return DOW_BADID otherwise.
245     *
246     * Calling/Exit State:
247     *     None.
``` fs_dow/dow_check.c    (dow_exists)    Page 34 fs_dow/dow_check.c (dow_exists) Page 35

```
251   * Remarks:
252   *    Answer stale unless higher level serialization ensures
253   *    otherwise.  NO HOLD IS PLACED ON RETURNED id.
254   */
255  dowid_t
256  dow_vp_any(vnode_t *vp)
257  {
258      dowid_t hashid;
259      dowid_t id;
260
261      DOW_MUTEX_LOCK();
262
263      for (hashid = DOW_TABLE_SIZE;
264           hashid < (DOW_TABLE_SIZE + DOW_HASHWIDTH); hashid++) {
265
266          ASSERT(DOW_HASHLINKS_SANE(hashid));
267          for (id = DOW_HASHNEXT(hashid); id != hashid;
268               id = DOW_HASHNEXT(id)) {
269
270              if ((DOW_IDENT1(id) == (long)vp) &&
271                  (DOW_TYPE(id) == DOW_ISPAGE)) {
272                      DOW_MUTEX_UNLOCK();
273                      return(id);
274              }
275          }
276      }
277      DOW_MUTEX_UNLOCK();
278      return (DOW_BADID);
279  }
280
281
282  #ifndef DOW_KLUDGE
283  void
284  mark_vp_offset_dows(vnode_t *vp, vp_offset_t offset, uchar_t marker)
285  {
286      dowid_t hashid;
287      dowid_t id;
288
289      DOW_MUTEX_LOCK();
290
291      for (hashid = DOW_TABLE_SIZE;
292           hashid < (DOW_TABLE_SIZE + DOW_HASHWIDTH); hashid++) {
293
294          ASSERT(DOW_HASHLINKS_SANE(hashid));
295          for (id = DOW_HASHNEXT(hashid); id != hashid;
296               id = DOW_HASHNEXT(id)) {
297
298              if ((DOW_IDENT1(id) == (long)vp) &&
299                  (DOW_TYPE(id) == DOW_ISPAGE) &&
300
```

```
301                         (DOW_IDENT2(id) >= offset)) {
302                     DOW_SPARE(id) = marker;
303                 }
304             }
305         }
306         DOW_MUTEX_UNLOCK();
307         return;
308     }
309 }
310 void
311 check_vp_offset_dows(vnode_t *vp, off_t offset)
312 {
313     dowid_t hashid;
314     dowid_t id;
315
316     DOW_MUTEX_LOCK();
317     for (hashid = DOW_TABLE_SIZE;
318          hashid < (DOW_TABLE_SIZE + DOW_HASHWIDTH); hashid++) {
319         ASSERT(DOW_HASHLINKS_SANE(hashid));
320         for (id = DOW_HASHNEXT(hashid); id != hashid;
321              id = DOW_HASHNEXT(id)) {
322             if ((DOW_IDENT1(id) == (long)vp) &&
323                 (DOW_IDENT2(id) >= offset)) {
324                 if (DOW_SPARE(id) & DOW_TRACKED) {
325                     cmn_err(CE_CONT,
326                         "CHECK_VP_OFFSET_DOWS: found tracked dow 0x%x\n", id);
327                 } else {
328                     cmn_err(CE_CONT,
329                         "CHECK_VP_OFFSET_DOWS: found untracked dow 0x%x\n", id);
330                 }
331                 call_demon();
332             }
333         }
334     }
335     DOW_MUTEX_UNLOCK();
336     return;
337 }
338 #endif
339
340 /*
341  * void
342  * check_dow_freelist()
343  *    Verify that the freelist of DOW structures is consistent.
344  *
345  * Calling/Exit State:
346  *    DOW mutex held by caller.
347  */
350
```

```
351  void
352  check_dow_freelist()
353  {
354      dowid_t x = DOW_FREEHEAD;
355      int count = 0;
356
357      ASSERT(DOW_FREENEXT(DOW_FREEPREV(x)) == x);
358      while ((x = DOW_FREENEXT(x)) != DOW_FREEHEAD) {
359          ASSERT(DOW_FREEPREV(DOW_FREENEXT(x)) == x);
360          ++count;
361          ASSERT(count <= dow_freecount);
362      }
363      ASSERT(DOW_FREEPREV(DOW_FREENEXT(x)) == x);
364      ASSERT(count == dow_freecount);
365  }
366
367  /*
368   * void
369   * check_notfree(dowid_t id)
370   *    Verify that id is not on the freelist.
371   *
372   * Calling/Exit State:
373   *    DOW mutex held by caller.
374   */
375  void
376  check_notfree(dowid_t id)
377  {
378      ASSERT(DOW_DEBUG_HASHID(id) != DOW_FREEHEAD);
379      ASSERT(DOW_DEBUG_FLUSHID(id) != DOW_FREEHEAD);
380  }
381
382  /*
383   * void
384   * check_hashdup(dowid_t x, dowid_t hb, long i1, long i2)
385   *    Verify that dowid x is on hash chain hb, and that no
386   *    synonym of x exists on the hash chain. (i1, i2) is the
387   *    identity tuple for dowid x.
388   *
389   * Calling/Exit State:
390   *    dow_mutex held by caller.
391   */
392  void
393  check_hashdup(dowid_t x, dowid_t hb, long i1, long i2)
394  {
395      int count = 0;
396      dowid_t y;
397
398      for (y = DOW_HASHNEXT(hb); y != hb; y = DOW_HASHNEXT(y)) {
399  }
```

```
401                 if (y == x) {
402                     ASSERT(count == 0);
403                     !!count;
404                 } else {
405                     ASSERT((i1 != (long)DOW_IDENT1(y)) ||
406                            (i2 != (long)DOW_IDENT2(y)));
407                 }
408             }
409             ASSERT(count == 1);
410         }
411     }
412     /*
413      * check_hash(dowid_t id)
414      *    Verify that id is on the correct hash chain.
415      *
416      * Calling/Exit State:
417      *    DOW mutex held by caller.
418      */
419     void
420     check_hash(dowid_t id)
421     {
422         dowid_t hbucket;
423         hbucket = DOW_HASHBUCKET(DOW_IDENT1(id), DOW_IDENT2(id));
424         ASSERT(DOW_DEBUG_HASHID(id) == hbucket);
425         ASSERT((DOW_STATE(id) & DOW_GONE) == 0);
426         CHECK_HASHDUP(id, hbucket, DOW_IDENT1(id), DOW_IDENT2(id));
427     }
428
429     /*
430      * check_hash_chain(dowid_t hb)
431      *    Verify that the hash chain at bucket hb is consistent.
432      *
433      * Calling/Exit State:
434      *    DOW mutex held by caller.
435      */
436     void
437     check_hash_chain(dowid_t hb)
438     {
439         /*
440          * count up the number of items and verify that they
441          * are correct,
442          * check sanity of links,
443          * check that hashids match
444          */
445         dowid_t x;
446         int count = 0;
``` fs_dow/dow_check.c                              (check_hash_chain)                    Page 39

```
451         ASSERT(DOW_HASHLINKS_SANE(hb));
452         for (x = DOW_HASHNEXT(hb); x != hb ; x = DOW_HASHNEXT(x)) {
453             ASSERT(DOW_HASHLINKS_SANE(x));
454             ++count;
455             ASSERT(count <= DOW_DEBUG_CNT(hb));
456             ASSERT((DOW_STATE(x) & DOW_GONE) == 0);
457             ASSERT(DOW_DEBUG_HASHID(x) == hb);
458         }
459         ASSERT(count == DOW_DEBUG_CNT(hb));
460     }
461
462     /*
463      * void
464      * check_hash_removed(dowid_t x)
465      *      Verify that dowid x has been unhashed.
466      *
467      * Calling/Exit State:
468      *      DOW mutex held by caller.
469      */
470     void
471     check_hash_removed(dowid_t x)
472     {
473         ASSERT(DOW_DEBUG_HASHID(x) == DOW_BADID);
474     }
475
476     /*
477      * void
478      * check_dowlink_chain(dowlinkid_t hd)
479      *      Verify that the chain of dowlink structures anchored at
480      *      headlink hd is consistent.
481      *
482      * Calling/Exit State:
483      *      Caller holds dow_mutex.
484      */
485     void
486     check_dowlink_chain(dowlinkid_t hd)
487     {
488         dowlinkid_t link;
489         int count = 0;
490         ASSERT(VALID_DOWLINK_HEAD(hd));
491         ASSERT(DOWLINK_LINKS_SANE(hd));
492         for (link = DOWLINK_NEXT(hd); link != hd; link = DOWLINK_NEXT(link)) {
493             ASSERT(DOWLINK_LINKS_SANE(link));
494             ++count;
495             ASSERT(count <= DOWLINK_DEBUG_CNT(hd));
496         }
497         ASSERT(count == DOWLINK_DEBUG_CNT(hd));
498     }
```

Page 39                                    (check_dowlink_chain)          fs_dow/dow_check.c

```
501  /*
502   * void
503   * check_dow_linkage(dowlinkid_t my_link)
504   *     Verify that the reciprocal linkage between "my_link" and the
505   *     inverse thereof is correct.  For a link that, for example,
506   *     encodes the dependence (X --> Y), the inverse link would
507   *     encode the antecedence (Y <-- X).  This function verifies that
508   *     each link correctly identifies both its own dow structure and
509   *     the dow structure with which the dependence/antecedence
510   *     relationship.
511   *
512   * Calling/Exit State:
513   *     Caller holds dow_mutex.
514   */
515  void
516  check_dow_linkage(dowlinkid_t my_link)
517  {
518      dowid_t my_dow, other_dow;
519      dowlinkid_t inv_link;
520
521      ASSERT(DOWLINK_ILINK_SANE(my_link));
522
523      inv_link = DOWLINK_INVERSE(my_link);
524      my_dow   = DOWLINK_DEBUG_MYDOW(my_link);
525      other_dow = DOWLINK_DEBUG_MYDOW(inv_link);
526
527      ASSERT(my_dow    == DOWLINK_DOWID(inv_link));
528      ASSERT(other_dow == DOWLINK_DOWID(my_link));
529  }
530
531  /*
532   * void
533   * check_dowlink_freelist()
534   *     Verify that the list of free dowlink structures is consistent.
535   *
536   * Calling/Exit State:
537   *     Dow mutex held by caller.
538   */
539  void
540  check_dowlink_freelist()
541  {
542      dowlinkid_t x = DOWLINK_FREEHEAD;
543      int count = 0;
544
545      ASSERT(DOWLINK_LINKS_SANE(x));
546
547      while ((x = DOWLINK_NEXT(x)) != DOWLINK_FREEHEAD) {
```

```
551             ASSERT(DOWLINK_DEBUG_LHEAD(x) == DOWLINK_FREEHEAD);
552             ASSERT(DOWLINK_PREV(DOWLINK_NEXT(x)) == x);
553             ++count;
554             ASSERT(count <= dowlink_freecount);
555         }
556         ASSERT(DOWLINK_PREV(DOWLINK_NEXT(x)) == x);
557         ASSERT(count == dowlink_freecount);
558     }
559 }
560
561 /*
562  * void
563  * print_dow(dowid_t i)
564  *      Debugging support routine, expected to be called from the kernel
565  *      debugger (KDB), to print the various fields in the indicated
566  *      dow structure. Also prints the antecdent and dependent link
567  *      chains, listing the linkid, next-linkid, and the dowid of the
568  *      connected antecedent or dependent dows.
569  *
570  * Calling/Exit State:
571  *      None.
572  *
573  */
574 void
575 print_dow(dowid_t i)
576 {
577     dowlinkid_t link, headlink;
578
579     debug_printf("dowid       %6d\taddr       0x%x\n", i, &(dow_tab[i]));
580     debug_printf("\tfree/hash:next(prev) %6d(%6d)\t", 
581         DOW_HASHNEXT(i),
582         DOW_HASHPREV(i));
583     debug_printf("flush     :next(prev) %6d(%6d)\n", DOW_FLUSHNEXT(i),
584         DOW_FLUSHPREV(i));
585     debug_printf("antecdent count      %6d\t", DOW_ANT_CNT(i));
586     debug_printf("dependent count      %6d\n", DOW_DEP_CNT(i));
587     debug_printf("%dow_sv 0x%x\t", DOW_SVP(i));
588     debug_printf("dow state    ");
589     if (DOW_STATE(i) & DOW_GONE)
590         debug_printf("G");
591     else
592         debug_printf(" ");
593     if (DOW_STATE(i) & DOW_PRUNE)
594         debug_printf("P");
595     else
596         debug_printf(" ");
597     if (DOW_STATE(i) & DOW_IOSETUP)
598         debug_printf("I");
599     else
600         debug_printf(" ");
```

```
601        if (DOW_STATE(i) & DOW_FLUSH)
602            debug_printf("F");
603        else
604            debug_printf(" ");
605        if (DOW_STATE(i) & DOW_INTRANS)
606            debug_printf("W");
607        else
608            debug_printf(" ");
609        if (DOW_STATE(i) & DOW_MODIFIED)
610            debug_printf("M");
611        else
612            debug_printf(" ");
613        debug_printf("\tTYPE: \t");
614        if (DOW_TYPE(i) == DOW_ISPAGE)
615            debug_printf("page");
616        else if (DOW_TYPE(i) == DOW_ISBUFFER)
617            debug_printf("buffer");
618        else if (DOW_TYPE(i) == DOW_ISFUNC)
619            debug_printf("function");
620        else if (DOW_TYPE(i) == DOW_ISFUNC_NBLK)
621            debug_printf("func+nblk");
622        else
623            debug_printf("??????");
624        debug_printf("\nhold        %6d\t", DOW_HOLD(i));
625        debug_printf("IDENT1   0x%8x\t", DOW_IDENT1(i));
626        debug_printf("IDENT2   0x%8x\n", DOW_IDENT2(i));
627        debug_printf("TimeStamp   %6d\t", DOW_TIMESTAMP(i));
628        debug_printf("Buffer ptr 0x%8x\t", DOW_BP(i));
629        debug_printf("MOD count   %6d\n", DOW_MOD_LOCK(i));
630        debug_printf("DEBUG FLDS: hash(%6d(%6d)\tflush chain: ",
631                DOW_DEBUG_HASHID(i),
632                DOW_DEBUG_FLUSHID(i));
633        if (DOW_DEBUG_FLUSHID(i) == DOW_LEAF_FLUSHHEAD) {
634            debug_printf("leaf ");
635        }
636        else if (DOW_DEBUG_FLUSHID(i) == DOW_PRUN_FLUSHHEAD) {
637            debug_printf("prun ");
638        }
639        else if (DOW_DEBUG_FLUSHID(i) == DOW_AGED_FLUSHHEAD) {
640            debug_printf("aged ");
641        }
642        else if (DOW_DEBUG_FLUSHID(i) == DOW_FREEHEAD) {
643            debug_printf("free ");
644        }
645        else if (DOW_DEBUG_FLUSHID(i) == DOW_BADID) {
646            debug_printf("none? ");
647        }
648        else {
649            debug_printf("???? ");
650        }
```

```
fs_dow/dow_check.c                                              (print_dow)

651          debug_printf("\n\n");
652
653          link = headlink = DOWLINK_ANT_LINKHEAD(l);
654          debug_printf("antecedents list (curr/next/dow/DLH): %6d %6d %6d %6d\n",
655                  link,
656                  DOWLINK_NEXT(link),
657                  DOWLINK_DOWID(link),
658                  DOWLINK_DEBUG_LHEAD(link));
659          while ((link = DOWLINK_NEXT(link)) != headlink) {
660              debug_printf("                                  %6d %6d %6d %6d\n",
661                  link,
662                  DOWLINK_NEXT(link),
663                  DOWLINK_DOWID(link),
664                  DOWLINK_DEBUG_LHEAD(link));
665          }
666          debug_printf("\n");
667
668          link = headlink = DOWLINK_DEP_LINKHEAD(l);
669          debug_printf("dependent list (curr/next/dow/DLH): %6d %6d %6d %6d\n",
670                  link,
671                  DOWLINK_NEXT(link),
672                  DOWLINK_DOWID(link),
673                  DOWLINK_DEBUG_LHEAD(link));
674          while ((link = DOWLINK_NEXT(link)) != headlink) {
675              debug_printf("                                %6d %6d %6d %6d\n",
676                  link,
677                  DOWLINK_NEXT(link),
678                  DOWLINK_DOWID(link),
679                  DOWLINK_DEBUG_LHEAD(link));
680          }
681          debug_printf("\n");
682      }
683
684
685
686      /*
687       * void
688       * find_dow(long ident1, long ident2)
689       *     Find the hashbucket with the provided hash identity fields,
690       *     and print the hashbucket and the dowid (if found on the hash
691       *     chain).
692       * Calling/Exit State:
693       *     None.
694       */
695      void
696      find_dow(long ident1, long ident2)
697      {
698          dowid_t hb = DOW_HASHBUCKET(ident1, ident2);
699          dowid_t l;
700
``` fs_dow/dow_check.c                                              (find_dow)

fs_dow/dow_check.c (find_dow) Page 44

```
701        debug_printf("find_dow: hashbucket = %d\t", hb);
702        for (i = DOW_HASHNEXT(hb); i != hb; i = DOW_HASHNEXT(i)) {
703            if (DOW_IDENT1(i) == ident1 && DOW_IDENT2(i) == ident2) {
704                debug_printf("dowid = %d\n", i);
705                return;
706            }
707        }
708        debug_printf("\n");
709    }
710    }
711    #endif
712
```

Page 44   fs_dow/dow_check.c (find_dow)

Printed: Wed Apr 6 11:28:29 1994        File modified: Wed Apr 6 11:25:57 1994 fs_dow/dow_create.c  Page 45

```
1  #ident  "@(#)kern:fs/dow_create.c    1.4"
2  #ident  "$Header: $"
3
4  #include    <fs/dow.h>
5  #include    <fs/fs_hier.h>
6  #include    <io/conf.h>
7  #include    <mem/kmem.h>
8  #include    <mem/page.h>
9  #include    <svc/clock.h>
10 #include    <util/cmn_err.h>
11 #include    <util/debug.h>
12 #include    <util/ghier.h>
13 #include    <util/sysmacros_f.h>
14 #include    <util/var.h>
15
16 /*
17  * dowid_t
18  * dow_create_buf(dev_t dev, daddr_t blkno, long bsize, uint_t flag)
19  *   Lookup the specified (dev, blkno) to find an associated dow,
20  *   if one exists, and return it held. If a dow does not exist,
21  *   create one. Return with a hold on the dow. flag specifies
22  *   whether blocking is permitted for dow structures.
23  *
24  * Calling/Exit State:
25  *   Caller does not hold dow_mutex. Even if the flag specifies no wait,
26  *   the caller is not expected to call this function on an interrupt
27  *   path or while holding other locks; while this is not a requirement
28  *   for this functionality, it is implied in the current implementation
29  *   (because DOW_MUTEX_LOCK() and DOW_MUTEX_UNLOCK() assume that the
30  *   caller was at basepl.
31  *
32  * Remarks:
33  * PERF:
34  *   We could acquire the dow_mutex inside the function and release
35  *   it before returning. It is a performance issue whether we can
36  *   hope to cover several calls to dow_interface with one lock
37  *   round trip.
38  */
39
40 #ifdef DEBUG
41 short   func_creats = 0;    /* Remove after funcs are tested */
42 #endif
43
44 dowid_t
45 dow_create_buf(dev_t dev, daddr_t blkno, long bsize, uint_t flag)
46 {
47     dowid_t id;
48     dowid_t hashbucket;
```

```
       ASSERT(KS_HOLDOLOCKS());
51
52     ASSERT(getpl() == PLBASE);
53
54     DOW_MUTEX_LOCK();
55
56     while ((id = dow_lookup(dev, blkno)) == (dowid_t)DOW_BADID) {
57         if ((id = dow_alloc_1()) == DOW_BADID) {
58             if (flag & (DOW_NO_WAIT | DOW_NO_RESWAIT)) {
59                 DOW_MUTEX_UNLOCK();
60                 return (DOW_BADID);
61             } else {
62                 DOW_FREE_SV_WAIT();
63                 DOW_MUTEX_LOCK();
64                 continue;
65             }
66         }
67
68     }
69     ASSERT(VALID_DOWID(id));
70     dow_init(id, (long)dev, (long)blkno, DOW_ISBUFFER);
71     DOW_CHEAP_HOLD(id);
72     DOW_BSIZE(id) = bsize;
73     DOW_BP(id) = NULL;
74
75
76     hashbucket = DOW_HASHBUCKET(dev, blkno);
77     dow_inchash(id, hashbucket);
78     dow_flush_tailins(id, DOW_AGED_FLUSHHEAD);
79
80     CHECK_HASHDUP(id, hashbucket, dev, blkno);
81     DOW_MUTEX_UNLOCK();
82     return(id);
83
84 }
85
86 /*
87  * Successful lookup. There is no need to wait for INTRANS or
88  * MOD states to clear. Note that dow_lookup() created a hold on
89  * id before returning it to us.
90  */
91 #ifdef DEBUG
92     ASSERT(VALID_DOWID(id));
93     ASSERT(DOW_TYPE(id) == DOW_ISBUFFER);
94     ASSERT(DOW_BSIZE(id) == bsize);
95     hashbucket = DOW_HASHBUCKET(dev, blkno);
96     CHECK_HASHDUP(id, hashbucket, dev, blkno);
97 #endif
98     DOW_MUTEX_UNLOCK();
99     return(id);
100 }
```

```
fs_dow/dow_create.c                                                    (dow_create_buf)    Page 47

101 /*
102  * dowid_t
103  * dow_create_function(void (*func)(), void *argp, uint_t flag,
104  *                     boolean_t func_can_block)
105  *
106  *   Lookup the specified (func, argp) to find an associated dow;
107  *   if one exists, and return it held. If a dow does not exist,
108  *   create one. Return with a hold on the dow. flag specifies
109  *   whether blocking is permitted for dow structures.
110  *
111  *   func_can_block: B_FALSE if it is known that the function is
112  *   a non-blocking function in all invocations; B_TRUE otherwise.
113  *
114  * Calling/Exit State:
115  *   Caller does not hold dow_mutex. It may be acquired, and released
116  *   and reacquired if allocation is a blocking allocation. The mutex
117  *   will be dropped before return.
118  *
119  *   Eventhough the caller may specify non-blocking allocation, it will
120  *   be assumed that the caller is at plbase. (convenience).
121  *
122  * Remarks:
123  *
124  * PERF:
125  *   We could acquire the dow_mutex inside the function and release
126  *   it before returning. It is a performance issue whether we can
127  *   hope to cover several calls to dow_interface with one lock
128  *   round trip.
129  *
130  */
131 dowid_t
132 dow_create_func(void (*func)(), void *argp, uint_t flag,
133                 boolean_t func_can_block)
134 {
135     dowid_t id;
136     dowid_t hashbucket;
137
138     DOW_MUTEX_LOCK();
139
140     while (((id = dow_lookup((long)func, (long)argp)) == (dowid_t)DOW_BADID){
141
142         if (((id = dow_alloc_1()) == DOW_BADID) {
143             if ((flag & (DOW_NO_WAIT | DOW_NO_RESWAIT)) {
144                 DOW_MUTEX_UNLOCK();
145                 return (DOW_BADID);
146             } else {
147                 DOW_FREE_SV_WAIT();
148                 DOW_MUTEX_LOCK();
149                 continue;
150             }
```

```
151         }
152         ASSERT(VALID_DOWID(id));
153         dow_init(id, (long)func, (long)argp,
154                 (func_can_block ? DOW_ISFUNC : DOW_ISFUNC_NBLK));
155         DOW_CHEAP_HOLD(id);
156         DOW_BP(id) = NULL;
157
158         hashbucket = DOW_HASHBUCKET(((long)func, (long)argp);
159         dow_inchash(id, hashbucket);
160         dow_flush_tailing(id, DOW_AGED_FLUSHHEAD);
161         CHECK_HASHDUP(id, hashbucket, (long)func, (long)argp);
162         DOW_MUTEX_UNLOCK();
163
164 #ifdef DEBUG
165         'func_create;
166 #endif
167         return(id);
168     }
169
170     /*
171      * Successful lookup. There is no need to wait for INTRANS or
172      * MOD states to clear. Note that dow_lookup() created a hold on
173      * id before returning it to us.
174      */
175 #ifdef DEBUG
176     ASSERT(VALID_DOWID(id));
177     ASSERT(DOW_TYPE(id) & DOW_ISFUNC);
178     hashbucket = DOW_HASHBUCKET((long)func, (long)argp);
179     CHECK_HASHDUP(id, hashbucket, (long)func, (long)argp);
180 #endif
181     DOW_MUTEX_UNLOCK();
182     return(id);
183 }
184 /*
185 TODO:
186 accept a len arguement
187 return badid if off+len crosses pageboundary
188 match offset to offset & PAGEMASK
189
190 */
191 /*
192  * dowid_t
193  * dow_create_page(vnode_t *vp, off_t offset, int len, uint_t flag)
194  *      Lookup the specified (vp, offset) to find an associated dow,
195  *      if one exists, and return it held. If a dow does not exist,
196  *      create one. Return with a hold on the dow. flag specifies
197  *      whether:
198  *      (1) blocking is permitted for dow structures and
199  *      (2) dow_create is being called from dow_strategy in which case,
200  *
```

```
           *       (a) blocking is not permitted, and
201        *       (b) if dow resource is not available, other dow_create() calls
202        *           must be disabled (failed or blocked) in order to disable
203        *           the DOW optimization until the count of un-tracked page
204        *           pushes drops to 0. (This should be extremely improbable!)
205        *
206        * Calling/Exit State:
207        *    Caller holds dow_mutex. It may be released and reacquired if
208        *    allocation is a blocking allocation.
209        *
210        * Remarks:
211        *
212        * PERF:
213        *    We could acquire the dow_mutex inside the function and release
214        *    it before returning. It is a performance issue whether we can
215        *    hope to cover several calls to dow_interface with one lock
216        *    round trip.
217        */
218    dowid_t
219    dow_create_page(vnode_t *vp, off_t offset, int len, uint_t flag)
220    {
221        dowid_t id;
222
223        DOW_MUTEX_LOCK();
224        id = dow_create_page_1(vp, offset, len, flag);
225        DOW_MUTEX_UNLOCK();
226        return(id);
227    }
228
229    /*
230     * dow_create_page_1(vnode_t *vp, off_t offset, int len, uint_t flag)
231     *    Internal interface to do the actual creation of a dow corresponding
232     *    to the specified identity. Does the real work of dow_create_page.
233     *
234     * Calling/Exit State:
235     *    dow_mutex held by the caller. The dow_mutex is held on return.
236     *    It may be dropped and reacquired if flag specifies waiting is
237     *    tolerable.
238     */
239    dowid_t
240    dow_create_page_1(vnode_t *vp, off_t offset, int len, uint_t flag)
241    {
242        dowid_t id;
243        dowid_t hashbucket;
244
245        ASSERT(DOW_MUTEX_OWNED());
246
247        while (((id = dow_lookup_page(vp, offset)) == (dowid_t)DOW_BADID)(
```

```
251             if (untracked_pageio > 0) {
252                 return (DOW_BADID);
253             }
254         }
255         if ((id = dow_alloc_l()) == DOW_BADID) {
256             if (flag & (DOW_NO_WAIT | DOW_NO_RESWAIT)) {
257                 return (DOW_BADID);
258             } else {
259                 DOW_FREE_SV_WAIT();
260                 DOW_MUTEX_LOCK();
261                 continue;
262             }
263         }
264
265         ASSERT(VALID_DOWID(id));
266         dow_init(id, (long)vp, (long)offset, DOW_ISPAGE);
267         VN_SOFTHOLD(vp);
268         DOW_CHEAP_HOLD(id);
269         DOW_LEN(id) = len;
270         /*
271          * XXX:   OTHER dow INITIALIZATIONS FOR PAGE TYPE?
272          */
273
274         hashbucket = DOW_HASHBUCKET((long)vp, (long)offset);
275         dow_inshash(id, hashbucket);
276         dow_flush_tailins(id, DOW_AGED_FLUSHHEAD);
277         /*
278          * Verify (in DEBUG mode) that there is no synonym
279          */
280         CHECK_HASHDUP(id, hashbucket, (long)vp, (long)offset);
281         return(id);
282     }
283
284 #ifdef DEBUG
285     hashbucket = DOW_HASHBUCKET((long)vp, (long)offset);
286     /*
287      * Successful lookup. There is no need to wait for INTRANS or
288      * MOD states to clear. Note that dow_lookup() created a hold on
289      * id before returning it to us.
290      */
291     ASSERT(VALID_DOWID(id));
292     ASSERT(DOW_TYPE(id) == DOW_ISPAGE);
293     CHECK_HASHDUP(id, hashbucket, (long)vp, (long)offset);
294 #endif
295     return(id);
296 }
```

```
  1  #ident   "@(#)kern:fs/dow_flush.c   1.7"
  2  #ident   "$Header: $"
  3
  4  #include      <fs/dow.h>
  5  #include      <fs/fs_hier.h>
  6  #include      <io/conf.h>
  7  #include      <mem/kmem.h>
  8  #include      <mcm/page.h>
  9  #include      <proc/proc.h>
 10  #include      <svc/clock.h>
 11  #include      <svc/errno.h>
 12  #include      <util/cmn_err.h>
 13  #include      <util/debug.h>
 14  #include      <util/qhier.h>
 15  #include      <util/mod/moddefs.h>
 16  #include      <util/sysmacros_f.h>
 17  #include      <util/var.h>
 18
 19  /*
 20   * TODO:
 21   *       Write a debug routine that can be called periodically to verify
 22   *       that DOW_STATE, DOW_DEBUG_FLUSHID, DOW_DEBUG_HASHID for all the
 23   *       dows are consistent with each other.
 24   *
 25   * One main concern: to verify that if a dow gets to the pruned list, and
 26   * is modified or iosetup, that it will get written. We don't have anything
 27   * that walks the pruned list (does not quite make sense), and we are depending
 28   * on the fact that between the iodone processing bubbling up and the pruning
 29   * from above and flush demon's leaf processing, we have covered all means by
 30   * which dows will get processed without external nudging.
 31   */
 32
 33  STATIC   clock_t    dow_flush_daemon_woke = 0;
 34  STATIC   off_t      dow_pagesync_off = (-1);
 35  STATIC   sv_t       dow_pagesync_sv;
 36  STATIC   lwp_t     *lwp_dowflushd;                    /* dow_flush_daemon lwpp */
 37  STATIC   vnode_t   *dow_pagesync_vp = NULL;
 38  STATIC   boolean_t  dow_pagesync_handoff = B_FALSE;
 39  STATIC   boolean_t  dow_unloading = B_FALSE;
 40
 41  void             dow_pagesync_daemon();
 42
 43  void             dowInit(void);
 44  void             dowpostroot(void);
 45  STATIC   int     dow_load(void);
 46  STATIC   int     dow_unload(void);
 47  STATIC   k_lwpid_t  dow_pagesync_lwpid;
 48  STATIC   k_lwpid_t  dow_flush_lwpid;
 49  STATIC   toid_t     dow_timeid;
 50
```

```
 51  #define DRVNAME "dow - Delayed Ordered Writes driver"
 52
 53  MOD_MISC_WRAPPER(dow, dow_load, dow_unload, DRVNAME);
 54
 55  /*
 56   * STATIC int
 57   * dow_load(void)
 58   *     Load the dow module.  Call spawn_sys_lwp
 59   *     to create our daemons as LWPs of sysproc.
 60   *
 61   * Calling/Exit State:
 62   *     No locks held on entry and exit.
 63   *
 64   * Return value:
 65   *     0: is returned on success.
 66   *     1: is returned on failure, if we can't
 67   *        start the daemons.  This will cause
 68   *        the module load to fail.
 69   */
 70  STATIC int
 71  dow_load(void)
 72  {
 73      int         error;
 74
 75      dowinit();
 76      /*
 77       * We don't set LWP_DETACHED so we can
 78       * wait for these daemons to exit
 79       * if we try to unload the module.
 80       */
 81      if (spawn_sys_lwp(&dow_flush_lwpid, 0, dow_flush_daemon, NULL))
 82          return 1;
 83
 84      if (spawn_sys_lwp(&dow_pagesync_lwpid, 0, dow_pagesync_daemon, NULL)) {
 85          /*
 86           * Kill the dow_flush daemon
 87           * and cancel the timeout.
 88           */
 89          dow_unloading = B_TRUE;
 90
 91          DOW_FLUSH_EVENT_BROADCAST();
 92          error = wait_sys_lwp(dow_flush_lwpid);
 93          if (error) {
 94              cmn_err(CE_NOTE, "dow_unload: wait for dow_flush error %d\n",
 95                      error);
 96          }
 97          untimeout(dow_timeid);
 98          return 1;
 99      }
100  }
```

```
101            return 0;
102    }
103
104    /*
105     * STATIC int
106     * dow_unload(void)
107     *     Unload the dow module.  Tell the daemons to exit.
108     *     Wait for the daemons to exit. Cancel the timeout.
109     *
110     * Calling/Exit State:
111     *     No locks held on entry and exit.
112     */
113    STATIC int
114    dow_unload(void)
115    {
116        int        error;
117
118        dow_unloading = B_TRUE;
119
120        DOW_FLUSH_EVENT_BROADCAST();
121        error = wait_sys_lwp(dow_flush_lwpid);
122        if (error) {
123            cmn_err(CE_NOTE, "dow_unload: wait for dow_flush error %d\n",
124                error);
125        }
126
127        SV_BROADCAST(&dow_pagesync_sv, 0);
128        error = wait_sys_lwp(dow_pagesync_lwpid);
129        if (error) {
130            cmn_err(CE_NOTE, "dow_unload: wait for dow pagesync error %d\n",
131                error);
132        }
133
134        untimeout(dow_timeid);
135        return 0;
136    }
137
138    /*
139     * void
140     * dow_start_flush_timeout(void)
141     *     Allocate space for configuring a periodic timeout.
142     *
143     * Calling/Exit State:
144     *     Called at PLTIMEOUT.
145     */
146    void
147    dow_start_flush_timeout(void)
148    {
``` fs_dow/dow_flush.c    (dow_start_flush_timeout)    Page 54

```
151             void *co = itimeout_allocate(KM_SLEEP);
152             dow_timeid = itimeout_a(dow_flush_timeout, (void *)NULL,
153                          (10 | TO_PERIODIC), PLTIMEOUT, co);
154     }
155
156     /*
157      * dow_flush_timeout(void)
158      * dow flush demon timeout routine. fires every 10 ticks.
159      * Wakeup dow flush demon if there are items on the leaf flush
160      * chain, or the age flush chain is non-empty and the dow flush demon
161      * has not been nudged for DOW_AGE_TIX clock ticks.
162      *
163      * Calling/Exit State:
164      *     Called at PLTIMEOUT.
165      */
166     void
167     dow_flush_timeout(void)
168     {
169         pl_t savepl;
170
171         /*
172          * first, check to see if something needs pruning.
173          */
174         savepl = DOW_MUTEX_LOCK();
175         if (!EMPTY_DOW_FLUSHLIST(DOW_LEAF_FLUSHHEAD) ||
176             (!EMPTY_DOW_FLUSHLIST(DOW_AGED_FLUSHHEAD) &&
177              ((lbolt - DOW_AGE_TIX) > dow_flush_daemon_woke))) {
178                  dow_flush_daemon_woke = lbolt;
179                  DOW_FLUSH_EVENT_BROADCAST();
180         }
181         DOW_MUTEX_UNLOCK_SAVEDPL(savepl);
182         return;
183     }
184
185     /*
186      * dow_flush_daemon(void *arg)
187      * System LWP to flush delayed writes or execute deferred actions
188      * whose antecedents have been written, and to initiate the
189      * pruning of those deferred writes/actions that are overdue.
190      *
191      * Calling/Exit State:
192      *     The LWP blocks until signalled by the DOW system that there is
193      *     work for it to do.
194      */
195     /* ARGSUSED */
196     void
197     dow_flush_daemon(void *arg)
``` fs_dow/dow_flush.c    (dow_flush_daemon)    Page 54

File modified: Wed Apr  6 11:25:57 1994

```
201 {
202     dowid_t id;
203     int     cycle_count;
204
205     u.u_lwpp->l_name = "dow_flushd";
206     lwp_dowflushd = u.u_lwpp;
207
208     dow_start_flush_timeout();
209
210     for(;;) {
211         DOW_FLUSH_EVENT_WAIT();
212         if (dow_unloading)
213             lwp_exit();
214         DOW_MUTEX_LOCK();
215         dow_flush_daemon_woke = lbolt;
216         while ((id = DOW_FLUSHNEXT(DOW_LEAF_FLUSHHEAD))
217                 != DOW_LEAF_FLUSHHEAD) {
218             ASSERT((DOW_STATE(id) & (DOW_FLUSH | DOW_PRUNE))
219                 == DOW_PRUNE);
220             if (dow_process_leaf_flush(id)) {
221                 DOW_MUTEX_LOCK();
222             }
223             if (dow_pagesync_handoff) {
224                 /*
225                  * Perhaps because dow_flush could not
226                  * perform a synchronous page push operation
227                  * it had to re-enqueue the dow structure
228                  * back on to the leaf chain.
229                  *
230                  * Set the dow_flush_daemon woke back to 0
231                  * to ensure that the flush daemon gets an
232                  * early wakeup in this case, and break out
233                  * of the loop we are in.
234                  */
235                 dow_pagesync_handoff = B_FALSE;
236                 dow_flush_daemon_woke = 0;
237                 DOW_MUTEX_UNLOCK();
238                 DOW_FLUSH_EVENT_WAIT();
239                 DOW_MUTEX_LOCK();
240                 break;
241             }
242         }
243
244         cycle_count = 0;
245 rescan:
246
247         for (id = DOW_FLUSHNEXT(DOW_AGED_FLUSHHEAD);
248             id != DOW_AGED_FLUSHHEAD; id = DOW_FLUSHNEXT(id)) {
249             ASSERT((DOW_STATE(id) & DOW_PRUNE) == 0);
250             if ((DOW_TIMESTAMP(id) <= (lbolt - FLUSHDELTAMAX)) &&
```

```
251                 ((DOW_STATE(id) & DOW_MODIFIED) ||
252                 (DOW_DEP_CNT(id) > 0)) ) {
253                     prune(id);
254                     ASSERT(DOW_STATE(id) & DOW_PRUNE);
255                     CHECK_MOTON_FLUSHCHATN(id, DOW_AGED_FLUSHHEAD);
256                     if (++cycle_count < 20) {
257                         goto rescan;
258                     }
259                     goto done_scan;
260             }
261             /* else: continue */
262         }
263     }
264 done_scan:
265     dow_flush_daemon_woke = lbolt;
266     /*
267      * now handle the leaf chain a second time, if new work
268      * was created due to above pruning.
269      */
270     while ((id = DOW_FLUSHNEXT(DOW_LEAF_FLUSHHEAD))
271             != DOW_LEAF_FLUSHHEAD) {
272         ASSERT((DOW_STATE(id) & (DOW_FLUSH | DOW_PRUNE))
273                 == DOW_PRUNE);
274         if (dow_pagesync_handoff) {
275             DOW_MUTEX_LOCK();
276         }
277         it (dow_pagesync_handoff) {
278             /*
279              * Perhaps because dow_flush could not
280              * perform a synchronous page push operation
281              * it had to re-enqueue the dow structure
282              * back on to the leaf chain.
283              *
284              * Set the dow_flush_daemon woke back to 0
285              * to ensure that the flush daemon gets an
286              * early wakeup in this case, and break out
287              * of the loop we are in.
288              */
289             dow_pagesync_handoff = B_FALSE;
290             dow_flush_daemon_woke = 0;
291             break;
292         }
293     }
294     DOW_FLUSH_EVENT_CLEAR();
295     DOW_MUTEX_UNLOCK();
296 }
``` fs_dow/dow_flush.c (dow_flush_daemon) Page 57

```
301  /*
302   * void
303   * dow_pagesync_daemon(void *arg)
304   *     System LWP to flush delayed page writes, if necessary, synchronously.
305   *
306   * Calling/Exit State:
307   *     The LWP blocks until signalled by the DOW system that there is
308   *     work for it to do.
309   */
310  /* ARGSUSED */
311  void
312  dow_pagesync_daemon(void *arg)
313  {
314      dowid_t id;
315
316      u.u_lwpp->l_name = "dow_pagesyncd";
317      SV_INIT(&dow_pagesync_sv);
318      DOW_MUTEX_LOCK();
319
320      for(;;) {
321          /* Wait here while there is no work to do! */
322          while ((dow_pagesync_vp == NULL) ||
323                 (dow_pagesync_off == (-1)) ) {
324              SV_WAIT(&dow_pagesync_sv, (PRIBUF + 10), &dow_mutex);
325              if (dow_unloading)
326                  lwp_exit();
327              DOW_MUTEX_LOCK();
328          }
329
330          id = dow lookup page(dow_pagesync_vp, dow_pagesync_off);
331
332          dow_pagesync_vp = NULL;
333          dow_pagesync_off = (-1);
334
335          if (id != DOW_BADID) {
336              /*
337               * Valid dow. We should proceed to flush it only if
338               * all of the following are true:
339               *     - it is a leaf level dow
340               *     - it is not GONE, IOSETUP, or INTRANS
341               *     - it is not already being flushed
342               *     - it is modified
343               */
344              if (DOW_ANY_CNT(id) == 0 &&
345                  ((DOW_STATE(id) & (DOW_MODIFIED|DOW_GONE|DOW_FLUSH|
346                   DOW_IOSETUP|DOW_INTRANS)) == DOW_MODIFIED)) {
347                  prune(id);
348                  if (dow_process_leaf_flush(id)) {
349                      DOW_MUTEX_LOCK();
350                  }
```

```
351                }
352                dow_rele_1(id);
353            }
354        } /* for (;;) */
355    }
356
357
358    /*
359     * void
360     * dow_flush(dowid_t id)
361     *      This function is called for forcing out those antecedent delayed
362     *      writes that have not been explicitly initiated (due to a
363     *      VOP_PUTPAGE or a bwrite) themselves.
364     *
365     *      WILL NOT BE ASKED TO HANDLE ABORTED or CLEAR-MODIFIED DOWIDs.
366     *      This filtering is done by the callers. dow_flush is an internal
367     *      interface and is invoked by dow_handle_sync_1, dow_setmodify,
368     *      and by the dow_flush_demon, all of which bypass calling it
369     *      if the dow state is not MODIFIED or is aborted.
370     *
371     *      Also will not be asked to handle functions.
372     *
373     *      The caller is expected to have done the dow_flush_remove() on id.
374     *
375     * Calling/Exit State:
376     *      dow_mutex held on the way in, but will be dropped before returning.
377     *
378     */
379    void
380    dow_flush(dowid_t id)
381    {
382        ASSERT(DOW_MUTEX_OWNED());
383        ASSERT(DOW_STATE(id) == (DOW_MODIFIED | DOW_FLUSH | DOW_PRUNE));
384        ASSERT((DOW_STATE(id) & DOW_GONE) != DOW_GONE);
385        ASSERT(DOW_ANT_CNT(id) == 0);
386        ASSERT((DOW_TYPE(id) == DOW_ISPAGE) || (DOW_TYPE(id) == DOW_ISBUFFER));
387
388        if (DOW_TYPE(id) == DOW_ISPAGE) {
389            {
390                vnode_t *vp;
391                off_t offset;
392            /*
393             * XXX:
394             *      NEED some debug code to test that the page
395             *      is in core ?
396             */
397                DOW_CHEAP_HOLD(id);
398                vp = DOW_VP(id);
399                offset = DOW_OFFSET(id) & PAGEMASK;
400                DOW_TIMESTAMP(id) = (clock_t)(u.u_lwpp);
```

```
401        DOW_MUTEX_UNLOCK();
402        VOP_PUTPAGE(vp, offset, PAGESIZE, B_ASYNC, sys_cred);
403        DOW_MUTEX_LOCK();
404    if ((DOW_STATE(id) & DOW_FLUSH) &&
405        (DOW_TIMESTAMP(id) == (clock_t)(u.u_lwpp))) {
406        /*
407         * The dow structure is still in a FLUSH state,
408         * and no other LWP issued a dow_flush on it since
409         * the dow_flush issued by current LWP.
410         * That must mean that the ASYNC VOP_PUTPAGE
411         * did not actuate an IO, (this can happen if
412         * either the page was no longer marked dirty or
413         * if the p_pageout bit was set). If the page is
414         * not marked dirty, we should be able to clear
415         * the DOW_MODIFIED bit on the dow, but we don't
416         * know reliably that this is the case.
417         * The safe thing to do is to follow through
418         * with a synchronous putpage request.
419         *
420         * However, if we are the dow_flush_daemon, we
421         * cannot afford to be blocked on a synchronous
422         * page push, since this can be problematic if the
423         * page is covered by more than one dow structure.
424         * (This can be the case if fs_bsize < pagesize).
425         * In that case, we will pass the request on to
426         * the dow_pagesync_daemon to handle.
427         */
428        if (u.u_lwpp == lwp_dowflushd) {
429            /*
430             * requeue the dowid, at the tail of the
431             * appropriate flush chain, release the
432             * hold and return.
433             */
434            ASSERT((DOW_STATE(id)& DOW_PRUNE) == DOW_PRUNE);
435            ASSERT((DOW_STATE(id)& DOW_GONE) == 0);
436            ASSERT(DOW_ANY_CNT(id) == 0);
437            DOW_STATE(id) &= ~DOW_FLUSH;
438            DOW_TIMESTAMP(id) = 0;
439            dow_flush_tailins(id, DOW_LEAF_FLUSHHEAD);
440            dow_pagesync_vp = vp;
441            dow_pagesync_off = DOW_OFFSET(id);
442            dow_pagesync_handoff = B_TRUE;
443            SV_BROADCAST(&dow_pagesync_sv, 0);
444            dow_rele_l(id);
445            DOW_MUTEX_UNLOCK();
446            return;
447        }
448
449        CHECK_NOTON_ANY_FLUSHCHAIN(id);
450
``` fs_dow/dow_flush.c (dow_flush) Page 60

```
451                 DOW_MUTEX_UNLOCK();
452                 VOP_PUTPAGE(vp, offset, PAGESIZE, 0, sys_cred);
453                 DOW_MUTEX_LOCK();
454                 if ((DOW_STATE(id) & DOW_FLUSH) &&
455                     (DOW_TIMESTAMP(id) == (clock_t)(u.u_lwpp))) {
456                         CHECK_NOTON_ANY_FLUSHCHAIN(id);
457                         DOW_STATE(id) &= ~(DOW_FLUSH|DOW_MODIFIED|
458                                            DOW_PRUNE);
459                         DOW_STATE(id) |= DOW_INTRANS;
460                         dow_iodone(id);
461                 }
462                 dow_rele_l(id);
463                 DOW_MUTEX_UNLOCK();
464                 return;
465         }
466         } else {
467
468                 dev_t dev;
469                 int blkno;
470                 long bsize;
471                 buf_t *bp;
472
473                 dev  = DOW_DEV(id);
474                 blkno = DOW_BLKNO(id);
475                 bsize = DOW_BSIZE(id);
476                 /*
477                  * Need a debugging mode function to be able to assert
478                  * that the buffer by this identity is in memory.
479                  *
480                  */
481                 ASSERT(BP_INCORE(dev, blkno, bsize));
482                 /*
483                  * As an optimization, we choose to call blookup,
484                  * and only if blookup fails, drop the DOW_MUTEX and
485                  * call bread. That way we can avoid the DOW_MUTEX
486                  * round trip.
487                  */
488                 if ((bp = blookup(dev, blkno, bsize)) != NULL) {
489 #ifdef ASSERTFAIL
490                         ASSERT((DOW_BP(id) == bp) || (DOW_BP(id) == NULL));
491 #endif
492                         DOW_BP(id) = bp;
493                         bp->b_writestrat = dow_strategy_buf;
494                         DOW_MUTEX_UNLOCK();
495                         bawrite(bp);
496                         return;
497                 }
498                 /*
499
500
``` fs_dow/dow_flush.c (dow_flush)

```
501      * We don't need to raise the hold on the DOW in order
502      * to ensure that while bread blocks the DOW structure
503      * does not get destroyed/freed. This is because we have
504      * already set the FLUSH state, which will keep dow_rele
505      * and/or dow_iodone from blowing us away.
506      * However, we would like to initialize the b_writestrat
507      * field after bread completes, so we should deposit a
508      * hold so that we uniformly apply the
509      * "no reference without holding" rule.
510      *
511      */
512     DOW_CHEAP_HOLD(id);
513     DOW_MUTEX_UNLOCK();
514     bp = bread(dev, blkno, bsize);
515     DOW_MUTEX_LOCK();
516     /*
517      * while the above bread blocked, we had
518      * DOW_FLUSH set: this would cause all
519      * except the flush demon to skip handling
520      * the dow; conversely, if the dow_flush
521      * was called from outside the flush demon,
522      * the demon itself will not interfere with
523      * the caller since the caller has taken the
524      * dow off leaf chain.
525      *
526      * this means that an external bwrite is the
527      * only thing that can race with this dow_flush
528      * to write it out.
529      *
530      * other events that could possibly race
531      * are: dow_abort and dow_cleanmod.
532      *
533      * both will wait while state == DOW_FLUSH,
534      * so effectively we can ignore them.
535      *
536      * WHEN we do wake up out of bread, the whole world
537      * could have changed! So we just go ahead and let
538      * bawrite (dow_strategy_buf) worry about it. We
539      * could, however, test whether MOD, FLUSH bits are
540      * off and bail out with just a brelse and perhaps
541      * a dow_iodone!
542      */
543 #ifdef ASSERTFAIL
544     ASSERT((DOW_BP(id) == bp) || (DOW_BP(id) == NULL));
545 #endif
546     bp->b_writestrat = dow_strategy_buf;
547     DOW_BP(id) = bp;
548     dow_rele_l(id);
549     DOW_MUTEX_UNLOCK();
550     bawrite(bp); /* will call dow_strategy_buf */
```

```
551        return;
552    }
553
554
555
556    /*
557     * void
558     * dow_ioflush(dowid_t id)
559     *   Complete the deferred IO push for pages/buffers on which a bwrite()
560     *   or a VOP_PUTPAGE() operation had been initiated but which could not
561     *   be written earlier due to dependencies.
562     *   For these ids, we completely trust the bp that is stored in them.
563     *   Note that the buffers in this case have not been brelse'd; their
564     *   ownership has been implicitly passed on to the dow_flush daemon.
565     *
566     * Remarks:
567     *   Handling the race between callers of dow_ioflush and those of
568     *   dow_clearmod and dow_abort:
569     *
570     *   Since IO setup work has already been done when dow_ioflush
571     *   gets called, we must go through with the IO that has already
572     *   been set up. To ensure correctness, we force dow_abort and
573     *   dow_clearmod to wait until IOSETUP state is turned off before
574     *   proceeding to clear DOW_MODIFIED state.
575     *
576     * THEREFORE, we can assert here that DOW_MODIFIED is ON.
577     */
578    void
579    dow_ioflush(dowid_t id)
580    {
581    #define DOW_FPMIO       (DOW_FLUSH | DOW_PRINF | DOW_MODIFIED | DOW_IOSETUP)
582
583        buf_t *bp;
584
585        ASSERT(DOW_MUTEX_OWNED());
586        ASSERT((DOW_STATE(id) & DOW_FPMIO) == DOW_FPMIO);
587        ASSERT(DOW_ANT_CNT(id) == 0);
588        /*
589         * DOW_IOSETUP should never be a state for functions, so we can
590         * assert that id is not a function.
591         */
592        ASSERT((DOW_TYPE(id) == DOW_ISBUFFER) || (DOW_TYPE(id) == DOW_ISPAGE));
593        ASSERT((DOW_STATE(id) & DOW_INTRANS) == 0);
594        ASSERT(DOW_HOLD(id) > 0);
595        ASSERT(on_some_flushchain(id) == B_FALSE);
596
597        /*
598         * XXX:
599         *    would like to verify that if this is a buffer cache write,
600         *    then that (a) no one (except may be self) owns the bp and
```

```
601              that (b) bp is not on the freelist.
602          */
603
604         /*
605          * before we issue the IO, we need to handle the possibility
606          * of this id being aborted. if the id has been aborted, we would
607          * not want to turn off the DOW_PRUNE state. We still submit the
608          * IO that has already been setup.
609          */
610         DOW_TIMESTAMP(id) = INT_MAX;
611
612         switch(DOW_TYPE(id)) {
613             case DOW_ISPAGE:
614                 /*
615                  * TBD: handle blocksize ( pagesize (nio > 1)
616                  *      cases, by having the buffer chain available
617                  *      in the dow structure. To do this, first
618                  *      move the buffer chain out of the dow
619                  *      structure, and then issue the strategy
620                  *      calls one-by-one.
621                  *
622                  * As each io completes, dow_pgiodone will be
623                  * called; when the last dow_pgiodone is called,
624                  * dow_iodone will be called on the dowid.
625                  */
626                 bp = dow_buffer(id);
627                 ASSERT(bp != NULL);
628                 if ((DOW_STATE(id) & DOW_GONE) == 0) {
629                     dow_startmod_wrlock_l(id);
630                     /*
631                      * during the startmod_wrlock call, we
632                      * could block. dow could get aborted
633                      * meanwhile. yet, because of the iosetup
634                      * state of the page, the dow still has a
635                      * hold and so cannot become freed until
636                      * after dow_iodone gets called.
637                      */
638                     if ((DOW_STATE(id) & DOW_GONE) {
639                         DOW_STATE(id) = (DOW_GONE | DOW_PRUNE
640                                                   | DOW_INTRANS);
641                     } else {
642                         DOW_STATE(id) = DOW_INTRANS;
643                         dow_drop_modlock_l(id);
644                     }
645                 } else {
646                     ASSERT(DOW_STATE(id) & DOW_PRUNE);
647                     DOW_STATE(id) = (DOW_GONE | DOW_PRUNE
648                                               | DOW_INTRANS);
649                 }
650                 DOW_MUTEX_UNLOCK();
```

```
                                                                            (dow_ioflush)
651                     (*bdevsw[getmajor(bp->b_edev)].d_strategy)(bp);
652                     break;
653             case DOW_ISBUFFER:
654                     bp = dow_buffer(id);
655                     if (DOW_STATE(id) & DOW_GONE) {
656                             /* assert that GONE => PRUNE */
657                             ASSERT(DOW_STATE(id) & DOW_PRUNE);
658                             DOW_STATE(id) = (DOW_GONE | DOW_PRUNE | DOW_INTRANS);
659                     } else {
660                             DOW_STATE(id) = DOW_INTRANS;
661                     }
662
663                     ASSERT(bp != NULL);
664                     DOW_MUTEX_UNLOCK();
665                     (*bdevsw[getmajor(bp->b_edev)].d_strategy)(bp);
666                     break;
667             }
668             /*
669              * stat keeping?
670              */
671             return;
672     }
673
674     /*
675      * void
676      * dow_flush_headins(dowid_t id, dowid_t fl_head)
677      *     Insert the dow "id" at the head of the indicated flush chain.
678      *
679      * Calling/Exit State:
680      *     dow_mutex held by caller, and held on return. The function
681      *     does not block or drop the lock.
682      *
683      * Remarks:
684      *     Caller has responsibility to modulate timestamp as appropriate.
685      *
686      * PERF:
687      *     Convert to a macro. Preferrably assembler macro.
688      */
689     void
690     dow_flush_headins(dowid_t id, dowid_t fl_head)
691     {
692             ASSERT(DOW_MUTEX_OWNED());
693             ASSERT(VALID_DOWID(id));
694             DOW_FLUSHNEXT(id) = DOW_FLUSHNEXT(fl_head);
695             DOW_FLUSHPREV(id) = fl_head;
696             DOW_FLUSHNEXT(fl_head) = id;
697             DOW_FLUSHPREV(DOW_FLUSHNEXT(id)) = id;
698             DOW_DEBUG_FLUSHENTER(id, fl_head);
699     }
700     /*
```

```
fs_dow/dow_flush.c                                          (dow_flush_heading)                                Page 65

701   * void
702   * dow_flush_tailins(dowid_t id, dowid_t fl_head)
703   *     Insert the dow "id" at the tail of the flush chain.
704   *
705   * Calling/Exit State:
706   *     dow_mutex held by caller, and held on return. The function
707   *     does not block or drop the lock.
708   *
709   * Remarks:
710   *     Caller has responsibility to modulate timestamp as appropriate.
711   *
712   * PERF:
713   *     Convert to a macro. Preferrably assembler macro.
714   */
715   void
716   dow_flush_tailins(dowid_t id, dowid_t fl_head)
717   {
718       ASSERT(DOW_MUTEX_OWNED());
719       ASSERT(VALID_DOWID(id));
720       DOW_FLUSHNEXT(id) = fl_head;
721       DOW_FLUSHPREV(id) = DOW_FLUSHPREV(fl_head);
722       DOW_FLUSHPREV(fl_head) = id;
723       DOW_FLUSHNEXT(DOW_FLUSHPREV(id)) = id;
724       DOW_DEBUG_FLUSHENTER(id, fl_head);
725   }
726
727   /*
728    * void
729    * dow_flush_remove(dowid_t id)
730    *     Remove the dow "id" from the flush chain.
731    *
732    * Calling/Exit State:
733    *     dow_mutex held by caller, and held on return. The function
734    *     does not block or drop the lock.
735    *
736    * PERF:
737    *     Convert to a macro. Preferrably assembler macro.
738    */
739   void
740   dow_flush_remove(dowid_t id)
741   {
742       ASSERT(DOW_MUTEX_OWNED());
743       ASSERT(VALID_DOWID(id));
744       ASSERT(on_some_flushchain(id));
745
746       DOW_FLUSHPREV(DOW_FLUSHNEXT(id)) = DOW_FLUSHPREV(id);
747       DOW_FLUSHNEXT(DOW_FLUSHPREV(id)) = DOW_FLUSHNEXT(id);
748
749       DOW_DEBUG_FLUSHLEAVE(id);
750
```

Page 65                                     (dow_flush_remove)                                    fs_dow/dow_flush.c

```
751  ]
752
753  /*
754   * void
755   * dowinit(void)
756   *     Initialize the dow subsystem.
757   *
758   * Calling/Exit State:
759   *     Should only be called during system startup - no locking issues.
760   *
761   * Description:
762   *     Initializes the dow data structures.
763   */
764  void
765  dowinit(void)
766  {
767       dow_arrayinit();        /* initialize the dow array */
768  }
769
770  /*
771   * void
772   * dowpostroot(void)
773   *     Post-root initializations.
774   *
775   * Calling/Exit State:
776   *     Called from main() after mounting root.
777   */
778  void
779  dowpostroot(void)
780  {
781       (void) spawn_lwp(NP_SYSPROC, &dow_flush_lwpid, LWP_DETACHED, NULL,
782                  dow_flush_daemon, NULL);
783
784       (void) spawn_lwp(NP_SYSPROC, &dow_pagesync_lwpid, LWP_DETACHED, NULL,
785                  dow_pagesync_daemon, NULL);
786  }
787  }
``` fs_dow/dow_handle.c                                                                                         page 67

```
 1  #ident   "@(#)kern:fs/dow_handle.c   1.2"
 2  #Ident   "$Header: $"
 3
 4  #include   <fs/dow.h>
 5  #include   <fs/fs_hier.h>
 6  #include   <io/conf.h>
 7  #include   <mem/kmem.h>
 8  #include   <mem/page.h>
 9  #include   <svc/clock.h>
10  #include   <util/cmn_err.h>
11  #include   <util/debug.h>
12  #include   <util/ghier.h>
13  #include   <util/sysmacros_f.h>
14  #include   <util/var.h>
15
16  /*
17   * void
18   * dow_handle_async(dowid_t id)
19   *
20   *      Initiate operations that would ultimately result in a
21   *      write IO for id, if some operation is not already
22   *      underway.
23   *
24   * Calling/Exit State:
25   *
26   *      Caller expected to pass in a dowid with a hold, if valid.
27   *      the hold will be not be released by this function before
28   *      it returns.
29   *
30   * Remarks:
31   *      The real work is done by dow_handle_async_l.
32   */
33  void
34  dow_handle_async(dowid_t id)
35  {
36      if (!VALID_DOWID(id))
37          return;
38      DOW_MUTEX_LOCK();
39      dow_handle_async_l(id);  /* will drop the dow mutex */
40      return;
41  }
42
43  /*
44   * void
45   * dow_handle_async_l(dowid_t id)
46   *
47   *      Initiate operations that would ultimately result in a
48   *      write IO for id, if some operation is not already
49   *      underway.
50   *
```

Page 67                                                          (dow_handle_async)

fs_dow/dow_handle.c

```
fs_dow/dow_handle.c                                          (dow_handle_async)    Page 68

51    * Calling/Exit State:
 52    *
 53    *      Caller expected to pass in a valid dowid with a hold.
 54    *      the hold will be not be released by this function before
 55    *      it returns.
 56    *      dow_mutex held on the way in, dropped before returning.
 57    */
 58   void
 59   dow_handle_async(dowid_t id)
 60   {
 61
 62        uchar_t id_state;
 63
 64        ASSERT(DOW_MUTEX_OWNED());
 65        ASSERT(VALID_DOWID(id));
 66        id_state = DOW_STATE(id);
 67        ASSERT(DOW_HOLD(id) > 0);
 68
 69        if (id_state & DOW_GONE) {
 70             ASSERT(id_state == (DOW_GONE|DOW_PRUNE));
 71             DOW_MUTEX_UNLOCK();
 72             return;
 73        }
 74        if (DOW_ANY_CNT(id) == 0) {
 75             if ((id_state & DOW_INTRANS) != 0) {
 76                  CHECK_HASH(id);
 77                  if (DOW_STATE(id) & DOW_MODIFIED) {
 78                       DOW_STATE(id) |= DOW_PRUNE;
 79                  }
 80                  DOW_MUTEX_UNLOCK();
 81                  return;
 82             }
 83             if (id_state & (DOW_IOSETUP | DOW_FLUSH)) {
 84                  ASSERT((DOW_STATE(id) & DOW_PRUNE) != 0);
 85                  if ((id_state & DOW_FLUSH) == 0) {
 86                       /* Must be IOSETUP. Flush it */
 87                       ASSERT(DOW_STATE(id) & DOW_MODIFIED);
 88                       dow_flush_remove(id);
 89                       DOW_STATE(id) |= DOW_FLUSH;
 90                       dow_ioflush(id);
 91                  } else {
 92                       /*
 93                        * FLUSH is set. This id is already being
 94                        * handled by the DOW system
 95                        */
 96                       DOW_MUTEX_UNLOCK();
 97                  }
 98                  return;
 99             }
100             if ((id_state & DOW_MODIFIED) == 0) {
```

```
101        /*
102         * This could be either because id was never
103         * modified, or it was either clear_modified
104         * or aborted.
105         */
106        dow_flush_remove(id);
107        DOW_STATE(id) |= DOW_INTRANS;
108        dow_iodone(id);
109        DOW_MUTEX_UNLOCK();
110        return;
111    }
112    /*
113     * Ensure that id gets out soon, by putting it at the
114     * head of the leaf flush chain. PRUNE may or may not be
115     * set, so we set it in any case. We want to let the flush
116     * demon take care of it since we don't want to block here.
117     */
118    dow_flush_remove(id);
119    DOW_STATE(id) |= DOW_PRUNE;
120    dow_flush_headins(id, DOW_LEAF_FLUSHHEAD);
121    DOW_MUTEX_UNLOCK();
122    return;
123
124   } /* if DOW_ANT_CNT(id) == 0 */
125
126   /* If the id has not been pruned, now is the time to do it */
127   if ((id_state & DOW_PRUNE) == 0) {
128       prune(id);
129   }
130
131   CHECK_ANTECEDENTS_PRUNED(id);
132   DOW_MUTEX_UNLOCK();
133   return;
134 }
135
136 /*
137  * void
138  * dow_handle_sync(dowid_t id)
139  *
140  * Wait until the caller's relevant modification of id has
141  * been reliably written out, after initiating operations
142  * (such as pruning a modified dow) that would ultimately
143  * result in a write IO -- if a write IO is not already
144  * underway. If write IO is generated or will be generated
145  * due to this function, then wait until the IO completes.
146  *
147  * Calling/Exit State:
148  *
```

```
fs_dow/dow_handle.c                                    (dow_handle_async_l)

151   *    Caller expected to pass in a dowid with a hold, if valid.
152   *    the hold will be not be released by this function before
153   *    it returns.
154   *
155   * Remarks:
156   *    The real work is done by dow_handle_sync_l.
157   */
158   void
159   dow_handle_async_l(dowid_t id)
160   {
161        if (!VALID_DOWID(id))
162             return;
163        DOW_MUTEX_LOCK();
164        dow_handle_sync_l(id); /* will drop the dow mutex */
165        return;
166   }
167
168   /*
169    * dow_handle_sync_l(dowid_t id)
170    *
171    * Wait until the caller's relevant modification of id has
172    * been reliably written out.
173    *
174    *
175    * Calling/Exit State:
176    *    Caller expected to pass in a dowid with a hold, if valid.
177    *    the hold will be released by this function before
178    *    it returns.
179    *    dow mutex held on the way in, dropped before returning.
180    */
181   void
182   dow_handle_sync_l(dowid_t id)
183   {
184        uchar_t id_state;
185
186        ASSERT(DOW_MUTEX_OWNED());
187        ASSERT(VALID_DOWID(id));
188        ASSERT(DOW_HOLD(id) > 0);
189        id_state = DOW_STATE(id);
190        if (id_state & DOW_GONE) {
191             ASSERT(id_state == (DOW_GONE|DOW_PRUNE));
192             DOW_MUTEX_UNLOCK();
193             return;
194        }
195        if (DOW_ANT_CNT(id) == 0) {
196             if ((id_state & DOW_INTRANS) != 0) {
197                  if (DOW_STATE(id) & DOW_MODIFIED) {
198                       DOW_STATE(id) |= DOW_PRUNE;
199                       dow_intrans_wait(id);
200                       DOW_MUTEX_LOCK();
```

```
        if (((DOW_STATE(id) & DOW_MODINTRANS) == 0) ||
            (DOW_STATE(id) & DOW_GONE)) {
            /* mission accomplished */
            DOW_MUTEX_UNLOCK();
            return;
        }
        /* else wait for IO to complete, below */ dow_intrans_wait(id);
        return;
    } if (id_state & (DOW_IOSETUP | DOW_FLUSH)) {
        ASSERT(id_state & DOW_PRUNE);
        if ((id_state & DOW_FLUSH) == 0) {
            /* Must be IOSETUP. Flush it */
            ASSERT(DOW_STATE(id) & DOW_MODIFIED);
            dow_flush_remove(id);
            DOW_STATE(id) |= DOW_FLUSH ;
            dow_ioflush(id);
            DOW_MUTEX_LOCK();
            /*
             * and then, wait below
             */
        }
        /* FLUSH is set. This id is already being */
        /* handled by the DOW system */
        dow_intrans_wait(id);
        return;
    } if ((id_state & DOW_MODIFIED) == 0) {
        /*
         * either the id was never modified, or was
         * either clear_modified or aborted.
         */
        DOW_STATE(id) |= DOW_INTRANS;
        dow_flush_remove(id);
        dow_iodone(id);
        DOW_MUTEX_UNLOCK();
        return;
    }

/*
     * Modified, and not being flushed/written. We can
     * assert that id has not been aborted, since dow_abort
     * would have cleared MODIFY, or failed to proceed
     * because of a flush in progress; but had the latter
     * been the case, the subsequent IO that has occurred would
     * have cleared MODIFY.
```

```
        /*
         * Since we can tolerate blocking, let is perform the flush
         * right here!
         */
        if (DOW_TYPE(id) & DOW_ISFUNC) {
            dow_flush_remove(id);
            DOW_STATE(id) |= (DOW_FLUSH | DOW_PRUNE);
            dow_process_leaf_func(id, NULL);
            DOW_MUTEX_UNLOCK();
            return;
        } else {
            dow_flush_remove(id);
            DOW_STATE(id) |= (DOW_FLUSH | DOW_PRUNE);
            dow_flush(id);
            DOW_MUTEX_LOCK();
            dow_intrans_wait(id);
            return;
        }
    }
    if ((id_state & DOW_PRUNE) == 0) {
        prune(id);
    } else {
        CHECK_ANTECEDENTS_PRUNED(id);
    }
    dow_lowait_l(id);
    return;
}
```

```
 1  #ident    "@(#)kern:fs/dow_io.c   1.4"
 2  #ident    "$Header: $"
 3
 4  #include    <fs/dow.h>
 5  #include    <fs/fs_hier.h>
 6  #include    <io/conf.h>
 7  #include    <mem/kmem.h>
 8  #include    <mem/page.h>
 9  #include    <svc/clock.h>
10  #include    <util/cmn_err.h>
11  #include    <util/debug.h>
12  #include    <util/ghier.h>
13  #include    <util/sysmacros_f.h>
14  #include    <util/var.h>
15
16  /*
17   * void
18   * dow_strategy_buf(buf_t *bp)
19   *
20   * Perform dow setup for a write/flush request. This is done
21   * if a dow structure exists; else, the passed in device strategy
22   * function is called directly. If a dow structure exists and
23   * has antecedents, the the passed in device strategy routine
24   * is stored in the buffer for deferred execution.
25   *
26   * Calling/Exit State:
27   *     None. Acquires and releases dow_mutex within.
28   *
29   */
30  void
31  dow_strategy_buf(buf_t *bp)
32  {
33      dowid_t id;
34
35      DOW_MUTEX_LOCK();
36      id = dow_lookup((bp->b_edev), (bp->b_blkno));
37      if (!VALID_DOWID(id)) {
38          DOW_MUTEX_UNLOCK();
39          bp->b_wrfcnstrat = NULL;
40          (*bdevsw[getmajor(bp->b_edev)].d_strategy)(bp);
41          return;
42      }
43      ASSERT((DOW_TYPE(id) == DOW_ISBUFFER);
44      ASSERT((DOW_STATE(id) & (DOW_GONE|DOW_INTRANS|DOW_IOSETUP)) == 0);
45      ASSERT(DOW_HOLD(id) > 0);
46
47      if (DOW_ANT_CNT(id) == 0) {
48          if ((DOW_STATE(id) & DOW_FLUSH) == 0) {
49              /*
50               * if this write originated externally, now is the
``` fs_dow/dow_io.c    (dow_strategy_buf)    Page 74

```
51                   * time to deque id from its flush chain.
52                   */
53  #ifdef DEBUG
54                  if (DOW_STATE(id) & DOW_PRUNE) {
55                      ASSERT(DOW_DEBUG_FLUSHID(id) == DOW_LEAF_FLUSHHEAD);
56                  } else {
57                      ASSERT(DOW_DEBUG_FLUSHID(id) == DOW_AGED_FLUSHHEAD);
58                  }
59  #endif
60                  dow_flush_remove(id);
61              }
62              CHECK_NOTON_ANY_FLUSHCHAIN(id);
63              DOW_STATE(id) -= DOW_INTRANS;
64              dow_iodone_insert(id, bp, dow_buf_iodone);
65              DOW_TIMESTAMP(id) = INT_MAX;
66              DOW_MUTEX_UNLOCK();
67              (*bdevsw[getmajor(bp->b_edev)].d_strategy)(bp);
68              return;
69          }
70      }
71      ASSERT((DOW_STATE(id) & DOW_FLUSH) == 0);
72      if ((DOW_STATE(id) & DOW_PRUNE) == 0) {
73          CHECK_ON_FLUSHCHAIN(id, DOW_AGED_FLUSHHEAD);
74          ASSERT((DOW_STATE(id) & DOW_FLUSH) == 0);
75          prune(id);
76      }
77      CHECK_NOTON_FLUSHCHAIN(id, DOW_AGED_FLUSHHEAD);
78
79      dow_iodone_insert(id, bp, dow_buf_iodone);
80      DOW_STATE(id) -= (DOW_IOSETUP | DOW_MODIFIED | DOW_PRUNE);
81      DOW_TIMESTAMP(id) = (lboll - FLUSHDELTAMAX);
82      /*
83       * since there are antecedents, we could not have come here
84       * from dow_flush. There is not much else to do; we have
85       * already pruned the id, so we can be outta here.
86       *
87       * in a sychronous bwrite call, the caller does not do a
88       * dow_intrans wait; rather, it will do a biowait() after
89       * calling this strategy function. Control will return to
90       * the caller, in that case, after the dow_iodone processing
91       * has been completed.
92       */
93      DOW_BP(id) = bp;
94      DOW_MUTEX_UNLOCK();
95      return;
96  }
97  /*
98   * THIS VERSION DOES NOT HANDLE blocksize ( pagesize. See file
99   * multi_bp_pageio for how this will be handled.
100  *
```

```
101  * ASSUMPTIONS:
102  *    blocksize >= pagesize
103  *    page clustering disabled selectively for DOW uses.
104  */
105
106 /*
107  * void
108  * dow_strategy_page(buf_t **bpp, vnode_t *vp, off_t off, int len)
109  *
110  * Perform dow setup for a page write/flush request. If a dow
111  * structure exists, and has antecedents, then the dow is marked
112  * as "IOSETUP"--i.e., ready for a deferred call to the device
113  * strategy routine. If the dow structure has no antecedents,
114  * then the IO is submitted immediately.
115  *
116  * If a dow structure corresponding to the page does not exist,
117  * then a dow structure is created. This allows the tracking of
118  * intransit pages for the DOW system, so that if a dow_create()
119  * were to occur on an in-transit page then the dow would correctly
120  * contain the "INTRANS" state. These actions are specific to
121  * page dows since a page-flush request can originate without
122  * any resource locking (unlike a buffer flush request).
123  *
124  * Finally, because multiple page write requests can be in
125  * progress at the same time (eventhough only one call to the
126  * device strategy routine can result at a time), the dow strategy
127  * routine acquires the DOW_MOD_LOCK (pseudo rwsleep lock) in
128  * the write mode in order to clear the DOW_MODIFIED state.
129  * By clearing the MODIFIED state under the cover of the DOW_MOD_LOCK,
130  * it is assured that the MODIFIED state is not set unless the
131  * page itself is MODIFIED.
132  *
133  * If the dow structure does not exist and cannot be allocated, then
134  * the write is performed immediately, but all dow_alloc's for
135  * pages are disallowed util the write completes. This is to
136  * prevent the creation of page dows with inconsistent INTRANS
137  * information.
138  *
139  * Calling/Exit State:
140  *    Caller does not hold dow mutex. Furthermore, the caller is at
141  *    basepl (though this assumption is only for convenience).
142  */
143 void
144 dow_strategy_page(buf_t **bpp, vnode_t *vp, off_t off, int len)
145 {
146     dowid_t id;
147     ASSERT((bpp != NULL) && ((*bpp) != NULL));
148
149     DOW_MUTEX_LOCK();
150
```

```
151     /*
152      * assume the caller has ensured that dow_strategy is
153      * called only for the appropriate type of pages (i.e.,
154      * directory pages, for example.)
155      */
156
157     id = dow_create_page_l(vp, off, len, DOW_NO_WAIT);
158     if (!VALID_DOWID(id)) {
159             dow_io_utp_setup(*bpp);
160             (*++untracked_pageio);
161             DOW_MUTEX_UNLOCK();
162             (*bdevsw[getmajor((*bpp)->b_edev)].d_strategy)(*bpp);
163             return;
164     }
165     ASSERT(DOW_TYPE(id) == DOW_ISPAGE);
166     /*
167      * The following assert is true under the assumption that the file
168      * system (or dow client) serializes calls to dow_strategy for the
169      * same page such that only one call can be active through upto the
170      * point that biodone processing is done.
171      */
172     ASSERT((DOW_STATE(id) & (DOW_INTRANS|DOW_IOSETUP|DOW_GONE)) == 0);
173     ASSERT(DOW_HOLD(id) > 0);
174     dow_startmod_wrlock_l(id);
175     /*
176      * on return from dow_startmod_wrlock_l, the dow could have been
177      * aborted. hence in the remainder of this function, we must explicitly
178      * account for that possibility.
179      */
180     dow_iodone_insert(id, *bpp, dow_page_iodone);
181     if (DOW_ANT_CNT(id) == 0) {
182             if ((DOW_STATE(id) & DOW_FLUSH) == 0) {
183                     /*
184                      * if this write originated externally, now is the
185                      * time to deque id from its flush chain.
186                      */
187 #ifdef DEBUG
188                     if (DOW_STATE(id) & DOW_PRUNE) {
189                             ASSERT(DOW_DEBUG_FLUSHID(id) == DOW_LEAF_FLUSHHEAD);
190                     } else {
191                             ASSERT(DOW_DEBUG_FLUSHID(id) == DOW_AGED_FLUSHHEAD);
192                     }
193 #endif
194                     dow_flush_remove(id);
195             }
196             if (DOW_STATE(id) & DOW_GONE) {
197                     DOW_STATE(id) = (DOW_GONE | DOW_PRUNE | DOW_INTRANS);
198             } else {
199                     DOW_STATE(id) = DOW_INTRANS;
200                     dow_drop_modlock_l(id);
``` fs_dow/dow_io.c                    (dow_strategy_page)                    Page 77

```
201                }
202                DOW_TIMESTAMP(id) = INT_MAX;
203                DOW_MUTEX_UNLOCK();
204                (*bdevsw[getmajor((*bpp)->b_edev)].d_strategy)(*bpp);
205                return;
206        }
207        if ((DOW_STATE(id) & DOW_PRUNE) == 0) {
208                CHECK_ON_FLUSHCHAIN(id, DOW_AGED_FLUSHHEAD);
209                ASSERT((DOW_STATE(id) & (DOW_FLUSH|DOW_IOSETUP|DOW_GONE)) == 0);
210                prune(id);
211        }
212        CHECK_NOTON_FLUSHCHAIN(id, DOW_AGED_FLUSHHEAD);
213        /*
214         * So we have antecedents. We could not have come here from the
215         * flush daemon in that case. Nor could flush demon have started on us.
216         */
217        ASSERT((DOW_STATE(id) & DOW_FLUSH) == 0);
218
219        /*
220         * EVENTHOUGH WE ARE NOT ABOUT TO TURN ON INTRANS, we keep MODIFIED
221         * OFF if DOW_GONE is set. This is because DOW_GONE was set AFTER
222         * all existing modifications that held relevance to the dow subsystem
223         * had already cleared. After the state is set to DOW_GONE, we do
224         * not allow the creation of new antecedents anyway, so it is not
225         * clear how we might end up here with a write unless the dow client
226         * has done nothing to ensure this does not happen.
227         *
228         * The current write has originated externally and coincidentally
229         * found the aborted DOW structure in that case! So we just do what
230         * we must -- pass the write along, but don't infer MODIFY.
231         */
232        if (DOW_STATE(id) & DOW_GONE) {
233                DOW_STATE(id) = (DOW_IOSETUP|DOW_GONE|DOW_PRUNE);
234        } else {
235                DOW_STATE(id) = (DOW_IOSETUP|DOW_MODIFIED|DOW_PRUNE);
236                dow_drop_modlock_l(id);
237        }
238
239        DOW_BP(id) = (*bpp);
240        DOW_MUTEX_UNLOCK();
241        /*
242         * In a synchronous VOP_PUTPAGE, the caller will do the biowait
243         * on each of the buffers that comprise the page. Therefore, by
244         * the time that the last biowait completes, dow_iodone will get
245         * called for the dowid. So we don't need to do a dow_intrans_wait
246         * in here.
247         */
248        return;
249 }
250 }
```

Page 77                            (dow_strategy_page)                    fs_dow/dow_io.c

```
      /*
       * dow_buf_iodone(buf_t *bp)
       *      Perform the chained iodone action for a dow on completion of a
       *      buffer write.
       *
       * Calling/Exit State:
       *      Called at interrupt level from biodone. Acquires and releases
       *      dow_mutex.
       */
      void
      dow_buf_iodone(buf_t *bp)
      {
              dowid_t id;
              pl_t savepl;
              savepl = DOW_MUTEX_LOCK();
              id = DOW_P_TO_ID((bp->b_misc));
              ASSERT(VALID_DOWID(id));
              ASSERT(DOW_HOLD(id) > 0);
              ASSERT(DOW_DEV(id) == bp->b_edev);
              ASSERT(DOW_BLKNO(id) == bp->b_blkno);
              ASSERT(DOW_TYPE(id) == DOW_TSBUFFER);
              CHECK_NOTON_ANY_FLUSHCHAIN(id);
              DOW_CHEAP_RELE(id);
              dow_iodone_restore(id, bp);
              dow_iodone(id);
              DOW_MUTEX_UNLOCK_SAVEPL(savepl);
              biodone(bp);
      }

/*
       * dow_page_iodone(buf_t *bp)
       *      Perform the chained iodone action for a dow on completion of a
       *      page write.
       *
       * Calling/Exit State:
       *      Called at interrupt level from biodone. Acquires and releases
       *      dow_mutex.
       */
      void
      dow_page_iodone(buf_t *bp)
      {
              dowid_t id;
              pl_t savepl;
```

```
301        savepl = DOW_MUTEX_LOCK();
302        id = DOW_P_TO_ID((bp->b_misc));
303        ASSERT(VALID_DOWID(id));
304        ASSERT(DOW_HOLD(id) > 0);
305        ASSERT(DOW_VP(id) == bp->b_pages->p_vnode);
306        ASSERT(((bp->b_flags & B_PAGEIO) &&
307                (DOW_OFFSET(id) == ((off_t)(bp->b_pages->p_offset) +
308                (off_t)(bp->b_un.b_addr))))
309             || ((DOW_OFFSET(id) == ((off_t)(bp->b_pages->p_offset) +
310                ((unsigned long)(bp->b_un.b_addr)) & PAGESIZE)))));
311        ASSERT(DOW_TYPE(id) == DOW_ISPAGE);
312        CHECK_NOTON_ANY_FLUSHCHAIN(id);
313        DOW_CHEAP_RELE(id);
314        dow_iodone_restore(id, bp);
315        dow_iodone(id);
316        DOW_MUTEX_UNLOCK_SAVEDPL(savepl);
317        biodone(bp);
318 }
319
320 /*
321  * void
322  * dow_untracked_pageio_iodone(buf_t *bp)
323  *
324  * Perform the chained iodone action for a dow on completion of a
325  * page write, for which no dow was created (because of dow resource
326  * exhaustion).
327  *
328  * Calling/Exit State:
329  *     Called at interrupt level from biodone. Acquires and releases
330  *     dow_mutex.
331  */
332 void
333 dow_untracked_pageio_done(buf_t *bp)
334 {
335     pl_t savepl;
336     /*
337      * handle untracked page io protocol.
338      *
339      * pass on to other iochain processing.
340      */
341     savepl = DOW_MUTEX_LOCK();
342     (--untracked_pageio);
343     dow_io_utp_rele(bp);
344     DOW_MUTEX_UNLOCK_SAVEDPL(savepl);
345     biodone(bp);
346 }
347
348 /*
349  * void
350  * dow_iodone(dowid_t id)
```

```
     /*
      * On write IO completion, (a) issue wakeups to LWPs that are in
      * dow_intrans_wait, (b) break dependencies and (c) execute actions
      * that can be, but need not be, deferred to the dow_flush_demon,
      * for new leaf dows that are created as a result of (b).
      *
      * Calling/Exit State:
      *    dow_mutex held by caller. caller ensures that the dowid is held
      *    if necessary. This function is called at interrupt level, and cannot
      *    block.
      */
     void
     dow_iodone(dowid_t id)
     {
             dowlinkid_t     headlink, link;
             dowid_t dep;

ASSERT(DOW_MUTEX_OWNED());
             ASSERT(VALID_DOWID(id));
             ASSERT(EMPTY_IODONE_LINKAGE(id));
             DOW_STATE(id) &= ~DOW_INTRANS;
             ASSERT((DOW_STATE(id) & (DOW_FLUSHINTRANS|DOW_IOSETUP)) == 0);
             CHECK_NOTON_ANY_FLUSHCHAIN(id);

headlink = DOWLINK_DEP_LINKHEAD(id);
             CHECK_DOWLINK_CHAIN(headlink);
             while (0 < DOW_DEP_CNT(id)) {
                     link = DOWLINK_NEXT(headlink);
                     ASSERT(headlink != link);
                     dep = DOWLINK_DOWID(link);
                     CHECK_DOWLINK_CHAIN(DOWLINK_ANT_LINKHEAD(dep));
                     ASSERT(DOW_ANT_CNT(dep) > 0);
                     ASSERT(id == DOWLINK_DOWID(DOWLINK_INVERSE(link)));
                     dowlink_breaklink(link, dep, id);
                     if (DOW_ANT_CNT(dep) > 0) {
                             continue;
                     }
                     /*
                      * the dependent itself is a leaf level dow. proceed to
                      * handle it if it can be processed right away, OR, if
                      * cannot be processed queue it up on the proper
                      * flush chain.
                      */
                     dow_flush_remove(dep);
                     dow_process_leaf_iodone(dep);

} /* while */

/*
              * we have handled all the dependent links. next we need to:
```

```
401         *    - if (hold --> 0) free the dow structure
402         *    - otherwise:
403         *         - signal blocked waiters
404         *         - if PRUNE'd and MODIFIED, reinsert on the leaf
405         *             flush chain
406         *         - else if GONE, then turn off MODIFY, unhash and
407         *             put away on the PRUNE list (no one looks at it)
408         *         - else turn off all states except MODIFY, and
409         *             insert on the tail of the aged flush chain.
410         */
411        ASSERT(DOW_MUTEX_OWNED());
412        ASSERT(DOW_DEP_CNT(id) == 0);
413        ASSERT(EMPTY_DOWLINK_LIST(headlink));
414        if (DOW_STATE(id) & DOW_GONE) {
415            ASSERT(DOW_STATE(id) == (DOW_PRUNE | DOW_GONE));
416            CHECK_HASH_REMOVED(id);
417            if (DOW_HOLD(id) > 0) {
418                if (DOW_SV_BLKD(id)) {
419                                        /* wakeup blocked waiters */
420                    DOW_SV_BROADCAST(id);
421                }
422                dow_flush_tailins(id, DOW_PRUN_FLUSHHEAD);
423                CHECK_ANTECDENTS_PRUNED(id);
424                return;
425            } else {
426                ASSERT(!DOW_SV_BLKD(id));
427                dow_free(id);
428                return;
429            }
430        }
431        CHECK_HASH(id);
432        if (DOW_HOLD(id) == 0) {
433            /* there should be no blocked waiters. */
434            ASSERT(!DOW_SV_BLKD(id));
435            dow_remhash(id);
436            if (DOW_TYPE(id) == DOW_ISPAGE) {
437                VN_SOFTRELE(DOW_VP(id));
438            }
439            dow_free(id);
440            return;
441        }
442        if (DOW_STATE(id) & DOW_PRUNE) {
443            if (DOW_STATE(id) & DOW_MODIFIED) {
444                dow_flush_tailins(id, DOW_LEAF_FLUSHHEAD);
445            } else {
446                /*
447                 * someone turned on the PRUNE bit while last
448                 * IO was in progress; no MOD state was deposited,
449                 * however. Furthermore, this dow has not been
450                 * aborted since DOW_GONE was checked earlier.
```

```
451                 * just turn it back off and send this id to
452                 * aged list. Since we got rid of all of its
453                 * dependents, it is okay to turn off the PRUNE
454                 * bit since the protocol that "entire subtree
455                 * under a pruned dow is maintained pruned" is
456                 * not violated.
457                 */
458                DOW_STATE(id) &= ~DOW_PRUNE;
459                dow_flush_tailins(id, DOW_AGED_FLUSHHEAD);
460        }
461    } else {
462            DOW_STATE(id) &= ~DOW_PRUNE;
463            /* leave existing timestamp alone */
464            dow_flush_tailins(id, DOW_AGED_FLUSHHEAD);
465    }
466
467    if (DOW_SV_BLKD(id)) {
468            /* wakeup blocked waiters */
469            DOW_SV_BROADCAST(id);
470    }
471    return;
472 }
473
474 /*
475  * void
476  * dow_iodone_insert(dowid_t id, buf_t *bp, void (*iodonefunc)())
477  * Insert the function "iodonefunc" on the iodone chain
478  * for the buffer indicated by bp.
479  *
480  * Calling/Exit State:
481  *    Dow mutex is held by the caller.
482  */
483 void
484 dow_iodone_insert(dowid_t id, buf_t *bp, void (*iodonefunc)())
485 {
486    ASSERT(EMPTY_IODONE_LINKAGE(id));
487    DOW_B_IODONE(id) = (void (*)())(bp->b_iodone);
488    DOW_B_IOCHAIN(id) = (void *)(bp->b_misc);
489    bp->b_iodone = iodonefunc;
490    bp->b_misc = DOW_ID_TO_P(id);
491 }
492
493 /*
494  * void
495  * dow_iodone_restore(dowid_t id, buf_t *bp)
496  * Restore the iodone chain in the buffer bp after unlinking
497  * the dow_iodone action.
498  *
499  * Calling/Exit State:
500  *    Dow mutex is held by the caller who is at interrupt level.
```

```
fs_dow/dow_io.c                                          (dow_iodone_insert)                    Page 83

501   */
502   void
503   dow_iodone_restore(dowid_t id, buf_t *bp)
504   {
505       ASSERT((!EMPTY_IODONE(id)));
506       bp->b_iodone = DOW_B_IODONE(id);
507       bp->b_misc = DOW_B_IOCHAIN(id);
508       DOW_DEBUG_IODONE_INIT(id);
509   }
510
511   /* buf_t *
512    * dow_buffer(dowid_t id)
513    *    Return the buffer associated with the indicated dow.
514    *
515    * Calling/Exit State:
516    *    Called under dow_mutex cover.
517    *
518    */
519   buf_t *
520   dow_buffer(dowid_t id)
521   {
522       ASSERT(DOW_STATE(id) & DOW_IOSETUP);
523       return (DOW_BP(id));
524   }
525
526   /* void
527    * dow_bdwrite(buf_t *bp)
528    *    Perform a bdwrite in conjunction with setting up the
529    *    dow write strategy indirection for the a future
530    *    bwrite/bawrite call.
531    *
532    * Calling/Exit State:
533    *    Called under dow_mutex cover.
534    *
535    */
536   void
537   dow_bdwrite(buf_t *bp)
538   {
539       bp->b_writeatrat = dow_strategy_buf;
540       bdwrite(bp);
541   }
```

Page 83                                                  (dow_bdwrite)                    fs_dow/dow_io.c

```
  1  #ident  "@(#)kern:fs/dow_leaf.c 1.2"
  2  #ident  "$Header: $"
  3
  4  #include    <fs/dow.h>
  5  #include    <fs/fs_hier.h>
  6  #include    <io/conf.h>
  7  #include    <mcm/kmcm.h>
  8  #include    <mem/page.h>
  9  #include    <svc/clock.h>
 10  #include    <util/cmn_err.h>
 11  #include    <util/debug.h>
 12  #include    <util/ghier.h>
 13  #include    <util/sysmacros_f.h>
 14  #include    <util/var.h>
 15
 16  /*
 17   * void
 18   * dow_process_leaf_func(dowid_t leafid, void (*called_from)(dowid_t))
 19   *
 20   *    Process a leaf level dow that represents a function. Called either
 21   *    as a result of the last antecedent going away (during iodone
 22   *    processing) or from flush demon or handle
 23   *    routines that want to execute the leaf level dow function.
 24   *
 25   *    This function is written with the knowledge that (a) a function dow
 26   *    has no dependents and (b) that it should not be pushed to the aged
 27   *    list, since functions are to be executed in a timely manner.
 28   *
 29   * Calling/Exit State:
 30   *    dow_mutex held on entry. May need to be dropped if the function is
 31   *    a blocking function.
 32   *
 33   *    If called_from == dow_iodone, then the dow_mutex is not dropped,
 34   *    and if the function can be executed without blocking then it is
 35   *    executed. dow_mutex is held on return.
 36   *
 37   *    Otherwise, the function will be executed (subject to its MOD state
 38   *    being set). The dow_mutex will be reacquired before returning.
 39   *
 40   *    Caller is expected to have removed the leafid from any flush chain
 41   *    that it may have been on.
 42   */
 43  void
 44  dow_process_leaf_func(dowid_t leafid, void (*called_from)(dowid_t))
 45  {
 46      void (*funcp)();
 47      void *argp;
 48
 49      ASSERT(DOW_MUTEX_OWNED());
 50
``` fs_dow/dow_leaf.c                                                  (dow_process_leaf_func)                                    Page 85

```
51          ASSERT(VALID_DOWID(leafid));
52          ASSERT(DOW_DEP_CNT(leafid) == 0);
53          ASSERT(DOW_TYPE(leafid) & DOW_ISFUNC);
54          /*
55           * we should either never be aborting a function, or be doing the
56           * abort synchronously since functions can themselves have no
57           * dependents. In that case, no one should ever get here with an
58           * dowid that is marked DOW_GONE.
59           */
60          ASSERT((DOW_STATE(leafid) & (DOW_GONE|DOW_INTRANS)) == 0);
61          CHECK_NOTON_ANY_FLUSHCHAIN(leafid);
62          CHECK_HASH(leafid);
63
64          if (DOW_STATE(leafid) & DOW_MODIFIED) {
65              if (DOW_TYPE(leafid) == DOW_ISFUNC_NBLK) {
66
67                  funcp = DOW_FUNC(leafid);
68                  argp  = DOW_ARGP(leafid);
69                  (*funcp)(argp);
70
71                  goto done_execute;
72
73              if (called_from == dow_iodone) {
74                  /*
75                   * can't handle this dow, since we can't block
76                   * and the function is a potentially blocking one.
77                   * let dow_flush_demon handle it.
78                   */
79                  ASSERT((DOW_STATE(leafid) & DOW_FLUSH) == 0);
80                  DOW_STATE(leafid) |= DOW_PRUNE;
81                  dow_[flush_heading(leafid, DOW_LEAF_FLUSHHEAD);
82                  return ;
83              }
84              /*
85               * we will need to drop the mutex before we can execute the
86               * function, in preparation, we set the "DOW_INTRANS" state
87               */
88              DOW_STATE(leafid) |= DOW_INTRANS;
89              funcp = DOW_FUNC(leafid);
90              argp  = DOW_ARGP(leafid);
91              DOW_MUTEX_UNLOCK();
92              (*funcp)(argp);
93              DOW_MUTEX_LOCK();
94
95              goto done_execute;
96
97          }
98          /*
99           * else: DOW_MODIFIED == 0, we have these alternatives:
100          *
```

Page 85                                                            (dow_process_leaf_func)                          fs_dow/dow_leaf.c

```
101      *  1. treat it as a "clear-modified/aborted" case, whereby we just
102      *     proceed to handle it as a dow whose execution has already
103      *     happened.
104      *
105      *  2. a problem with (1) is that it requires that in the usual case
106      *     (no abort/clear-mod), we must never have a function dow that is
107      *     marked as unmodified -- i.e., dow_create_func must perform
108      *     dow setmod. but that is unacceptable, since the client expects
109      *     to control the firing of this function in relation to some other
110      *     setup work being completed (i.e, only after dow_order has
111      *     completed). but we cannot push the function dow to the aged list
112      *     either, since then we don't have a guarantee about who will do
113      *     the final release of the dow (i.e., not being able to distinguish
114      *     between whether a clear-mod was called or whether a set-mod was
115      *     _not_ called.)
116      *
117      *  3. owing to complications (1) and (2), we handle such dows just a
118      *     little differently as follows: we assume that for a function
119      *     dow, if it is NOT MODIFIED and NOT HELD, then it can be treated
120      *     as having been clear-modified; else we should treat it as a
121      *     dow on which a set-modify may yet happen. In this case, when
122      *     the final dow_rele does come through and it finds the function
123      *     dow in a clear-mod state, it just gets rid of it (which is
124      *     appropriate, for it would do the same for any dow that has no
125      *     dependents).
126      *
127      *     Thus we choose alternative (3). See comment in dow_rele_1() for
128      *     function dows.
129      */
130     if (DOW_HOLD(leafid) == 0) {
131         DOW_STATE(leafid) = 0;
132         goto done_execute;
133     }
134
135     DOW_STATE(leafid) &= ~DOW_PRUNE;
136     DOW_TIMESTAMP(leafid) = INT_MAX; /* unmodified, so doesn't matter */
137     dow_flush_tailing(leafid, DOW_AGED_FLUSHHEAD);
138     return;
139
140 done_execute:
141     /*
142      * basically, this is specialized lodone processing for functions.
143      */
144     ASSERT(DOW_MUTEX_OWNED());
145     dow_remhash(leafid);
146     DOW_STATE(leafid) = ~(DOW_GONE|DOW_PRUNE);
147     if (DOW_HOLD(leafid) > 0) {
148         if (DOW_SV_BLKD(leafid)) {
149             DOW_SV_BROADCAST(leafid);
150         }
```

```
fs_dow/dow_leaf.c                                      (dow_process_leaf_func)            Page 87

151             /*
152              * let dow_rele complete the job of freeing.
153              */
154             dow_flush_headins(leafid, DOW_PRUN_FLUSHHEAD);
155         } else {
156             ASSERT(DOW_SV_BLKD(leafid));
157             dow_free(leafid);
158         }
159         return;
160     }
161
162     /*
163      * dow_process_leaf_iodone(dowid_t id)
164      *
165      * Called from dow_iodone to process each new leaf dow that
166      * results from breaking dependence links.
167      * Caller is expected to have removed the leafid from any
168      * flush chain that it may have been on.
169      *
170      * Calling/Exit State:
171      * Called with dow_mutex held, returns with same held, never
172      * dropping it.
173      *
174      */
175     void
176     dow_process_leaf_iodone(dowid_t id)
177     {
178         ASSERT(DOW_MUTEX_OWNED());
179         ASSERT((DOW_STATE(id) & DOW_FLUSHINTRANS) == 0);
180         CHECK_NOTON_ANY_FLUSHCHAIN(id);
181         /* Handover function dows to dow_process_leaf_func to do. */
182         if (DOW_TYPE(id) & DOW_ISFUNC) {
183             dow_process_leaf_func(id, &dow_iodone);
184             ASSERT(DOW_MUTEX_OWNED());
185             return;
186         }
187
188         if ((DOW_STATE(id) & DOW_PRUNE) == 0) {
189             ASSERT((DOW_STATE(id) & (DOW_GONE|DOW_FLUSH|DOW_IOSETUP)) == 0);
190             if ((DOW_HOLD(id) == 0) && (DOW_DRP_CNT(id) == 0)) {
191                 dow_remhash(id); /* 1 DOW_GONE, but to be freed */
192                 if (DOW_TYPE(id) == DOW_ISPAGE) {
193                     VN_SOFTRELE(DOW_VP(id));
194                 }
195                 dow_free(id);
196                 return;
197             }
198             /*
199              * We need to ensure that we should not be here and have
200              * waiters blocked on IO completion for id! (Though this
```

```
201          * is tolerable, it is not good, particularly if the id
202          * is unmodified). With modified ids, we expect that anyone
203          * that waits does so after pruning the id. leave the
204          * existing timestamp on the id unchanged.
205          */
206         dow_flush_taillins(id, DOW_AGED_FLUSHHEAD);
207         return;
208     }
209     /* else: pruned */
210     if (DOW_STATE(id) & (DOW_IOSETUP|DOW_MODIFIED)) {
211         if (DOW_STATE(id) & DOW_IOSETUP) {
212             dow_flush_headins(id, DOW_LEAF_FLUSHHEAD);
213         } else {
214             dow_flush_taillins(id, DOW_LEAF_FLUSHHEAD);
215         }
216         return;
217     }
218     /*
219      * PRUNE'd, but !MOD, !INTRANS, !IOSETUP, !FLUSH. May/Maynot be GONE.
220      *
221      *           IF GONE:
222      *
223      * we want to do what dow_iodone might normally do for a GONE or
224      * clear-modified dow, without calling it recursively from here.
225      * so we do the following:
226      *
227      *    HOLD == 0, DEP_CNT == 0 : unhash and free
228      *    HOLD != 0, DEP_CNT == 0 : unhash, put on pruned list
229      *                              dow_rele will get rid of it
230      *    DEP_CNT > 0 :             don't unhash. put back on
231      *                              the leaf chain so that
232      *                              dow_iodone will be called on
233      *                              it later.
234      *
235      *    IF !GONE : Must be either clear-modified or
236      *               not yet set-modified. In either case,
237      *               we can let the flush demon handle the
238      *               appropriate signalling of waiters, etc.
239      *               We take care of the simple case here.
240      *
241      *    HOLD == 0, DEP_CNT == 0 : unhash and free
242      *    Otherwise:                : reinsert to leaf flush tail.
243      */
244     ASSERT(DOW_MUTEX_OWNED());
245     if (DOW_STATE(id) & DOW_GONE) {
246         CHECK_HASH_REMOVED(id);
247         if (DOW_DEP_CNT(id) > 0) {
248             dow_flush_taillins(id, DOW_LEAF_FLUSHHEAD);
249             return;
250         }
```

```
251            }
252            if (DOW_HOLD(id) > 0) {
253                dow_flush_tailing(id, DOW_PRUN_FLUSHHEAD);
254                return;
255            }
256            ASSERT(IDOW_SV_BLKD(id));
257            dow_free(id);
258            return;
259        }
260        CHECK_HASH(id);
261        if ((DOW_DEP_CNT(id) == 0) &&
262            (DOW_HOLD(id) == 0)) {
263            dow_remhash(id);
264            ASSERT(IDOW_SV_BLKD(id));
265            if (DOW_TYPE(id) == DOW_ISPAGE) {
266                VN_SOFTRELE(DOW_VP(id));
267            }
268            dow_free(id);
269            return;
270        }
271        dow_flush_tailing(id, DOW_LEAF_FLUSHHEAD);
272        return;
273    }
274    
275    /*
276     * boolean_t
277     * dow_process_leaf_flush(dowid_t id)
278     *    Perform the appropriate flush actions for a dow that has no
279     *    antecedents.
280     *
281     *    Called with dow_mutex held. May drop it before returning.
282     *    return: B_TRUE if DOW_MUTEX dropped.
283     *
284     *    Caller has NOT removed the id from the leaf flush chain; also,
285     *    it must only be on the leaf flush chain.
286     *
287     * Calling/Exit State:
288     *    Caller hold dow_mutex, which is dropped if either flush/ioflush
289     *    actions need to performed.
290     */
291    boolean_t
292    dow_process_leaf_flush(dowid_t id)
293    {
294        ASSERT(DOW_MUTEX_OWNED());
295        /*
296         * The caller of this procedure has obtained id from the
297         * leaf flush chain. Therefore, we can be certain that no one
298         * else is currently flushing this dowid. Furthermore, we can
299         * be certain that the id has been pruned.
300         */
```

```
301        CHECK_ON_FLUSHCHAIN(id, DOW_LEAF_FLUSHHEAD);
302        ASSERT((DOW_STATE(id) & (DOW_FLUSHINTRANS|DOW_PRUNE)) == DOW_PRUNE);
303 #ifdef DEBUG
304        ASSERT(DOW_DEBUG_FLUSHID(id) == DOW_LEAF_FLUSHHEAD);
305 #endif
306        dow_flush_remove(id);
307        DOW_STATE(id) |= DOW_FLUSH;
308        if ((DOW_TYPE(id) & DOW_ISFUNC) {
309            if ((DOW_STATE(id) & DOW_GONE) == 0) {
310                dow_process_leaf_func(id, NULL);
311                ASSERT(DOW_MUTEX_OWNED());
312                return (B_FALSE);
313            }
314            CHECK_HASH_REMOVED(id);
315            dow_iodone(id);
316            return (B_FALSE);
317        }
318        if (DOW_STATE(id) & DOW_IOSETUP) {
319            dow_ioflush(id);
320            return(B_TRUE);
321        } else if (DOW_STATE(id) & DOW_MODIFIED) {
322            dow_flush(id);
323            return(B_TRUE);
324        } else {
325            /*
326             * !function, !IOSETUP, !MODIFIED, but PRUNE'd.
327             * may be GONE. In either case (whether GONE or
328             * not), the treatment is identical:
329             *       call dow_iodone
330             */
331            if (DOW_STATE(id) & DOW_GONE) {
332                DOW_STATE(id) |= (DOW_GONE|DOW_PRUNE|DOW_INTRANS);
333                CHECK_HASH_REMOVED(id);
334            } else {
335                DOW_STATE(id) |= DOW_INTRANS;
336                CHECK_HASH(id);
337            }
338            dow_iodone(id);
339            return(B_FALSE);
340        }
341    }
342 }
```

```
 1  #ident   "@(#)kern:fs/dow_order.c   1.4"
 2  #ident   "$Header: $"
 3
 4  #include   <fs/dow.h>
 5  #include   <fs/fs_hier.h>
 6  #include   <io/conf.h>
 7  #include   <mem/kmem.h>
 8  #include   <mem/page.h>
 9  #include   <svc/clock.h>
10  #include   <util/cmn_err.h>
11  #include   <util/debug.h>
12  #include   <util/qhfer.h>
13  #include   <util/sysmacros_f.h>
14  #include   <util/var.h>
15  /*
16   * dow_order family of subroutines. dow_order_nowait provides the
17   * necessary base implementation; all waiting is done outside, in
18   * dow_order_nowait and dow_order routines.
19   */
20  /*
21   * In all success-but-no-link-established cases, we may want to take
22   * care of functions.
23   */
24  /*
25   * General Notes:
26   *
27   *    1. If either of the dowids is invalid, dow_order returns
28   *       successfully without making the specified linkage. The
29   *       rest of this discussion pertains to the case when
30   *       both dowids are valid.
31   *
32   *    2. The caller is expected to maintain a hold on each dowid
33   *       before calling dow_order.
34   *
35   *    3. The dow protocol ensures:
36   *
37   *       (a)   DOW_FLUSH     => DOW_PRUNE
38   *             DOW_IOSETUP   => DOW_PRUNE
39   *             DOW_GONE     => DOW_PRUNE
40   *
41   *             That is, if a dow is picked for flushing by the
42   *             dow_flush_demon, then all of its antecedents
43   *             must be flushed before the dow is flushed. Also,
44   *             if dow_strategy is called for a dow, then again
45   *             all its antecedents must be flushed before
46   *             the dow can be flushed. In both instances, the
```

```
 51  *      protocols followed by dow_flush_demon and dow_strategy
 52  *      will ensure that this is done by pruning the
 53  *      dependency subtree that is rooted at the dow.
 54  *
 55  *      dow_abort will also participate in this protocol.
 56  *
 57  * (b)  If any dow is pruned, then all its dependents current
 58  *      and future will be pruned as well. This has implications
 59  *      on dow_order.
 60  *
 61  * (c)  When a disk write does take place, a dow reverts
 62  *      to the non-pruned state.
 63  *
 64  * (d)  DOW_INTRANS    => ~(DOW_FLUSH | DOW_IOSETUP | DOW_MODIFIED)
 65  *
 66  * 4.   In establishing a link, it is of interest whether the
 67  *      *relevant* modification of the antecedent has already
 68  *      been flushed to the disk; if so, the linkage is not
 69  *      necessary (and should not be made, if no event can be
 70  *      guaranteed to occur that can break the link).
 71  *      Similarly, if the dependent is already being written
 72  *      to disk, then linking cannot be completed until the
 73  *      dependent write completes -- otherwise, the impending
 74  *      modification of the dependent can become flushed to
 75  *      disk while the antecedent is yet to be flushed.
 76  *      These yield the following:
 77  *
 78  *      IF antecedent is in state:
 79  *
 80  *          MODIFIED, but not INTRANS: The relevant modification of
 81  *              the antecedent may not be written to disk. So
 82  *              a link should be created unless the dependent
 83  *              is INTRANS.
 84  *
 85  *          INTRANS, but not MODIFIED: The relevant modification is
 86  *              being written (potentially), and we could definitely
 87  *              conclude that it is written when the current write
 88  *              completes. Either we wait for the write to complete
 89  *              before making the link, or create the link and let
 90  *              the write completion remove the created link.
 91  *
 92  *              We follow the protocol that at write completion,
 93  *              all dependency links are removed. To ensure the
 94  *              correctness of this, we handle the next case
 95  *              specially-
 96  *
 97  *          INTRANS and MODIFIED: Since the relevant modification of
 98  *              the antecedent cannot be assumed to be written to
 99  *              disk on completion of the current write, we cannot
100  *              allow the removal of the dependency link in this
```

```
101  *         case. Therefore, if we made the desired linkage,
102  *         then the link would need to be flagged specially
103  *         so that write-completion does not remove it.
104  *         Instead, we elect not to make the link (or wait
105  *         until IO completes in order to make the requested
106  *         link).
107  *
108  *     not INTRANS and not MODIFIED: The relevant modification
109  *         has already been reflected to disk; therefore,
110  *         there is no need to establish the link.
111  *
112  *  If dependent is in state:
113  *
114  *     FLUSH or INTRANS: The dependent is about to be written.
115  *         So do not establish a linkage until after the
116  *         write completes. (The modification of the
117  *         dependent that we do not want to write to disk
118  *         ahead of the antecedent is yet to occur so the
119  *         current write of the dependent is benign).
120  *
121  *  In addition to the above, these special conditions need to
122  *  be handled:
123  *
124  *     antecedent GONE: (i.e., aborted): In this instance,
125  *         there is no constraint on the scheduling of
126  *         a write for the dependent. So we return
127  *         success without creating the linkage.
128  *
129  *     dependent GONE: If the antecedent has not been aborted,
130  *         then any pending write for it must be forced out.
131  *         The linkage itself is not made, but the attempt
132  *         is treated as a failure unless the antecedent write
133  *         is not waited for.
134  *
135  *  The above rules (for the abort cases) could be applied in
136  *  reverse, so that the dependent GONE => success and
137  *  antecedent GONE => failure/wait. We have elected the
138  *  first set of rules because dependent modifications
139  *  are typically expected to occur in the future while
140  *  antecedent modifications have already occurred and so
141  *  can be flushed out right now.
142  *
143  *     dependent PRUNE: This state suggests that there is an
144  *         urgency about scheduling a disk write for the
145  *         dependent -- either because some write was
146  *         initiated for the dependent or its dependents
147  *         and cannot complete unless the dependent write
148  *         itself completes. In such cases, we would like
149  *         to ensure that any links we create also
150  *         carry this urgency forward to the new antecedents
```

```
         *           to be added. An alternative may have been to
         *           treat this similarly to dependent being in
         *           INTRANS or FLUSH states (and so waiting for
         *           dependent write to complete); but we can get
         *           better write caching by making the link right now.
         *           So, if we make the link, we must ensure that
         *           the antecedent is in a PRUNE state as well.
         */
         int
         dow_order_nowait(dowid_t dep_id, dowid_t ant_id)
         /*
          * Establish the desired dependency linkage. Do not block
          * -- return with appropriate failure indication if the
          *    dependency could not be established either because
          *    the status of the antecedent or dependent DOW structures
          *    indicated IOs in progress or because of a potential
          *    dependency cycle or because of lack of linkage resources.
          *
          * Calling/Exit State:
          *    dow_mutex is held by caller. Never dropped. If the id's are
          *    not invalid, they have positive hold counts. The following
          *    codes are returned by the function:
          *
          *           0                    successful.
          *
          *           DOW_ANT_BUSY         antecedent is being written to disk, however,
          *                                its state is MODIFIED as well; so it is not
          *                                possible to determine whether this new link
          *                                can be removed when the IO completes. hence
          *                                the link is not created.
          *
          *           DOW_DEP_BUSY         dependent is being written to disk. if the
          *                                link were created and control returned to the
          *                                caller, then caller's modification of the
          *                                dependent could get written to disk by the
          *                                IO that is in progress. (This does not matter
          *                                if the antecedent state is not MODIFIED).
          *
          *           DOW_POS_CYCLE        the specified link could give rise to a cycle,
          *                                and therefore has not been established.
          *
          *           DOW_DEF_CYCLE        a reverse dependency between dep_id
          *                                and ant_id is known to exist.
          *
          *           DOW_CREATE_OK        the desired link can be made.
          *
          *           DOWLINK_NORES        no resources were available to establish the
```

```
201      *
202      *                                 desired linkage.
203      *
204      *      DOW_DEP_GONE               the dependent has been aborted. the correct
205      *                                 recovery is for the antecedent to be flushed.
206      *
207      *      DOW_DEP_PRUNE              the dependent is PRUNE'd, and has no antece-
208      *                                 dents; it is advisable therefore, to flush
209      *                                 the dependent before creating the link.
210      *
211      * XXX: Add some debugging support.
212      */
213     int
214     dow_order_no_wait(dowid_t dep_id, dowid_t ant_id)
215     {
216         uchar_t ant_state;
217         uchar_t dep_state;
218         int linkage_err;
219
220         ASSERT(DOW_MUTEX_OWNED());
221         ASSERT(dep_id != ant_id);
222         ASSERT(VALID_DOWID(dep_id));
223         ASSERT(VALID_DOWID(ant_id));
224         ASSERT(DOW_HOLD(dep_id) > 0);
225         ASSERT(DOW_HOLD(ant_id) > 0);
226
227         ant_state = DOW_STATE(ant_id);
228         ant_state &= (DOW_MODINTRANS | DOW_GONE);
229         dep_state = DOW_STATE(dep_id);
230
231         if (ant_state == 0) {
232             /*
233              * debugging note:
234              * unless a dow_clearmodify operation was done on the
235              * ant_id, we expect that the antecedent cannot
236              * have any dependents (since the last write completion
237              * must have removed all the dependents). So we may
238              * want to introduce such a debug mode state, so that
239              * the following assert can be placed:
240              *
241              * ASSERT(DOW_MODCLEARED(ant_id) ||
242              *        DOW_DEP_CNT(ant_id) == 0);
243              */
244             return 0;
245         }
246         ASSERT((ant_state & (DOW_MODIFIED|DOW_GONE)) !=
247                             (DOW_MODIFIED|DOW_GONE));
248         if (ant_state == DOW_MODINTRANS) {
249             /*
250              * cannot allow caller to proceed past this point
                  * to modifying the dependent, until the current
```

```
         * IO completes.
         * Also, since the antecedent is INTRANS, we can
         * assert that it has not antecedents.
         */
        ASSERT(DOW_ANT_CNT(ant_id) == 0);
        return (DOW_ANT_BUSY);
    } else if (ant_state & DOW_GONE) {
        /* MOD state should be clear, as asserted earlier. */
        if (ant_state & DOW_INTRANS) {
            /*
             * the linkage is permissible in this case (so
             * long as dependent is not INTRANS), since the
             * antecedent INTRANS occurred  after  the last
             * setmod operation (this can be inferred from
             * the fact that abort has to have come between
             * the setmod and the current INTRANS).
             *
             * however, we will instead ask the caller to retry
             * after the antecedent INTRANS has cleared: at that
             * point we can return success without creating the
             * link.
             */
            ASSERT(DOW_ANT_CNT(ant_id) == 0);
            return (DOW_ANT_BUSY);
        }
        return 0;
    }
    /*
     * At this point, the antecedent is either MODIFIED or INTRANS
     * but not both; and it is not in an aborted state.
     */
    if ((dep_state & (DOW_PRUNE|DOW_INTRANS) != 0) {
        if ((dep_state & DOW_FLUSHINTRANS) != 0) {
            /*
             * there should be no antecedents since IO initiation
             * is being done or IO is in progress
             */
            ASSERT(DOW_ANT_CNT(dep_id) == 0);
            return (DOW_DEP_BUSY);
        }
        /* dep_state may be DOW_GONE, DOW_IOSETUP */
    || (dep_state & DOW_GONE) {
            /*
             * PRUNE must be set, MOD must be clear.
             */
            ASSERT((dep_state & DOW_MODPRUNE) == DOW_PRUNE);
            /*
             * if dependent is aborted (or being aborted), then we
             * expect the caller to flush the antecedent (and wait
```

```
301         * until the flush completes) before proceeding.
302         */
303        return (DOW_DEP_GONE);
304    }
305    return (DOW_DEP_PRUNE);
306  }
307
308  ASSERT((dep_state & (DOW_GONE|DOW_FLUSHINTRANS)) == 0);
309
310  if ((linkage_err = linkage_detect(dep_id, ant_id)) != DOW_CREATE_OK) {
311     /*
312      * either the desired link exists (linkage_err == 0),
313      * or either there is known to be a cycle or a
314      * cycle is possible but not certain.
315      */
316     ASSERT( (linkage_err == DOW_POS_CYCLE) ||
317             (linkage_err == DOW_DEF_CYCLE) ||
318             (linkage_err == 0));
319
320     return linkage_err;
321  }
322
323  /*
324   * we are almost ready to create the link.
325   */
326  if (!DOWLINK_AVAIL(2)) {
327     return (DOWLINK_NORES);
328  }
329
330  return(dowlink_makelink(dep_id, ant_id));
331 }
332
333 /*
334  * int
335  * dow_order(dowid_t dep, dowid_t ant, uchar_t dow_order_flag)
336  *    Establish the specified ordering. dow_order_flag can be either
337  *    DOW_NO_WAIT, DOW_NO_RESWAIT, or DOW_; 0 implies that all waiting is
338  *    tolerable.
339  *
340  *    Returns 0 if successful; a non-zero error code if unsuccessful.
341  *    The non-zero error code is the same as that returned by
342  *    dow_order_no_wait.
343  *
344  * Calling/Exit State:
345  *    No spin locks should be held by caller, unless DOW_NO_WAIT is
346  *    specified (in which case blocking will not occur).
347  */
```

```
                                                                                (dow_order_no_wait)
351  int
352  dow_order(dowid_t dep, dowid_t ant, uint_t dow_order_flag)
353  {
354      int err;
355
356      ASSERT((dow_order_flag & DOW_NO_WAIT) || KS_HOLDNOLOCKS());
357      if (!VALID_DOWID(dep) || !VALID_DOWID(ant))
358          return(0);
359      DOW_MUTEX_LOCK();
360      ASSERT(dep != ant);
361      ASSERT(DOW_HOLD(dep) > 0);
362      ASSERT(DOW_HOLD(ant) > 0);
363      if (dow_order_flag & DOW_NO_WAIT) {
364          err = dow_order_no_wait(dep, ant);
365          DOW_MUTEX_UNLOCK();
366          return (err);
367      }
368      for (;;) {
369          switch (err = dow_order_no_wait(dep, ant)) {
370          case 0:  /* success */
371              DOW_MUTEX_UNLOCK();
372              return (0);
373          case DOWLINK_NORES:
374              if (dow_order_flag & DOW_NO_RESWAIT) {
375                  DOW_MUTEX_UNLOCK();
376                  return(err);
377              }
378              DOWLINK_FREE_SV_WAIT();
379              break;
380          case DOW_ANT_BUSY:
381              /*
382               * wait for antecedent to be flushed out.
383               */
384              dow_intrans_wait(ant);
385              break;
386          case DOW_DEP_BUSY:
387              /*
388               * dependent write has been initiated. wait
389               * for it to complete.
390               */
391              dow_intrans_wait(dep);
392              break;
393          case DOW_DEP_GONE:
394              /*
395               * dependent has been aborted. flush the
396               * antecedent.
397               */
398              ASSERT((DOW_STATE(ant) & DOW_GONE) == 0);
399              dow_handle_sync_1(ant);
400              break;
```

```
401        case DOW_POS_CYCLE:
402            /*
403             * potentially, there may be a chain of
404             * dependency from antecedent to dependent.
405             * flush the antecedent.
406             */
407            ASSERT((DOW_STATE(ant) & DOW_GONE) == 0);
408            dow_handle_sync_l(ant);
409            break;
410        case DOW_DEF_CYCLE:
411            /*
412             * a reverse dependency from antecedent
413             * to dependent is _known_ to exist.
414             * flush the dependent.
415             */
416            ASSERT((DOW_STATE(dep) & DOW_GONE) == 0);
417            dow_handle_sync_l(dep);
418            break;
419        case DOW_DEP_PRUNE:
420            /*
421             * the dependent is a leaf dow that has already
422             * been pruned. flush the dependent.
423             */
424            dow_handle_sync_l(dep);
425            break;
426        case DOW_MAX_ANTCNT:
427            dow_handle_sync_l(dep);
428            break;
429        case DOW_MAX_DEPCNT:
430            dow_handle_sync_l(ant);
431            break;
432        default: /*
433                  *+ unexpected return code from dow_order_nowait.
434                  *+ unrecoverable software error.
435                  */
436            cmn_err(CE_PANIC,
437                "unexpected return code 0x%x from "
438                "dow_order_nowait\n", err);
439            /* NOTREACHED */
440        } /* switch */
441        DOW_MUTEX_LOCK();
442    }
443 }
```

```
 1  #ident   "@(#)kern:fs/dow_prune.c    1.2"
 2  #ident   "$Header: $"
 3
 4  #include    <fs/dow.h>
 5  #include    <fs/fs_hier.h>
 6  #include    <io/conf.h>
 7  #include    <mem/xmem.h>
 8  #include    <mcm/page.h>
 9  #include    <svc/clock.h>
10  #include    <util/cmn_err.h>
11  #include    <util/debug.h>
12  #include    <util/ghier.h>
13  #include    <util/sysmacros_f.h>
14  #include    <util/var.h>
15
16  /*
17   *
18   *    Notes:
19   *
20   *    There are three flush chains:
21   *
22   *    1. a leaf chain, on which a dow appears if and
23   *       only if it has no antecedents and it must be
24   *       executed soon.
25   *
26   *    2. a non-leaf "pruned" chain, on which a dow appears
27   *       if it must be executed soon but must wait because
28   *       it has one or more antecedents that are valid (i.e.
29   *       MODIFIED and not ABORTED).
30   *
31   *    3. an agelist, on which dows appear if there is no
32   *       urgency for executing them.
33   *
34   *    Pruning refers to an operation that identifies all
35   *    leaf level antecedents/grand-antecedents of a dowid and
36   *    queues them on the leaf flush chain and simultaneously
37   *    prunes any non-leaf antecedent that has not been pruned
38   *    already.
39   *
40   *    The dow subroutines must work to ensure that once a
41   *    dow is on lists 1 or 2, that any antecedent that is
42   *    added to it forces the pruning of the antecedent as well.
43   *    For this purpose:
44   *
45   *    - dow_order must prune newly created antecedents
46   *      and move the dependent dow off the leaf chain
47   *      if it happens to be on the leaf chain.
48   *      Alternatively, as a simplification, a dowid
49   *      that is marked as being pruned does not accumulate
50   *      any antecedents (OR, if it is pruned and is on the
                leaf chain?)
```

```
 51   *  To maintain the invariant that a dow id being pruned
 52   *  must be on the leaf chain if it has no antecedents,
 53   *
 54   *     - dow_iodone will move any dependent that has been
 55   *       pruned and now has no antecedents to the leaf chain.
 56   *
 57   *  We expect that functions such as dow_handle_sync,
 58   *  dow_handle_async, dow_abort, dow_order, dow_strategy,
 59   *  and the dow_flush_demon (which walks the aged chain)
 60   *  will call dow_prune on a given dow id or its antecedents.
 61   *
 62   *  The functions that populate the leaf flush chain all follow
 63   *  the protocol of enquing IOSETUP items to the head of the flush
 64   *  chain and non-IOSETUP items to the tail of the flush chain.
 65   *  Nobody ever walks the "pruned" non-leaf flush chain directly,
 66   *  so we may be able to get rid of it and save some overhead.
 67   *  For the moment, we keep it since it helps debugging.
 68   *
 69   */
 70
 71  /*
 72   * int
 73   * prune_search(dowid_t x, int recur_depth)
 74   *    Prune each antecedent of x that has not already been pruned.
 75   *    Any leaf antecedent (i.e., one that has no antecedents) should
 76   *    be added to the leaf flush chain if it is not already on the
 77   *    leaf flush chain. If the recursion depth exceeds MAX_RECUR,
 78   *    return 1, else return 0. If we get an indication that
 79   *    MAX_RECUR depth was exceeded, then we do not mark x as pruned;
 80   *    instead, we add it to the age chain for future pruning, with
 81   *    timestamp appropriately adjusted to cause the flush daemon to
 82   *    pick it up.
 83   *
 84   * Calling/Exit State:
 85   *    dow_mutex held by caller. Will be held across this function.
 86   *
 87   * Remarks:
 88   *
 89   *    Normally we do not expect to exceed MAX_RECUR depth. If we do,
 90   *    then we handle the boundary case in a special way. All dow-ids
 91   *    that are found at depth == MAX_RECUR are put at the head of
 92   *    the aged list. Subsequently as we return to upper layers of
 93   *    recursion, the dependent dows are enqueued at the tail of the aged
 94   *    list.
 95   */
 96  int
 97  prune_search(dowid_t x, int recur_depth, boolean_t prunexelf)
 98  {
 99      dowlinkid_t linkhead;
100      dowlinkid_t link;
```

```
    dowid_t y;
    int err;

ASSERT(DOW_MUTEX_OWNED());
    ASSERT(DOW_ANT_CNT(x) > 0);

/*
     * Caller ensures that x is not INTRANS, or PRUNE.
     * Furthermore since our pruning protocol is that
     * FLUSH or IOSETUP or GONE ==> PRUNE, x cannot be in
     * FLUSH, IOSETUP, or GONE states either.
     */

ASSERT((DOW_STATE(x) &
            (DOW_PRUNE|DOW_FLUSHINTRANS|DOW_GONE| DOW_IOSETUP)) == 0);

linkhead = DOWLINK_ANT_LINKHEAD(x);

CHECK_DOWLINK_CHAIN(linkhead);
    link = DOWLINK_NEXT(linkhead);

if (recur_depth == MAX_RECUR) {
        /*
         * - For each antecedent y of x, do:
         *   - if y is already marked pruned, skip to next antecedent.
         *   - if y is leaf
         *     mark it pruned and move it to the leaf flush chain,
         *   else
         *     move y to aged list, and timestamp it so that it looks
         *     very old to the flush demon.
         *
         * - After all antecedents of x are visited as above, move x to the
         *   tail of the aged list. Make x's timestamp very old only if
         *   pruneself is true (indicating that x must be pruned as well).
         *
         * - return 1.
         */ while (link != linkhead) {
            y = DOWLINK_DOWID(link);
            link = DOWLINK_NEXT(link);
            if (DOW_STATE(y) & DOW_PRUNE) {
                CHECK_ANTECEDENTS_PRUNED(y);
                continue;
            }
            /*
             * PERF: We could optimize a bit here, and set the PRUNE
             * state only if the state is MOD or MODINTRANS. Not
```

```
151          * particularly worthwhile.
152          */
153         ASSERT((DOW_STATE(y) &
154                 (DOW_FLUSH|DOW_IOSETUP|DOW_GONE)) == 0);
155         /*
156          * we must handle either cases: whether MODIFY is set
157          * or not set. however, at this point there is no
158          * difference in treatment. dow_iodone knows how to
159          * handle (MODIFIED cleared and PRUNE set) cases.
160          */
161         if (DOW_ANT_CNT(y) == 0) {
162             if (DOW_STATE(y) & DOW_INTRANS) {
163                 DOW_STATE(y) |= DOW_PRUNE;
164             } else {
165                 dow_flush_remove(y);
166                 DOW_STATE(y) |= DOW_PRUNE;
167                 dow_flush_headins(y, DOW_LEAF_FLUSHHEAD);
168             }
169             continue;
170         } else {
171             ASSERT((DOW_STATE(y) & DOW_INTRANS) == 0);
172             /* make y look very old */
173             dow_flush_remove(y);
174             DOW_TIMESTAMP(y) = 0;
175             dow_flush_headins(y, DOW_AGED_FINISHHEAD);
176             continue;
177         }
178     } /* while link != linkhead */
179     /*
180      * we finished processing x's antecedents now handle x itself.
181      */
182     dow_flush_remove(x);
183     if (pruneself) {
184         DOW_TIMESTAMP(x) = 0;
185     }
186     dow_flush_tailins(x, DOW_AGED_FINISHHEAD);
187     return 1;
188 } /* if recur_depth == MAX_RECUR */
189
190 /*
191  *   For each antecedent y of x,
192  *   - if y is already pruned, skip to the next antecedent,
193  *   - if y is a leaf,
194  *     # we could make the optimization that if y is INTRANS,
195  *       skip it (since from x's standpoint, the current disk
196  *       write of y will cover x's relevant modification).
197  *     # however, we will not implement the optimization so
198  *       that we can simplify dow code in other places, that
199  *       can then rely on the stronger guarantee that when a
200  *       dow is marked pruned, so are all of its antecedents.
```

```
201          * this ought to be a rare instance anyway, so it does not
202          * hurt that we do not exploit the optimization.
203          *      mark y pruned and move it to the leaf chain.
204          * else
205          *      visit y recursively, and, accumulate its return into err.
206          *
207          * After all of x's antecedents have been visited as above, check
208          * the accumulated err value:
209          *      if 0, then recursion depth remained bounded,
210          *              - if pruneself, then mark x as pruned and move it to
211          *                the pruned list,
212          *              - else return 0 indicating success (without touching x)
213          *
214          *      else, we must have reached the recursion limit. so, we must
215          *              - return the non-zero error code to our caller. recall
216          *                that x was not affected, so we may either reset the
217          *                timestamp on x to 0 only if pruneself is true, or do
218          *                so even if pruneself is false -- it does not make
219          *                much difference.
220          */
221         err = 0;
222         while (link != linkhead) {
223                 y = DOWLINK_DOWID(link);
224                 link = DOWLINK_NEXT(link);
225                 if (DOW_STATE(y) & DOW_PRUNE) {
226                         CHECK_ANTECEDENTS_PRUNED(y);
227                         continue;
228                 }
229                 ASSERT((DOW_STATE(y) & (DOW_FLUSH|DOW_IOSETUP|DOW_GONE)) == 0);
230                 /*
231                  * only DOW_MODIFY could possibly be set. we must handle
232                  * either case: whether MODIFY is set or not.
233                  */
234                 if (DOW_ANT_CNT(y) == 0) {
235                         if (DOW_STATE(y) & DOW_INTRANS) {
236                                 DOW_STATE(y) |= DOW_PRUNE;
237                         } else {
238                                 dow_flush_remove(y);
239                                 DOW_STATE(y) |= DOW_PRUNE;
240                                 dow_flush_heading(y, DOW_LEAF_FLUSHHEAD);
241                         }
242                         continue;
243                 }
244                 ASSERT(recur_depth < MAX_RECUR);
245                 ASSERT((DOW_STATE(y) & DOW_INTRANS) == 0);
246                 err += prune_search(y, (1 + recur_depth), B_TRUE);
247                 continue;
248         }
249         if (err) {
250                 /* some antecedent of x was not fully pruned */
``` fs_dow/dow_prune.c                                                                              (prune_search)                                                                              Page 105

```
251             dow_flush_remove(x);
252             DOW_TIMESTAMP(x) = 0;
253             /*
254              * IT IS VITAL that x is sent to that tail of the aged
255              * list, so that all of its unpruned antecdents precede
256              * it on that list. prune(), which calls this function,
257              * relies on that ordering when it reissues pruning
258              * for these antecdents.
259              */
260             dow_flush_tailins(x, DOW_AGED_FLUSHHEAD);
261         } else if (pruneself) {
262             dow_flush_remove(x);
263             DOW_STATE(x) |= DOW_PRUNE;
264             dow_flush_tailins(x, DOW_PRUN_FLUSHHEAD);
265             CHECK_ANTECDENTS_PRUNED(x);
266         }
267         return(err);
268     }
269
270     /*
271      * int
272      * prune(dowid_t x)
273      *     Prune each antecdent of x that has not already been pruned,
274      *     and then x itself. Any leaf antecdent (i.e., one that has no
275      *     antecdents) should be added to the leaf flush chain if it is
276      *     not already on the leaf chain.
277      *
278      * Calling/Exit State:
279      *     dow_mutex held by caller. Will be held across this function.
280      *
281      * Remarks:
282      *     During pruning, we will recursively visit each antecdent in the
283      *     dependency graph under x, and prune it.
284      *     Normally we do not expect to exceed MAX_RECUR depth. If we do,
285      *     then we handle the boundary case in a special way. All dow-ids
286      *     that are found at depth == MAX_RECUR are put at the head of
287      *     the aged list. Subsequently as we return to upper layers of
288      *     recursion, the dependent dows are enqueued at the tail of the aged
289      *     list. Finally, wehn control return here, we will walk the
290      *     aged list and prune everything that is old enough until x is pruned.
291      */
292
293     void
294     prune(dowid_t x)
295     {
296         dowid_t z;
297
298         ASSERT(DOW_MUTEX_OWNED());
299         ASSERT(VALID_DOWID(x));
300         CHECK_NOTFREE(x);
```

```
301    if ((DOW_STATE(x) & (DOW_PRUNE | DOW_INTRANS)) != 0) {
302        if (DOW_STATE(x) & DOW_PRUNE) {
303            CHECK_ANTECEDENTS_PRUNED(x);
304            return;
305        }
306        ASSERT(DOW_ANT_CNT(x) == 0);
307        CHECK NOTON ANY FLUSHCHAIN(x);
308        DOW_STATE(x) |= DOW_PRUNE;
309        return;
310    } else if (DOW_ANT_CNT(x) == 0) {
311        CHECK ON_FLUSHCHAIN(x, DOW_AGED_FLUSHHEAD);
312        dow_flush_remove(x);
313        DOW_STATE(x) |= DOW_PRUNE;
314        dow_flush_tailins(x, DOW_LEAF_FLUSHHEAD);
315        return;
316    }
317
318    ASSERT((DOW_STATE(x) & (DOW_PRUNE|DOW_IOSETUP|DOW_FLUSHINTRANS)) == 0);
319
320    /*
321     * DOW_GONE:
322     *   dow_abort (which will set DOW_GONE ) for "x" will
323     *   prune all antecedents of "x" (and may in fact be
324     *   calling this function)
325     *
326     *   We require that dow_abort do the pruning BEFORE
327     +   setting DOW_GONE.
328     +
329     *   Subsequently, no antecedents will accumulate. So we
330     *   can treat DOW_GONE as a no operation.
331     */
332
333    CHECK_ON_FLUSHCHAIN(x, DOW_AGED_FLUSHHEAD);
334
335    if (prune_search(x, 0, B_TRUE) != 0) {
336        /*
337         * the top down pruning of x did not complete because it reached
338         * the set recursion limit on prune_search. this should be a very
339         * rare occurrence. we can afford to be heavy handed in this case,
340         * and so we will keep pruning aged dows off the aged list
341         * until we have successfully pruned x.
342         * NOTE that because all antecedents of x that could not be pruned
343         * wound up on the aged list ahead of z, by pruning the aged list
344         * in the normal order repeatedly, we will cover them efficiently
345         */
346
347        while ((DOW_STATE(x) & DOW_PRUNE) == 0) {
348            /*
349             * TODO: ADD DEBUG CODE TO DETECT INFINITE LOOPING HERE.
350             */
```

```
                */
351             z = DOW_FLUSHNEXT(DOW_AGED_FLUSHHEAD);
352             ASSERT(z != DOW_AGED_FLUSHHEAD);
353             ASSERT((DOW_STATE(z) &
354                     (DOW_PRUNE|DOW_FLUSHINTRANS|DOW_IOSETUP)) == 0);
355             if (DOW_TIMESTAMP(z) <= (lbolt - DOW_AGE_TIX) ) {
356                 if (DOW_ANT_CNT(z) == 0) {
357                     dow_flush_remove(z);
358                     DOW_STATE(z) |= DOW_PRUNE;
359                     dow_flush_tailins(z, DOW_LEAF_FLUSHHEAD);
360                 } else {
361                     (void) prune_search(z, 0, B_TRUE);
362                 }
363             } else {
364                 dow_flush_remove(z);
365                 dow_flush_tailins(z, DOW_AGED_FLUSHHEAD);
366             }
367         }
368     }
369     CHECK_ANTECEDENTS_PRUNED(x);
370 }
371
372 /*
373  * void
374  * prune_antecedents(dowid_t x)
375  *     Prune antecedents of x. For now, we will also prune x if it turns
376  *     out that the dependency graph beneath x is too deep. This is done
377  *     for convenience, since prune() has the necessary algorithm for
378  *     handling the recursion overflow.
379  *
380  * Calling/Exit State:
381  *     dow_mutex is held by the caller and never dropped before returning.
382  */
383 void
384 prune_antecedents(dowid_t x)
385 {
386     ASSERT((DOW_STATE(x) & (DOW_INTRANS|DOW_PRUNE)) == 0);
387     ASSERT(DOW_ANT_CNT(x) > 0);
388     if (prune_search(x, 0, B_FALSE) != 0) {
389         /* prune everything, x included! */
390         prune(x);
391     }
392 }
```

```
1   #ident  "@(#)kern:fs/dow_util.c 1.7"
2   #ident  "$Header: $"
3
4   #include <fs/dow.h>
5   #include <fs/fs_hier.h>
6   #include <io/conf.h>
7   #include <mem/kmem.h>
8   #include <mem/page.h>
9   #include <proc/lwp.h>
10  #include <proc/proc.h>
11  #include <proc/user.h>
12  #include <svc/clock.h>
13  #include <util/cmn_err.h>
14  #include <util/debug.h>
15  #include <util/ghier.h>
16  #include <util/inline.h>
17  #include <util/sysmacros_f.h>
18  #include <util/var.h>
19
20  #define SWAP_DISABLE()  {                                                   \
21          ASSERT(u.u_procp != NULL);                                          \
22          ATOMIC_INT_INCR(&(u.u_procp->p_lwpkeepcnt));                        \
23          }
24
25  #define SWAP_ENABLE()   {                                                   \
26          ASSERT(u.u_procp != NULL);                                          \
27          ASSERT(ATOMIC_INT_READ(&(u.u_procp->p_lwpkeepcnt))                  \
28                  > 0);                                                       \
29          ATOMIC_INT_DECR(&(u.u_procp->p_lwpkeepcnt));                        \
30          }
31
32  dow_t           dow_tab[DOW_ARRAYSIZE];
33  int             dow_freecount;
34  int             dowlink_freecount;
35  int             untracked_pageio;
36  dow_io_utp_t    dow_io_utp_tab[MAX_UNTRACKED_PAGES];
37  sv_t            dow_io_utp_sv;  /* to control dow_io_utp_t alloc */
38  lock_t          dow_mutex;
39  sv_t            dow_free_sv;
40  sv_t            dowlink_free_sv;
41  event_t         dow_flush_event;
42
43  LKINFO_DECL(dow_mutex_lkinfo, "fs:dow_mutex spin lock global", 0);
44
45  /*
46   * void
47   * dow_io_utp_setup(buf_t *bp)
48   *      Setup the biodone processing chain for executing the untracked
49   *      pageio protocol. Basically, we need to adjust the untracked
50   *      pageio counter for each pageio that completes, where such pages
```

```
 *   would have normally been associated with dow structures but were
 *   not, due to dow resource exhaustion.
 *
 * Calling/Exit State:
 *   dow_mutex held by caller, and may need to be dropped and reacquired
 *   if the system exhausts the frames for tracking untracked pageio.
 */
void
dow_io_utp_setup(buf_t *bp)
{
    int i;
    dow_io_utp_t *dow_io_utpp;

ASSERT(DOW_MUTEX_OWNED());
    for(;;) {
        for (i=0; i < MAX_UNTRACKED_PAGES; i++) {
            dow_io_utpp = &(dow_io_utp_tab[i]);
            if (dow_io_utpp->diu_bp == NULL) {
                dow_io_utpp->diu_bp = bp;
                dow_io_utpp->diu_func = bp->b_iodone;
                dow_io_utpp->diu_chain = bp->b_misc;
                bp->b_iodone = dow_untracked_pageio_done;
                bp->b_misc = dow_io_utpp;
                return;
            }
        }
        DOW_IO_UTP_SV_WAIT();
        DOW_MUTEX_LOCK();
    }
}

/*
 * void
 * dow_io_utp_rele(buf_t *bp)
 *   Release the untracked pageio frame acquired in dow_io_utp_setup, and
 *   signal any blocked waiters.
 *
 * Calling/Exit State:
 *   dow_mutex held by caller, who is at interrupt level.
 */
void
dow_io_utp_rele(buf_t *bp)
{
    dow_io_utp_t *dow_io_utpp;

ASSERT(DOW_MUTEX_OWNED());
    dow_io_utpp = bp->b_misc;
    bp->b_misc = dow_io_utpp->diu_chain;
    bp->b_iodone = dow_io_utpp->diu_func;
    dow_io_utpp->diu_bp = NULL;
```

```
101       dow_io_utpp->diu_func = NULL;
102       dow_io_utpp->diu_chain = NULL;
103       if (DOW_IO_UTP_SV_BKWD()) {
104           DOW_IO_UTP_SV_BROADCAST();
105       }
106   }
107
108   /*
109    * void
110    * dow_arrayinit(void)
111    *      Initialize all dow structures (including hash buckets and
112    *      chain anchors for flushchains and freelist).
113    *
114    * Calling/Exit State:
115    *      None. This is a system initialization routine.
116    *
117    * Remarks:
118    *      Must call dowlink_arrayinit before calling dow_arrayinit. Else
119    *      assertions in dow_init (for the dependent and antecedent
120    *      linkheads) would trip.
121    */
122   void
123   dow_arrayinit(void)
124   {
125       dowid_t i;
126
127       dowlink_arrayinit();
128       CHECK_DOWLINK_FREELIST();
129
130       DOW_FREE_SV_INIT();
131       DOW_IO_UTP_SV_INIT();
132       DOW_MUTEX_INIT();
133       DOW_FLUSH_EVENT_INIT();
134
135       for (i = 0; i < DOW_ARRAYSIZE; i++) {
136           dow_init(i, 0, NULL, DOW_ISFUNC_NBLK);
137       }
138       dow_freecount = 0;
139       untracked_pagelo = 0;
140       for (i = 0; i < DOW_TABLE_SIZE; i++) {
141           dow_free(i);
142       }
143
144       for (i = 0; i < MAX_UNTRACKED_PAGES; i++) {
145           dow_io_utp_tab[i].diu_bp = NULL;
146           dow_io_utp_tab[i].diu_func = NULL;
147           dow_io_utp_tab[i].diu_chain = NULL;
148       }
149
150       ASSERT(dow_freecount == DOW_TABLE_SIZE);
```

```
151  #ifdef DEBUG
152      for (i = 0; i < DOW_TABLE_SIZE; i++) {
153          ASSERT(DOW_DEBUG_FLUSHID(i) == DOW_FREEHEAD);
154          ASSERT(EMPTY_DOWLINK_LIST(DOWLINK_ANT_LINKHEAD(i)));
155          ASSERT(EMPTY_DOWLINK_LIST(DOWLINK_DEP_LINKHEAD(i)));
156          CHECK_DOWLINK_CHAIN(DOWLINK_DEP_LINKHEAD(i));
157          CHECK_DOWLINK_CHAIN(DOWLINK_ANT_LINKHEAD(i));
158      }
159
160      for (i = DOW_TABLE_SIZE; i < (DOW_TABLE_SIZE + DOW_HASHWIDTH); i++) {
161          ASSERT(DOW_DEBUG_CNT(i) == 0);
162          ASSERT(EMPTY_DOW_HASHLIST(i));
163      }
164
165      for (i = (DOW_TABLE_SIZE + DOW_HASHWIDTH);
166              i < (DOW_TABLE_SIZE + DOW_HASHWIDTH + 3); i++) {
167          ASSERT(DOW_DEBUG_CNT(i) == 0);
168          ASSERT(EMPTY_DOW_FLUSHLIST(i));
169      }
170
171  #endif
172      CHECK_DOW_FREELIST();
173  }
174
175  /*
176   * void
177   * dow_init(dowid_t x, long ident1, long ident2, uchar_t type)
178   *     Initialize a dow structure. ident1 and ident2 provide the
179   *     identity; type specifies whether this is to be a buffer,
180   *     page, or function dow.
181   *
182   * Calling/Exit State:
183   *     Normally the dow mutex should be held by caller, except when
184   *     called during system initialization. It is the caller's
185   *     responsibility to insert the dow structure on the correct
186   *     hash chain.
187   *
188   * Remarks:
189   *     dow_init() should only be used as an internal interface. It
190   *     does not require that a dow_hold be placed on x, nor does it
191   *     place the dow_hold. That is left to the caller(s). The validity
192   *     of x is guaranteed by the dow mutex held by caller.
193   */
194  void
195  dow_init(dowid_t x, long ident1, long ident2, uchar_t type)
196  {
197      DOW_FREENEXT(x) = x;
198      DOW_FREEPREV(x) = x;
199      DOW_FLUSHNEXT(x) = x;
200
```

```
201        DOW_FLUSHPREV(x) = x;
202        DOW_HOLD(x) = 0;
203        DOW_LEVEL(x) = 0;
204        DOW_DEP_CNT(x) = 0;
205        DOW_ANT_CNT(x) = 0;
206        DOW_TIMESTAMP(x) = INT_MAX;
207        DOW_SV_INIT(x);
208        DOW_STATE(x) = 0;
209        DOW_TYPE(x) = type;
210        if (type == DOW_ISBUFFER) {
211            DOW_DEV(x) = (dev_t)ident1;
212            DOW_BLKNO(x) = (int)ident2;
213            DOW_BSIZE(x) = 0;
214            DOW_MOD_LOCK(x) = 0;
215        } else if (type == DOW_ISPAGE) {
216            DOW_VP(x) = (vnode_t *)ident1;
217            DOW_OFFSET(x) = (off_t)ident2;
218            DOW_MOD_LOCK(x) = 0;
219        } else {
220            DOW_FUNC(x) = (void (*)())ident1;
221            DOW_ARGP(x) = (void *)ident2;
222            DOW_MOD_LOCK(x) = 0;
223        }
224        DOW_BP(x) = NULL;
225        DOW_DEBUG_IODONE_INIT(x);
226        /*
227         * This assertion would trip unless we called
228         * dowlink_array_init before dow_arrayinit was called,
229         * during initialization. We expect the assertion
230         * to hold subsequently, when dow_t's are recycled.
231         */
232 #ifdef DEBUG
233        if (x < DOW_TABLE_SIZE) {
234            ASSERT(EMPTY_DOWLINK_LIST(DOWLINK_ANT_LINKHEAD(x)));
235            ASSERT(EMPTY_DOWLINK_LIST(DOWLINK_DEP_LINKHEAD(x)));
236            ASSERT(DOWLINK_LINKS_SANE(DOWLINK_ANT_LINKHEAD(x)));
237            ASSERT(DOWLINK_LINKS_SANE(DOWLINK_DEP_LINKHEAD(x)));
238        }
239 #endif
240        DOW_DEBUG_INIT(x);
241    }
242 #ifdef DEBUG
243    /*
244     * void
245     * dow_free_badinit(dowid_t id)
``` fs_dow/dow_util.c                    (dow_init)                    Page 113

```
251  *        Fill up a freed dow structure with creative material
252  *        for enhanced entomological purposes.
253  *
254  * Calling/Exit State:
255  *        dow mutex held by caller.
256  *
257  */
258  void
259  dow_free_badinit(dowid_t id)
260  {
261      DOW_FLUSHNEXT(id) = DOW_BADID;
262      DOW_FLUSHPREV(id) = DOW_BADID;
263      DOW_HOLD(id) = (-1799);
264      DOW_LEVEL(id) = 170;
265      DOW_DEP_CNT(id) = 187;
266      DOW_ANT_CNT(id) = 204;
267      DOW_TIMESTAMP(id) = INT_MAX;
268      DOW_STATE(id) = 255;
269      DOW_TYPE(id) = 255;
270      DOW_DEV(id) = 1600085856;
271      DOW_BLKNO(id) = 168430090;
272      DOW_BP(id) = (buf_t *)1515870410;
273      DOW_BSIZE(id) = 1600085856;
274      DOW_MOD_LOCK(id) = (-6475);
275      DOW_B_IOCHAIN(id) = (void *)(0xffffffff);
276  }
277
278  /*
279   * void
280   * dow_debug_init(dowid_t id)
281   *        Initialize debugging information for a dow structure.
282   *
283   * Calling/Exit State:
284   *        dow mutex held by caller.
285   *
286   */
287  void
288  dow_debug_init(dowid_t id)
289  {
290      DOW_DEBUG_HASHID(id) = DOW_BADID;
291      DOW_DEBUG_FLUSHID(id) = DOW_BADID;
292      DOW_DEBUG_CNT(id) = 0;
293  }
294  #endif
295
296  /*
297   * void
298   * dow_inshash(dowid_t id, dowid_t hbucket)
299   *        Insert dow "id" on a hash chain anchored at dow table index
300   *        of hbucket
``` fs_dow/dow_util.c                    (dow_debug_init)                    Page 113

File modified: Wed Apr  6 11:25:59 1994

```
301  * Calling/Exit State:
302  *     dow_mutex held by caller, and held on return. The function
303  *     does not block or drop the lock.
304  *
305  * PERF:
306  *     Convert to a macro. Preferrably assembler macro.
307  *     Collect stats on how good a hash function we really have.
308  */
309  void
310  dow_hashin(dowid_t id, dowid_t hbucket)
311  {
312      ASSERT(DOW_MUTEX_OWNED());
313      ASSERT(VALID_DOWID(id));
314      ASSERT(VALID_HASH_BUCKET(hbucket));
315      DOW_HASHNEXT(id) = DOW_HASHNEXT(hbucket);
316      DOW_HASHPREV(id) = hbucket;
317      DOW_HASHPREV(DOW_HASHNEXT(id)) = id;
318      DOW_HASHNEXT(hbucket) = id;
319      DOW_DEBUG_HASHENTER(id, hbucket);
320  }
321  /*
322   * void
323   * dow_remhash(dowid_t id, dowid_t hbucket)
324   *     Remove dow "id" from its hash chain.
325   *
326   * Calling/Exit State:
327   *     dow_mutex held by caller, and held on return. The function
328   *     does not block or drop the lock.
329   *
330   * PERF:
331   *     Convert to a macro. Preferrably assembler macro.
332   */
333  void
334  dow_remhash(dowid_t id)
335  {
336      ASSERT(DOW_MUTEX_OWNED());
337      ASSERT(VALID_DOWID(id));
338      CHECK_HASH(id);
339      DOW_HASHNEXT(DOW_HASHPREV(id)) = DOW_HASHNEXT(id);
340      DOW_HASHPREV(DOW_HASHNEXT(id)) = DOW_HASHPREV(id);
341      DOW_DEBUG_HASHLEAVE(id);
342      DOW_HASHINVAL(id);
343  }
344  dowid_t
345  dow_alloc(void)
346  *    Allocate a dow structure from the freelist.
347  *
348  * Calling/Exit State:
```

```
fs_dow/dow_util.c                                              (dow_remhash)    Page 115

351   *     The dow_mutex is acquired and released within. The function does
352   *     not block.
353   *
354   * Remarks:
355   *     If later we implement dow_reservations, then a flag could be
356   *     used to specify reservation. All the real work is done by
357   *     dow_alloc_l.
358   *
359   * PERF: both dow_alloc and dow_alloc_l are good candidates for inlining.
360   *
361   */
362   dowid_t
363   dow_alloc(void)
364   {
365           dowid_t id;
366
367           DOW_MUTEX_LOCK();
368           id = dow_alloc_l();
369           DOW_MUTEX_UNLOCK();
370
371           return(id);
372   }
373
374   /*
375   * dowid_t
376   * dow_alloc_l(void)
377   *     Allocate a dow structure from the freelist.
378   *
379   * Calling/Exit State:
380   *     The dow_mutex is held at entry and exit, and is not reacquired.
381   *     The function does not block.
382   *
383   * Remarks:
384   *     If later we implement dow_reservations, then a flag could be
385   *     used to specify reservation. Once dow structures are reserved,
386   *     the caller can expect successful yet non-blocking return.
387   */
388   dowid_t
389   dow_alloc_l(void)
390   {
391           dowid_t freefirst;
392
393           ASSERT(DOW_MUTEX_OWNED());
394           if (dow_freecount == 0) {
395                   ASSERT(EMPTY_DOW_FREELIST(DOW_FREEHEAD));
396                   return ((dowid_t)DOW_BADID);
397           }
398           ASSERT(!EMPTY_DOW_FREELIST(DOW_FREEHEAD));
399           --(dow_freecount);
400           freefirst = DOW_FREENEXT(DOW_FREEHEAD);
```

Page 115                                                       (dow_alloc_l)

Printed: Wed Apr  6 11:28:29 1994                              File modified: Wed Apr  6 11:25:59 1994 fs_dow/dow_util.c (dow_alloc_1) page 116

```
401             DOW_FREENEXT(DOW_FREEHEAD) = DOW_FREENEXT'(freefirst);
402
403  #ifdef DEBUG
404             /*
405              * In DEBUG mode, we maintain the freelist doubly linked.
406              */
407             ASSERT(DOW_FREEPREV(DOW_FREENEXT(freefirst)) == freefirst);
408             DOW_FREEPREV(DOW_FREENEXT(freefirst)) = DOW_FREEHEAD;
409  #endif
410
411             DOW_DEBUG_FREELEAVE(freefirst);
412             return(freefirst);
413     }
414     /*
415      * void
416      * dow_free(dowid_t x)
417      *     Insert dowid "x" at the head of the dow free list. Bump
418      *     up the dow_freecount.
419      *
420      * Calling/Exit State:
421      *     dow_mutex held by caller, returned held. Non-blocking function.
422      *
423      * Remarks:
424      *     Caller has the responsibility of dequeuing x from its hash and
425      *     flush chains.
426      *
427      * PERF:
428      *     Convert to a macro.
429      */
430     void
431     dow_free(dowid_t x)
432     {
433             ASSERT(DOW_HOLD(x) == 0);
434             ASSERT(DOW_DEP_CNT(x) == 0);
435             ASSERT(DOW_ANT_CNT(x) == 0);
436             ASSERT(DOW_MOD_LOCK(x) == 0);
437             ASSERT(!DOW_SV_BLKD(x));
438
439             DOW_FREENEXT(x) = DOW_FREENEXT(DOW_FREEHEAD);
440
441  #ifdef DEBUG
442             DOW_FREEPREV(x) = DOW_FREEHEAD;
443             DOW_FREEPREV(DOW_FREENEXT(x)) = x;
444  #endif
445
446             DOW_FREENEXT(DOW_FREEHEAD) = x;
447             ++dow_freecount;
448             if (DOW_FREE_SV_BLKD()) {
449                     DOW_FREE_SV_BROADCAST();
450
``` fs_dow/dow_util.c (dow_free) page 116

```
451            }
452            DOW_FREE_BADINIT(x);
453            DOW_DEBUG_FREEENTER(x);
454      }
455
456      /*
457       * dowid_t
458       * dow_lookup(long ident1, long ident2)
459       *       Search for a dow corresponding to the specified
460       *       identity tuple, (ident1, ident2), which may identify
461       *       a buffer or a function dow. If one is found, return with
462       *       a hold on the dowid. If none is found, return an invalid
463       *       dowid (i.e., DOW_BADID).
464       *
465       * Calling/Exit State:
466       *       Called and returns with dow_mutex held.
467       *
468       * PERF:
469       *       May be converted to a macro? We should put in several debug
470       *       checks for now, and convert it to a macro with these checks
471       *       removed, after the code is shown to hold up well.
472       */
473      dowid_t
474      dow_lookup(long ident1, long ident2)
475      {
476          dowid_t hash_bucketid;
477          dowid_t i;
478
479          ASSERT(DOW_MUTEX_OWNED());
480
481          hash_bucketid = DOW_HASHBUCKET(ident1, ident2);
482
483          ASSERT(DOW_HASHLINKS_SANE(hash_bucketid));
484          ASSERT(VALID_HASH_BUCKET(hash_bucketid));
485
486          i = DOW_HASHNEXT(hash_bucketid);
487          while (i != hash_bucketid) {
488              ASSERT(VALID_DOWID(i));
489              ASSERT(DOW_DEBUG_HASHID(i) == hash_bucketid);
490              ASSERT(DOW_HASHLINKS_SANE(i));
491              ASSERT((DOW_STATE(i) & DOW_GONE) == 0);
492              if ((DOW_IDENT1(i) == ident1) && (DOW_IDENT2(i) == ident2)) {
493                  DOW_CHEAP_HOLD(i);
494                  return(i);
495              }
496              i = DOW_HASHNEXT(i);
497          };
498          return(DOW_BADID);
499      }
500
```

```
501  }
502  /*
503   * dowid_t
504   * dow_lookup_page(vnode_t *vp, off_t offset)
505   *
506   *      Search for a page dow corresponding to the specified
507   *      identity (vp, offset). If one is found, return with
508   *      a hold on the dowid. If none is found, return an invalid
509   *      dowid (i.e., DOW_BADID).
510   *
511   * Calling/Exit State:
512   *      Called and returns with dow_mutex held.
513   *
514   * PERF:
515   *      May be converted to a macro? We should put in several debug
516   *      checks for now, and convert it to a macro with these checks
517   *      removed, after the code is shown to hold up well.
518   */
519  dowid_t
520  dow_lookup_page(vnode_t *vp, off_t offset)
521  {
522      dowid_t hash_bucketid;
523      dowid_t i;
524
525      ASSERT(DOW_MUTEX_OWNED());
526
527      hash_bucketid = DOW_HASHBUCKET((long)vp, offset);
528
529      ASSERT(DOW_HASHLINKS_SANE(hash_bucketid));
530      ASSERT(VALID_HASH_BUCKET(hash_bucketid));
531
532      i = DOW_HASHNEXT(hash_bucketid);
533      while (i != hash_bucketid) {
534          ASSERT(VALID_DOWID(i));
535          ASSERT(DOW_DEBUG_HASHID(i) == hash_bucketid);
536          ASSERT(DOW_HASHLINKS_SANE(i));
537          ASSERT((DOW_STATE(i) & DOW_GONE) == 0);
538          if ((DOW_IDENT1(i) == (long)vp) &&
539              (DOW_IDENT2(i) == offset)) {
540              DOW_CHEAP_HOLD(i);
541              return(i);
542          }
543          i = DOW_HASHNEXT(i);
544      }
545      return(DOW_BADID);
546  }
547  /*
```

```
551    void
552    dow_startmod(dowid_t id)
553  *    Begin modification of the data associated with the specified dow.
554  *
555  * Calling/Exit State:
556  *    None. The caller should be prepared to block.
557  *
558  * Description:
559  *    Inhibit swapping, and if the dow is a page dow, acquire the
560  *    modification interlock.
561  *
562  * Remarks:
563  *    Swapping is inhibited as a deadlock avoidance measure, since
564  *    while modifying the data the lwp is either holding a buffer,
565  *    or it's holding the dow
566  *    if the dow corresponds to a buffer, or it's holding the dow
567  *    modification interlock, if the dow corresponds to a page.
568  */
569  void
570  dow_startmod(dowid_t id)
571  {
572      if (!VALID_DOWID(id))
573          return;
574
575      SWAP_DISABLE();
576      ASSERT(DOW_TYPE(id) == DOW_ISPAGE || DOW_TYPE(id) == DOW_ISBUFFER);
577      if (DOW_TYPE(id) == DOW_ISBUFFER)
578          return;
579
580      dow_startmod_rdlock(id);
581  }
582  /*
583  * void
584  * dow_startmod_rdlock(dowid_t id)
585  *    Acquire the modification interlock on a dow structure, in read
586  *    mode. This is a pseudo reader-writer lock, whose intent is
587  *    to ensure that if the dow structure carries the DOW_MODIFIED
588  *    state, then the real page is modified as well.
589  *    Called only for page dows. Not needed for buffer dows, because
590  *    buffers are uniquely owned, and writes on buffers always complete.
591  *    Read mode lockers are those that intend to set the MOD state.
592  *
593  * Calling/Exit State:
594  *    None. The caller should be prepared to block.
595  */
596  void
597  dow_startmod_rdlock(dowid_t id)
598  {
599      dowid_t hbucket;
600      long ident1, ident2;
```

```
fs_dow/dow_util.c                                                    (dow_startmod_rdlock)        Page 120

601              if (!VALID_DOWID(id) || (DOW_STATE(id) & DOW_GONE))
602                      return;
603
604              DOW_MUTEX_LOCK();
605              ASSERT(DOW_TYPE(id) == DOW_ISPAGE);
606              ident1 = DOW_IDENT1(id);
607              ident2 = DOW_IDENT2(id);
608              hbucket = DOW_HASHBUCKET(ident1, ident2);
609      #ifdef  DEBUG
610              ASSERT(DOW_DEBUG_HASHID(id) == hbucket);
611      #endif
612              while (DOW_MOD_LOCK(id) == (-1)) {
613                      DOW_SV_WAIT(hbucket);
614                      DOW_MUTEX_LOCK();
615                      if (DOW_STATE(id) & DOW_GONE) {
616                              DOW_MUTEX_UNLOCK();
617                              return;
618                      }
619              }
620              ASSERT(DOW_MOD_LOCK(id) >= 0);
621              (-+(DOW_MOD_LOCK(id)));
622              DOW_MUTEX_UNLOCK();
623              return;
624      }
625
626      /*
627       * void
628       * dow_startmod_wrlock_l(dowid_t id)
629       *      Acquire the modification interlock on a dow structure in write.
630       *      mode. This is a pseudo reader-writer lock, whose intent is
631       *      to ensure that if the dow structure carries the DOW_MODIFIED
632       *      state, then the real page is modified as well.
633       *      Called only for page dows. Not needed for buffer dows, because
634       *      buffers are uniquely owned, and writes on buffers always complete.
635       *      Write mode locking is done by functions that clear the
636       *      MODIFY state.
637       *
638       * Calling/Exit State:
639       *      dow mutex held by caller. The caller should be prepared
640       *      to block, however.
641       */
642      void
643      dow_startmod_wrlock_l(dowid_t id)
644      {
645              dowid_t hbucket;
646              long    ident1, ident2;
647
648              if (DOW_STATE(id) & DOW_GONE)
649                      return;
650
```

```
                                              (dow_startmod_wrlock_1)
651         ASSERT(DOW_TYPE(id) == DOW_ISPAGE);
652         ident1 = DOW_IDENT1(id);
653         ident2 = DOW_IDENT2(id);
654         hbucket = DOW_HASHBUCKET(ident1, ident2);
655 #ifdef  DBBUG
656         ASSERT(DOW_DEBUG_HASHID(id) == hbucket);
657 #endif
658         while (DOW_MOD_LOCK(id) != 0) {
659             DOW_SV_WAIT(hbucket);
660             DOW_MUTEX_LOCK();
661             if (DOW_STATE(id) & DOW_GONE) {
662                 return;
663             }
664         }
665         ASSERT(DOW_MOD_LOCK(id) == 0);
666         (--(DOW_MOD_LOCK(id)));
667         return;
668     }
669
670     /*
671      * void
672      * dow_drop_modlock_1(dowid_t id)
673      *     Release the modification interlock on a page dow.
674      *
675      * Calling/Exit State:
676      *     dow_mutex held by caller.
677      */
678     void
679     dow_drop_modlock_1(dowid_t id)
680     {
681         dowid_t hbucket;
682         long ident1, ident2;
683
684         ASSERT(VALID_DOWID(id));
685
686         if ((DOW_STATE(id) & DOW_GONE)
687             return;
688
689         ASSERT(DOW_TYPE(id) == DOW_ISPAGE);
690         if (DOW_MOD_LOCK(id) > 0) {
691             (--(DOW_MOD_LOCK(id)));
692             if (DOW_MOD_LOCK(id) > 0) {
693                 return;
694             }
695         } else {
696             ASSERT(DOW_MOD_LOCK(id) == (-1));
697             (++(DOW_MOD_LOCK(id)));
698         }
699         ident1 = DOW_IDENT1(id);
```

```
701         ident2 = DOW_IDENT2(id);
702         hbucket = DOW_HASHBUCKET(ident1, ident2);
703 #ifdef  DEBUG
704         ASSERT(DOW_DEBUG_HASHID(id) == hbucket);
705 #endif
706         if (DOW_SV_BLKD(hbucket))
707                 DOW_SV_BROADCAST(hbucket);
708         return;
709  }
710
711  /*
712   * void
713   * dow_clear_modlock_l(dowid_t id)
714   *    Clear the modification interlock on a page dow and wakeup
715   *    all waiters. It is expected that the caller will reset the
716   *    DOW_STATE to DOW_GONE before dropping the dow_mutex, which
717   *    is held on entry to this function.
718   *
719   * Calling/Exit State:
720   *    dow_mutex held by caller.
721   *
722   */
723  void
724  dow_clear_modlock_l(dowid_t id)
725  {
726         dowid_t hbucket;
727         long    ident1, ident2;
728
729         ASSERT(VALID_DOWID(id));
730         if (DOW_STATE(id) & DOW_GONE)
731                 return;
732         ASSERT(DOW_TYPE(id) == DOW_ISPAGE);
733         ident1 = DOW_IDENT1(id);
734         ident2 = DOW_IDENT2(id);
735         hbucket = DOW_HASHBUCKET(ident1, ident2);
736 #ifdef  DEBUG
737         ASSERT(DOW_DEBUG_HASHID(id) == hbucket);
738 #endif
739         DOW_MOD_LOCK(id) = 0;
740         if (DOW_SV_BLKD(hbucket))
741                 DOW_SV_BROADCAST(hbucket);
742         return;
743  }
744
745
746
747  /*
748   * void
749   * dow_setmod(dowid_t id, clock_t flushdelta)
750   *    Set the MODIFY state in the dow, and release the modification interlock.
```

```
             *  Set the timestamp such that dow flush demon flushes out the dow within
             *  the period of clockticks specified by flushdelta.
             *
             *  Calling/Exit State:
             *  The caller must have acquired the modification interlock before calling
             *  this function (this cannot be ASSERT'ed, however, since it is a pseudo
             *  reader-writer sleep lock).
             */
void
dow_setmod(rowid_t id, clock_t flushdelta)
{
        uchar_t dow_state;
        clock_t flush_stamp;

if (!VALID_DOWID(id) || (DOW_STATE(id) & DOW_GONE))
                return;

ASSERT(flushdelta <= FLUSHDELTAMAX);

DOW_MUTEX_LOCK();
        /*
         * the following assert rules out setting the MOD bit on
         * an aborted DOW. not clear if we should just allow the
         * operation but not set the MOD bit.
         */
        ASSERT(DOW_HOLD(id) > 0);
        if (DOW_STATE(id) & DOW_MODIFIED) {
                ASSERT((DOW_TYPE(id) & DOW_ISFUNC) == 0);
                if (DOW_TYPE(id) == DOW_ISPAGE) {
                        dow_drop_modlock_l(id);
                }
                flush_stamp = (lbolt - (FLUSHDELTAMAX - flushdelta));
                if (DOW_TIMESTAMP(id) > flush_stamp) {
                        DOW_TIMESTAMP(id) = flush_stamp;
                }
                DOW_MUTEX_UNLOCK();
                SWAP_ENABLE();
                return;
        }
        DOW_STATE(id) |= DOW_MODIFIED;
        dow_state = DOW_STATE(id);
        flush_stamp = (lbolt - (FLUSHDELTAMAX - flushdelta));
        /*
         * Fire the dow if:
         *   - no antecedents, and, not already being written/executed,
         *     and,    - type == function, or
```

```
801        *          - pruned (though how can this be?)
802        */
803
804        if ((DOW_ANT_CNT(id) == 0) && ((dow_state & DOW_FLUSHINTRANS) == 0)) {
805            if ((DOW_TYPE(id) & DOW_ISFUNC) {
806
807                dow_flush_remove(id);
808                DOW_STATE(id) |= (DOW_FLUSH|DOW_PRUNE);
809                DOW_TIMESTAMP(id) = INT_MAX;
810                dow_process_leaf_func(id, NULL);
811                DOW_MUTEX_UNLOCK();
812                return;
813
814            } else if (dow_state & DOW_PRUNE) {
815                /* Should not this dow already be on the leaf chain? */
816                dow_flush_remove(id);
817                dow_flush_tailins(id, DOW_LEAF_FLUSHHEAD);
818                /*
819                 * PERF: instead of leaving the dow on leaf chain
820                 *       for flush demon to complete as above, we
821                 *       could just handle it right away, as below?
822                 *       if we do, then, remember to drop the
823                 *       dow_modlock in page cases!
824                 *
825                 * DOW_STATE(id) |= DOW_FLUSH;
826                 * if (dow_state & DOW_TOSETUP) {
827                 *     dow_ioflush(id);
828                 *     return;
829                 * } else {
830                 *     dow_flush(id);
831                 *     return;
832                 * }
833                 */
834                DOW_TIMESTAMP(id) = flush_stamp;
835                if (DOW_TYPE(id) == DOW_ISPAGE) {
836                    dow_drop_modlock_l(id);
837                }
838                DOW_MUTEX_UNLOCK();
839                SWAP_ENABLE();
840                return;
841            }
842        }
843
844        DOW_TIMESTAMP(id) = flush_stamp;
845        /*
846         * The dowid stays on whichever flush chain it happens to be on!
847         */
848        if (DOW_TYPE(id) == DOW_ISPAGE) {
849            dow_drop_modlock_l(id);
850        }
```

```
851              DOW_MUTEX_UNLOCK();
852              if ((DOW_TYPE(id) & DOW_ISFUNC) == 0)
853                   SWAP_ENABLE();
854              return;
855       }
856
857       /*
858        * void
859        * dow_rele(dowid_t id)
860        *      Release the hold on a dow structure.
861        *
862        * Calling/Exit State:
863        *      The caller must have previously acquired a hold via a lookup or
864        *      create operation.
865        *
866        * Remarks:
867        *      dow_rele_l does the real work.
868        */
869      void
870      dow_rele(dowid_t id)
871      {
872              if (IVALID_DOWID(id)) {
873                   return;
874              }
875              DOW_MUTEX_LOCK();
876              dow_rele_l(id); /* does not drop the dow_mutex */
877              DOW_MUTEX_UNLOCK();
878              return;
879      }
880
881      /*
882       * void
883       * dow_rele_l(dowid_t id)
884       *      internal interface to release a hold on the dow structure and to
885       *      initiate cleaning/freeing the dow if appropriate.
886       *
887       * Calling/Exit State:
888       *      Called with dow_mutex held, returns with same held.
889       */
890      void
891      dow_rele_l(dowid_t id)
892      {
893              ASSERT(DOW_MUTEX_OWNED());
894              ASSERT(DOW_HOLD(id) > 0);
895              CHECK_NOTFREE(id);
896              DOW_CHEAP_RELE(id);
897
898              /*
899               * if the hold is positive, or there are any links
```

```
 901         * (antecedent/dependent) , don't free the dow.
 902         *
 903         * PERF: Collapse the three tests into one?
 904         */
 905        if (DOW_HOLD(id) > 0 || DOW_ANT_CNT(id) > 0 ||
 906            DOW_DEP_CNT(id) > 0) {
 907                return;
 908        }
 909        /*
 910         * hold == 0, no antecedent/dependent links, free the dow
 911         * if it is not being flushed/written. Alternatively, if
 912         * the dow is a function whose execution is deferred to the
 913         * flush demon, we cannot remove it.
 914         */
 915        if (DOW_STATE(id) & (DOW_FLUSHINTRANS|DOW_IOSETUP)) {
 916                return;
 917        }
 918        /*
 919         * function types recieve a slightly different treatment:
 920         * for a "modified" function dow, we must either absorb the
 921         * responsibility of executing the function here itself or
 922         * leave it to the flush demon (=> verify that the dow is on
 923         * the leaf list and that it is in PRUNE state); the dow, in
 924         * this case should not be freed without executing the function.
 925         * A function dow that does not have the modified state, on
 926         * the other hand, must be assumed to have been "clear-modified"
 927         * in which case, dow_rele can treat it basically as free-able.
 928         * See discussion in dow_process_leaf_func().
 929         */
 930        if ((DOW_TYPE(id) & DOW_ISFUNC) &&
 931            ((DOW_STATE(id) & (DOW_MODIFIED | DOW_GONE)) == DOW_MODIFIED)) {
 932                CHECK_ON_FLUSHCHAIN(id, DOW_LEAF_FLUSHHEAD);
 933                return;
 934        }
 935        /*
 936         * At this point, this dow is a goner! We should be able
 937         * to assert that if the GONE state is ON, then the dow
 938         * cannot be on any hash chains.
 939         */
 940        dow_flush_remove(id);
 941        if ((DOW_STATE(id) & DOW_GONE) == 0) {
 942                dow_remhash(id);
 943                if (DOW_TYPE(id) -- DOW_ISPAGE) {
 944                        VN_SOFTREF(DOW_VP(id));
 945                }
 946        } else {
```

```
951             CHECK_HASH_REMOVED(id);
952         }
953         dow_free(id);
954         return;
955     }
956 /*
957  * dow_intrans_wait(dowid_t id)
958  *     Wait for any current IO sequence to complete. This may not necessarily
959  *     require that an IO must occur -- just that dow_iodone processing
960  *     is performed on the id.
961  *
962  *
963  * Remarks:
964  *     No special handling is needed for the DOW_GONE case, assuming that
965  *     DOW_FLUSH/DOW_IOSETUP/DOW_INTRANS all guarantee that dow_iodone will
966  *     be performed for the id.
967  */
968 void
969 dow_intrans_wait(dowid_t id)
970 {
971     ASSERT(DOW_MUTEX_OWNED());
972     ASSERT(DOW_HOLD(id) > 0);
973
974     if (DOW_STATE(id) & (DOW_FLUSHINTRANS | DOW_IOSETUP)) {
975         DOW_SV_WAIT(id);
976     } else {
977         DOW_MUTEX_UNLOCK();
978     }
979
980 }
981 /*
982  * void
983  * dow_iowait_1(dowid_t id)
984  *     Wait until the IO initiated by a previous dow_handle_async
985  *     completes.
986  *
987  * Calling/Exit State:
988  *     Caller holds the dow mutex, and is prepared to block.
989  *
990  * Remarks:
991  *     If dow_handle_async could not initiate a pruning operation due
992  *     to an intransit IO when it got called, then it will set the
993  *     state to PRUNE'd -- causing dow_iodone() to resubmit the id for
994  *     a quick flush. In that case, dow_iowait may need to wait twice;
995  *     the first time to permit the INTRANS state to clear, and the
996  *     second time, for the resubmitted IO to complete.
997  *
998  *     No special handling is needed for the DOW_GONE case, assuming that
999  *     (a) DOW_FLUSH/DOW_IOSETUP/DOW_INTRANS all guarantee that dow_iodone
1000 *     will be performed for the id.
``` fs_dow/dow_util.c (dow_intrans_wait)

```
1001    *    (b) if the id is not in one of these states, then DOW_MODIFIED must
1002    *        imply !DOW_GONE, so no additional checking is needed.
1003    */
1004   void
1005   dow_intrans_wait(dowid_t id)
1006   {
1007
1008       ASSERT(DOW_MUTEX_OWNED());
1009       ASSERT(DOW_HOLD(id) > 0);
1010       if ((DOW_STATE(id) & (DOW_FINISHINTRANS | DOW_IOSETUP)) {
1011           if ((DOW_STATE(id) & DOW_MODINTRANS) != DOW_MODINTRANS) {
1012               DOW_SV_WAIT(id);
1013               return;
1014           }
1015           /*
1016            * else: MODIFIED and INTRANS. In this case, we may need to
1017            *       wait a second time (depending on whether PRUNE is
1018            *       turned ON or not).
1019            */
1020           if ((DOW_STATE(id) & DOW_PRUNE) == 0) {
1021               DOW_SV_WAIT(id);
1022               return;
1023           }
1024           /*
1025            * After the current IO completes, we will retest the state
1026            * and wait a second time.
1027            */
1028           DOW_SV_WAIT(id);
1029           DOW_MUTEX_LOCK();
1030       }
1031
1032       if ( (DOW_STATE(id) & (DOW_FLUSHINTRANS | DOW_IOSETUP)) ||
1033            ((DOW_STATE(id) & DOW_MODPRUNE) == DOW_MODPRUNE)) {
1034           DOW_SV_WAIT(id);
1035           return;
1036       }
1037       /*
1038        * there is no IO that the caller is interested in waiting for.
1039        */
1040       DOW_MUTEX_UNLOCK();
1041       return;
1042   }
1043
1044   /*
1045    * void
1046    * dow_iowait(dowid_t id)
1047    *   Wait for any initiated IO on the dow to finish, including IO that
1048    *   may not be currently underway but would happen soon, anyway, due
1049    *   to the setting of the PRUNE state.
1050    *
``` fs_dow/dow_util.c (dow_iowait_1)

```
     * Calling/Exit State:
     *    None. The caller must be prepared to block.
     */
    void
    dow_lowait(dowid_t id)
    {
        if (!VALID_DOWID(id)) {
            return;
        }
        ASSERT(KS_HOLDOLOCKS());
        DOW_MUTEX_LOCK();
        dow_lowait_l(id); /* drops the mutex */
        return;
    }
```

```
fs_dow/dowlink_util.c                                               Page 130

1  #ident   "@(#)kern:fs/dowlink_util.c    1.3"
 2  #ident   "$Header: $"
 3
 4  #include    <fs/dow.h>
 5  #include    <fs/fs_hier.h>
 6  #include    <io/conf.h>
 7  #include    <mcm/kmcm.h>
 8  #include    <mem/page.h>
 9  #include    <svc/clock.h>
10  #include    <util/cmn_err.h>
11  #include    <util/debug.h>
12  #include    <util/ghier.h>
13  #include    <util/sysmacros_f.h>
14  #include    <util/var.h>
15
16  dowlink_t       dow_link_tab[DOWLINK_ARRAYSIZE];
17
18  /*
19   * void
20   * dowlink_arrayinit(void)
21   *       Initialize the array of dow link structures.
22   *
23   * Calling/Exit State:
24   *       None.
25   */
26  void
27  dowlink_arrayinit(void)
28  {
29      dowlinkid_t i;
30
31      for (i = 0; i < (DOWLINK_ARRAYSIZE); i++) {
32          dowlink_init(i, i, DOW_BADID);
33          DOWLINK_DEBUG_INIT(i, i);
34      }
35      DOWLINK_FREE_SV_INIT();
36      dowlink_freecount = 0;
37      for (i = DOWLINK_TABLE_BASE;
38           i < (DOWLINK_TABLE_BASE + DOWLINK_MAXFREE); i++) {
39          DOWLINK_DEBUG_INIT(i, DOWLINK_BADID);
40          dowlink_free(i);
41      }
42      ASSERT(dowlink_freecount == DOWLINK_MAXFREE);
43  }
44
45  /*
46   * void
47   * dowlink_init(dowlinkid_t link, dowlinkid_t inverselink, dowid_t id)
48   *       Initialize the dow link upon allocation. If link X were to
49   *       be used to specify an antecedence/dependence relationship
```

(dowlink_arrayinit)

```
 51  *    between two dow ids A and B, such that X is on the appropriate
 52  *    link chain for A, then,
 53  *         inverselink identifies the corresponding link on B's
 54  *                    link chain that identifies the dowid A,
 55  *         id identifies the dowid B.
 56  *
 57  * Calling/Exit State:
 58  *    dow_mutex held by caller.
 59  */
 60
 61 void
 62 dowlink_init(dowlinkid_t link, dowlinkid_t inverselink, dowid_t id)
 63 {
 64      DOWLINK_NEXT(link) = link;
 65      DOWLINK_PREV(link) = link;
 66      DOWLINK_INVERSE(link) = inverselink;
 67      DOWLINK_DOWID(link) = id;
 68 }
 69
 70 #ifdef DEBUG
 71 /*
 72  *
 73  * dowlink_debug_init(dowlinkid_t link, dowlinkid_t head)
 74  *    Initialize debugging support fields in a link that will
 75  *    be inserted on a linkchain headed by "head".
 76  *
 77  * Calling/Exit State:
 78  *    dow_mutex held by caller.
 79  */
 80
 81 void
 82 dowlink_debug_init(dowlinkid_t link, dowlinkid_t head)
 83 {
 84      DOWLINK_DEBUG_LHEAD(link) = head;
 85      DOWLINK_DEBUG_CNT(link) = 0;
 86 }
 87
 88 /*
 89  * void
 90  * dowlink_free_badinit(dowlinkid_t link)
 91  *    Festoon this link with artful material to lure insects.
 92  *
 93  * Calling/Exit State:
 94  *    dow_mutex held by caller.
 95  */
 96 void
 97 dowlink_free_badinit(dowlinkid_t link)
 98 {
```

```
101             DOWLINK_INVERSE(link) = DOWLINK_BADID;
102             DOWLINK_DOWID(link) = DOW_BADID;
103     }
104     #endif
105
106     /*
107      * dowlinkid_t
108      * dowlink_alloc(void)
109      *     Allocate a link structure.
110      *
111      * Calling/Exit State:
112      *     dow_mutex is held by caller.
113      *
114      * Remark:
115      *     The freelist is maintained doubly linked only under DEBUG
116      *     compile option. Therefore, the following assert is not valid
117      *     except in DEBUG compile:
118      *         ASSERT(DOWLINK_LINKS_SANE(DOWLINK_FREEHEAD))
119      */
120     dowlinkid_t
121     dowlink_alloc(void)
122     {
123             dowlinkid_t freefirst;
124
125             ASSERT(DOWLINK_LINKS_SANE(DOWLINK_FREEHEAD));
126             if (dowlink_freecount_ == 0) {
127                     ASSERT(EMPTY_DOWLINK_LIST(DOWLINK_FREEHEAD));
128                     return(DOWLINK_BADID);
129             }
130             ASSERT(!EMPTY_DOWLINK_LIST(DOWLINK_FREEHEAD));
131             --(dowlink_freecount_);
132             freefirst = DOWLINK_NEXT(DOWLINK_FREEHEAD);
133             ASSERT(VALID_DOWLINK_ID(freefirst));
134             DOWLINK_NEXT(DOWLINK_FREEHEAD) = DOWLINK_NEXT(freefirst);
135     #ifdef  DEBUG
136             DOWLINK_PREV(DOWLINK_NEXT(freefirst)) = DOWLINK_FREEHEAD;
137     #endif
138             DOWLINK_DEBUG_FREELEAVE(freefirst);
139
140     #ifdef  DEBUG
141             DOWLINK_PREV(freefirst) = (-8877);
142             DOWLINK_NEXT(freefirst) = (-7708);
143             DOWLINK_INVERSE(freefirst) = (-6655);
144             DOWLINK_DOWID(freefirst) = (-5566);
145     #endif
146             DOWLINK_DEBUG_INIT(freefirst, DOWLINK_BADID);
147
148             return(freefirst);
149     }
150
```

```
        /*
151     *   dowlinkid_t
152     *   dowlink_free(void)
153     *       Free a link structure.
154     *
155     *   Calling/Exit State:
156     *       dow_mutex is held by caller.
157     *
158     *   Remark:
159     *       The freelist is maintained doubly linked only under DEBUG
160     *       compile option. Therefore, the following assert is not valid
161     *       except in DEBUG compile:
162     *           ASSERT(DOWLINK_LINKS_SANE(DOWLINK_FREEHEAD))
163     */
164
165     void
166     dowlink_free(dowlinkid_t link)
167     {
168         ASSERT(VALID_DOWLINK_ID(link));
169         DOWLINK_NEXT(link) = DOWLINK_NEXT(DOWLINK_FREEHEAD);
170
171     #ifdef DEBUG
172         DOWLINK_PREV(link) = DOWLINK_FREEHEAD;
173         DOWLINK_PREV(DOWLINK_NEXT(link)) = link;
174     #endif
175
176         DOWLINK_NEXT(DOWLINK_FREEHEAD) = link;
177         (:dowllink_freecount;
178         if (DOWLINK_FREE_SV_BLKD()) {
179             DOWLINK_FREE_SV_BROADCAST();
180         }
181         DOWLINK_FREE_RADINIT(link);
182         DOWLINK_DEBUG_FREECNTR(link);
183     }
184
185     /*
186     *   void
187     *   dowlink_addlink(dowlinkid_t newlink, dowlinkid_t headlink)
188     *       add the link, newlink, to the dow link chain anchored
189     *       at headlink.
190     *
191     *   Calling/Exit State:
192     *       dow_mutex held by caller.
193     */
194     void
195     dowlink_addlink(dowlinkid_t newlink, dowlinkid_t headlink)
196     {
197         ASSERT(VALID_DOWLINK_ID(newlink));
198         ASSERT(VALID_DOWLINK_HEAD(headlink));
199         DOWLINK_NEXT(newlink) = DOWLINK_NEXT(headlink);
200
``` fs_dow/dowlink_util.c  (dowlink_addlink)

```
201            DOWLINK_PREV(newlink) = headlink;
202            DOWLINK_NEXT(headlink) = newlink;
203            DOWLINK_PREV(DOWLINK_NEXT(newlink)) = newlink;
204            DOWLINK_DEBUG_ENTER(newlink, headlink);
205
206    }
207    /*
208    *  void
209    *  dowlink_sublink(dowlinkid_t link)
210    *    Remove the specified link from its link chain.
211    *
212    *  Calling/Exit State:
213    *    dow_mutex held by caller.
214    *
215    */
216    void
217    dowlink_sublink(dowlinkid_t link)
218    {
219            DOWLINK_NEXT(DOWLINK_PREV(link)) = DOWLINK_NEXT(link);
220            DOWLINK_PREV(DOWLINK_NEXT(link)) = DOWLINK_PREV(link);
221            DOWLINK_DEBUG_LEAVE(link);
222    }
223
224    /*
225    *  int
226    *  dowlink_makelink(dowid_t dep_id, dowid_t ant_id)
227    *    Build two linkages: one on the dep_id's antecedent
228    *    link chain to represent the dependency on ant_id; the
229    *    other, on ant_id's dependent link chain to represent its
230    *    antecedence over dep_id. Also adjust the dependent and
231    *    antecedent counts for ant_id and dep_id respectively.
232    *
233    *    Return appropriate error code if the creation of the dependence
234    *    link causes maximum dependent/antecedent counts to be exceeded.
235    *    Otherwise return 0.
236    *
237    *  Calling/Exit State:
238    *    dow_mutex held by caller.
239    */
240    int
241    dowlink_makelink(dowid_t dep_id, dowid_t ant_id)
242    {
243            dowlinkid_t dlink, alink, dep_head, ant_head;
244
245            ASSERT(DOWLINK_AVAIL(2));
246            ASSERT(VALID_DOWID(dep_id));
247            ASSERT(VALID_DOWID(ant_id));
248
249            if (DOW_DEP_CNT(ant_id) >= DOW_DEP_MAX) {
250                    return (DOW_MAX_DEPCNT);
``` fs_dow/dowlink_util.c  (dowlink_makelink)

```
351         } else if (DOW_ANT_CNT(dep_id) >= DOW_ANT_MAX) {
352             return (DOW_MAX_ANTCNT);
353         }
354
355         dep_head = DOWLINK_ANT_LINKHEAD(dep_id);
356         ant_head = DOWLINK_DEP_LINKHEAD(ant_id);
357
358         dlink = dowlink_alloc();
359         alink = dowlink_alloc();
360
361         dowlink_init(alink, dlink, dep_id);
362         dowlink_init(dlink, alink, ant_id);
363
364         dowlink_addlink(alink, ant_head);
365         dowlink_addlink(dlink, dep_head);
366
367         ++DOW_DEP_CNT(ant_id);
368         ++DOW_ANT_CNT(dep_id);
369
370         ASSERT(DOWLINK_JLINK_SANE(dlink));
271
272 #ifdef DEBUG
273     {
274         ASSERT( (dep_id == DOWLINK_DEBUG_YYDOW(dlink)) &&
275                 (ant_id == DOWLINK_DEBUG_MYDOW(alink)) &&
276                 (ant_head == DOWLINK_DEBUG_LHEAD(alink)) &&
277                 (dep_head == DOWLINK_DEBUG_LHEAD(dlink)) &&
278                 (DOWLINK_DEBUG_CNT(anL_head) == DOW_DEP_CNT(ant_id)) &&
279                 (DOWLINK_DEBUG_CNT(dep_head) == DOW_ANT_CNT(dep_id)) );
280     }
281 #endif
282     return(0);
283 }
284
285 /*
286  * void
287  * dowlink_breaklink(alink, dependent, antecedent)
288  * Dismantle the linkage between dependent and antecedent ids.
289  *     - link exists on antecedent's list
290  *     - remove link and its inverse, and free them both
291  * Adjust the dependent and antecedent counts of the dow ids
292  * appropriately.
293  *
294  * Calling/Exit State:
295  *     dow_mutex held by caller.
296  */
297 void
298 dowlink_breaklink(dowlinkid_t alink, dowid_t dep_id, dowid_t ant_id)
299 {
300     dowlinkId_t dlink;
```

```
                                                              (dowlink_breaklink)

301        ASSERT(VALID_DOWID(dep_id));
302        ASSERT(VALID_DOWID(ant_id));
303
304
305    ASSERT(VALID_DOWLINK_ID(alink));
306    dlink = DOWLINK_INVERSE(alink);
307    ASSERT(VALID_DOWLINK_ID(dlink));
308    ASSERT(DOWLINK_ILINK_SANE(dlink));
309    ASSERT(DOWLINK_DOWID(dlink) == ant_id);
310    ASSERT(DOWLINK_DOWID(alink) == dep_id);
311
312 #ifdef DEBUG
313    {
314        dowlinkid_t dep_head = DOWLINK_ANT_LINKHEAD(dep_id);
315        dowlinkid_t ant_head = DOWLINK_DEP_LINKHEAD(ant_id);
316
317        ASSERT( (dep_id == DOWLINK_DEBUG_MYDOW(dlink)) &&
318                (ant_id == DOWLINK_DEBUG_MYDOW(alink)) &&
319                (ant_head == DOWLINK_DEBUG_LHEAD(alink)) &&
320                (dep_head == DOWLINK_DEBUG_LHEAD(dlink)) &&
321                (DOWLINK_DEBUG_CNT(ant_head) == DOW_DEP_CNT(ant_id)) &&
322                (DOWLINK_DEBUG_CNT(dep_head) == DOW_ANT_CNT(dep_id)) );
323    }
324 #endif
325    dowlink_sublink(alink);
326    dowlink_sublink(dlink);
327    --(DOW_ANT_CNT(dep_id));
328    --(DOW_DEP_CNT(ant_id));
329    dowlink_free(alink);
330    dowlink_free(dlink);
331 }
332
333 /*
334  * int
335  * linkage_detect(dowid_t dep_id, dowid_t ant_id)
336  *    Return indication of whether: (a) a dependence link exists between
337  *    dep_id and ant_id, or (b) a dependence link exists the other way,
338  *    or, (c) there exists the possibility of a transitive dependence
339  *    between the ant_id and dep_id (i.e., whether the introduction of
340  *    the proposed link potentially results in a cycle), or (d) no link
341  *    exists and no possibility of a cycle exists either, so the proposed
342  *    link can be created.
343  *
344  * Calling/Exit State:
345  *    dow_mutex held by caller.
346  */
347 int
348 linkage_detect(dowid_t dep_id, dowid_t ant_id)
```

```
351  {
352      dowlinkid_t link, dep_ant_lhead, dep_dep_lhead;
353
354      /*
355       * first, we search the antecedent list of the dependent to see
356       * whether the desired link exists already (if so, return 0).
357       */
358
359      link = dep_ant_lhead = DOWLINK_ANT_LINKHEAD(dep_id);
360
361      ASSERT((DOW_ANT_CNT(dep_id) == 0) ||
362              !EMPTY_DOWLINK_LIST(dep_ant_lhead));
363      ASSERT((DOW_ANT_CNT(dep_id) > 0) ||
364              EMPTY_DOWLINK_LIST(dep_ant_lhead));
365      CHECK_DOWLINK_CHAIN(dep_ant_lhead);
366
367      while (((link = DOWLINK_NEXT(link)) != dep_ant_lhead) {
368
369          if (DOWLINK_DOWID(link) == ant_id) {
370              CHECK_DOW_LINKAGE(link);
371              return 0;
372          }
373      }
374
375      /*
376       * the desired link does not yet exist. check whether it can be
377       * created.
378       */
379      if (DOW_DEP_CNT(dep_id) == 0 || DOW_ANT_CNT(ant_id) == 0) {
380          /*
381           * there is no possibility of a cycle.
382           */
383          return (DOW_CREATE_OK);
384      }
385
386      /*
387       * At this point, we can either return an indication that a cycle
388       * is possible; or, check a little further to see whether a reverse
389       * link exists (in which case a cycle would be definite). This is
390       * largely a performance issue; we want to decide which of the two
391       * to flush, and knowing that ant_id definitely depends on dep_id
392       * tilts the bias towards flushing dep_id.
393       */
394
395      link = dep_dep_lhead = DOWLINK_DEP_LINKHEAD(dep_id);
396      ASSERT(!EMPTY_DOWLINK_LIST(dep_dep_lhead));
397      CHECK_DOWLINK_CHAIN(dep_dep_lhead);
398
399      while (((link = DOWLINK_NEXT(link)) != dep_dep_lhead) {
400
```

```
401        if (DOWLINK_DOWID(llnk) == ant_id) {
402            CHECK_DOW_LINKAGE(llnk);
403            return DOW_DEF_CYCLE;
404        }
405    }
406
407    return DOW_POS_CYCLE;
408 }
```

We claim:

1. An ordering subsystem for controlling the order of operations in a computer system, the computer system having a first unit and a second unit for files, having a file management subsystem for controlling operations for files, said file management subsystem specifying operations for files in response to new requests where a sequence of requests for said operations is represented by the requests R1, R2, . . . , Rr and where the requests for said operations in said sequence have order dependencies D1, D2, . . . Dd where r and d are integers, said order dependencies constraining the order for carrying out said operations, said ordering subsystem including, an ordering store for storing a plurality of entries, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, add means for adding entries to the ordering store by processing said new requests to identify one or more common operations CO0, CO1, . . . , COco, each of said common operations identifying an operation requested by one or more of the requests R1, R2, . . . , Rr, where said common operations have common order dependencies CD0, CD1, . . . , CDcd that preserve the order dependencies D1, D2, . . . , Dd between the operations in the requests, and where co and cd are integers, execution means for executing said one or more common operations CO0, CO1, . . . , COco responsive to the entries in the ordering store, and delete means for deleting entries from the ordering store, wherein said first unit is primary storage and said second unit is secondary storage, said requests are update requests, said operations include writes from said primary storage to said secondary storage and may include function calls, said writes from said primary storage to said secondary storage may include common writes combining one or more separate writes and may include associated function calls, and wherein said add means includes, dow_create means for providing one or more of said entries as common-write entries for identifying common writes or as function-call entries for identifying function calls, and dow_order means for providing one or more of said entries as order entries for identifying said order dependencies as common-write order dependencies or as function-call order dependencies.

2. The ordering subsystem of claim 1 wherein said add means includes, dow_create means for providing one or more of said entries as operation entries for identifying common operations, and dow_order means for providing one or more of said entries as order entries for identifying said common order dependencies.

3. The ordering subsystem of claim 2 wherein said delete means includes operation delete means for deleting operation entries from said ordering store and includes order delete means for deleting order entries from said ordering store.

4. The ordering subsystem of claim 3 wherein said delete means includes dow_abort means for deleting entries from said ordering store.

5. The ordering subsystem of claim 4 wherein said dow_abort means operates asynchronously with respect to said execution means.

6. The ordering subsystem of claim 1 wherein said operations include writes from said first unit to said second unit.

7. The ordering subsystem of claim 1 wherein said operations include function calls.

8. The ordering subsystem of claim 1 wherein said first unit is primary storage and said second unit is secondary storage and wherein said requests are update requests and said operations include writes from said primary storage to said secondary storage.

9. The ordering subsystem of claim 1 wherein said entries in the ordering store are organized in one or more sets with each set having an order from high order for predecessor operations to low order for dependent operations and wherein each of said function-call entries, if present in a set, is the lowest order so that function calls are the last performed operation in a set.

10. The ordering subsystem of claim 1 wherein a write for one or more of said update requests is delayed so as to be part of one of said common writes.

11. The ordering subsystem of claim 1 wherein said update requests R1, R2, . . . , Rr are presented in time order with R1 before R2, R2 before R3, . . . , R(r−1) before Rr and wherein a write for one or more of said update requests is delayed so as to be part of one of said common writes whereby writes for one or more of said update requests are not necessarily in the time order of the update requests R1, R2, . . . , Rr.

12. The ordering subsystem of claim 1 wherein said add means operates asynchronously with respect to said execution means.

13. The ordering subsystem of claim 1 wherein said delete means operates asynchronously with respect to said execution means.

14. The ordering subsystem of claim 1 wherein said system includes a local unit and a remote unit connected by a network.

15. The ordering subsystem of claim 14 wherein said first unit is primary storage in said local unit and said second unit is secondary storage in said local unit, wherein said requests are update requests and said operations include writes from said primary storage to said secondary storage and may include function calls, and wherein said remote unit initiates said requests for writes from said primary storage to said secondary storage over said network.

16. An ordering subsystem for controlling the order of operations in a computer system, the computer system having a first unit and a second unit for files, having a file management subsystem for controlling operations for files, said file management subsystem specifying operations for files in response to new requests where a sequence of requests for said operations is represented by the requests R1, R2, . . . Rr and where the requests for said operations in said sequence have order dependencies D1, D2, . . . , Dd where r and d are integers, said order dependencies constraining the order for carrying out said operations, said ordering subsystem including, an ordering store for storing a plurality of entries, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, add means for adding entries to the ordering store by processing said new requests to identify one or more common operations CO0, CO1, ... COco, each of said common operations identifying an operation requested by one or more of the requests R1, R2, ... Rr, where said common operations have common order dependencies CD0, CD1, ... CDcd that preserve the order dependencies D1, D2, ... Dd between the operations in the requests, and where co and cd are integers, execution means for executing said one or more common operations CO0, CO1, ... , COco responsive to the entries in the ordering store, and delete means for deleting entries from the ordering store, wherein the computer system includes call means for issuing a call to said ordering subsystem and said ordering subsystem includes, dow_flush_chain means for queuing operation entries for operations to be executed, dow_strategy means for searching the ordering store to identify operation entries for operations to be executed and for placing said operation entries for operations to be executed on the dow_flush_chain means, dow_flush means for removing operation entries from the dow_flush_chain and for initiating the operations to be executed.

17. An ordered write subsystem for controlling the order of operations in connection with writes from primary storage to secondary storage in a computer system, the computer system having data organized in files, having primary storage for storing files, having a secondary storage for storing files, having a file management subsystem for controlling transfers of files between primary storage and secondary storage, said file management subsystem specifying operations in connection with writes from primary storage to secondary storage in response to new update requests for said operations, where a sequence of update requests is represented by the update requests R1, R2, ... , R(r-1), Rr, where the update requests in said sequence have order dependencies D1, D2, ... , Dd and where r and d are integers, said order dependencies constraining the order for carrying out said operations, said ordered write subsystem including, an ordering store for storing a plurality of entries, each of said entries containing an operation type identifying one of said operations, at least one of said entries at some time also containing a link which links said entry to another of said entries, said link specifying an order for carrying out said operations in said linked entries, said entries and said links defining a partially ordered acyclic graph, add means for adding entries to said ordering store by processing said new update requests to identify common operations, said common operations including, one or more common writes CW1, CW2, ... , CWcw for a combined operation requested by one or more of the update requests R1, R2, ... , Rr where cw is an integer less than r, and one or more function calls FC1, FC2, ... , FCfc where fc is an integer, and wherein said common writes and said function calls have common order dependencies CD1, CD2, ... , CDcd that preserve the update order dependencies D1, D2, ... , Dd between the operations, where cd is an integer, execution means for executing common operations including, write means responsive to the entries in the ordering store for writing from primary storage to secondary storage with said common writes CW1, CW2, ... , CWcw constrained by the common-write order dependencies CD1, CD2, ... , CDcd, function means for executing said function calls, and delete means for deleting entries from the ordering store, wherein said ordering subsystem includes, dow_startmod means for indicating that a set-up for a common operation is to be initiated, dow_setmod means for indicating that said set-up is complete, dow_create means for providing one of said entries as an operation entry for identifying said common operation, and dow_order means for providing one of said entries as an order entry for identifying said common order dependency.

18. The ordering subsystem of claim 17 wherein said add means includes, dow_create means for providing one or more of said entries as operation entries for identifying said common operations, and dow_order means for providing one or more of said entries as order entries for identifying said common order dependencies.

19. The ordering subsystem of claim 18 wherein said dow_create means provides said operation entries as common-write entries for identifying common writes.

20. The ordering subsystem of claim 18 wherein said dow_create means provides said operation entries as function-call entries for identifying function calls.

21. The computer system of claim 17 wherein said ordering store includes ordered locations with higher-order locations and lower-order locations and for each common-write entry, zero or more higher-order locations for an order entry pointing to zero or more higher-order common writes and zero or more lower-order locations for an order entry pointing to zero or more lower-order common writes.

22. The computer system of claim 17 wherein a write for one or more of said update requests is delayed so as to be part of one of said common writes.

23. The computer system of claim 17 wherein said update requests R1, R2, ... , Rr are presented in time order with R1 before R2, R2 before R3, ... , R(r-1) before Rr and wherein a write for one or more of said update requests is delayed so as to be part of one of said common writes whereby writes for one or more of said update requests are not in the time order of the update requests R1, R2, ... , R(r-1), Rr.

24. The computer system of claim 17 wherein said add means operates asynchronously with respect to said execution means.

25. The computer system of claim 17 wherein said delete means includes operation delete means for deleting operation entries from said ordering store and includes order delete means for deleting order entries from said ordering store.

26. The ordering subsystem of claim 25 wherein said operation delete means includes dow_abort means for deleting entries from said ordering store.

27. The ordering subsystem of claim 26 wherein said dow_abort means operates asynchronously with respect to said execution means.

28. The ordering subsystem of claim 17 wherein said primary storage includes a cache and wherein said ordered write subsystem causes said file management subsystem to initiate writes from said cache.

29. The ordering subsystem of claim 27 further including device drivers connected to write from said cache to said secondary storage.

30. The ordering subsystem of claim 19 wherein said ordering subsystem is operative for a first one and for a second one of said common operations and wherein, said dow__startmod means is called for indicating that a first set-up for said first one of said common operations is to be initiated and dow__startmod means is again called for indicating that a second set-up for said second one of said common operations is to be initiated, said dow__setmod means is called for indicating that said first set-up is complete for said first one of said common operations, said dow__create means is called for providing a first one of said entries as a first operation entry for identifying said first common operation, said dow__order means is called for providing a first one of said entries as an order entry for identifying said first common order dependency; said dow__order means employed to provide said order entry after said dow__setmod means are employed to indicate that said first set-up is complete for said first one of said common operations and before said dow__startmod means are employed to indicate that said second set-up for said second one of said common operations is to be initiated.

31. A method in a computer system having a first unit and a second unit for files, having a file management subsystem for controlling operations for files, said file management subsystem specifying operations for files in response to new requests where a sequence of requests for the operations is represented by the requests R1, R2, ..., Rr and where the requests for the operations in said sequence have order dependencies D1, D2, ..., Dd where r and d are integers, said order dependencies constraining the order for carrying out the operations, said computer system including an ordering subsystem for controlling the order of operations including, said method comprising:

storing a plurality of entries in an ordering store, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, adding entries to the ordering store by processing said new requests to identify one or more common operations CO1, CO2, ..., COco, each of the common operations identifying an operation requested by one or more of the requests R1, R2, ..., Rr, where said common operations have common order dependencies CD1, CD2, ..., CDcd that preserve the order dependencies D1, D2, ..., Dd between the operations in the requests, and where co and cd are integers, and executing said one or more common operations CO1, CO2, ..., COco responsive to the entries in the ordering store, wherein said first unit is primary storage and said second unit is secondary storage, said requests are update requests, said operations include writes from said primary storage to said secondary storage and may include function calls, said writes from said primary storage to said secondary storage may include common writes combining one or more separate writes and may include associated function calls, and said add step includes, dow__create step for providing one or more of said entries as common-write entries for identifying common writes or as function-call entries for identifying function calls, and dow__order step for providing one or more of said entries as order entries for identifying said order dependencies as common-write order dependencies or as function-call order dependencies.

32. The computer method of claim 31 wherein said adding step includes, dow__create step for providing one or more of said entries as operation entries for identifying common operations, and dow__order step for providing one or more of said entries as order entries for identifying said common order dependencies.

33. The computer method of claim 32 further comprising a delete step which includes an operation delete step for deleting operation entries from said ordering store and includes an order delete step for deleting order entries from said ordering store.

34. The computer method of claim 30 wherein said delete step includes a dow__abort step for deleting entries from said ordering store.

35. The computer method of claim 34 wherein said dow__abort step operates asynchronously with respect to said execution step.

36. The computer method of claim 31 wherein said operations include writes from said first unit to said second unit.

37. The computer method of claim 31 wherein said operations include function calls.

38. The computer method of claim 31 wherein said first unit is primary storage and said second unit is secondary storage and wherein said requests are update requests and said operations include writes from said primary storage to said secondary storage.

39. The computer method of claim 31 wherein said entries in the ordering store are organized in one or more sets with each set having an order from high order for preceding operations to low order for succeeding operations and wherein said function-call entries, if present in a set, are the lowest order so that function calls are the last performed operation in a set.

40. The computer method of claim 31 wherein a write for one or more of said update requests is delayed so as to be part of one of said common writes.

41. The computer method of claim 31 wherein said update requests R1, R2, ..., Rr are presented in time order with R1 before R2, R2 before R3, ..., R(r-1) before Rr and wherein a write for one or more of said update requests is delayed so as to be part of one of said common writes whereby writes for one or more of said update requests are not necessarily in the time order of the update requests R1, R2, ..., Rr.

42. The computer method of claim 31 wherein said add step operates asynchronously with respect to said execution step.

43. The computer method of claim 31 further comprising a delete step which operates asynchronously with respect to said execution step.

44. The computer method of claim 31 wherein said system includes a local unit and a remote unit connected by a network.

45. The computer method of claim 44 wherein said first unit is primary storage in said local unit and said second unit is secondary storage in said local unit, wherein said requests are update requests and said operations include writes from said primary storage to said secondary storage and may include function calls, wherein said remote unit communicates over said network with said local unit to move data between said first unit and said second unit.

46. A computer method in a computer system having data organized in files, having primary storage for storing files, having a secondary storage for storing files, having a file management subsystem for controlling transfers of files between primary storage and secondary storage, said file management subsystem specifying operations in connection with writes from primary storage to secondary storage in response to new update requests where a sequence of update requests for the operations is represented by the update requests R1, R2, ..., R(r−1), Rr, where the update requests in said sequence have order dependencies D1, D2, ..., Dd and where r and d are integers, the order dependencies constraining the order for carrying out the operations, said computer method including an ordered write subsystem for controlling the order of operations in connection with writes from primary storage to secondary storage, said method including, storing a plurality of entries in an ordering store, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, add steps for adding entries to said ordering store by processing said new update requests to identify common operations, said common operations including, one or more common writes CW1, CW2, ..., CWcw for a combined operation identifying an operation requested by one or more of the update requests R1, R2, ..., Rr where cw is an integer lees than r, and one or more function calls FC1, FC2, ..., FCfc where fc is an integer, and where said common writes and said function calls have common order dependencies CD1, CD2, ..., CDcd that preserve the update order dependencies D1, D2, ..., Dd between the operations in the requests, where cd is an integer, executing common operations including, write steps responsive to the entries in the ordering store for writing from primary storage to secondary storage with said common writes CW1, CW2, ..., CWcw constrained by the common-write order dependencies CD1, CD2, ..., CDcd, function steps for executing said function calls, and deleting entries from the ordering store, wherein said ordering subsystem performs, dow__startmod steps for indicating that a set-up for a common operation is to be initiated, dow__setmod steps for indicating that said set-up is complete, dow__create steps for providing one of said entries as an operation entry for identifying said common operation, and dow__order steps for providing one of said entries as an order entry for identifying said common order dependency.

47. The computer method of claim 46 wherein said add steps include, dow__create steps for providing one or more of said entries as operation entries for identifying said common operations, and dow__order steps for providing one or more of said entries as order entries for identifying said common order dependencies.

48. The computer method of claim 46 wherein said dow__create steps provide said operation entries as common-write entries for identifying common writes.

49. The computer method of claim 46 wherein said dow__create steps provide said operation entries as function-call entries for identifying function calls.

50. The computer method of claim 46 wherein said ordering store includes ordered locations with higher-order locations and lower-order locations and wherein said ordering store includes for each common-write entry, zero or more higher-order locations for an order entry pointing to zero or more higher-order common writes and zero or more lower-order locations for an order entry pointing to zero or more lower-order common writes.

51. The computer method of claim 46 wherein a write for one or more of said update requests is delayed so as to be part of one of said common writes.

52. The computer method of claim 46 wherein said update requests R1, R2, ..., Rr are presented in time order with R1 before R2, R2 before R3, ..., R(r−1) before Rr and wherein a write for one or more of said update requests is delayed so as to be part of one of said common writes whereby writes for one or more of said update requests are not in the time order of the update requests R1, R2, ..., R(r−1), Rr.

53. The computer method of claim 46 wherein said add steps operate asynchronously with respect to said execution steps.

54. The computer method of claim 46 wherein said deleting step includes an operation delete step for deleting operation entries from said ordering store and includes an order delete step for deleting order entries from said ordering store.

55. The computer method of claim 54 wherein said operation delete step includes a dow__abort step for deleting entries from said ordering store.

56. The computer method of claim 55 wherein said dow__abort step operates asynchronously with respect to said execution steps.

57. The computer method of claim 46 wherein said ordering subsystem is operative for a first one and for a second one of said common operations and wherein, said dow__startmod steps are called for indicating that a first set-up for said first one of said common operations are to be initiated and dow__startmod steps are again called for indicating that a second set-up for said second one of said common operations is to be initiated, said dow__setmod steps are called for indicating that said first set-up are complete for said first one of said common operations, said dow__create steps are called for providing a first one of said entries as a first operation entry for identifying said first common operation, said dow__order steps are called for providing a first one of said entries as an order entry for identifying said first common order dependency; said dow__order steps employed to provide said order entry after said dow__setmod steps are employed to indicate that said first set-up is complete for said first one of said common operations and before said dow__startmod steps are employed to indicate that said second set-up for said second one of said common operations is to be initiated.

58. A computer system having a first unit and a second unit for files, having an operating system including a file system with a plurality of file system implementations, said operating system having a kernel formed of a plurality of subsystems including a file management subsystem for controlling operations for files, said file management subsystem specifying operations for files in response to new requests where a sequence of requests for said operations is represented by the requests R1, R2, . . . , Rr and where the requests for said operations in said sequence have order dependencies D1, D2, . . . , Dd, said order dependencies constraining the order for carrying out said operations, said kernel including an ordering subsystem for controlling the order of operations, said ordering subsystem organized independently of other subsystems of said kernel and having a common interface for communicating with said other subsystems, said ordering subsystem including, an ordering store for storing a plurality of entries, each of said entries containing an operation type identifying one of said operations for files, at least one of said entries at some time also containing a link which links said entry to another of said entries, said link specifying an order for carrying out said operations in said linked entries, said entries and said links defining a partially ordered acyclic graph, add means for adding entries to the ordering store by processing said new requests to identify one or more common operations CO1, CO2, . . . , COco, each of said common operations identifying an operation requested by one or more of the requests R1, R2, . . . , Rr, where said common operations have common order dependencies CD1, CD2, . . . , CDcd that preserve the order dependencies D1, D2, . . . , Dd between the operations in the requests, execution means for executing said one or more common operations CO1, CO2, . . . , COco responsive to the entries in the ordering store, and delete means for deleting entries from the ordering store, wherein said ordering subsystem includes in said common interface, dow_startmod means for indicating that a set-up for a common operation is to be initiated, dow_setmod means for indicating that said set-up is complete, dow_create means for providing one of said entries as an operation entry for identifying said common operation, and dow_order means for providing one of said entries as an order entry for identifying said common order dependency.

59. The computer system of claim 58 wherein said ordering subsystem is operative for a first one and for a second one of said common operations and wherein, said dow_startmod means is called for indicating that a first set-up for said first one of said common operations is to be initiated and dow_startmod means is again called for indicating that a second set-up for said second one of said common operations is to be initiated, said dow_setmod means is called for indicating that said first set-up is complete for said first one of said common operations, said dow_create means is called for providing a first one of said entries as a first operation entry for identifying said first common operation, said dow_order means is called for providing a first one of said entries as an order entry for identifying said first common order dependency; said dow_order means is employed to provide said order entry after said dow_setmod means is employed to indicate that said first set-up is complete for said first one of said common operations and before said dow_startmod means is employed to indicate that said second set-up for said second one of said common operations is to be initiated.

* * * * *